United States Patent [19]

Parker et al.

[11] Patent Number: 4,901,340
[45] Date of Patent: Feb. 13, 1990

[54] SYSTEM FOR THE EXTENDED PROVISION OF CELLULAR MOBILE RADIOTELEPHONE SERVICE

[75] Inventors: Terry S. Parker, Spring; Harold G. Saroka, Winfield; Harold E. Horton, San Ramon; Edward L. Didion, Spring; Elmer Lyle, Spring; Randall L. Crouse, Spring, all of Tex.

[73] Assignee: GTE Mobilnet Incorporated, Houston, Tex.

[21] Appl. No.: 246,582

[22] Filed: Sep. 19, 1988

[51] Int. Cl.⁴ .................................................. H04Q 7/04
[52] U.S. Cl. ........................................ 379/60; 455/33; 379/57
[58] Field of Search .................. 379/60, 58, 59, 57, 379/63; 455/33, 34, 12, 54, 56, 58, 32; 340/825.44, 825.54, 311.1, 313

[56] References Cited

U.S. PATENT DOCUMENTS

| | | | |
|---|---|---|---|
| 4,178,476 | 12/1979 | Frost | 379/57 |
| 4,644,351 | 2/1987 | Zabarsky et al. | 340/825.44 |
| 4,658,416 | 4/1987 | Tanaka | 379/57 |
| 4,670,905 | 6/1987 | Sandvos et al. | 455/33 |
| 4,700,374 | 10/1987 | Bini | 379/60 |
| 4,723,264 | 2/1988 | Sasuta | 379/58 |
| 4,737,978 | 4/1988 | Burke et al. | 379/60 |
| 4,747,122 | 5/1988 | Bhagat et al. | 379/57 |
| 4,748,655 | 5/1988 | Thrower et al. | 379/60 |
| 4,752,951 | 6/1988 | Kennecker | 379/211 |
| 4,775,999 | 10/1988 | Williams | 379/59 |
| 4,814,763 | 3/1989 | Nelson et al. | 340/825.44 |
| 4,827,499 | 5/1989 | Warty et al. | 379/58 |
| 4,833,701 | 5/1989 | Comroe et al. | 379/60 |
| 4,833,702 | 5/1989 | Snitara et al. | 379/60 |

FOREIGN PATENT DOCUMENTS 0114016 9/1979 Japan .

OTHER PUBLICATIONS

Huff, D. "Cellular Networking: The Building of the Nationwide Cellular Network." Cellular Business (Aug. 1988).

Primary Examiner—Robert Lev
Attorney, Agent, or Firm—John A. Odozynski

[57] ABSTRACT

A technique for enabling a peregrinating Cellular Mobile Radiotelephone (CMR) subscriber to automatically receive, in a foreign service area (that is, an area outside his home service area), calls placed to his MID at his home service area. A roaming processor is coupled through a cable or LAN to a switch associated with a foreign MTSO and is coupled, preferably through a private data network, to a switch associated with the subscriber's home MTSO. Within the roaming processor resides a program that detects the reception at the foreign switch of a predetermined code indicating that calls placed to the roamer's home MID are to be forwarded to the foreign MTSO. Subsequent to the "validation" of the roamer and to the performance of certain software housekeeping tasks, the roamer is assigned a Temporary Directory Number (TDN) for use in the remote service area. The FMR processor then commands the subscriber's home MTSO switch to forward calls, placed to the subscriber's MID at the home MTSO, to the TDN. Calls are subsequently forwarded, via the PSTN, from the subscriber's home MTSO to the foreign MTSO.

78 Claims, 19 Drawing Sheets

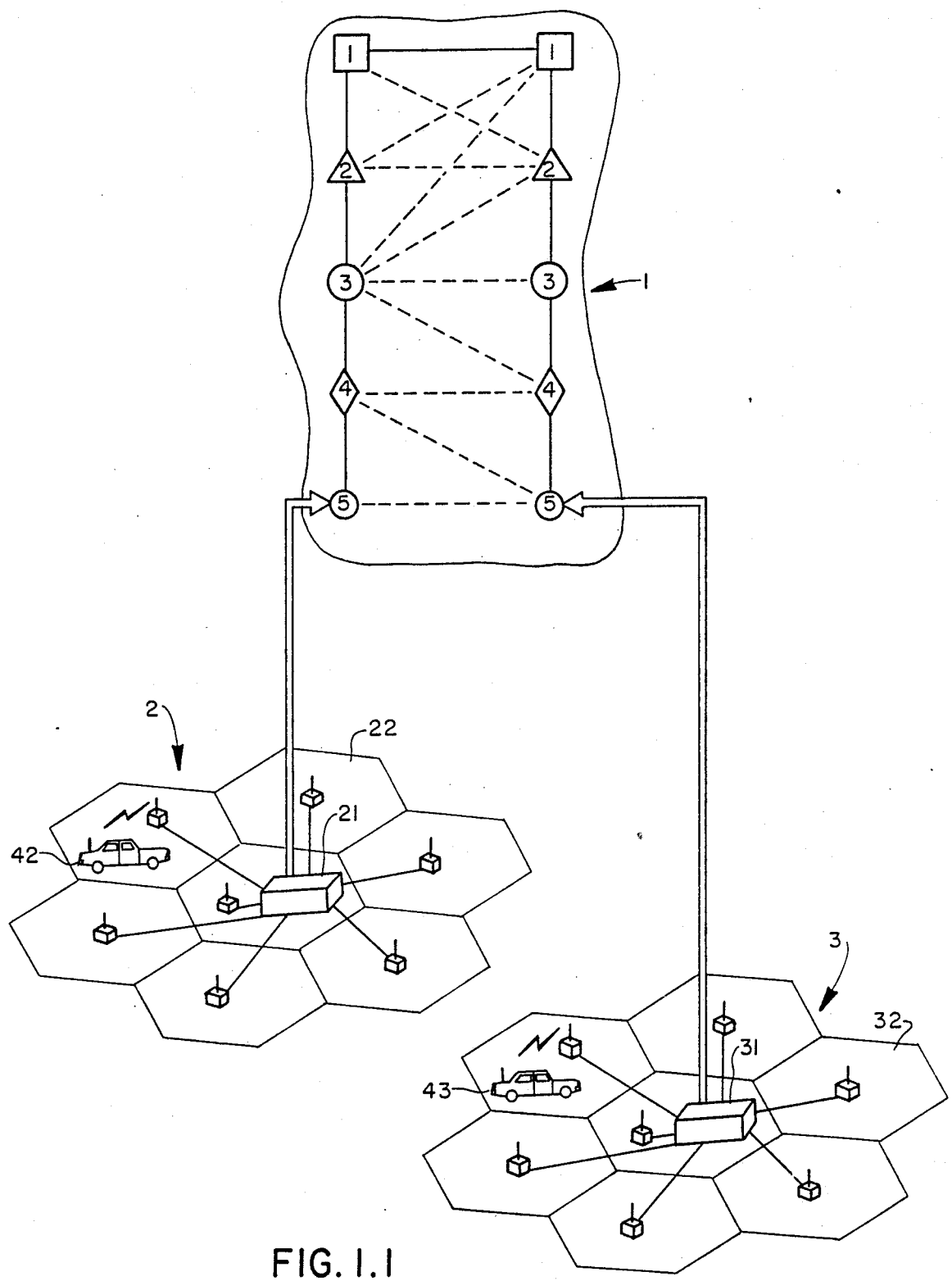
FIG. 1.1

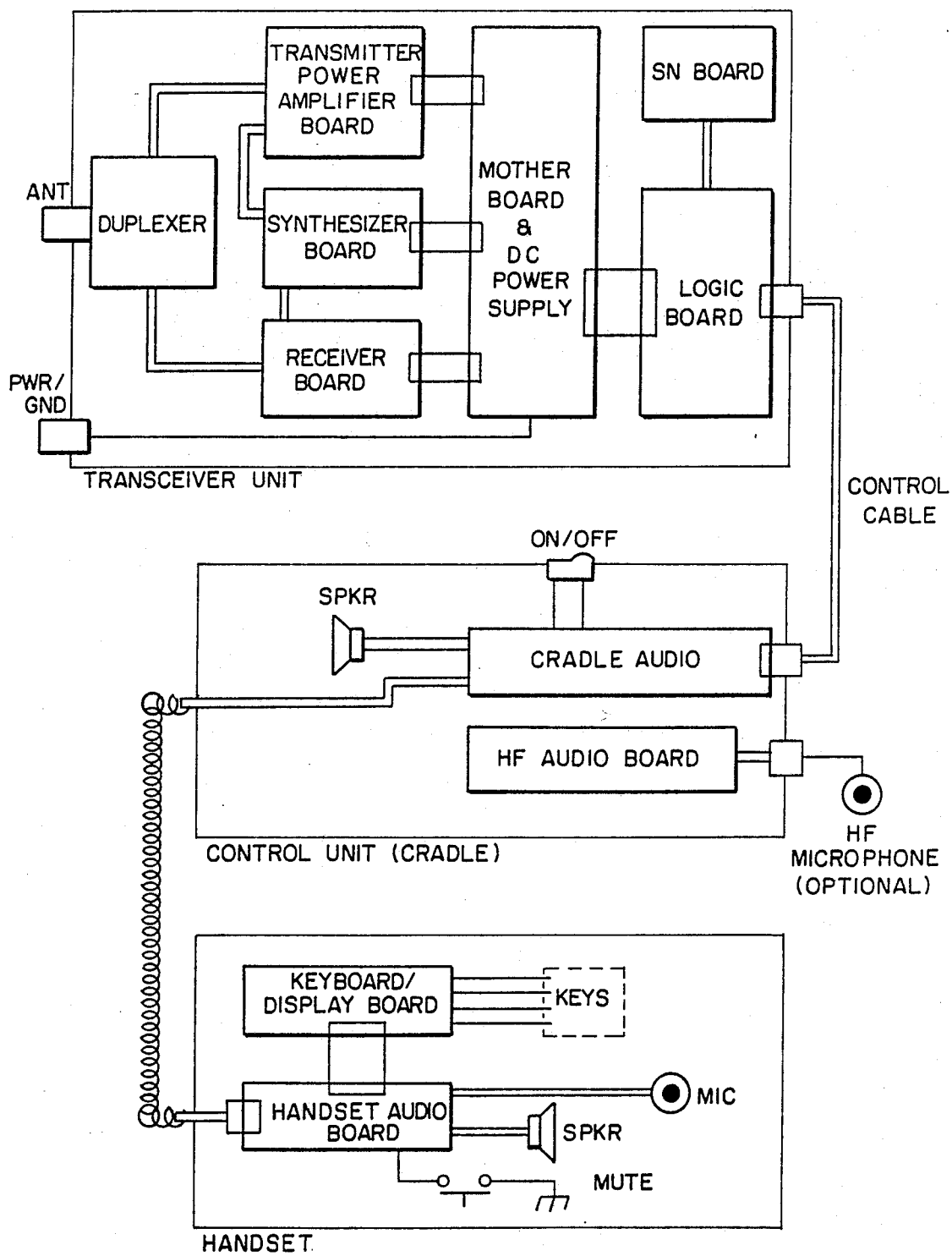
FIG. 1.2

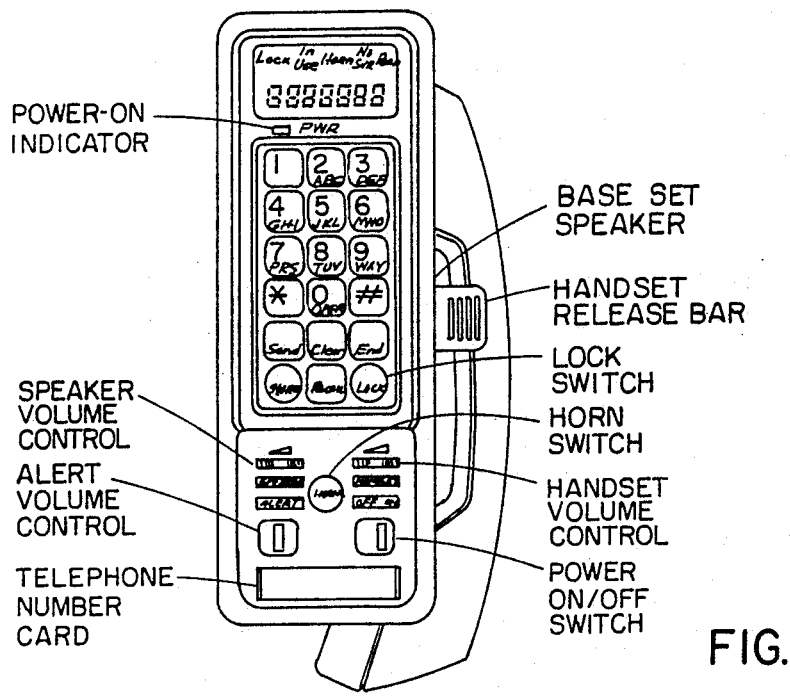
FIG. 1.3
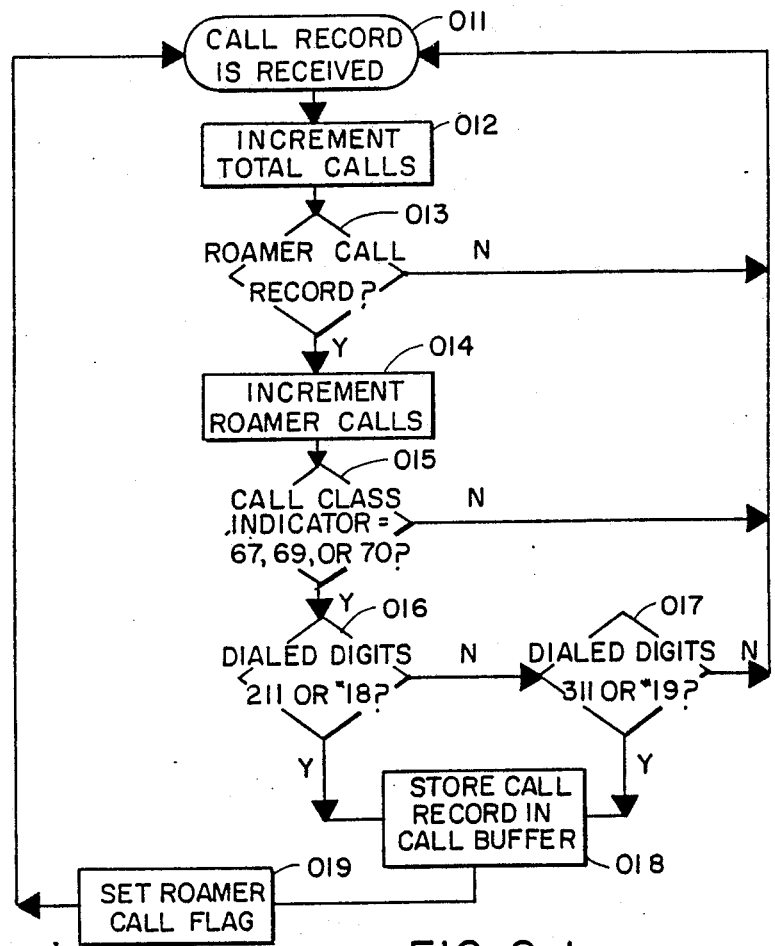
FIG. 2.1

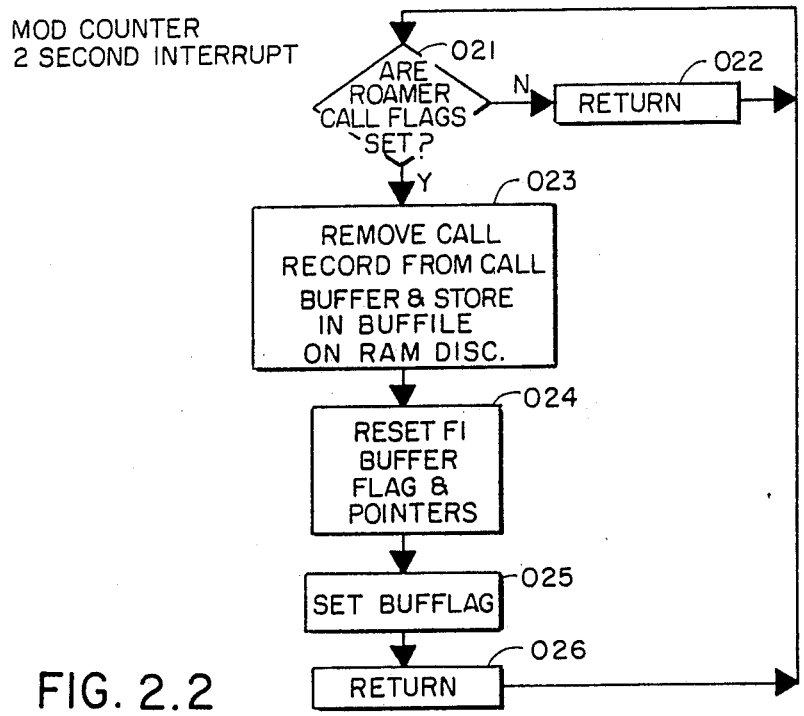
FIG. 2.2
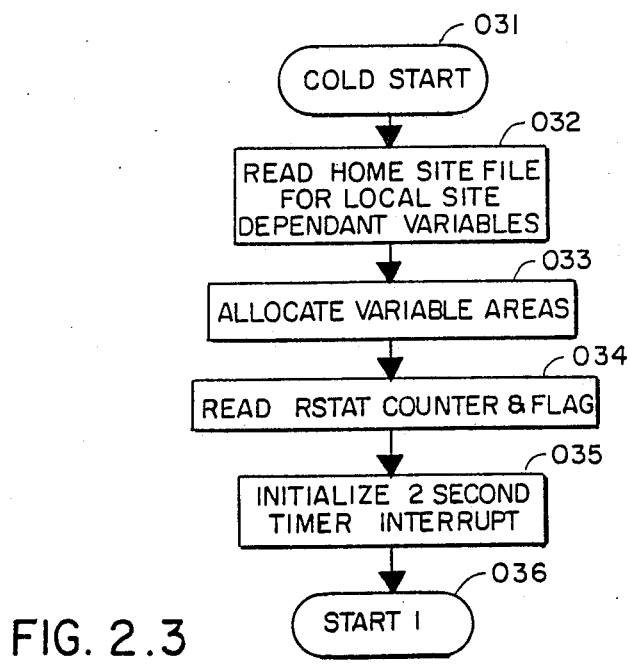
FIG. 2.3

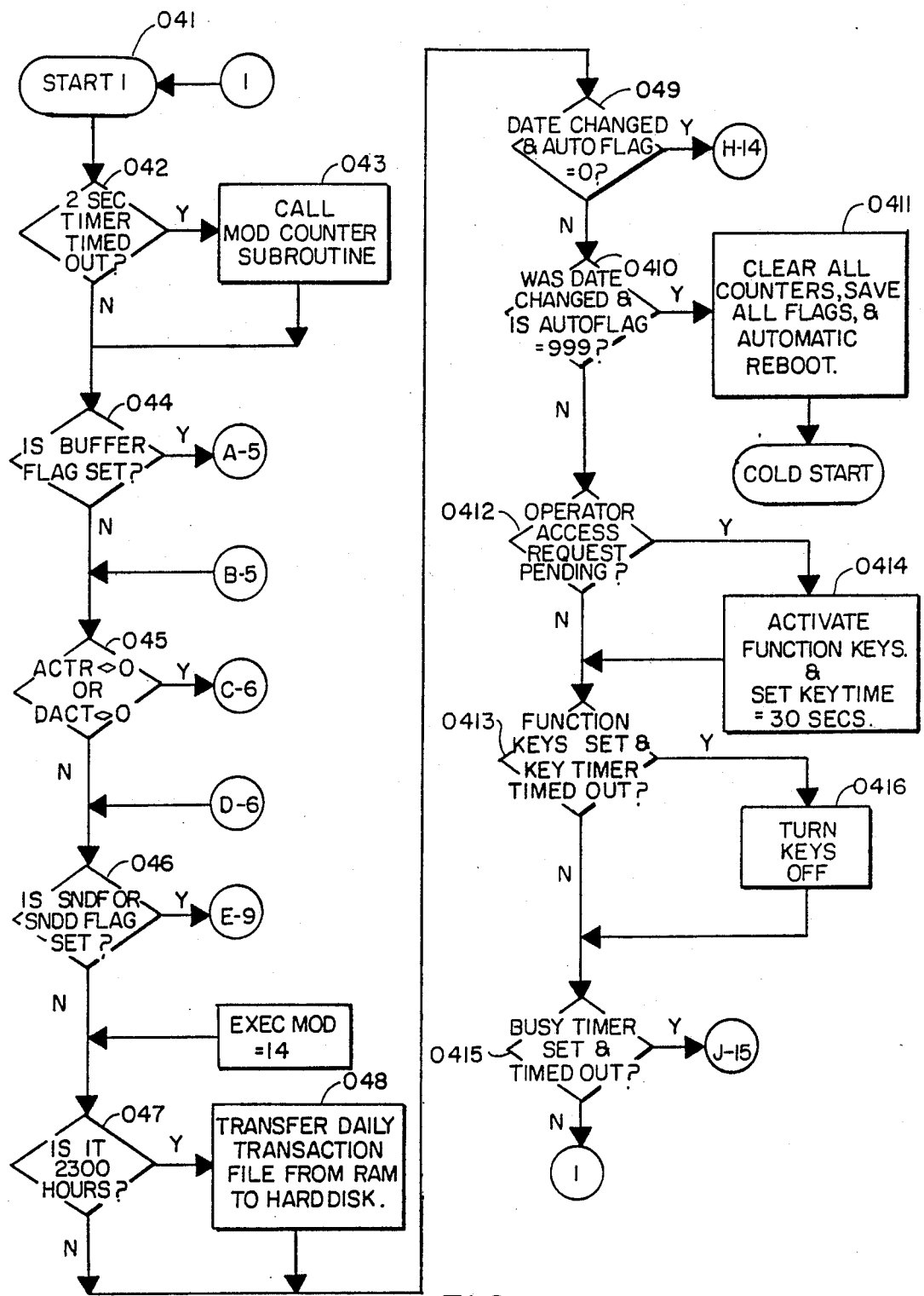
FIG. 2.4

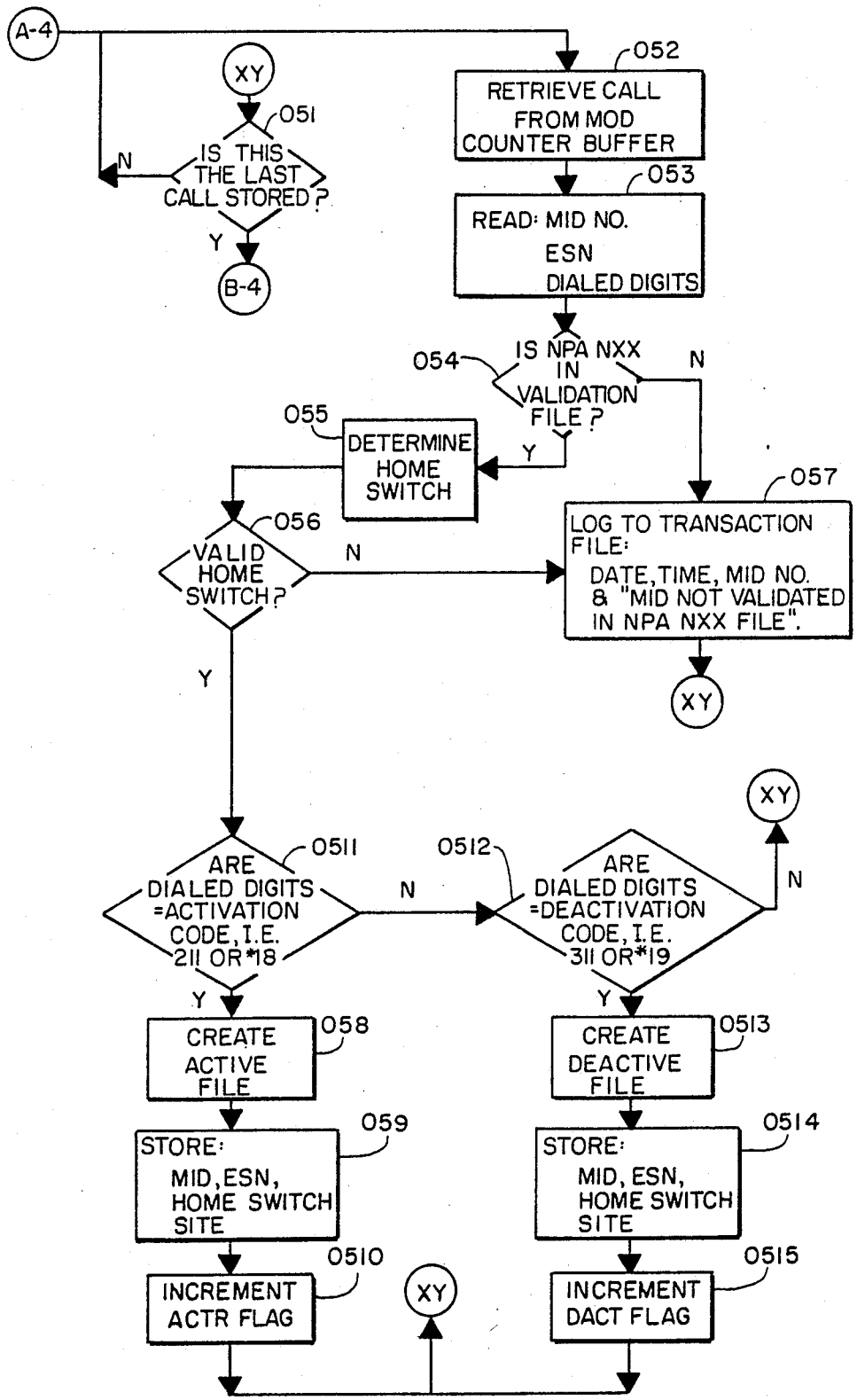
FIG. 2.5

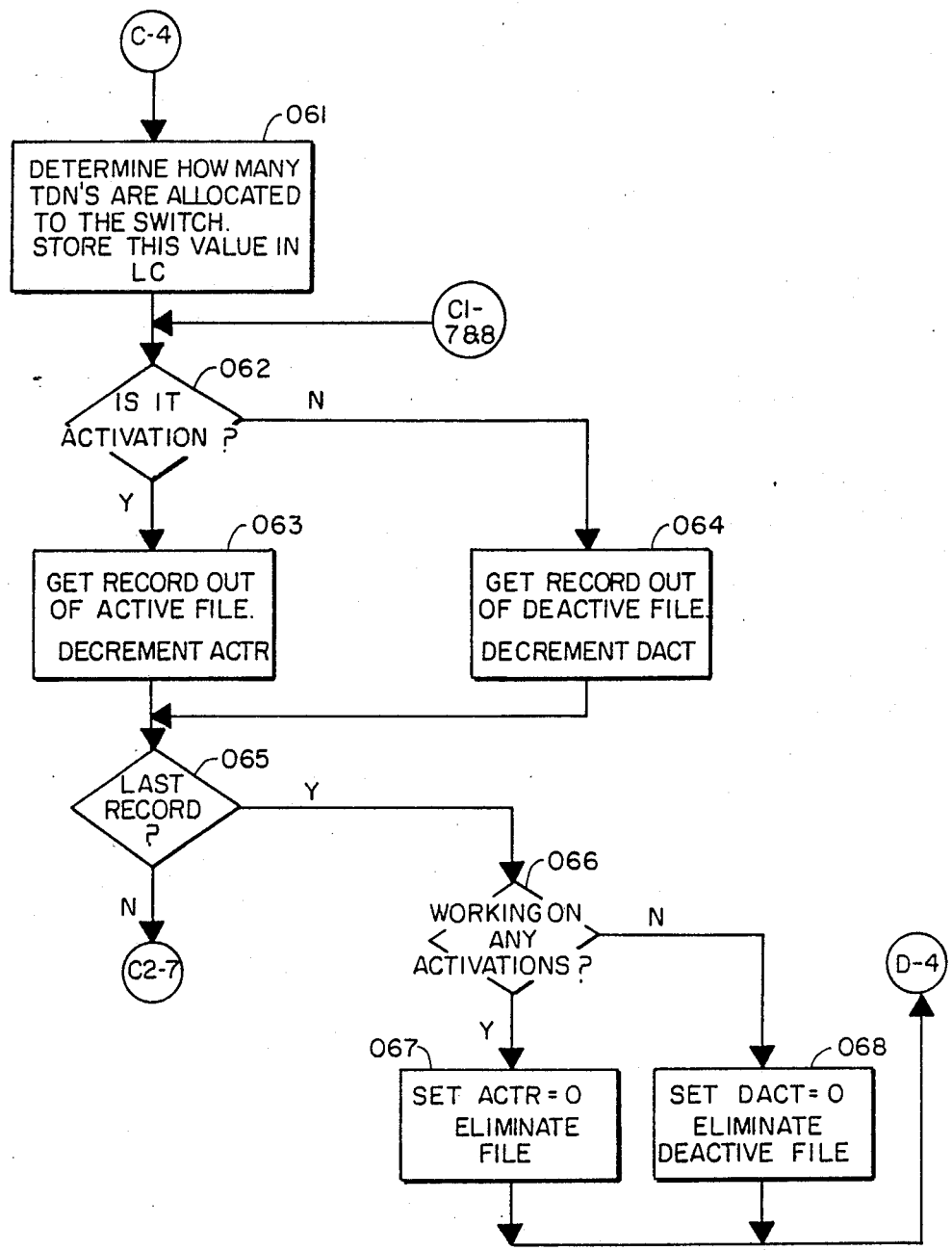
FIG. 2.6

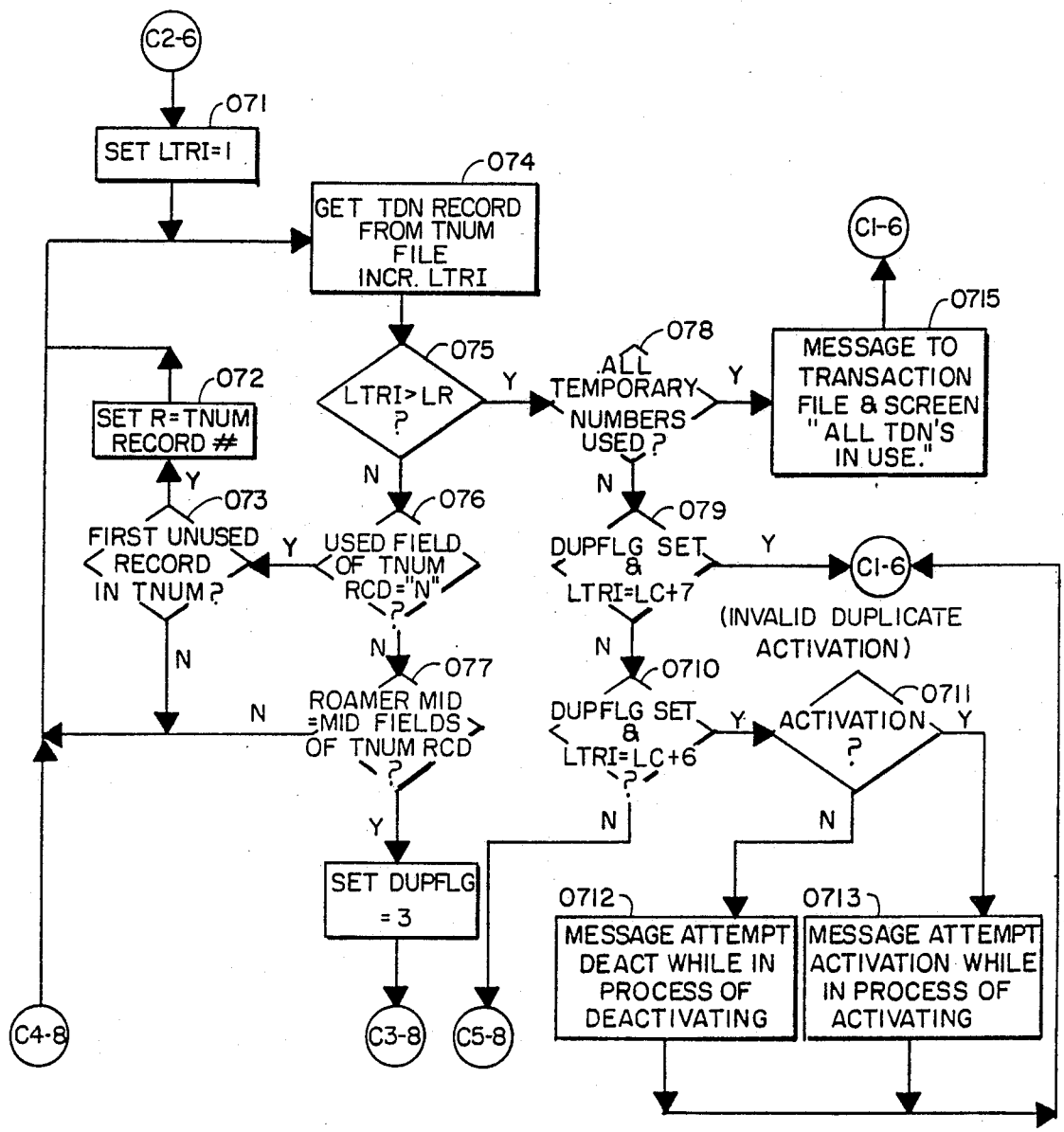
FIG. 2.7

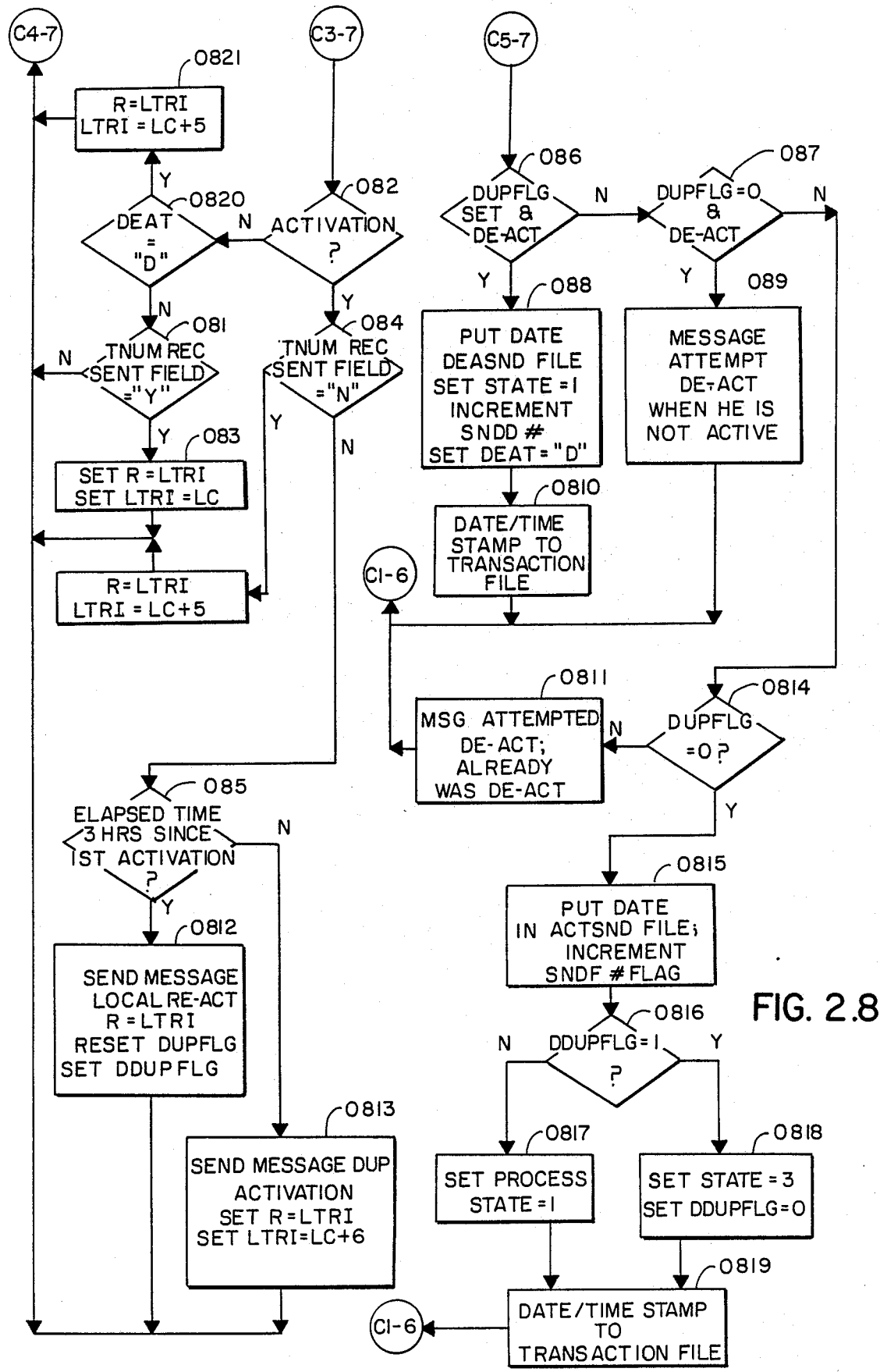
FIG. 2.8

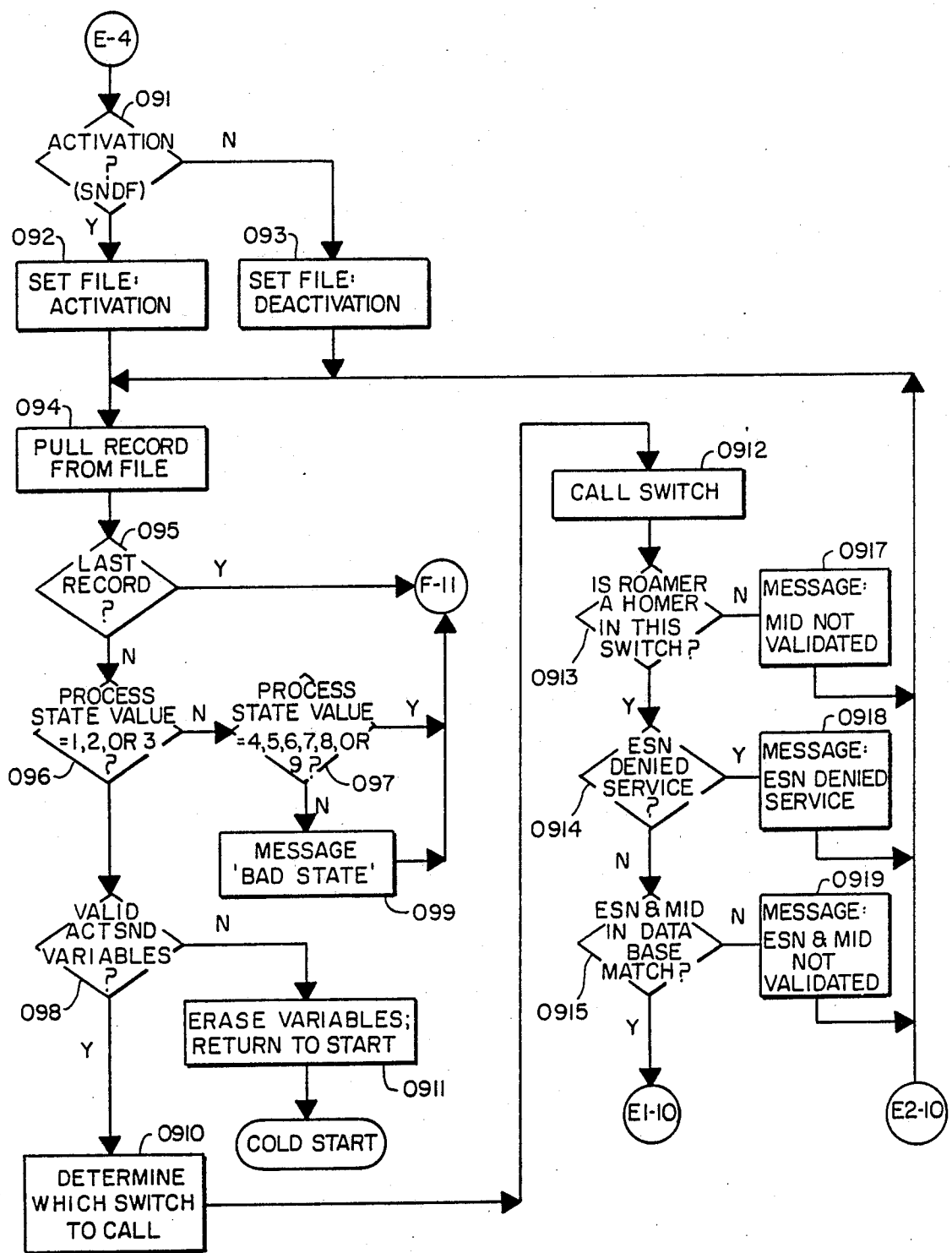
FIG. 2.9

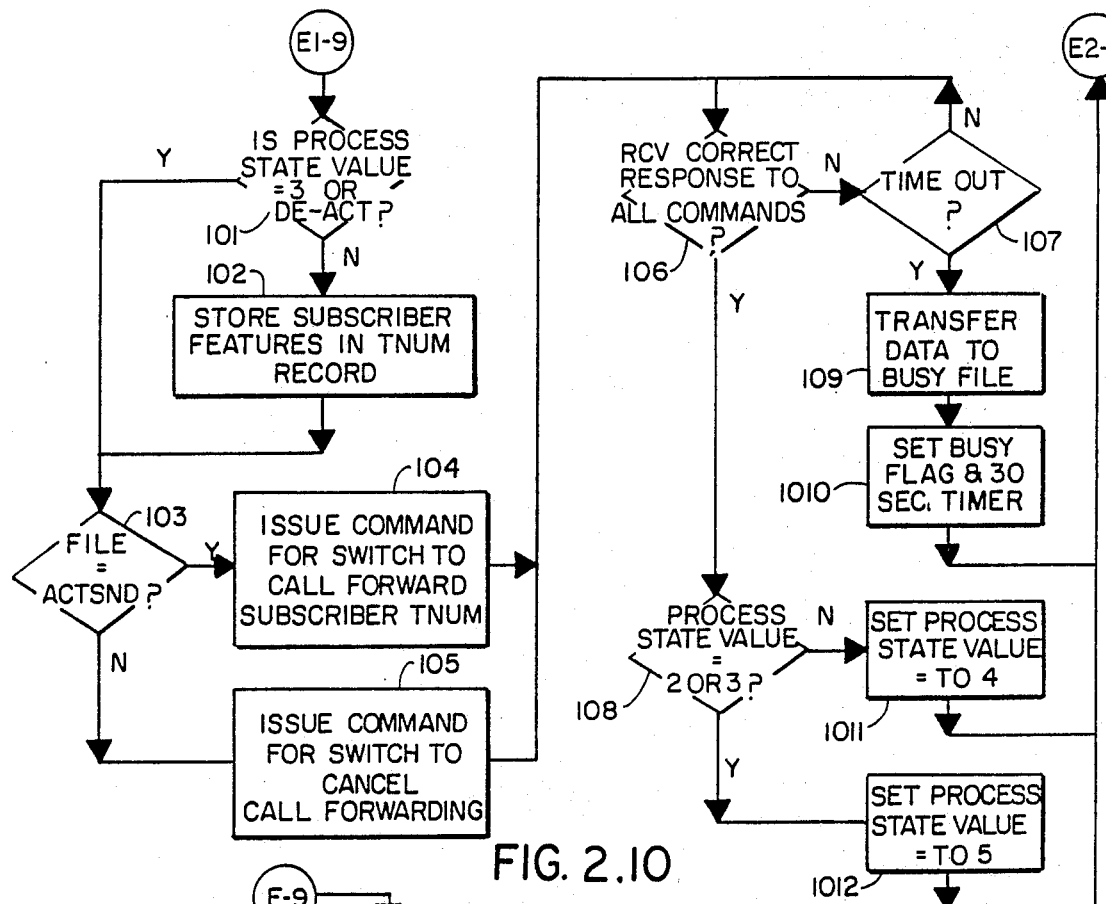
FIG. 2.10
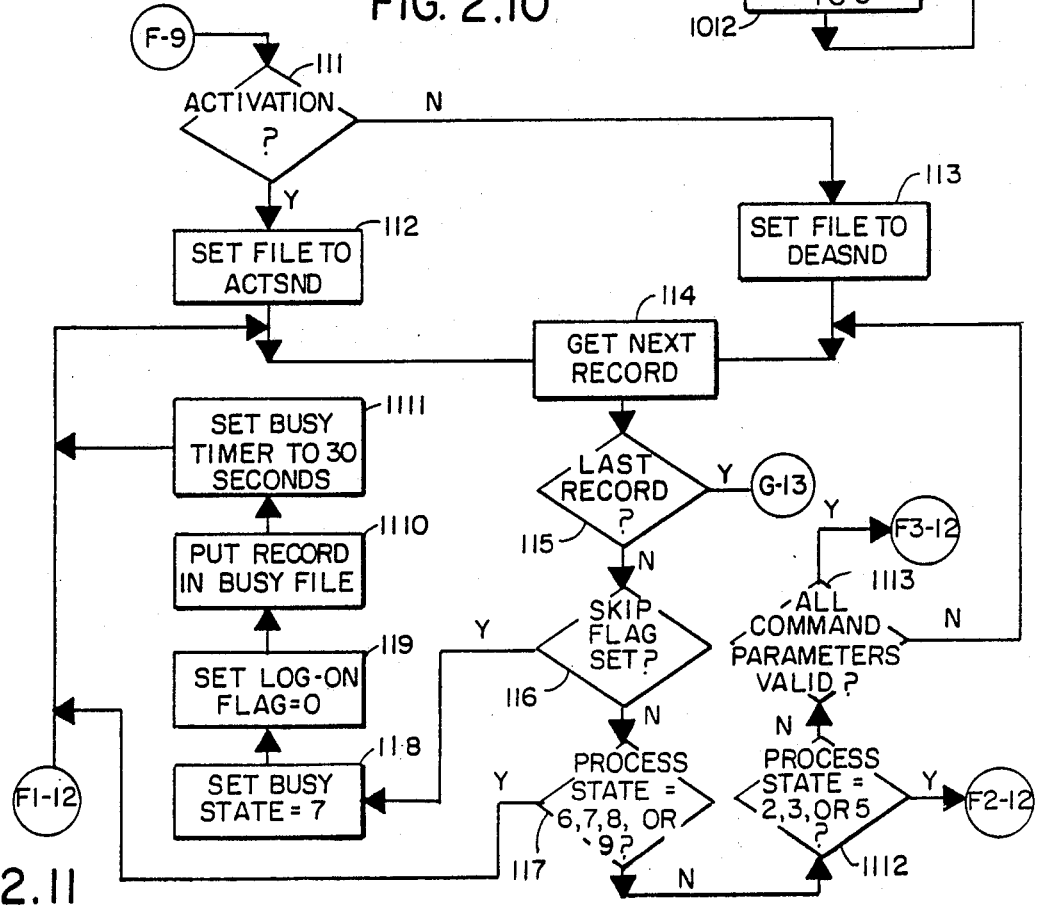
FIG. 2.11

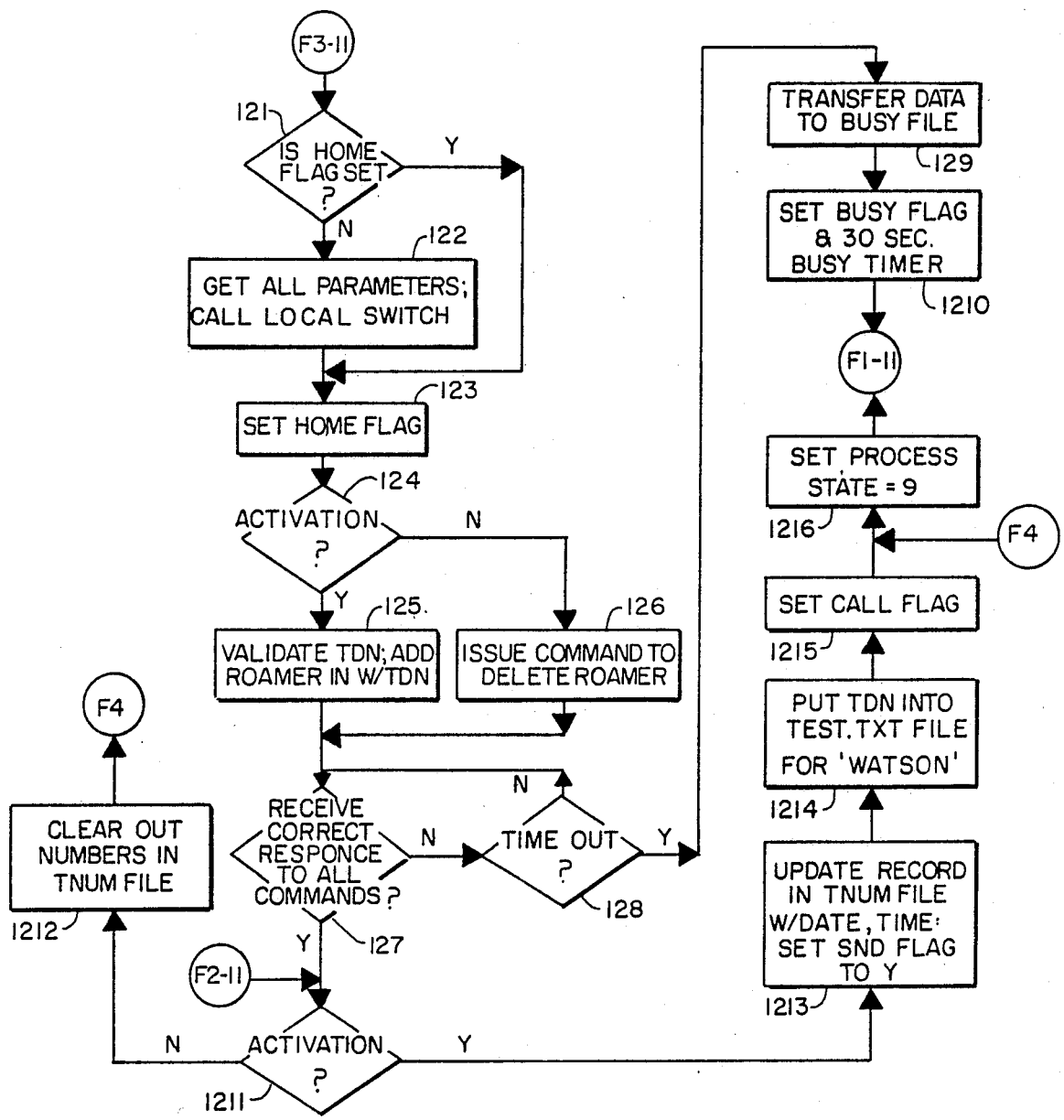
FIG. 2.12

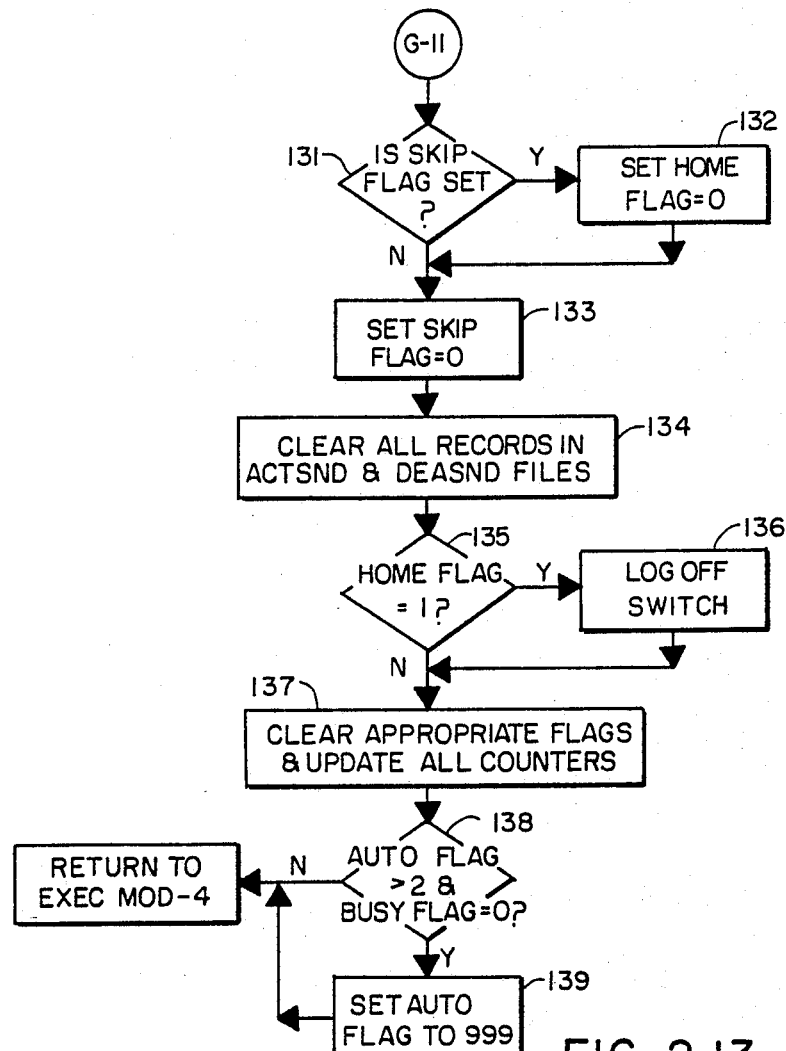
FIG. 2.13
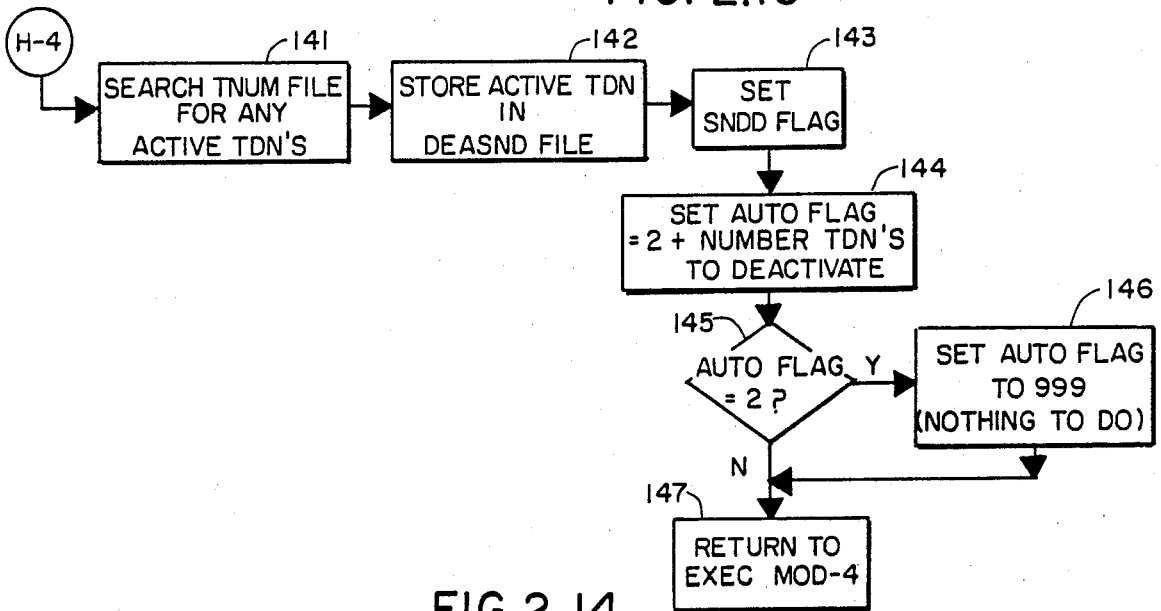
FIG. 2.14

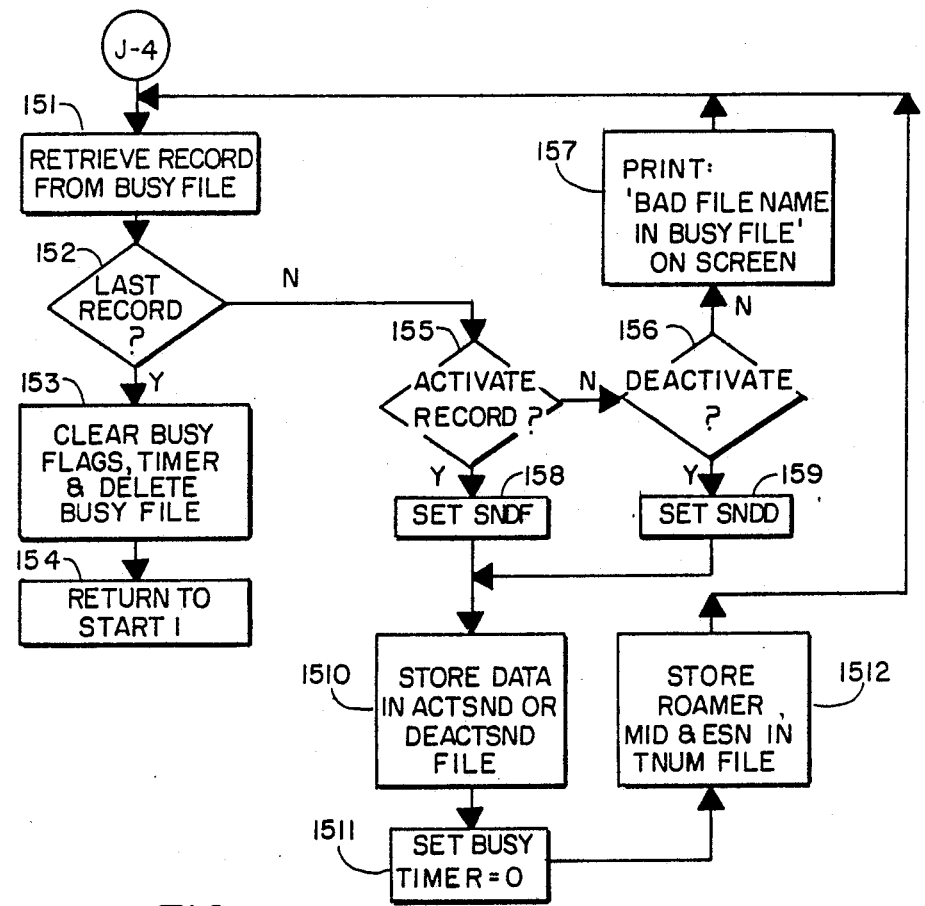
FIG. 2.15
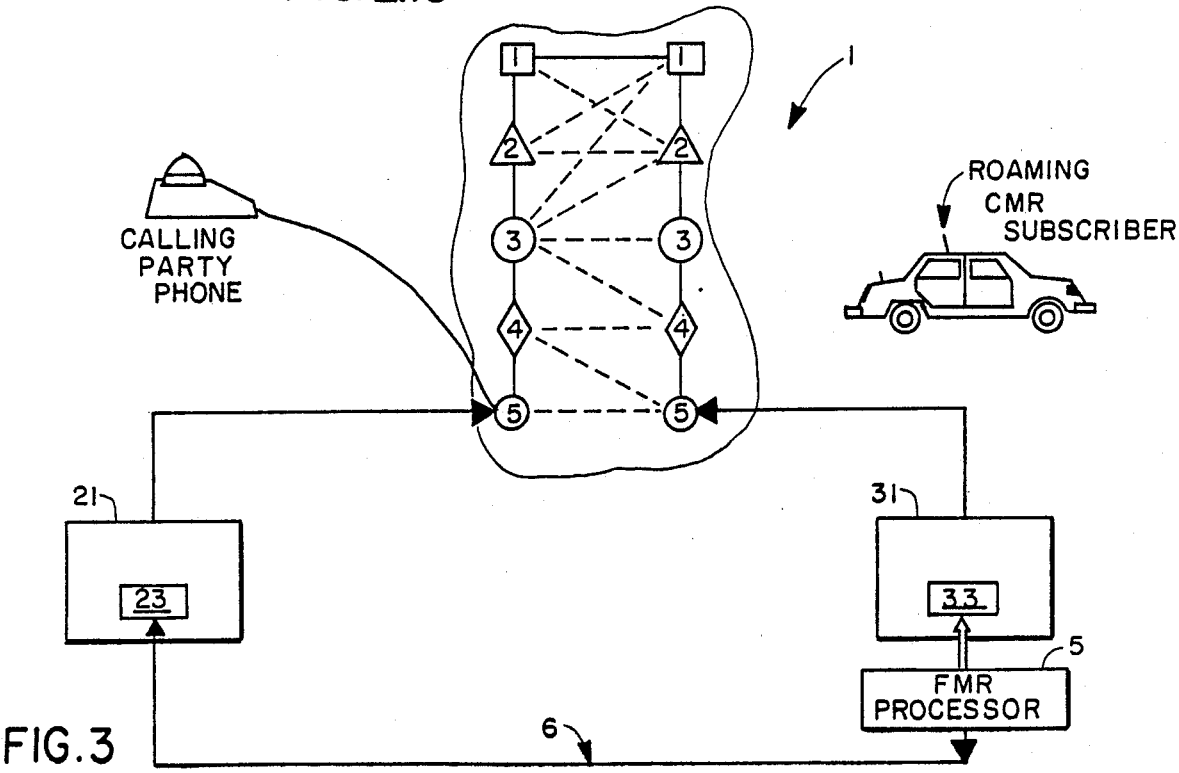
FIG. 3

SYSTEM FOR THE EXTENDED PROVISION OF CELLULAR MOBILE RADIOTELEPHONE SERVICE

Cross-reference is made to the following related applications: Ser. No. 386,476, entitled "FMR Reactivation/Duplicate Activation," filed July 28, 1989 as a continuation-in-part of Ser. No. 268,397, entitled "Pre-Activated FMR," filed Nov. 7, 1988 as a continuation-in-part of this application.

FIELD OF THE INVENTION

This invention relates to the Cellular Mobile Radiotelephone (CMR) technology and, more particularly, to a system for significantly extending the provision of CMR service by automatically forwarding, to a CMR subscriber outside his home service area, calls placed to the subscriber's Mobile Identification Number (MID) at his home service area.

BACKGROUND OF THE INVENTION

CMR service is one of the most rapidly growing telecommunication services currently offered. (See, for example, "Surging, Price-Insensitive Demand Over Next Two Years and Strong Five-Year Picture Forecast for Cellular Industry Association, Which Sees Capacity Concerns Validated," TELECOMMUNICATIONS REPORTS, Aug. 15, 1988 (pp. 22, 23).) The technology underlying CMR service is exhaustively documented and well within the understanding of those possessed of ordinary skill in the art. Accordingly, a rigorous description of CMR technology will not be undertaken here, and the reader will be referred to the following representative publications, the contents of which are hereby incorporated by reference:

- Arrendondo, G. A., J. C. Feggeler, and J. I. Smith. 1979. AMPS: Voice and Data Transmission, *Bell System Technical Journal* 58, no. 1 (January): 97.
- Bernard, Josef. 1987. *The Cellular Connection.* Mendocino, Calif.: Quantum Publishing.
- Bartee, T. C., ed. 1985. *Data Communications, Networks, and Systems.* Indianapolis: Howard W. Sams.
- Bartee, T. C., ed. 1986. *Digital Communications.* Indianapolis: Howard W. Sams
- Fluhr, Z. C., and P. T. Porter. 1979. AMPS: Control Architecture. *Bell System Technical Journal* 58, no. 7 (January): 43.
- Gibson, Stephen W. 1987. *Cellular Mobile Radio Telephones.* Englewood Cliffs: Prentice-Hall.
- *IEEE Journal on Selected Areas in Communications.* 1984. Special issue on mobile radio communications. See Hirono et al., Miki and Hata, and Suzuki et al. *IEEE Journal on Selected Areas in Communications* SAC-2, no. 4 (July).
- *IEEE Transactions on Communications.* 1973. Special joint issue on mobile radio communications. *IEEE Transactions on Communications COM-*21, no. 11 (November).
- Lee, W. C. Y. 1982. *Mobile Communications Engineering.* New York: McGraw-Hill.
- MacDonald, V. H. 1979. AMPS: The Cellular Concept. *Bell System Technical Journal* 58, no. 7 (January): 15.

Of course, one of the salient attractions of CMR service is that it affords the subscriber enhanced access to the public switched telephone network (PSTN), thereby enabling the subscriber both to place and to receive telephone calls at times when he would otherwise have been inaccessible, that is, at times when he is constrained to the confines of an automobile. The accessibility afforded by CMR technology is further enhanced by the availability of transportable CMR units that may be removed from the automobile and carried by the subscriber.

However, one characteristic of the existing CMR system is that this high degree of accessibility is approachable only when the subscriber is physically present within the range covered by his home service area. The subscriber's ability to receive incoming calls outside his home service area has heretofore been severely restricted in ways that will be described below, but are largely circumvented by the instant invention. (A subscriber using, or attempting to use, his cellular phone in a service area outside his home service area is aid to be "roaming" and is, at least for the purposes of this document, referred to as a "roamer".)

In fact, although it might be assumed that the subscriber will not always be aware that he has travelled beyond the range of his home service area, the cellular system has been designed to detect this situation and to so apprise the subscriber.

Briefly, each cellular system has been uniquely assigned a System ID (SID). Electrical signals corresponding to each cellular system's SID are continually transmitted by that system over a control channel separate from the channel used to provide voice communications. The SID of the system from which a particular subscriber has agreed to acquire CMR services is programmed into a Numerical Assignment Module (NAM) incorporated into the subscriber's mobile unit. When a subscriber's mobile unit is "powered up," it reads a System Parameter Overhead Message that includes the fifteen-bit SID of the system whose signal the mobile unit is receiving. The mobile unit then compares the transmitted SID to the SID programmed in its NAM to determine identically. If the unit determines lack of identicality, a "ROAM" light is activated on the control head associated with the mobile unit. In this manner, the subscriber is made aware that his mobile unit has "seized" a system other than the system on which he is an authorized subscriber.

A roamer who desires to place an outgoing call to the system in the area in which he is roaming need only remember to first dial the area code of that system. Calls placed to the subscriber's home system do not require the dialing of a prefatory area code.

The procedure for receiving incoming calls, however, is substantially more cumbersome. An essential element of the roamer's ability to receive incoming calls is that would-be third-party callers to him need to know in which system the subscriber is physically available. Unanswered calls placed to the subscriber's home number will be answered with a message indicating that the subscriber cannot be found. What the caller needs to know, then, is what CMR system the roamer is using and the procedure for accessing the subscriber through the facilities of that system. That is, the caller must know the roamer's itinerary and the roamer access number of the system the roamer is using. The major service areas each have a ten-digit roamer access number. Areas in which service is provided by both a wireline and a nonwireline carrier, of course, have two roamer access numbers, one corresponding to the wireline carrier and one corresponding to the nonwireline carrier.

Armed with this information, the would-be caller must first dial the ten-digit roamer access number of the system he expects the roamer to be using. After a short pause followed by a tone, the caller must then dial the roamer's home number, including his home area code. In some services areas, this cumbersome and demanding procedure is exacerbated by the need for the subscriber to prearrange, with the CMR service provider in the "foreign" area, the right to have incoming calls delivered.

Even when the above-mentioned procedural hurdles have been surmounted, the foreign-area service provider may be disinclined to have (or technically incapable of having) the applicable service charges applied to the subscriber's home service area bill, and the charge will need to be prepaid or applied to an acceptable credit card.

In a manner that will be made clear by the detailed Description set forth below, the above-indicated limitation of the CMR system, as it has been heretofore implemented, is cured by the invention underlying the Follow-Me-Roaming (SM) Cellular Mobile Radiotelephone Service. ("Follow-Me-Roaming" is a service mark of GTE Mobilnet Incorporated. At appropriate occurrences throughout the remainder of this document, various constituent elements of the combined hardware and software system that implements that service are referred to in conjunction with the use of the acronym "FMR".)

SUMMARY OF THE INVENTION

The above and other objects, advantages and capabilities are achieved in one aspect of the invention by a method for enabling a roaming CMR subscriber to automatically receive, in a foreign service area, calls placed to his home service area. The method comprises the steps: (a) receiving, at a foreign service area MTSO, information indicating that the roaming CMR subscriber desires to receive, in the foreign service area, calls placed to his home service area; (b) validating the roaming subscriber; (c) upon validation of the roaming subscriber, assigning the roaming subscriber a temporary directory number (TDN) for use in the foreign service area; and (d) providing information to the roaming CMR subscriber's home service area MTSO so as to enable the roaming CMR subscriber's home service area MTSO to call forward, to the TDN, calls placed to the roaming CMR subscriber's MID in his home service area.

In another aspect, the invention comprises an apparatus for enabling a roaming CMR subscriber to automatically receive, in a foreign service area, calls placed to this home service area. The apparatus comprises a computer for coupling both to a switch associated in the home service area and to a switch associated with the foreign service area. The computer is programmed to: (1) receive information indicating that calls placed to the home service area are to be forwarded to the foreign service area; (2) assign the subscriber a temporary directory number (TDN) in the foreign switch; and (3) command the home switch to forward, to the TDN, calls placed to the home service area.

In a further aspect, the invention comprises a CMR system that automatically forwards, to a foreign service area outside a CMR subscriber's home service area, calls placed to the subscriber's home service area. The system comprises a home MTSO that is associated with the home service area and includes a home switch for receiving calls placed to the subscriber's MID. A foreign MTSO is associated with a foreign service area and includes a foreign switch. A control computer is coupled to the home switch and to the foreign switch for (1) receiving information indicating that calls placed to the CMR subscriber's home MTSO are to be forwarded to the foreign MTSO; (2) assigning the CMR subscriber a temporary directory number (TDN) in conjunction with the foreign switch for use in the foreign service area; and (3) providing information to the home switch that enables the home switch to forward, to the TDN at the foreign switch, calls placed to the CMR subscriber's MID in the home service area.

In yet another aspect of the invention, a method for activating a process that enables calls placed to a CMR subscriber's home service area to be automatically forwarded to a foreign service area outside the CMR subscriber's home service area includes, as a step, determining whether an activation request is a duplicate request and, further, determining whether a duplicate request is a valid duplicate request or an invalid duplicate request. Duplicate activation requests are detected by searching existing TNUM records (Temporary Number Records) in order to identify a match, if any, between the requesting CMR subscriber's MID and the MID in each of the respective TNUM records. (A complete functional definition of the TNUM records appears in narrative form, and in tabular form, under the Description of a Preferred Embodiment of the Invention. If a match is identified, a determination is made that the activation request is a duplicate request. The duplicate request is determined to be a valid duplicate request if the time of activation contained in the TNUM record that resulted in the identification of a match is at least a predetermined length of time earlier than the time of the then-pending activation request. If the duplicate request is determined to be a valid duplicate request, the subscriber is re-activated in him home service area, and, if the duplicate request is determined to be an invalid duplicate request, the duplicate request is substantially discarded.

BRIEF DESCRIPTION OF THE DRAWINGS

FIG. 1.1 is a system diagram of conventional a CMR system, depicting the constituent cell sites, MTSOs (Mobile Telephone Switching Offices), and corresponding MTSO cellular switches. FIG. 1.1 additionally depicts the manner in which two independent CMR systems are coupled via the PSTN (Public Switched Telephone Network).

FIG. 1.2 depicts, in block form, the constituent elements of a CMR mobile unit: the transceiver unit, the control unit, and the handset.

FIG. 1.3 is a pictorial representation of the handset and shows, particularly, the keypad through which activation or deactivation codes may be entered.

FIGS. 2.1 through 2.15 constitute a detailed and comprehensive flow diagram of the operational steps, primarily software-driven, that represent a fundamental aspect of the invention. Each of FIGS. 2.1 through 2.15 comprises several steps to which are attached individual reference designations. For example, in FIG. 2.10, the step labeled "SET PROCESS STATE VALUE=TO 5" has been assigned reference designation 1012. In addition, a directional bubble labeled "E2-9" is attached to step 1012. The prefix portion, "E2" is intended to indicate that step 1012 is connected to a step bearing the identical prefix (E2) on the Figure associated with the suffix, "9", that is, on FIG. 2.9. Therefore, the bubble "E2-9" on FIG. 2.10 is to be connected to the bubble "E2-10" on FIG. 2.9.

FIG. 3 is a diagram of the subject system for the Extended Provision of Cellular Mobile Radiotelephone Service. The diagram depicts a "home" MTSO and associated home switch, and a "foreign" MTSO and associated foreign switch. An FMR processor, programmed with the software disclosed in this patent document, is appended to the foreign switch and is coupled to the home switch via, for example, a private data network. The home MTSO and the foreign MTSO are conventionally interconnected via the PSTN.

DESCRIPTION OF A PREFERRED EMBODIMENT OF THE INVENTION

For a thorough understanding of the subject invention, reference is made to the following Description and appended claims, in conjunction with the above-described Drawings.

Preliminarily, however, in order to arrive at a contextual appreciation of the subject invention, attention is directed to the constituent Drawings of FIG. 1, which depict various conventional aspects of the existing CMR system.

FIG. 1.1 depicts two conventionally configured cellular systems, 2 and 3 respectively, interconnected via. For present purposes, assume that system 2 is a "home" system, that is, a system in which a particular, roaming, CMR customer is an authorized subscriber. Conversely, assume that system 3 is a "foreign" system, that is, a system to which the roaming subscriber may travel and through the facilities of which the subscriber desires to receive CMR telephone calls.

By way of background (and deferring for the moment the discussion of the more pertinent details of the subject invention), it is well understood that the conventional cellular system comprises a Mobile Telephone Switching Office (MTSO), illustrated by reference numerals 21 and 31 in FIG. 1.1, surrounded by an appropriate array of more or less identically equipped cell sites, 22 and 32. Mobile subscribers, 42 and 43, establish an RF communications link with the cell sites. Each of the cell sites is, in turn, coupled to its associated MTSO by a dedicated landline. The MTSOs are coupled by dedicated lines to the PSTN.

A complete description of the fixed and mobile hardware and software necessary to implement a cellular system, such as either system 2 or system 3, would be feckless as an effort to enhance the understanding of the invention by those even modestly acquainted with the U.S. cellular system, inasmuch as practitioners having ordinary skill in the art of CMR system design are well acquainted with the configuration and operation of such systems and will, therefore, be well prepared to apprehend the Description of the invention that follows. However, the conscientious reader is referred to the document entitled "DYNA T.A.C. ™ System Description," Instruction Manual 68P81150E01-A, available from Motorola Inc., Technical Writing Services, 1301 East Algonquin Road, Schaumburg, Ill., 60196, hereby incorporated reference.

Suffice it to say, however, that incorporated into each MTSO is a software-driven, computer-based cellular switch that performs various functions, including but not limited to:

(1) Providing switched interconnection between the MTSO and the PSTN.

(2) Providing switched connections between mobile subscribers served by the MTSO.

(3) Administering the usage of RF voice channels available to the associated cellular system.

(4) Providing control over signaling with the mobile units. (Some specifics regarding the configuration and operation of the mobile units are forthcoming below.)

(5) Providing control of the intercell location process and control of the resulting "handoff" of calls between cells.

(6) Recording billing information, including, inter alia, the generation of Call Records.

(7) Providing custom service to mobile users.

A specific example of a cellular switch that has been used in connection with the subject invention is the EMX 2500, available from Motorola, Inc. Literature describing that switch has in the past been available from Motorola, Inc., at the address provided above.

Turning now to the mobile unit, depicted in FIG. 1.2 with reliance on functional block diagrams, it is well understood that installed within each cellular subscriber's vehicle is a mobile unit that includes a transceiver unit, a control unit (including a cradle and a handset), a cellular antenna, and associated control, power, and antenna cables. A detailed description of one embodiment of such a mobile unit is found in the document "GTE METAL SERIES CELLULAR MOBILE TELEPHONE (MT930)," Publication Reference GTE-MN 1176, available from GTE Mobilnet Incorporated, 616 FM 1960 West, Suite 400, Houston, Tex., 77373, hereby incorporated by reference.

As alluded to above, included with each mobile unit is a handset, such as the handset depicted in FIG. 1.3. The handset includes a keypad that operates in some ways like the keypad of a standard push button residential telephone set. However, the handset provides many functions uncommon to residential telephones. These functions are described in operating manuals available from vendors of the mobile units. In the context of the subject invention, however, the handset (specifically, the keypad) will be seen as a suggested preferred mechanism by which the roaming subscriber may indicate a desire to receive the FMR cellular service.

With the above backgroun in grasp, it will be seen that the FMR system, in most respects, may be viewed as an "overlay" on the CMR system depicted in FIG. 1.1. As may be seen in FIG. 3, the FMR system includes an FMR processor 5 that is coupled to the foreign MTSO 31. Specifically, processor 5 is coupled, in a manner described below, to the cellular switch 33 resident within the foreign MTSO 31. The FMR processor is also coupled to the home cellular switch 21 through, preferably, a dedicated network 6. (The use of a dedicated network is suggested; however, those skilled in the art will recognize that numerous telecommunication facilities exist for establishing a communication channel between two computer-based devices such as the FMR processor 5 and the home MTSO 21 switch.)

The FMR processor 5 may be implemented in one form by a Compaq Portable II (Model 2) computer, available from Compaq Computer Corporation 20555 FM 149, Houston, Tex., 77070. The processor is equipped with 64K bytes internal RAM (Random Access Memory) and a 20M byte hard disk and may be upgraded with a communication port, also available from Compaq Corporation Computer. The FMR processor 5 is also enhanced with a "WATSON" voice communication card (provided by Natural Microsystems Corporation, Natick, Mass.) and a four-port communications card (such as the product designated Asynchronous Cluster Adapter Communication Board and available from AST Research Incorporated, Irvine, Calif.) that provides four communication ports on a single, pluggable circuit board.

The processor 5 is coupled to the "foreign" switch 33 (the switch resident in the foreign MTSO 31) at one port. Another communications port is used for remote maintenance by a central monitoring center that dials into the processor. The voice card is used to communicate with the switch via the software modules referred to as "ROAMERHOME" and "HOME.x," described below. Additionally, the voice card allows the FMR system to place a voice call (colloquially referred to as a "Watson") to the subscriber in order to announce to the subscriber that, for example, an FMR activation process has been successfully completed. The remaining communications ports may be used to monitor callers so that Call Records can be tracked and so that an activation or deactivation code may be detected.

Directing attention now to FIGS. 2.1 through 2.15, set forth therein is a comprehensive flow diagram describing in detail the operation of the software-driven FMR system according to which the subject invention is realized. The complete FMR software package includes an executive or background program, FMR.EXEC, and a basic program, FMR.BAS.

However, the keystone, and central software component, of the FMR system is the FMR.BAS program. Accordingly, the complete source code listing of FMR.BAS is set forth in Appendix A. (It will be recognized by programmers of any meaningful experience, that FMR.BAS is written in the Advanced Basic language.) As is immediately apparent from an inspection of FMR.BAS, as well as from an inspection of the flow diagram constituted by FIGS. 2.1 through 2.15, FMR.BAS utilizes in its operation a number of software flags, variables and subroutines. The descriptions and definitions of those many of these flags, variables, and subroutines are set forth in Appendix B. "FMR.BAS Glossary," which is provided to assist in the intimate and comprehensive understanding of the software-related aspects of the invention. In addition, FMR.BAS utilizes in its operation a number of subroutines of varying length. These subroutines are set forth in Appendix C. For completeness, Appendix D contains the FMR.EXEC software which is written in assembly language.

What will be described immediately below are the operational steps required to "activate" a roaming subscriber. In this context, to "activate" a roaming subscriber means to perform all the functions performed by the subject invention in the context of the FMR system in order that the roaming subscriber might receive, in a "foreign" service area (that is, a service area outside his home service area), calls placed in his home service area to his MID. (It is understood that such calls may originate with callers outside the subscriber's home service area. These calls, however, will be routed through the PSTN, perhaps by interexchange carriers, but will ultimately be delivered to the end office connected to the subscriber's home MTSO.)

It will be appreciated that some of the necessary operations are purely software operations, some are purely hardware operations, and some are hybrid. A "hybrid" operation is, for example, an operation that involves hardware operating under the control of or in response to a stimulus provided by the software, or software operating in response to a stimulus provided by the hardware. Furthermore, a number of the functions described below are performed by conventional cellular systems and are known to those familiar with the operation of cellular systems. To the extent that such functions are implicated in, or assist in an understanding of, the invention, they are included in the Description, infra. However, the comprehension and implementation of such functions are well understood by those having ordinary skill in the art of cellular communications.

In addition, a number of functions conventionally performed by cellular systems are deemed ancillary or collateral to the operation of the subject invention. Such functions have not been described in detail, but their comprehension and understanding are likewise understood by those having ordinary skill in the art of cellular communications.

In order to assure an intimate understanding of a roamer activation process, a software "map" is provided in tabular form below. The map sequentially traces the operational steps encountered according to the subject invention in order to activate a roaming CMR subscriber. The steps set forth below refer, of course, to the software-driven steps illustrated in FIGS. 2.1 through 2.15. A narrative description of those step appears immediately infra.

| Step Number | ACTIVATION FIG. 2 | Notes |
| --- | --- | --- |
| 1 | 011 | |
| 2 | 012 | |
| 3 | 013 | |
| 4 | 014 | |
| 5 | 015 | |
| 6 | 016 | |
| 7 | 018 | |
| 8 | 019 | ROAMERCALL FLAG=1 |
| 9 | 021 | |
| 10 | 023 | |
| 11 | 024 | |
| 12 | 025 | BUFFLG=1 |
| 13 | 026 | LOOP 011 |
| 14 | 041 | |
| 15 | 042 | |
| 16 | 044 | BUFFLG SET 025 |
| 17 | 052 | |
| 18 | 053 | |
| 19 | 054 | |
| 20 | 055 | |
| 21 | 056 | |
| 22 | 0511 | |
| 23 | 058 | CREATE ACTIVE FILE |
| 24 | 059 | |
| 25 | 0510 | ACTRFLAG+1 |
| 26 | 051 | B4-(LAST REC READ) |
| 27 | 045 | C6-(ACTR SET 0510) |
| 28 | 061 | SAVE TOTAL TDN'S |
| 29 | 062 | |
| 30 | 063 | ACTRFLAG−1 |
| 31 | 065 | |
| 32 | 071 | |
| 33 | 074 | |
| 34 | 075 | |
| 35 | 078 | |
| 36 | 079 | |
| 37 | 0710 | |
| 38 | 086 | |
| 39 | 087 | |
| 40 | 0814 | |
| 41 | 0815 | SNDF=SNDF+1 |
| 42 | 0816 | |
| 43 | 0817 | STATE=1 |
| 44 | 0819 | |

-continued

ACTIVATION

| Step Number | FIG. 2 | Notes |
|---|---|---|
| 45 | 062 | |
| 46 | 063 | |
| 47 | 065 | |
| 48 | 066 | |
| 49 | 067 | |
| 50 | 046 | SNDF #0 SET 0815 |
| 51 | 091 | |
| 52 | 092 | |
| 53 | 095 | |
| 54 | 096 | |
| 55 | 098 | |
| 56 | 0910 | |
| 57 | 0912 | |
| 58 | 0913 | |
| 59 | 0914 | |
| 60 | 0916 | |
| 61 | 101 | STATE=1 0817 |
| 62 | 102 | |
| 63 | 103 | |
| 64 | 104 | MODULE ROAMERHOME |
| 65 | 106 | |
| 66 | 108 | |
| 67 | 1011 | STATE=4 |
| 68 | 094 | |
| 69 | 095 | |
| 70 | 096 | STATE=4 SET 1011 |
| 71 | 097 | STATE=4 SET 1011 |
| 72 | 111 | SNDF#0 SET0815 |
| 73 | 112 | |
| 74 | 114 | |
| 75 | 115 | |
| 76 | 116 | |
| 77 | 117 | STATE=4 SET 1011 |
| 78 | 1112 | STATE=4 SET 1011 |
| 79 | 1113 | |
| 80 | 121 | |
| 81 | 122 | MODULE HOMEX |
| 82 | 123 | HOME FLAG=1 |
| 83 | 124 | |
| 84 | 125 | ROAMER SET IN TDN |
| 85 | 127 | |
| 86 | 1211 | SNDF#0 |
| 87 | 1213 | |
| 88 | 1214 | SET WATSON CALL |
| 89 | 1215 | CALL FLAG=1 |
| 90 | 1216 | STATE=9 |
| 91 | 114 | |
| 92 | 115 | |
| 93 | 131 | |
| 94 | 133 | |
| 95 | 134 | |
| 96 | 135 | |
| 97 | 136 | |
| 98 | 137 | |
| 99 | 138 | RETURN TO EXEC |

Operation may be assumed to begin when a Call Record is received, in Step 011, by the MTSO in the foreign service area. The FMR processor coupled to the foreign switch monitors all Call Records (regardless whether the corresponding call represents a request for FMR service) and, in Step 012, increments a variable whose value represent the total number of calls received. In Step 013, a determination is made as to whether the Call Record represents a roamer Call Record. The specific manner or logical method by which this determination is made depends on the particular characteristics of the foreign switch to which the FMR processor is coupled. Uniformly, however, the software driving the foreign switch must be adapted so as to provide some form of indication in the Call Record that a request for an FMR activation or FMR deactivation, usually a call class 67, has been received. This is conveniently accommodated in the Dial Digit field or the Roamer Home field in the Call Record. Alternatively, the determination may be derived from the call class failure indicator.

If the Call Record is, in fact, determined to be a roamer Call Record, the total number of roamer calls is incremented in an associated register. In Step 015, a determination is made whether the call class indicator associated with the then current Call Record is 67, 69, or 70. It should be understood that the call class indicator field of the Call Record indicates the manner in which the call was handled. For example, the call class indicator may designate a dropped call, a completed call, a call routed to a message or recording, or a call diverted to special handling trunks. If the call class indicator gives reason to suspect that the call might be a roamer call, a subsequent determination is made to see whether the subscriber has transmitted an FMR activation code, that is, the digits "211." The code, 211, is, of course, the code indicating to the foreign MTSO that the call being processed has been placed by a subscriber who is a roamer in that system. The code represents a request that calls placed to the roamer's home service area be forwarded to the foreign system that serves the location in which the roamer is now present. If it is determined that the code digits (i.e., 211) have in fact been dialed, the Call Record is stored in a call buffer (Step 018) and a flag, ROAMER CALL, is set (Step 019).

At this point it is useful to introduce the reader to the structure of the "TNUM" file and corresponding records entered into that file in response to the receipt, by the FMR system, of the activation code that represents a request for FMR service by a CMR subscriber. The TNUM file comprises a number of TNUM records containing information in the format set forth in the table below. Notice that a TNUM record includes a "TDN" field that contains the temporary directory numbers (TDNs) available for use with the associated foreign switch. The "USED" field indicates whether the TDN has been (tentatively or finally) assigned to a roaming subscriber. The mobile identification number (MID) of the requesting subscriber is indicated in the "MID" field. Other information in a TNUM record includes the roamer's electronic serial number (ESN), time and date of activation, and the roamer's feature package in his home switch. The "Sent" field indicates whether the activation has been completed (SENT=Y) or is merely in process (SENT=N).

| TNUM FILE RECORD FORMAT | | | | | | | |
|---|---|---|---|---|---|---|---|
| 5122601028 | Y | 5124611028 | 12345678 | Y | 13:00:00 | 06-30-87 | 015 |
| TEMPORY NUMBER ("TDN" FIELD) | IS THIS RECORD | ROAMER'S MID | ROAMER'S SERIAL NUMBER (ESN) | | TIME OF ACTIVATION | DATE OF ACTIVATION | UPDATES |

| TNUM FILE RECORD FORMAT | | |
|---|---|---|
| BEING USED ("USED" FIELD) | SENT TO BOTH FOREIGN AND HOME SWITCHES? | ROAMER'S FEATURE PACKAGE |

The FMR processing indicated above has been performed by the background or execution program, FMR.EXEC, which runs in a continuous loop. However, once the Flag ROAMER CALL is detected by FMR.BAS, FMR.BAS begins to process the call as indicated below.

Specifically, in Step 021, the FMR processor examines the ROAMER CALL flags to determine whether any of those flags are set. Because a ROAMER CALL flag had been set in Step 019, the determination is positive, and the system proceeds, in Step 023, to remove the corresponding Call Record from the call buffer and store the Call Record on a RAM, disk storage medium. This procedure is done primarily as a backup, precautionary, measure.

Next, in Step 024, the ROAMER CALL flag that had been set in Step 019, the buffer flag, and pointers are all reset.

In Step 025, the flag BUFFLAG is set. The setting of BUFFLAG occurs as part of the operation of the subroutine PEEKCALL. (See Appendix C.13) Specifically, BUFFLAG is set whenever Call Record data is passed by FMR.EXEC to a predetermined buffer, e.g., the RAM disk.

After Step 025, the FMR processing system loops back to Step 021. If any other ROAMER CALL flags have been or remain raised (i.e., set) (which would be true if there were, at the time, at least one other roaming subscriber who was simultaneously requesting FMR service), the processing of Steps 023 through 026 would be repeated until all ROAMER CALL flags have been cleared. Assuming the pending request is the only, or the last, request to be served, the FMR system proceeds to Step 041. Subsequently, in Step 042, a determination is made as to whether the two-second timer has timed out. If it is determined that the two-second timer has timed out, a routine is called to check the operation of the FMR system. For example, the "heartbeat" incorporated into the background program is examined for continuity. In addition, it may be possible for FMR.BAS to become "stuck" in one module for an excessive duration. If not, BUFFER is reset in Step 42, and the system jumps to step 052.

In Step 052, information related to the call is retrieved from the Call Buffer. Recall that information had been previously stored in the Call Buffer in Step 18. In Step 053, relevant information (MID, ESN, dialed digits) accumulated in the original request for FMR service is extracted. In Step 054, 055, and 056, a determination is made whether or not to "validate" the roaming subscriber's home switch. This determination is based on the information extracted in Step 052. Specifically, the FMR processing system determines: (1) whether the NPA NXX associated with the subscriber's request is in the validation file; (2) whether the subscriber's home switch is a "valid" switch. The determinants here are, inter alia, whether or not the switch is part of the FMR system and whether or not the switch is operating.

Once the roaming subscriber's home switch has been "validated," the digits dialed by the subscriber are examined in Step 0511 to determine whether those digits constitute an "activation" code. The activation code is, to a degree, arbitrarily chosen and may, for example, correspond, as suggested above, to the selection, by the subscriber, of the three keys on the control unit keypad corresponding to the digits 211. (The converse "deactivation" code and attendant processing by the FMR system will be described below.)

Once it has been determined that an activation code has been received, an ACTIVE FILE is created (Step 058), and the MID and ESN associated with the subscriber's mobile unit, as well as information identifying his home switch site, are stored (Step 059). In Step 0510 the ACTR flag is incremented, indicating that an activation request has been received. FMR.BAS then returns to Step 051 in order to determine whether the last Call Record has been stored. If there are no remaining Call Records to be stored, the FMR processing jumps to Step 045, where a determination is made whether ACTR is equal to ZERO. Inasmuch as, in this instance, ACTR cannot be equal to ZERO because it had, in Step 0510, been incremented, the program jumps to Step 061.

In Step 061, FMR.BAS determines the total number of temporary directory numbers (TDNs) provided for or allocated by the switch in the foreign MTSO. This value is stored in the variable LC (Last TDN Count). Subsequent to Step 062, in which it is determined that an activation is pending, the Call Record is retrieved (Step 063) from the ACTIVE file, and the value of ACTR is decremented by one. Assuming the current Call Record is not the last record in the file, the first record is retrieved from TNUM file (Step 074), and first record indicator LTRI (Step 071) is set to ONE.

Steps 072 through 075 comprise a looping routine that examines all TDN records in the TNUM file. In so doing, FMR.BAS searches for the first unused TDN or attempts to determine whether the roamer has previously requested the FMR activation. At Step 078, after all temporary number records in the TNUM file have been examined, the variable "R" will equal the record number in TNUM file of the first unused temporary number or the record number associated with a temporary number already allocated to the roamer. If 'R' is equal to ZERO, all temporary numbers have been used, and a message is sent to the daily transaction file (Step 0715) to indicate this condition. Assuming that an unused temporary number has been found or that the roamer has already been assigned a TDN, the program flow continues with Step 072.

If, during Steps 072 through 077, the roamer was found to already have a TDN assigned to him, the flag DUPFLG will be set equal to ONE (Step 0714), and program flow continues with Step 082. A determination is made at Step 084 whether the roamer's initial request for an activation has been completed or whether FMR.BAS is in the process of activating the roamer. Because we have assumed the presently described operation to be an activation, and because DUPFLG will be ZERO, FMR.BAS proceeds to Step 0815, where the then-present data is stored in the ACTSND file and SNDF (SeND Flag) is set.

At this point (Step 0816), an examination of DDUP is undertaken to determine if the roamer has already been assigned a temporary number in the foreign MTSO and three hours have elapsed since his first activation. If so, the value of the variable PROCESS STATE is set to 3, indicating a re-activation in the local switch only, else the value of PROCESS STATE is set to ONE (Normal Activation).

Because, again, the system is undergoing an activation process, processing proceeds to Step 063 where, inter alia, ACTR is caused to be decremented. Because, during Step 065, the then-current record is determined to be the last record and, in fact, an activation (Step 066), ACTR is set to ZERO, and the file is cleared. That is, all necessary information is at the time extracted from the file as the file is being processed. Consequently, the file can be used for another activation while this processing takes place. FMR.BAS then jumps to Step 046.

Because SNDF is set (recall Step 0815), FMR.BAS skips to Step 091. At Step 091, a determination is made that the processing then encountered is an activation. Accordingly, at Step 092, File is set to indicate an activation. Because (1) the then-present record is not the last record (Step 095), (2) the value of PROCESS STATE is ONE, and (3) all the ACTSND variables, roamer ESN and MID, are valid, FMR.BAS then determines which switch to call (Step 0910). This determination is made based on data in the ACTSND file. Specifically, data identifying the roamer's home switch is stored in ACTSND, and this data can be matched against the NPA file to retrieve the telephone number (that is, the number assigned to the switch in the private data network) of the home switch. In Step 0912, FMR.BAS calls the roamer's home switch. The roamer's home switch is then interrogated to determine:

Step 0913: Is the roamer a "homer" in the switch called?

Step 0914: Has there been no denial of services to the ESN corresponding to the roamer's equipment?

Step 0915: Do the ESN and the MID match in the data base?

If the results of the interrogation are all affirmative and the value of PROCESS STATE is not equal to 3 (Recall: PROCESS STATE was set to ONE in Step 0817), then, according to Step 102, the subscriber's feature package is retrieved from the home switch and stored in the assigned record in the TNUM file. (As an aside, the subscriber's feature package is evaluated to determine whether the subscriber has Call Forwarding in his home service area. If not, FMR.BAS will give the subscriber Call Forwarding in conjunction with the command to the home switch, set forth below.) Because the file is an ACTSND (Step 103), the FMR processor, in Step 104, issues a command to the roamer's home switch to call forward all calls placed the roamer's MID in his home service area to the assigned TDN.

The command, sent from the FMR processor to the roamer's home MTSO switch is a central component of the invention. This command, as well as ancillary and penumbral operations associated with it, form the contents of a subroutine referred to as ROAMERHOME. The specific processing steps undertaken by ROAMERHOME will vary in their detail in order to accommodate the command structure of the home switch with which ROAMERHOME is, at the time, interacting. The complete source listing of an exemplary form ROAMERHOME follows.

```
If the results of the interrogation are all affirmative and the value of PROCESS STATE is not equal to 3 (Recall:  PROCESS STATE was set to ONE in Step 0817), then, according to Step 102, the subscriber's feature package is retrieved from the home switch and stored in the assigned record in the TNUM file.  (As an aside, the subscriber's feature package is evaluated to determine whether the subscriber has Call Forwarding in his home service area.  If not, FMR.BAS will give the subscriber Call Forwarding in conjunction with the command to the home switch, set forth below.)  Because the file is an ACTSND (Step 103), the FMR processor, in Step 104, issues a command to the roamer's home switch to call
``` forward all calls placed the roamer's MID in his home service area to the assigned TDN.

The command, sent from the FMR processor to the roamer's home MTSO switch is a central component of the invention. This command, as well as ancillary and penumbral operations associated with it, form the contents of a subroutine referred to as ROAMERHOME. The specific processing steps undertaken by ROAMERHOME will vary in their detail in order to accommodate the command structure of the home switch with which ROAMERHOME is, at the time, interacting. The complete source listing of an exemplary form ROAMERHOME follows.

ROAMERHOME

```
SUB ROAMERHOME
ON ERROR GOTO FM2HANDLER
3100 TIMER OFF: TCHGFLG = 1: CALLSORT: HOME = 0
3105 M1$ = FNDUM$: M2$ = FNDUM$: M3$ = FNDUM$: LS$ =
     "FIRST": TNCON# = 0
3110 TOUT# = 3500: CLS : CALL GETTNUMI: CLOSE 11: CALL
     FIELDTNUM
3120 '
3135 CLS : CLOSE 4: XZ = 0: PH2$ = "NONE ACTIVE": NF =
     4: NA$ = FI1$: CALL OPENACTSND
3140 CLS : PRNFLG = 0: BUSYF = 0: RN = RN + 1: SEROK =
     0: FPTRAP = 0: BALCT# = 0: DSC# = VAL(RCD$):
     SEROK = 0: FPTRAP = 0
3141 IF EOF(4) OR RN > RECORD# THEN 3265 ELSE GET 4,
     RN: BSTATE# = 0
```

```
3142 IF VAL(STATE$) = 0 THEN TS$ = SPACE$(2): GOTO
     3140:    ELSE BUSYF = 0: BALCT# = 1

3143 STATE# = VAL(STATE$): ON STATE# GOTO 3145, 3145,
     3145, 3140, 3140, 3140, 3140, 3140, 3140

3144 PRINT "BAD STATE": GOTO 3140

3145 IF VAL(RMID$) = 0 AND VAL(RCD$) <> 0 THEN CALL
     CLEARTNUM: GOTO 3140:    ELSE IF VAL(RMID$) = 0
     AND VAL(RCD$) = 0 THEN CALL RERUN: CHAIN
     "pokecom"

3147 CLS : KEY OFF: LOCATE 25, 1: COLOR 15, 0, 0:
     STATUS: PRINT STAT1$: COLOR 7, 0, 0: LOCATE 12,
     27: PRINT "@@ CALLING " + SITE$ + " SWITCH @@"

3149 IF SITE$ = "SANANT" THEN 6200 ELSE IF SITE$ =
     "HSTNTX" THEN 6300 ELSE IF SITE$ = "MIAFLA" THEN
     6400 ELSE IF SITE$ = "ORDFLA" THEN 6800 ELSE IF
     SITE$ = "DALSTX" THEN 6400

3150 PH2$ = SITE$: CALL VALIDATENPA: IF LS$ <> SITE$
     THEN LS$ = SITE$

3151 IF SITE$ = "JACFLA" THEN PRM$ =
     ",N,8,1,CD,DS,PE":    ELSE PRM$ =
     ",E,7,1,CD,DS,PE"

3152 IF SITE$ = "YOUOHI" THEN FP1$ = ":FP=01":
     ELSE FP1$ = ":FP-15"

3156 BSTATE# = 9: CALL DIALCONNECT: IF BUSYF = 1 THEN
     3140 ELSE BSTATE# = 0

3157 CTOUT = 15: GET 11, VAL(RCD$)

3185 PRNFLG = 0: CALL DELAY2: M1$ = "(" + CHR$(3): M2$
     = "?": M3$ = FNDUM$: PRINT #2, CHR$(27)

3190 CALL GETCHAR: IF INSTR(A$, M1$) THEN 3195 ELSE IF
```

AA$ = nc$ THEN 3228 ELSE 3190

3195 PRNFLG = 1: CALL DELAY2: PRINT #2, PASSWD$

3200 CALL GETCHAR: IF INSTR(A$, M2$) THEN CALL GETCHAR: GOTO 3195: ELSE IF INSTR(A$, M1$) AND LEN(A$) ( 5 THEN 3205 ELSE IF AA$ = nc$ THEN 3228 ELSE 3200

3205 PRINT #2, MODE$

3210 CALL GETCHAR: PRNFLG = 0: IF INSTR(A$, M2$) THEN CALL GETCHAR: GOTO 3205: ELSE IF INSTR(A$, M1$) THEN 3220 ELSE IF AA$ = nc$ THEN 3228 ELSE IF INSTR(A$, "PAS") THEN CALL GETCHAR: GOTO 3185: ELSE 3210

3220 PRNFLG = 0: IF FI1$ = "ACTSND" THEN 3225 ELSE SIMCMD$ = "CHGLS:" + RMID$ + ":FP=" + FE$ + ":NOFT*": GOTO 3236

3225 FPTRAP = 0: XZ = VAL(RCD$): IF STATE# = 3 THEN A$ = "<": FPTRAP = 0: GOTO 3234: ELSE SIMCMD$ = "DISSD:SER=H'" + RSER$ + "*": SIMCMD$ = UCASE$(SIMCMD$): PRINT #2, SIMCMD$

3226 CALL GETCHAR: IF INSTR(A$, "NOT") THEN SIMCMD$ = "DIFLS:" + RMID$ + "*": FPTRAP = 1: GOTO 3226: ELSE IF INSTR(A$, "<") AND FPTRAP = 1 THEN 3230 ELSE IF INSTR(A$, "<") AND FPTRAP = 0 THEN CALL GETCHAR: PRINT #2, SIMCMD$: GOTO 3226

3227 IF INSTR(A$, "DENIED SERVICE") THEN DSC# = XZ: SEROK = 3: CALL DENYHANDLER: SEROK = 0: GOTO 3140: ELSE IF INSTR(A$, "TAPE OOS") THEN BSTATE# = 8: PUTINBUSYFILE: GOTO 3140

3228. IF INSTR(A$, "COMMAND") THEN 3225 ELSE IF AA$ = nc$ THEN BSTATE# = 7: PUTINBUSYFILE: GOTO 3140: ELSE IF INSTR(A$, M2$) THEN CALL GETCHAR: GOTO 3185: ELSE 3226

3229 GOTO 3226

3230 PRINT #2, SIMCMD$

3231 CALL GETCHAR: IF (INSTR(A$, "DOES NOT EXIST") OR INSTR(A$, "VACANT SUBSCRIBER") OR INSTR(A$, "NOT LOCALLY")) THEN DSC# = XZ: SEROK = 3: FPTRAP = 2: CALL DENYHANDLER: GOTO 3140: ELSE IF INSTR(A$, "?") THEN 3230

3232 IF INSTR(A$, "MID...") THEN FPTRAP = 2: GOTO 3231: ELSE IF INSTR(A$, "IN USE") THEN PRINT #2, "!": ELSE IF INSTR(A$, "TAPE OOS") THEN BSTATE# = 8: PUTINBUSYFILE: GOTO 3140: ELSE IF AA$ = nc$ THEN PUTINBUSYFILE: GOTO 3140

3233 IF FPTRAP = 2 THEN fp$ = A$: GOSUB 3300: IF BSTATE# = 1 THEN PUTINBUSYFILE: GOTO 3140: ELSE IF CK$ = "OK" THEN FPTRAP = 0: SEROK = 0: GOTO 3231: ELSE IF CK$ = "NO COMPARE" THEN CK$ = "": SEROK = 4: DSC# = XZ: CALL DENYHANDLER: PRINT #2, "!": GOTO 3140: ELSE 3231

3234 IF FPTRAP = 0 AND INSTR(A$, "<") THEN SIMCMD$ = "CHGLS:" + RMID$ + FP1$ + ":CF=11" + TDN$ + "*": GOTO 3236: ELSE 3231

3236 M1$ = FNDUM$: PRINT #2, SIMCMD$

3237 CALL GETCHAR: IF INSTR(A$, "COMPLETED") THEN M1$ = "<": GOTO 3240: ELSE IF AA$ = nc$ THEN PUTINBUSYFILE: GOTO 3140: ELSE IF INSTR(A$, "COMMAND?") THEN 3236

```
3238 IF INSTR(A$, "FORMAT") THEN CALL GETCHAR: BSTATE#
     = 12: CALL DENYHANDLER: GOTO 3140

3240 IF INSTR(A$, M1$) THEN 3245 ELSE IF INSTR(A$,
     "TAPE") OR INSTR(A$, "IN USE") THEN BSTATE# = 8:
     PUTINBUSYFILE: GOTO 3140: ELSE 3237

3245 PRINT #2, "!": CALL GETCHAR
                     15
3246 CALL GETCHAR: IF INSTR(A$, "CANCELLED") THEN 3250
     ELSE IF AA$ = nc$ THEN 3250 ELSE 3246

3250 IF STATE$ = "02" OR STATE$ = "03" THEN LSET
     STATE$ = "05":    ELSE LSET STATE$ = "04":

3251 GOSUB 3290: IF FI1$ = "ACTSND" THEN SNDF# = SNDF#
     - 1

3252 IF FI1$ = "DEASND" THEN SNDD# = SNDD# - 1

3255 LSET SPARE$ = SPACE$(6): PUT 4, RN: CALL
     UPDATERSTAT: GOTO 3140

3265 IF FI1$ = "ACTSND" THEN SNDF# = SNDF# - 1

3266 IF FI1$ = "DEASND" THEN SNDD# = SNDD# - 1

3267 CLOSE 4: LS$ = "": GOTO ROAMERRET

3290 IF FI1$ = "ACTSND" THEN MODAFLG = MODAFLG + 1

3291 IF FI1$ = "DEASND" THEN MODDFLG = MODDFLG + 1

3292 RETURN

3300 '

3305 GET 11, XZ: Q$ = MID$(fp$, 16, 3): IF VAL(Q$) < 0
     OR VAL(Q$) > 99 THEN BSTATE# = 1: RETURN:
     ELSE LSET FE$ = Q$: Q$ = "": fp$ = "": FPTRAP =
     0: PUT, 11, XZ

3310 IF MID$(A$, 38, 8) = MID$(M$, 15, 8) THEN CK$ =
```

```
         "OK":     ELSE CK$ = "NO COMPARE": HOSER$ =
         MID$(A$, 38, 8)

3315 RETURN

6200 PRM$ = ",E,7,1,CD,DS,PE": IF SNAME$ = "CIFMR"
     THEN FPCHK$ = "e": ELSE FPCHK$ = "h"

6201 LOGIN$ = "apxrcv -text -brief": SIMCMD$ =
     LCASE$(RSER$): FRAUD$ = "srno.srnum=h" + SIMCMD$
     + " r": SIMCMD$ = "": REVIEW$ =
     "sub_dirno.subnpa=" + MID$(RMID$, 1, 3) +
     " sub_dirno.subnxx=" + MID$(RMID$, 4, 3) +
     " sub_dirno.submdn=" + MID$(RMID$, 7, 4) + " r"

6202 UPDATE1$ = MID$(REVIEW$, 1, 64): UPDATE2$ =
     "licf=y licfdgt=1" + TDN$ + " licfáct=y u":
     CANCEL$ = UPDATE1$: GET 11, VAL(RCD$): CANCEL1$ =
     "licf=y licfact=n u"

6203 IF INSTR(FE$, "NO") THEN CANCEL1$ = "licf=n
     licfact=n u"

6205 PH2$ = SITE$: CALL VALIDATENPA: IF LS$ <> SITE$
     THEN LS$ = SITE$: CLOSE 2: BSTATE# = 9: CALL
     DELAY2: CALL DIALCONNECT: IF BUSYF = 1 THEN 3140

6207 BSTATE# = 0: M1$ = "gin:": CALL GETCHAR
     IF INSTR(A$, M1$) THEN 6209
     IF AA$ = nc$ THEN PUTINBUSYFILE: GOTO 3140
     GOTO 6207

6209 CALL DELAY2: M1$ = ":": PRNFLG = 1: PRINT #2,
     MODE$: CALL GETCHAR: PRNFLG = 0: M1$ = ":"

6211 CALL GETCHAR: IF INSTR(A$, "Pass") THEN 6213 ELSE
     IF AA$ = nc$ THEN PUTINBUSYFILE: GOTO 3140:
     ELSE IF INSTR(A$, "login:") THEN 6209 ELSE 6211
```

6213 CALL DELAY2: PRNFLG = 1: PRINT #2, PASSWD$: CALL GETCHAR: PRNFLG = 0: M1$ = "$": M2$ = ":"

6215 CALL GETCHAR: IF INSTR(A$, M1$) THEN PRNFLG = 0: GOTO 6217:    ELSE IF AA$ = nc$ THEN 6297 ELSE IF INSTR(A$, "login") THEN 6209 ELSE 6215

6217 PRINT #2, LOGIN$

6219 M1$ = ":": CALL GETCHAR: IF INSTR(A$, "not found") THEN 6217 ELSE IF INSTR(A$, "Enter Form") THEN 6221 ELSE IF AA$ = nc$ THEN 6297 ELSE IF INSTR(A$, "$") THEN 6217 ELSE 6219

6221 IF STATE# = 3 THEN 6236 ELSE IF FI1$ = "DEASND" THEN 6236 ELSE PRINT #2, "fraud"

6223 CALL GETCHAR: IF INSTR(A$, "E=Exec") THEN 6225 ELSE IF AA$ = nc$ THEN 6297 ELSE IF INSTR(A$, "not allowed") THEN 6221 ELSE 6223

6225 PRINT #2, "r": CMP1$ = FNDUM$

6227 M2$ = ">": CALL GETCHAR: IF INSTR(A$, M2$) THEN 6230 ELSE IF AA$ = nc$ THEN 6297 ELSE 6227

6230 SEROK = 0: PRINT #2, FRAUD$

6232 CALL GETCHAR: IF INSTR(A$, "Form not found") THEN SEROK = 1: GOTO 6232:    ELSE IF INSTR(A$, M2$) THEN 6234 ELSE IF AA$ = nc$ THEN 6297 ELSE 6232

6234 IF SEROK = 0 THEN DSC# = VAL(RCD$): SEROK = 3: FPTRAP = 0: CALL DENYHANDLER: GOSUB 6290: SEROK = 0: GOTO 3140:    ELSE GOSUB 6275: IF SEROK = 0 THEN 6236

6235 IF INSTR(A$, "$ ") THEN 6217 ELSE SEROK = 0: GOTO 6297

6236 PRINT #2, "sub"

After the command has been issued by the FMR processor to the roamer's home switch, the FMR processor continues to monitor the switch's response to all issued commands in order to assure that proper responses to those commands have been received. This operation is illustrated as Step 106.

Assuming proper responses are obtained, the system then determines that the value of PROCESS STATE is not equal to 2 or 3. (A value of PROCESS STATE equal to 2 would indicate that the roamer was found to have had his ESN denied in his home switch. A value of 3 indicates that a reactivation is in progress.) The value of PROCESS STATE is then set to 4, at which point the program jumps to Step 094.

At step 094, the Call Record is pulled from the file and, because this is not the last record (Step 095) and the value of PROCESS STATE is equal to 4 (Steps 096 and 097), the program jumps to step 111.

At step 111, a determination is made that the then-ongoing process is an activation. As a result, file is set to ACTSND in Step 112. In step 114, the next record is retrieved, and, because (1) that record is determined not to be the last record (Step 115), (2) the SKIP flag is not set (Step 116), (3) the value of PROCESS STATE is equal to 4 (Step 117 and 1112), and (4) all command parameters are determined to be valid (Step 1113), the program jumps to step 121.

At step 121, a determination is made that the HOME flag is not set. The HOME flag would be set if the FMR system were at this time simultaneously processing several requests for activation. In Step 122, the FMR processor obtains all parameters necessary to establish a communications link with the local switch. The link may be established through the PSTN or through a private network such as is available through Telenet Corporation. This information is then stored in the HOME file, and the FMR processor calls the local switch. This processing is done in one of several subroutines generically referred to as HOME.x.

The word "HOME" in the subroutine name denotes the FMR processor's perspective rather than the perspective of a CMR subscriber. Thus, HOME.X is used to communicate with the local (i.e. HOME) switch, which is a foreign switch for FMR service purposes. Each of the HOME.x subroutines will vary in its particulars in order to accommodate the specific command structure of the local switch to which the FMR processor is, at the time, coupled. (HOME.2500, for example, is the version of HOME.x currently used in conjunction with the EMX 2500, available from Motorola, Inc.) The command structure of the switch dictates the specific code required to "tell" the local switch to validate the roaming subscriber's TDN. In addition, the format of the Call Record generated by each model of switch can be expected to vary so the EXEC software may need to be modified as well. The complete source code listing of HOME.2500 follows.

```
6238 M1$ = ":": CALL GETCHAR: IF INSTR(A$, "E=Exec")
     THEN 6240 ELSE IF AA$ = nc$ THEN 6297 ELSE IF
     INSTR(A$, "not allowed") THEN 6236 ELSE 6238

6240 IF STATE# = 3 THEN 6247 ELSE IF FI1$ = "DEASND"
     THEN 6247 ELSE PRINT #2, "r"

6241 M2$ = ">": CALL GETCHAR: IF INSTR(A$, M2$) THEN
     6242 ELSE IF AA$ = nc$ THEN 6297 ELSE 6241

6242 SEROK = 0: PRINT #2, REVIEW$

6243 M1$ = ":": M2$ = ">": CALL GETCHAR
     IF INSTR(A$, "ldn_type=") THEN GOSUB CHKFP
     IF INSTR(A$, ".srnum=") THEN fp$ = A$: GOTO 6243
     IF INSTR(A$, "not found") THEN SEROK = 3: GOTO
     6243
     IF AA$ = nc$ THEN 6297
     IF INSTR(A$, "E=Exec") THEN 6244
     GOTO 6243
```

```
6244 IF SEROK = 3 OR SEROK = 5 THEN FPTRAP = 2: DSC# =
     VAL(RCD$): CALL DENYHANDLER: FPTRAP = 0: SEROK =
     0: GOTO 3140

6245 SEROK = 0: GOSUB 6294: IF SEROK = 1 THEN SEROK =
     0: GOTO 6246:       ELSE SEROK = 4: DSC# =
     VAL(RCD$): CALL DENYHANDLER: SEROK = 0: GOSUB
     6290: GOTO 3140

6246 IF Q$ = "" THEN BSTATE# = 1: GOTO 6297:       ELSE
     IF STATE# = 3 THEN 6247 ELSE XZ = VAL(RCD$): GET
     11, XZ: LSET FE$ = Q$: Q$ = "": PUT 11, XZ

6247 PRINT #2, "u"

6248 M1$ = ">": CALL GETCHAR: IF INSTR(A$, M1$) THEN
     6250 ELSE IF AA$ - nc$ THEN 6297 ELSE 6248

6250 IF FI1$ = "DEASND" THEN PRINT #2, CANCEL$:
     ELSE PRINT #2, UPDATE1$

6251 CALL GETCHAR: IF INSTR(A$, M1$) THEN 6252 ELSE IF
     AA$ = nc$ THEN 6297 ELSE 6251

6252 IF FI1$ = "DEASND" THEN PRINT #2, CANCEL1$:
     ELSE PRINT #2, UPDATE2$

6253 M1$ = ":": CALL GETCHAR: IF INSTR(A$, "E=Exec")
     THEN 6255 ELSE IF AA$ = nc$ THEN 6297 ELSE IF
     INSTR(A$, "(Y or N)") THEN CALL DELAY2: PRINT #2,
     "y": GOTO 6253:     ELSE 6253

6255 GOSUB 6290: IF STATE$ = "02" OR STATE$ = "03"
     THEN LSET STATE$ = "05": ELSE LSET STATE$ = "04"

6256 IF FI1$ = "ACTSND" THEN SNDF# = SNDF# - 1

6257 IF FI1$ = "DEASND" THEN SNDD# = SNDD# - 1

6258 LSET SPARE$ = SPACE$(6): PUT 4, RN: GOSUB 3290:
     CALL UPDATERSTAT: GOTO 3140
```

```
6275 M1$ = ":": M2$ = "$": SEROK = 0

6276 PRINT #2, "<"

6277 CALL GETCHAR: IF INSTR(A$, "Enter Form") THEN
     SEROK = 0: RETURN:     ELSE IF INSTR(A$, M2$)
     THEN SEROK = 1: RETURN: ELSE IF AA$ = nc$ THEN
     SEROK = 3: RETURN: ELSE IF INSTR(A$, M1$) THEN
     6276 ELSE 6277

6290 '

6291 M1$ = "$ ": M2$ = ":": PRINT #2, "<"

6292 CALL GETCHAR: IF AA$ = nc$ THEN RETURN:     ELSE
     IF INSTR(A$, M1$) THEN RETURN: ELSE IF INSTR(A$,
     "E=Exec") OR INSTR(A$, M2$) THEN 6290 ELSE 6292

6294 IF INSTR(fp$, ".srnum=h") THEN SIMCMD$ =
     LCASE$(RSER$): X# = INSTR(fp$, ".srnum="): IF
     MID$(fp$, X# + 8, 8) = SIMCMD$ THEN SEROK = 1:
     GOTO 6296:     ELSE SEROK = 4: HOSER$ =
     MID$(fp$, X# + 8, 8): GOTO 6296

6295 IF INSTR(fp$, ".srnum=m") THEN CALL MANUFTOHEX:
     X# = INSTR(fp$, ".srnum="): IF MID$(fp$, X# + 8,
     11) = SIMCMD$ THEN SEROK = 1: GOTO 6296:
     ELSE SEROK = 4: HOSER$ = MID$(fp$, X# + 8, 11):
     GOTO 6296

6296 IF INSTR(fp$, "licf=y") THEN Q$ = "YES": RETURN:
     ELSE IF INSTR(fp$, "licf=n") THEN Q$ = "NO":
     RETURN: ELSE Q$ = "": PRINT "TROUBLE WITH
     IMMEDIATE CALL FORWARD FIELD": RETURN 6297 IF INSTR(A$, nc$) THEN 3140 ELSE GOSUB 6290:
     PUTINBUSYFILE: GOTO 3140
```

CHKFP:

X$ = "": X% = INSTR(A$, "ldn_type="): IF X% <> 0 THEN
  X$ = MID$(A$, X% + 9, 1)

IF X$ = FPCHK$ THEN SEROK = 0: ELSE SEROK = 5

RETURN

6300 PRM$ = ",E,7,1,CD,DS,PE": PH2$ = SITE$: CALL
  VALIDATENPA:
6301 IF LS$ <> SITE$ THEN LS$ = SITE$: BSTATE# = 9:
  CALL DIALCONNECT: IF BUSYF = 1 THEN 3140 ELSE
  SEROK = 0: CALL DELAY2
6304 BSTATE# = 0
6305 GOSUB 6390: IF BUSYF <> 1 THEN 6311
6306 IF BSTATE# <> 6 THEN BSTATE# = 7: PUTINBUSYFILE:
  GOTO 3140:    ELSE PUTINBUSYFILE: GOTO 3140
6311 SEROK = 0: IF STATE# = 3 THEN 6326 ELSE IF FI1$ =
  "ACTSND" THEN SD$ = "DISPL CP SERDEN " + RSER$:
  PRINT #2, SD$:    ELSE 6328
6312 CALL GETCHAR: IF INSTR(A$, "NOT FOUND IN") THEN
  6314 ELSE IF INSTR(A$, "DENIED SERVICE") THEN
  DSC# = VAL(RCD$): SEROK = 3: GOTO 6314:    ELSE
  IF AA$ = nc$ THEN 6370 ELSE IF INSTR(A$, "COMMAND
  ABORT") THEN 6311 ELSE 6312
6314 M1$ = ":": CALL GETCHAR: IF INSTR(A$, M1$) THEN
  GOSUB 6390: IF BUSYF = 1 THEN GOSUB 6350:
  PUTINBUSYFILE: GOTO 3140
6315 IF SEROK = 0 THEN 6316 ELSE IF SEROK = 3 THEN
  GOSUB 6350: DSC# = VAL(RCD$): CALL DENYHANDLER:
  GOTO 3140:    ELSE IF SEROK = 2 THEN GOSUB 6350:

PUTINBUSYFILE; GOTO 3140

6316 M1$ = ":": TT$ = RMID$: DS$ = "DISPLA CP
SUBSCRIBER " + MID$(TT$, 1, 3) + " " + MID$(TT$,
4, 3) + " " + MID$(TT$, 7, 4): PRINT #2, DS$

6317 CALL GETCHAR: X# = INSTR(A$, MID$(RMID$, 1, 3)):
IF INSTR(A$, "NOT ASSIGNED") THEN SEROK = 2:
FPTRAP = 2: GOTO 6320: ELSE IF AA$ = nc$ THEN
6370

6318 IF X# > 0 AND X# < 5 THEN 6319 ELSE IF INTR(A$,
"COMMAND ABORT") THEN 6316 ELSE 6317

6319 IF INSTR(A$, RSER$) THEN 6320 ELSE SEROK = 4:
HOSER$ = MID$(A$, 26, 8)

6320 IF SEROK = 2 THEN DSC# = VAL(RCD$): GOSUB 6350:
CALL DENYHANDLER: SEROK = 0: GOTO 3140:       ELSE
IF SEROK = 0 THEN 6321 ELSE IF SEROK = 4 THEN
DSC# = VAL(RCD$): GOSUB 6350: CALL DENYHANDLER:
SEROK = 0: GOTO 3140

6321 CALL GETCHAR: IF INSTR(A$, "---") THEN 6322 ELSE
X# = INSTR(A$, "PKG"): IF X# <> 0 THEN fp = X#:
GOTO 6321:      ELSE 6321

6322 CALL GETCHAR: GET 11, VAL(RCD$): Q$ = MID$(A$, fp
3): IF VAL(Q$) < 0 OR VAL(Q$) > 99 THEN BSTATE# =
1: GOTO 6370:     ELSE LSET FE$ = Q$: PUT 11,
VAL(RCD$): fp = 0

6323 M1$ = ":": CALL GETCHAR: IF INSTR(A$, "NPA") THEN
6326 ELSE IF AA$ = nc$ THEN 6370 ELSE 6323

6326 GOSUB 6390: IF BUSYF = 1 THEN PUTINBUSYFILE:
BUSYF = 0: GOTO 3140:     ELSE CALL DELAY2: DS$ =
"CHANGE CP SUBSCRIBER " + MID$(RMID$, 1, 3) + " "

```
        + MID$(RMID$, 4, 3) + " " + MID$(RMID$, 7, 4) +
        ";;;;;;;;;15 Y ;;;;;;;11" + TDN$ = " ;;Y;": PRINT
        #2, DS$
6327 M1$ = ":": CALL GETCHAR: IF INSTR(A$, "NPA:")
        THEN 6340 ELSE IF INSTR(A$, "COMMAND ABORT") THEN
        6311 ELSE IF AA$ = nc$ THEN 6370 ELSE 6327
6328 GET 11, VAL(RCD$)
6329 DS$ = "CHANGE CP SUBSCRIBER " + MID$(RMID$, 1, 3)
        + " " + MID$(RMID$, 4, 3) + " " + MID$(RMID$, 7,
        4) + " ;;;;;;;;;" + FE$ + " N ;;;;;;;;;Y;": CALL
        DELAY2: PRINT #2, DS$: GOTO 6327
6340 CALL DELAY2: GOSUB 6350: IF STATE$ = "02" OR
        STATE$ = "03" THEN LSET STATE$ = "05": ELSE LSET
        STATE$ = "04"
6341 IF FI1$ = "ACTSND" THEN SNDF# = SNDF# - 1
6342 IF FI1$ = "DEASND" THEN SNDD# = SNDD# - 1
6345 LSET SPARE$ = SPACE$(6): PUT 4, RN: GOSUB 3290:
        CALL UPDATERSTAT: GOTO 3140
6350 IF INSTR(A$, nc$) THEN RETURN
6351 M2$ = ">": BUSYF = 0: GOSUB 6390: IF BUSYF = 1
        THEN RETURN:     ELSE PRINT #2, "LOGOUT"
6352 CALL GETCHAR: IF INSTR(A$, "..>") THEN RETURN:
        ELSE IF AA$ = nc$ THEN RETURN: ELSE 6352
6353 GOTO 6352
6360 PP = TIMER + 2
6363 IF TIMER > PP THEN RETURN:     ELSE IF PP >
        (TIMER + 2) THEN 6360 ELSE 6363
6370 BUSYF = 1: PUTINBUSYFILE: IF INSTR(A$, nc$) THEN
        3140 ELSE GOSUB 6350: GOTO 3140
```

```
6390 BUSYF = 0: M1$ = ">": PRINT #2, CHR$(17); : PRINT
     #2, CHR$(17); : CALL DELAY2: PRINT #2, CHR$(1)
6391 CALL GETCHAR: IF INSTR(A$, ".>") THEN CALL
     DELAY2: GOTO 6396:      ELSE IF INSTR(A$, ">")
     THEN RETURN
6392 IF AA$ = nc$ OR INSTR(A$, nc$) THEN BUSYF = 1:
     RETURN
6393 GOTO 6391
6396 PRINT #2, "LOGIN": M1$ = ":": CALL DELAY2
6397 CALL GETCHAR: IF INSTR(A$, "USENAME:") THEN CALL
     DELAY2: PRNFLG = 1: PRINT #2, MODE$: GOTO 6398:
     ELSE IF AA$ = nc$ THEN BSTATE# = 5: GOTO 6392:
     ELSE IF INSTR(A$, "QUEUED") THEN BSTATE# = 6:
     BUSYF = 1: RETURN: ELSE 6397
6398 CALL GETCHAR: PRNFLG = 0: IF INSTR(A$, "PASS")
     THEN CALL DELAY2: M1$ = ">": PRNFLG = 1: PRINT
     #2, PASSWD$:    ELSE IF AA$ = nc$ THEN 6392 ELSE
     IF INSTR(A$, "FAILURE") THEN 6390 ELSE 6398
6399 CALL GETCHAR: PRNFLG = 0: IF INSTR(A$, "FAILURE")
     THEN BUSYF = 1: PRNFLG = 0: RETURN:     ELSE IF
     INSTR(A$, ">") THEN PRINT : PRNFLG = 0: RETURN:
     ELSE IF AA$ = nc$ THEN 6392 ELSE 6399
6400 PRM$ = ",E,7,1,CD,DS": PH2$ = SITE$: CALL
     VALIDATENPA: MODE$ = "ALW:RCCHAN SRM!"'
6401 IF LS$ <> SITE$ THEN LS$ = SITE$: CLOSE 2: CALL
     DELAY2: BSTATE# = 9: CALL DIALCONNECT: SEROK = 0:
     GOTO 6405:    ELSE IF BUSFLG = 0 THEN 6406
6405 IF BUSYF = 1 THEN BUSYF = 0: GOTO 3140:     ELSE
     M1$ = ":": GOSUB 6480: IF BUSYF = 1 THEN
     PUTINBUSYFILE: BUSYF = 0: GOTO 3140
```

```
6406 BSTATE# = 0: IF FI1$ = "ACTSND" THEN CMD1$ =

"VFY-DN-30" + MID$(RMID$, 4, 7) + ".": CMD2$ =

"VFY-LEN-31": CMD3$ = "RC:MOBL;CHG:/": CMD4$ =

"ORD 4,TN " + MID$(RMID$, 4, 7) + ",ESM!": CMD5$

= "RC:CFV:/": CMD6$ = "BASE " + MID$(RMID$, 4, 7)

+ ", TO " + TDN$ + ",PFX!":      ELSE 6450

IF STATE# = 3 THEN 6423

6407 cfw$ = "YES": SEROK = 0: M1$ = "PF": M3$ =

FNDUM$: M2$ = "?": CMD$ = CMD1$: GOSUB 6490

6408 CALL GETCHAR: IF INSTR(A$, M1$) THEN M1$ =

FUNDUM$: GOTO 6409:  ELSE IF INSTR(A$, M2$) OR

AA$ = nc$ THEN 6487 ELSE 6408

6409 CALL GETCHAR: IF INSTR(A$, "LEN") THEN PLEN$ =

MID$(A$, 10, 10): VALFLG = 1: GOTO 6409:      ELSE

IF INSTR(A$, "END OF JOB") THEN M1$ = CHR$(25):

GOTO 6409: ELSE IF VALFLG = 1 THEN VALI$ = A$:

VALFLG = 2: ELSE IF INSTR(A$, M1$) THEN 6411
```

The HOME flag is then set in Step 123, and after a determination is made, in Step 124, that the ongoing process is an activation, the TDN is validated, and the roamer is included in the list of TDNs (Step 125).

In Step 127 a test is undertaken to confirm that correct responses have been received to all commands. If so, the TNUM file is updated with date and time of activation, and the SND is set to ONE. In Step 1214, the roamer's TDN is entered into the TEST.TXT file, in preparation for a callback that will be transmitted to the roamer. This callback is colloquially referred to as a "WATSON."

In Step 1215, the CALL flag is set; and in Step 1216 PROCESS STATE is set to 9. The program then jumps to Step 114, where the next record is obtained. If this record is determined to have been the last record, the program jumps to Step 131.

At Step 131, a determination is made that the SKIP flag is not set. The SKIP flag would be set, for example, when multiple activations are pending or when the initial attempt to establish a communications link with the home switch had failed. Such failure might be attributable to several causes, including, for example, blockage of the switch. The SKIP flag is then set to ZERO in Step 133, and in Step 134 all records in the ACTSND file are cleared. Because the HOME flag is determined in Step 135 to be equal to ONE, the FMR processor logs off the home switch (Step 136), clears all appropriate flags, updates and counters (Step 137).

In Step 138 a determination is made whether AUTO FLAG is greater than 2 and whether BUSY FLAG equals ZERO. Because this condition is not satisfied, FMR processing then returns to FMR.EXEC.

The FMR system also provides a unique feature, alluded to above, in that it is capable of detecting and appropriately processing a "duplicate activation request". A first type of "duplicate activation request" would occur, for example, when the roaming subscriber repeatedly enters an activation code through the keypad on his handset, without allowing the FMR system sufficient time to process the request, or on any other occasion when the subscriber initially enters an activation code and then re-enters the code, prematurely, before the FMR systems has completed processing of the initial activation request.

A second type of duplicate activation request arises when, for example, a CMR subscriber roams into a foreign service area and is provided FMR service in that area. Should the subscriber, on the same day, leave and then return to a local service area, he would need to be "re-activated" in this local area. Otherwise, of course, although this local MTSO would consider him active, calls placed to his home MID might be forwarded to the TDN in another foreign service area or not forwarded at all. Throughout the remainder of this document the second type of duplicate application request will be denominated a "valid" duplicate application, and the first type (described in the paragraph immediately above) will be denominated an "invalid" duplicate activation. In order to understand the manner in which either type of the duplicate activation request is handled, the flow of FMR.BAS will be re-traced, beginning with Step 0511.

Again, at Step 0511, FMR.BAS detects that an activation code, 211, has been received by the foreign switch. In response, an ACTIVE file is created in Step 058. In Step 059, the subscriber's MID and ESN are stored, and his home switch is identified and stored. The ACTR flag is incremented in Step 0510, indicating that an activation process is pending. At Step 051 a determination is made that the pending call is the last call stored, and processing is routed to Step 045. Because, at this point, ACTR is set (an activation is in process), processing jumps to Step 061. At this point a determination is made as to the exact number of TDNs allocated to the foreign switch, and this value is stored in LC. Because the pending process is an activation, in Step 063 the record is retrieved from the ACTIVE file, the ACTR is decremented. The pending record is not the last record (Step 065). (The effective last record is a dummy record.) Processing continues at Step 071, where LTRI is set to ONE, that is, a limit is imposed on the number of attempts that will be allowed to complete this activation. At Step 074, the record is recalled from TNUM. At this point, the FMR system is reading a TDNs in the TNUM file and attempting to assign a TDN to the requesting subscriber.

At Step 075, the last try (LTRI) is not equal to LC. That is, the FMR system determines that it has not exhausted all the TDNs available for assigning to the requesting subscriber. At Step 076, a determination is made that the "USED" field of the temporary number does not contain an "N" (=No).

At Step 077, the system compares the requesting roamer's MID to the MID field of the TNUM record. That is, FMR.BAS attempts to determine whether this roamer has previously been assigned a TDN. The process of comparing (i) MIDs that have already been assigned to TDN to (ii) the requesting MID is repeated for every TDN record. That is, a determination is made whether the requesting roamer has already been assigned any of the foreign switch's TDNs. If, in any one case, a match is found between the roamer's MID and the MID field of any TNUM record, that match indicates a duplicate activation, DUPFLG is set (Step 0714), and processing continues at Step 082. At Steps 082 and 084 a determination is made whether (1) this activation has actually been sent to ROAMERHOME or (2) whether the FMR system is simply in the process of activating this subscriber. To reiterate, if the "SENT" field in TNUM is equal to "Y" (=YES), then the requesting roamer has already been activated. If the SENT field is equal to "N" (=No), the FMR system has not completed the initial request for activation.

Assuming the response in Step 084 was N, then at Step 085 the system determines whether more than three hours have elapsed since the preceding activation. If three hours have elapsed, a "local" re-activation is indicated. That is to say, the subscriber travelled, for example, from a foreign service area in Houston to a service area in Austin, and then returned to Houston. He therefore needs to be "locally re-activated" in the foreign switch. The local re-activation is initiated in Step 0812. In addition, the Step 0812 the flag DUPFLG is reset, and the flag DDUPFLG is set. Setting DDUPFLG is an indication to the FMR system that a valid duplicate activation request is being processed.

If three hours have not elapsed, the FMR system effectively decides that it is encountering an "invalid" duplicate activation, and FMR.BAS sets LTRI (last try) to LC (last temporary number) plus 6. In essence, this step discards or ignores the invalid duplicate activation request. This is because LC is the last record FMR.BAS will complete and, as a result, there is no mechanism for arriving at LC+6. To apprehend the manner in which the discard is effected, we pick up the processing sequence at Step 074, where the next TDN record is extracted from the TNUM file. At Step 075, LTRI will be equal to LC+7 (because LTRI was incremented in Step 074). At Step 078, we assume that all TDNs are not in use.

Because at Step 079 DUPFLG is detected to be set (see Step 0813) and LTRI=LC+7, processing returns to Step 062. At this point, the FMR system undertakes to process the TDN record acquired immediately above in Step 074, having effectively discarded the invalid duplicate activation request.

By way of synthesization with respect to the detailed processing steps disclosed above, the FMR system uniquely processes activation requests by determining, initially, whether the request represents a duplicate activation request. This determination is made by comparing the then-requesting subscriber's MID to the MIDs in all the then-existing TNUM records. A match indicates a duplicate activation request and thereby gives rise to the need to discriminate between invalid and valid duplicate requests.

The duplication request is judged to be a valid request if the time of activation in the earlier TNUM record that formed the basis for the match is at least a predetermined length of time, for example, three hours, earlier than the then-requested activation. In this instance, it is assumed that the CMR subscriber has left the local foreign service area, been provided FMR service in another foreign service area, or had FMR service removed while in his home service area, and then returned to the local service area. A local re-activation is required, and the system sets DDUPFLG to signal this condition. The predetermined length of time is accordingly chosen to be the anticipated minimum time of travel between contiguous CMR service areas.

Conversely, if the duplicate activation request is determined to be an invalid request, because, for example, the earlier activation request occurred less than the predetermined length of time prior to the pending request, the request is substantially discarded.

What has been described above represents, in detailed form, the processing steps required to "activate" an FMR roamer. An analogous process is, of course, undertaken in order to "deactivate" the roamer once the FMR service is no longer required. The sequence of these steps is in some respects similar to and suggested by the steps encountered in the activation process.

However, in order to assure an intimate understanding of a roamer deactivation process, a software "map", similar to the one above, is provided in tabular form below. The map sequentially traces the operational steps encountered according to the subject invention in order to deactivate a roaming CMR subscriber.

| | DEACTIVATION | |
|---|---|---|
| Step Number | FIG. 2 | Notes |
| 1 | 011 | |
| 2 | 012 | |
| 3 | 013 | |
| 4 | 014 | |
| 5 | 015 | |
| 6 | 016 | |
| 7 | 018 | |
| 8 | 019 | ROAMERCALL FLAG=1 |
| 9 | 021 | |
| 10 | 023 | |
| 11 | 024 | |
| 12 | 025 | BUFFLG=1 |
| 13 | 026 | LOOP |
| 14 | 042 | |
| 15 | 044 | |
| 16 | 052 | BUFFLG=1 025 |
| 17 | 053 | |
| 18 | 054 | |
| 19 | 055 | |
| 20 | 056 | |
| 21 | 0511 | |
| 22 | 0512 | DIALED DIGITS 311 |
| 23 | 0513 | CREATE DEACTIVE FILE |
| 24 | 0514 | SAVE MID,ESN,SW |
| 25 | 0515 | DACT=DACT+1 |
| 26 | 051 | |
| 27 | 045 | DACT#0 SET 0515 |
| 28 | 061 | SAVE TOTAL TDN'S |
| 29 | 062 | DACT<>0 SET 0515 |
| 30 | 064 | DACT=DACT-1 |
| 31 | 065 | |
| 32 | 071 | LTRI=1 |
| 33 | 074 | LAST TDN INDEX-LC |
| 34 | 075 | |
| 35 | 076 | |
| 36 | 077 | SET DUPFLG=1 |
| 37 | 082 | DACT<>0(SET 0515) |
| 38 | 081 | |
| 39 | 083 | LTRI=LTRI+5 |
| 40 | 074 | |
| 41 | 075 | |
| 42 | 078 | |
| 43 | 079 | |
| 44 | 0710 | |
| 45 | 086 | DUPFLG=1 SET 077 |
| 46 | 088 | STATE=1 SNDD+1 |
| 47 | 0810 | TRANS=DATE&TIME |
| 48 | 062 | DACT<>0 SET 0515 |
| 49 | 064 | DACT=DACT-1 |
| 50 | 065 | |
| 51 | 066 | |
| 52 | 068 | LOOP |
| 53 | 046 | SNDD <> 0 SET 088 |
| 54 | 091 | |
| 55 | 093 | |
| 56 | 094 | |
| 57 | 095 | |
| 58 | 096 | STATE=1 SET 088 |
| 59 | 098 | |
| 60 | 0910 | |
| 61 | 0912 | |
| 62 | 0913 | GOOD GUY? |
| 63 | 0914 | |
| 64 | 0916 | |
| 65 | 101 | STATE=1 SET 088 |
| 66 | 102 | |
| 67 | 103 | SNDD#1(DEACT) |
| 68 | 105 | MODULE ROAMERHOME |
| 69 | 106 | |
| 70 | 108 | |
| 71 | 1011 | |
| 72 | 094 | |
| 73 | 095 | |
| 74 | 096 | |
| 75 | 097 | |
| 76 | 111 | SNDD#0(DEACT) |
| 77 | 113 | |
| 78 | 114 | |
| 79 | 115 | |
| 80 | 116 | |
| 81 | 117 | |
| 82 | 1112 | |
| 83 | 1113 | |
| 84 | 121 | |
| 85 | 124 | |
| 86 | 126 | |
| 87 | 127 | |
| 88 | 1211 | |
| 89 | 1212 | |
| 90 | 1216 | SET STATE=9 |
| 91 | 114 | |
| 92 | 115 | |
| 93 | 131 | |
| 94 | 133 | |
| 95 | 134 | |
| 96 | 135 | |
| 97 | 136 | |
| 98 | 137 | |
| 99 | 138 | RETURN TO EXEC |

By way of summarization, the subject System for the Provision of Extended Cellular Mobile Radiotelephone Service substantially enhances that value of CMR service to the subscriber by overcoming one of the limiting aspects of the existing system and permitting the subscriber to receive CMR calls, in a very convenient manner, beyond his home service area.

The underlying invention includes a method for enabling a roaming CMR subscriber to automatically receive, in a foreign service area, calls placed to his home service area. The method comprises the steps: (a) receiving at a foreign service area MTSO request information indicating that the roaming CMR subscriber desires to receive, in the foreign service, calls placed to his home service area; (b) validating the roaming subscriber; (c) upon validation of the roaming subscriber, assigning the roaming subscriber a temporary directory number (TDN) for use in the foreign service area; and (d) providing command information to the roaming CMR subscriber's home service area MTSO so as to enable the roaming CMR subscriber's home service area MTSO to call forward, to the TDN, calls placed to the roaming CMR subscriber's MID in his home service area. The request information may be delivered to the foreign MTSO by virtue of an activation code entered by the subscriber through the control unit (specifically, the handset keypad) of the subscriber's mobile unit. However, other approaches to logging the request for CMR service are contemplated by the invention. It is not necessary that the request be initiated through the mobile unit; and the subscriber himself may, on occasion, be not involved.

In addition, the subject system has been described as including a "validation" process prior to the grant of FMR service. Validation is granted according to a number of criteria. One of these criteria is that CMR system, or CMR carrier, that provides the subscriber service in his home service area be part of the "FMR network." This determination is made by examining the NPA NXX file to determine whether the subscriber's home NPA NXX are listed as part of the FMR network. In this sense, validation is directed, not primarily to the subscriber's entitlement, but to whether the subscriber's home system is entitled to participate in the provision of FMR service. It is contemplated that, in some configurations, validation, whether of the subscriber or of his home system, may be circumvented.

In another aspect, the subject System embodies an apparatus for enabling a roaming CMR subscriber to automatically receive, in a foreign service area, calls placed to his home service area. The apparatus comprises a computer for coupling both to a switch associated with the home service area and to a switch associated with the roaming service area. This switch is programmed to (1) receive information indicating that calls placed to the home service area are to be forwarded to the foreign service area; (2) assign the subscriber a temporary directory number (TDN) in the foreign switch; and (3) command the home switch to forward, to the TDN, calls place to the home service area. The apparatus, as described herein, assumes the form of a "control computer," namely, FMR processor 5. Although a specific model computer (the Compaq computer identified above) has been described for enablement purposes, various hardware configurations, including the computer and supplemental or peripheral equipment, are contemplated by the invention.

The FMR processing system, additionally, includes software means, in the form of FMR.BAS, its associated subroutines, and FMR.EXEC, all associated with the foreign MTSO (by virtue of the coupling and information exchange between the cellular switch resident in the foreign MTSO, and the FMR processor) for performing the FMR system functions described above.

Finally, the FMR processor is described in an environment that is characterized by the physical collocation of that processor with the foreign switch. At present this configuration is deemed preferred. However, given the comprehensive Description of the invention set forth above, it seems clear that the functions of that processor are susceptible of performance by or integration into a cellular switch.

Correspondingly, although the FMR processor may be coupled to the foreign and home switches by any appropriate telecommunications transmission media, transfer of calls between the home and foreign systems are presently performed, because of external constraints, through the PSTN. It is possible, however, that at some time these constraints, whether technological or regulatory, will be mitigated, and substitute forms of call transfer will be permitted. It is submitted beyond peradventure that such substitute forms will reside within the scope of this invention as claimed below.

Accordingly, although there has been disclosed and described what at present is considered to be a preferred embodiment of a CMR system for automatically forwarding, to a foreign service area, calls placed to a roaming subscriber's home service area, it will be apparent to those having ordinary skill in the art that various modifications can be made to the described system without departure from the concept of the subject invention or the scope of the appended claims.

```
6410 IF AA$ = nc$ THEN 6487 ELSE IF MID$(A$, 7, 2) = "
     2" AND VALFLG = 2 THEN OCSER$ = A$: VALFLG = 0:
     GOTO 6409:       ELSE IF INSTR(A$, "0 000 000
     0000") THEN cfw$ = "NO": GOTO 6409: ELSE 6409

6411 M1$ = "PF": M3$ = FNDUM$: M2$ = "?": SA$ = PLEN$:
     CALL REMOVESPACE: CMD$ = CMD2$ + SA$ + ".": GOSUB
     6490

6412 CALL GETCHAR: IF INSTR(A$, M1$) THEN 6413 ELSE IF
     INSTR(A$, M2$) OR AA$ = nc$ THEN 6487

6413 IF INSTR(A$, MID$(RMID$, 4, 3) + " " +
     MID$(RMID$, 7, 4)) THEN FEFLG = 1: SEROK = 1:
     GOTO 6412:       ELSE IF FEFLG = 1 THEN fp$ = A$:
     FEFLG = 0: GOTO 6412: ELSE IF INSTR(A$, "END OF
     JOB") THEN M3$ = CHR$(25): GOTO 6412: ELSE IF
     INSTR(A$, M3$) THEN 6416 ELSE 6412

6416 IF SEROK <> 1 THEN DSC# = VAL(RCD$): SEROK = 3:
     FPTRAP = 2: CALL DENYHANDLER: FPTRAP = 0: GOTO
```

6487:     ELSE IF VAL(MID$(VALI$, 30, 1)) <> 4
THEN SEROK = 3: FPTRAP = 0: DSC# = VAL(RCD$):
CALL DENYHANDLER: GOTO 6487

6417 OSCER$ = MID$(OCSER$, 8, 11): CALL OCTTOHEX:
SEROK = 0: IF RSER$ = MH$ THEN 6420 ELSE DSC# =
VAL(RCD$): SEROK = 4: HOSER$ = MH$: CALL
DENYHANDLER: GOTO 6487

6420 IF STATE# = 3 THEN 6423 ELSE Q$ = MID$(fp$, 7,
1): IF Q$ = "1" THEN Q$ = "YES":     ELSE IF Q$ =
"0" THEN Q$ = "NO": ELSE BSTATE# = 1: GOTO 6487

6421 XZ = VAL(RCD$): GET 11, XZ: LSET FE$ = Q$: Q$ =
"": fp$ = "": PUT 11, XZ

6423 MODE$ = "ALW:RCCHAN SRM!": GOSUB 6485: IF BUSYF =
1 THEN PUTINBUSYFILE: GOTO 3140:     ELSE CMD$ =
CMD3$: GOSUB 6490: M1$ = "OK": M2$ = "?": M3$ =
"RL"

6424 CALL GETCHAR: IF INSTR(A$, M1$) THEN 6425 ELSE IF
INSTR(A$, M2$) OR AA$ = nc$ THEN 6487 ELSE IF
INSTR(A$, M3$) THEN CALL DELAY5: GOTO 6423: ELSE
GOTO 6424

6425 CMD$ = CMD4$: GOSUB 6490: M1$ = "IP"

6426 CALL GETCHAR: IF INSTR(A$, "ACPT") THEN M3$ =
CHR$(25): GOTO 6426:      ELSE IF INSTR(A$, M3$)
THEN 6427 ELSE IF INSTR(A$, M2$) OR AA$ = nc$ OR
INSTR(A$, " , ER") THEN GOSUB 6487:    ELSE 6426

6427 IF cfw$ = "NO" THEN CMD$ = CMD5$: GOSUB 6490: M1$
= "OK": M2$ = "?": M3$ = "RL": GOTO 6428
GOSUB 6475: IF cfw$ = "NO" THEN GOT 6427:
GOTO 6487

6428 CALL GETCHAR: IF INSTR(A$, M1$) THEN 6429 ELSE IF INSTR(A$, M2$) OR AA$ = nc$ THEN 6487 ELSE IF INSTR(A$, M3$) THEN CALL DELAY5: GOTO 6427: ELSE 6428

6429 M3$ = FUNDUM$: CMD$ = CMD6$: GOSUB 6490: M1$ = "IP"

6430 CALL GETCHAR: IF INSTR(A$, "ACPT") THEN M3$ = CHR$(25): GOTO 6430: ELSE IF INSTR(A$, M3$) THEN 6431 ELSE IF INSTR(A$, M2$) OR AA$ = nc$ THEN 6487 ELSE IF INSTR(A$, ", ER") THEN GOSUB 6463: AA$ = nc$: GOTO 6487: ELSE 6430

6431 MODE$ = "ALW:RCCHAN " + RCCHAN$ + "!": GOSUB 6485: IF BUSYF = 1 THEN BUSYF: 0

6432 IF STATE$ = "02" OR STATE$ = "03" THEN LSET STATE$ = "05": ELSE LSET STATE$ = "04"

6433 IF FI1$ = "ACTSND" THEN SNDF# = SNDF# - 1

6434 IF FI1$ = "DEASND" THEN SNDD# = SNDD# - 1

6435 LSET SPARE$ = SPACE$(6): PUT 4, RN: GOSUB 3290: CALL UPDATERSTAT: GOTO 3140

6450 CMD1$ = "TR-DEACT-26" + MID$(RMID$, 4, 7) + ".": CMD2$ = "RC:MOBL;CHG:/": CMD3$ = "ORD 4,TN " + MID$(RMID$, 4, 7) + " ESM NO!"

6451 XZ = VAL(RCD$): M1$ = "PF": M2$ = "?": M3$ = FNDUM$: CMD$ = CMD1$: GOSUB 6490

6452 CALL GETCHAR: IF INSTR(A$, "FWD DLTD") THEN M3$ = CHR$(25): GOTO 6452: ELSE IF INSTR(A$, M2$) OR AA$ = nc$ THEN 6487 ELSE IF INSTR(A$, M3$) THEN 6454 ELSE IF INSTR(A$, ", ER") THEN GOSUB 6463: AA$ = nc$: GOTO 6487

```
6453 IF INSTR(A$, "FWD NONE") THEN M3$ = CHR$(25):
     GOTO 6452:    ELSE 6452

6454 GET 11, XZ: IF FE$ = "YES" THEN 6431

6455 MODE$ = "ALW:RCCHAN SRM!": GOSUB 6485: IF BUSYF =
     1 THEN PUTINBUSYFILE: GOTO 3140: ELSE M1$ = "OK":
     M2$ = "?": M3$ = ", ER": CMD$ = CMD2$: GOSUB 6490

6457 CALL GETCHAR: IF INSTR(A$, M1$) THEN 6457 ELSE IF
     INSTR(A$, M2$) OR AA$ = nc$ THEN 6487 ELSE IF
     INSTR(A$, M3$) THEN GOSUB 6463:   AA$ = nc$: GOTO
     6487:   ELSE 6456

6457 M3$ = FUNDUM$: M1$ = "IP": CMD$ = CMD3$: M2$ =
     "RL": GOSUB 6490

6458 CALL GETCHAR: IF INSTR(A$, "ACPT") THEN M3$ =
     CHR$(25): GOTO 6458: ELSE IF AA$ = nc$ THEN 6487
     ELSE IF INSTR(A$, M3$) THEN 6431 ELSE IF
     INSTR(A$, ", ER") THEN GOSUB 6463: AA$ = nc$:
     GOTO 6487:   ELSE IF INSTR(A$, "RL") THEN CALL
     DELAY5: GOTO 6457: ELSE 6458

6461 QUES# = QUES# + 1: IF QUES# > 5 THEN QUES# = 0:
     AA$ = nc$: RETURN: ELSE RETURN

6462 QUES# = QUES# + 1: IF QUES# > 5 THEN QUES# = 0:
     BUSYF = 1: RETURN:     ELSE BUSYF = 0: RETURN

6463 M1$ = CHR$(25): CALL GETCHAR: IF INSTR(A$, M1$)
     THEN RETURN:    ELSE 6363

6471 ALL = LOC(2): IF ALL = 0 THEN RETURN:     ELSE
     BB$ = INPUT$(ALL, 2): GOTO 6471

6475 CMD$ = "TR-DEACT-26" = MID$(RMID$, 4, 7) + ".":
     M1$ = "PF": M2$ = "?": M3$ = FNDUM$: GOSUB 6490

6476 CALL GETCHAR
```

```
     IF INSTR(A$, "FWD DLTD") THEN M3$ = CHR$(25):
     GOTO 6476
     IF INSTR(A$, M2$) OR INSTR(A$, ",ER") OR AA$ =
     nc$ THEN BUSTF = 1: RETURN
     IF INSTR(A$, M3$) THEN 6478
6477 IF INSTR(A$, "FWD NONE") THEN GOSUB 6463: BSTATE#
     = 3: BUSYF = 1: RETURN
     IF INSTR(A$, ", ER") THEN GOSUB 6463: AA$ = nc$:
     BUSYF = 1: RETURN
     GOTO 6476
6478 cfw$ = "NO": BSTATE# = 0: RETURN
6480 SKIPFLG = 0: IF BUSYF = 1 THEN RETURN: ELSE CALL
     DELAY2: CMD$ = "OP:RCCENSUS!": GOSUB 6490
6481 M1$ = FNDUM$: M2$ = "?": M3$ = "!": CALL GETCHAR:
     IF INSTR(A$, "RC CHANNEL") THEN RCCHAN$ = A$:
     GOTO 6483:    ELSE IF INSTR(A$, "OP:RCCEN") THEN
     BSTATE# = 5: BUSYF = 1: RETURN: ELSE IF INSTR(A$,
     "CHANNEL IDLE") THEN 6480
6482 IF AA$ = nc$ THEN BUSYF = 1: SKIPFLG = 0: PORTFLG
     = 0: RETURN:    ELSE 6481
6483 CALL GETCHAR: IF INSTR(A$, "CCP=0") THEN M1$ =
     CHR$(25): GOTO 6483:    ELSE IF INSTR(A$, M1$)
     THEN 6484 ELSE IF AA$ = nc$ OR INSTR(A$, M2$)
     THEN PUTINBUSYFILE: BUSYF = 1: RETURN: ELSE 6483
6484 RC# = INSTR(RCCHAN$, "="): RCCHAN$ =
     MID$(RCCHAN$, RC# + 2): IF RCCHAN$ = "SRM" OR
     RCCHAN$ = "" THEN RCCHAN$ = "SC2": PROTFLG = 0:
     RETURN: ELSE RETURN
6485 CMD$ = MODE$: GOSUB 6490: M1$ = FNDUM$: M2$ =
```

FNDUM$: M3$ = M2$

6486 CALL GETCHAR: IF INSTR(A$, M1$) THEN RETURN: ELSE IF INSTR(A$, "OFFICE") THEN M1$ = CHR$(25): GOTO 6486: ELSE IF AA$ = nc$ OR INSTR(A$, "<BUSY>") THEN BUSYF = 1: RETURN: ELSE 6486

6487 MODE$ = "ALW:RCCHAN " + RCCHAN$ + "!": GOSUB 6485: BUSYF = 0: IF SEROK <> 0 THEN SEROK = 0

6488 PUTINBUSYFILE: GOTO 3140

6489 RETURN

6490 CALL DELAY2

6492 PRINT "": FOR ZA = 1 TO LEN(CMD$): PRINT #2, MID$(CMD$, ZA, 1); : PRINT MID$(CMD$, ZA, 1); : GOSUB 6493: NEXT: RETURN

6493 PP = TIMER + .15

6494 IF TIMER > PP THEN RETURN: ELSE IF PP > (TIMER + 1) THEN 6493 ELSE 6494

6495 M1$ = FUNDUM$: M2$ = M1$

6496 PP = TIMER + 1

6497 IF TIMER > PP THEN RETURN: ELSE IF PP > (TIMER + 2) THEN 6496 ELSE 6497

6800 PH2$ = SITE$: CALL VALIDATENPA: PRM$ = ",E,7,1,CD,DS"

6801 IF LS$ <> SITE$ THEN LS$ = SITE$: CLOSE 2: CALL DELAY2: BSTATE# = 9: CALL DIALCONNECT: GOTO 6804: ELSE 6805

6804 IF BUSYF = 1 THEN 3140 ELSE SEROK = 0: BSTATE# = 0: CALL DELAY2

6805 GOSUB 6890: M1$ = FNDUM$: M2$ = FNDUM$: M3$ = FNDUM$: GOSUB 6880: IF BUSYF = 1 THEN

PUTINBUSYFILE: GOTO 3140

6806 IF FI1$ = "ACTSND" THEN CMD1$ = "$MTSA": CMD2$ = "DSO": CMD3$ = "DISP" + CHR$(9) + RIGHT$(RMID$, 7): CMD4$ = "$MTCC": CMD5$ = "CHNG: + CHR$(9) + RIGHT$(RMID$, 7): CMD6$ = CHR$(9) + "56" + CHR$(9) + "F" + CHR$(9) + "NA":   ELSE 6850

6807 CMD7$ = CHR$(9) + "1" + TDN$: M1$ = FNDUM$: CAPTURE$ = FNDUM$: M2$ = FNDUM$: M3$ = FNDUM$

6810 M1$ = "FUNCTION": CMD$ = CMD1$: GOSUB 6870: IF BUSYF = 1 THEN 3140 ELSE M1$ = "MTS": GOSUB 6871: IF BUSYF = 1 THEN 3140

6811 CMD$ = CMD2$: M1$ = "REQUEST": GOSUB 6870: IF BUSYF = 1 THEN 3140 ELSE M1$ = "MTS": GOSUB 6871: IF BUSYF = 1 THEN 3140

6812 CMD$ = CMD3$: M1$ = "REQUEST": CAPUTRE$ = RIGHT$(RMID$, 7): GOSUB 6870: IF BUSYF = 1 THEN 3140 ELSE M1$ = "MTS": GOSUB 6871: IF BUSYF = 1 THEN 3140

6813 CALL DOUBLEDABBLE: GOSUB CHKDISP: IF SERCK = 0 THEN 6814 ELSE GOSUB 6890: GOSUB 6895: SERCK = 0: GOTO 3140

6814 GOSUB 6890: CMD$ = CMD4$: M1$ = "REQUEST": GOSUB 6870: IF BUSYF = 1 THEN 3140 ELSE M1$ = "MTC": GOSUB 6871: IF BUSYF = 1 THEN 3140

6815 CMD$ = CMD5$: M1$ = "CHNG": GOSUB 6870: IF BUSYF = 1 THEN 3140 ELSE M1$ = "MTC": GOSUB 6871: IF BUSYF = 1 THEN 3140

6817 Q$ = MID$(fp$, 37, 2) + MID$(fp$, 45, 1): IF RIGHT$(Q$, 1) <> "F" AND RIGHT$(Q$, 1) <> "V" AND

```
     RIGHT$(Q$, 1) <> "N" THEN BSTATE# = 1:
     PUTINBUSYFILE: GOTO 3140

6818 IF STATE# = 3 THEN 6820 ELSE IF LEN(Q$) < 3 THEN
     Q$ = "0" + Q$: GOTO 6818

6819 XZ = VAL(RCD$): GET 11, XZ: LSET FE$ = Q$: Q$ =
     "": PUT 11, XZ

6820 CMD$ = CMD6$: M1$ = "CHNG": CAPTURE$ = FNDUM$:
     GOSUB 6870: IF BUSYF = 1 THEN 3140 ELSE M1$ =
     "MTC": GOSUB 6871: IF BUSYF = 1 THEN 3140

6822 CMD$ = CMD7$: M1$ = "CHANGE": GOSUB 6870: IF
     BUSYF = 1 THEN 3140 ELSE M1$ = "MTC": GOSUB 6871:
     IF BUSYF = 1 THEN 3140

6825 GOSUB 6890: GOSUB 6895

6840 IF STATE$ = "02" OR STATE$ = "03" THEN LSET
     STATE$ = "05": ELSE LSET STATE$ = "04"

6841 IF FI1$ = "ACTSND" THEN SNDF# = SNDF# - 1

6842 IF FI1$ = "DEASND" THEN SNDD# = SNDD# - 1

6843 LSET SPARE$ = SPACE$(6): PUT 4, RN: GOSUB 3290:
     CALL UPDATERSTAT: GOTO 3140

6850 XZ = VAL(RCD$): GET 11, XZ: IF RIGHT$(FE$, 1) =
     "N" THEN fp$ = "NA":       ELSE IF RIGHT$(FE$, 1)
     = "V" THEN fp$ = "VT": ELSE IF RIGHT$(FE$, 1) =
     "F" THEN fp$ = "F"

6851 CMD1$ = "$MTCC": CMD2$ = "CHNG" + CHR$(9) +
     RIGHT$(RMID$, 7): CMD3$ = CHR$(9) + LEFT$(FE$, 2)
     + CHR$(9) + fp$ + CHR$(9) + "NA"

6852 M1$ = "REQUEST": M2$ = FNDUM$: M3$ = FNDUM$:
     CAPTURE$ = FNDUM$: CMD$ = CMD1$: GOSUB 6870: IF
     BUSYF = 1 THEN 3140 ELSE M1$ = "MTC": GOSUB 6871:
```

```
        IF BUSYF = 1 THEN 3140

6854 CMD$ = CMD2$: M1$ = "CHNG": GOSUB 6870: IF BUSYF
     = 1 THEN 3140 ELSE M1$ = "MTC": GOSUB 6871: IF
     BUSYF = 1 THEN 3140

6855 CMD$ = CMD3$: M1$ = "CHANGE": GOSUB 6870: IF
     BUSYF = 1 THEN 3140 ELSE IF INSTR(A$, "CHNG")
     THEN CMD$ = CHR$(9): GOSUB 6870: IF BUSYF = 1
     THEN 3140 ELSE M1$ = "MTC": GOSUB 6871: IF BUSYF
     = 1 THEN 3140 ELSE M1$ = "MTC": GOSUB 6871: IF
     BUSYF = 1 THEN 3140

6856 GOSUB 6890: GOSUB 6895: GOTO 6840

6870 M2$ = "?": M3$ = ">": GOSUB 6875: PRINT #2, CMD$

6871 CALL GETCHAR: IF (AA$ = nc$ AND HOME = 0) THEN
     PUTINBUSYFILE: GOSUB 6890: GOSUB 6895: BUSYF = 1:
     RETURN: ELSE IF INSTR(A$, M1$) OR INSTR(A$,
     "CHNG") THEN RETURN: ELSE IF INSTR(A$, "INVALID")
     THEN 6877 ELSE IF INSTR(A$, CAPTURE$) THEN fp$ =
     A$: GOTO 6871

6872 GOTO 6871

6875 PP = TIMER + 2

6876 IF TIMER > PP THEN RETURN:     ELSE IF PP >
     (TIMER + 2) THEN 6875 ELSE 6876

6877 GOSUB 6462: IF BUSYF = 1 THEN AA$ = nc$: GOTO
     6872:     ELSE 6870

6880 m1$ = FNDUM$: M2$ = "?": LOG1$ = "$LOGIN": PRINT
     "LOGGING IN"

6881 CALL DELAY2: PRINT #2, LOG1$

6882 CALL GETCHAR: IF INSTR(A$, "PASSWORD") THEN LOG1$
     = PASSWD$: GOTO 6881:     ELSE IF AA$ = nc$ THEN
```

```
       BSTATE# = 7: BUSYF = 1: RETURN: ELSE IF INSTR(A$,
       "LOGGED IN") THEN M3$ = "MON>": LOG1$ = "": GOTO
       6881
6883   IF INSTR(A$, M3$) THEN BUSYF = 0: RETURN:
       ELSE IF INSTR(A$, "INVALID") THEN LOG1$ = "":
       GOTO 6881
6884   IF INSTR(A$, "MTC") OR INSTR(A$, "DSO") OR
       INSTR(A$, "CHNG") OR INSTR(A$, "MTS") THEN GOSUB
       6890: GOTO 6880:    ELSE 6882
6885   GOTO 6882
6890   CALL DELAY2: PRINT #2, CHR$(27): M1$ = ">": M2$ =
       "?"
6891   CALL GETCHAR: IF INSTR(A$, "MTC") OR INSTR(A$,
       "DSO") OR INSTR(A$, "CHNG") OR INSTR(A$, "MTS")
       OR INSTR(A$, "INVALID") THEN 6890 ELSE IF
       INSTR(A$, "MON") OR INSTR(A$, "LGN") THEN M1$ =
       FNDUM$: RETURN:    ELSE IF AA$ = nc$ THEN BUSYF
       = 1: RETURN:  ELSE 6891
6893   '
6895   LOG1$ = "$LOGOFF": M1$ = ">": M2$ = "?"
6896   CALL DELAY2: PRINT #2, LOG1$
6897   CALL GETCHAR: IF INSTR(A$, "LOGGED OFF") THEN
       RETURN
       IF AA$ = nc$ THEN RETURN
       IF INSTR(A$, "INVALID") OR INSTR(A$, "MTC") OR
       INSTR(A$, "DSO") OR INSTR(A$, "CHNG") OR
       INSTR(A$, "MTS") THEN CALL DELAY2: PRINT #2,
       CHR$(27): GOTO 6895
       GOTO 6897
```

```
CHKDISP:

IF INSTR(fp$, RSER1$) THEN SERCK = 0: GOTO

CHKDISPRET
    IF INSTR(fp$, "UN") THEN SEROK = 3: FPTRAP = 2:

SERCK = 3: GOTO CHKDISP1

SEROK = 4: SERCK = 4

CHKDISP1:

DSC# = VAL(RCD$): HOSER$ = MID$(fp$, 35, 10)

CALL DENYHANDLER

CHKDISPRET:

RETURN

ROAMERRET:

CALL TIMESUB

TCHGFLG = 1: CLS

END SUB
```

After the command has been issued by the FMR processor to the roamer's home switch, the FMR processor continues to monitor the switch's response to all issued commands in order to assure that proper responses to those commands have been received. This operation is illustrated as Step 106.

Assuming proper responses are obtained, the system then determines that the value of PROCESS STATE is not equal to 2 or 3. (A value of PROCESS STATE equal to 2 would indicate that the roamer was found to have had his ESN denied in his home switch. A value of 3 indicates that a reactivation is in progress.)

The value of PROCESS STATE is then set to 4, at which point the program jumps to Step 094.

*HOME.2500*

```
SUB HOME2500
ON ERROR GOTO FMR2500HANDLER:
3400 '
3401 CLS : CALL GETTNUM!: CLOSE 11: CALL FIELDTNUM
3405 BUSYF = 0: FO = 0: HOME = 0: RN = 0: KEY OFF: LOCATE 25, 1: CLS
3408 TIMER OFF: TCHGFLG = 1
3410 CLOSE 9
3411 NF = 9: NA$ = FI1$: CALL OPENACTSND
3415 BUSYF = 0: BSTATE# = 0: RN = RN + 1: BALCT# = 0
3416 IF EOF(9) OR RN > RECORD# THEN 3469 ELSE GET 9, RN:
     STATE# = VAL(STATE$): IF STATE# = 0 THEN 3415
     IF STATE# = 99 THEN 3469
3417 IF SKIPFLG = 1 THEN BSTATE# = 7: LOGO = 0: PUTINBUSYFILE: GOTO 3415 .
     IF STATE# = 1 THEN CALL PUTINBUSYFILE: GOTO 3415
3418 IF STATE# = 6 OR STATE# = 7 OR STATE# = 8 OR STATE# = 9 THEN 3415
     IF STATE# = 1 AND FI1$ = "ACTSND" THEN SNDF# = 1: CALL UPDATERSTAT: GOTO 3415
     IF STATE# = 1 AND FI1$ = "DEASND" THEN SNDD# = 1: CALL UPDATERSTAT: GOTO 3415
3419 IF STATE# = 2 OR STATE# = 3 OR STATE# = 5 THEN 3463
     IF VAL(RMID$) = 0 THEN CALL CLEARTNUM: GOTO 3415
3420 BALCT# = 1:   GET 11, VAL(RCD$): IF M$ = SPACE$(22) THEN CLOSE 6: GOTO 3415:
     ELSE IF MID$(SPARE$, 1, 4) = "BUSY" THEN 3415                                ELS
E 3425
3421 IF HOME = 0 THEN OPEN "HOME" FOR INPUT AS 15: HOME = 1:
3422 LINE INPUT #15, PHV$: INPUT #15, tnet$: INPUT #15, PASSWD$: INPUT #15, MODE$: L
INE INPUT #15, BAUD$: CLOSE 15: ST$ = "4": FO = 1: CLS : KEY OFF: LOCATE 25, 1: COLO
R 15, 0, 0: STATUS: PRINT STAT1$
3423 COLOR 7, 0, 0: LOCATE 12, 26: PRINT "*** DIALING LOCAL SWITCH ***"
3424 PRM$ = "": KEY OFF: LOCATE 25, 1: COLOR 15, 0, 0: STATUS: PRINT STAT1$: CALL DI
ALCONNECT: IF BUSYF = 1 THEN BUSYF = 0: HOME = 0: GOTO 3415
3425 KEY OFF: LOCATE 25, 1: COLOR 15, 0, 0: STATUS: PRINT STAT1$: LOCATE 13, 1
3426 GOSUB 6390: IF BUSYF = 0 THEN 3428
3427 IF BSTATE# <> 5 THEN BSTATE# = 7: PUTINBUSYFILE: SKIPFLG = 1: GOTO 3415:  ELSE
PUTINBUSYFILE: SKIPFLG = 1: GOTO 3415
3428 HOME = 1: CTOUT = 20
IF FI1$ = "DEASND" THEN 3435
 GOSUB 3550
 CMD1$ = "CHAN CP ROAMER " + MID$(RMID$, 1, 3) + " " + MID$(RMID$, 4, 3) + " " + MID
$(RMID$, 7, 4) + " 0 ; " + RSER$ + " ;;;;; " + FNMO$ + FNDY$ + " ; " + MID$(FNYR$, 4,
2) + " ; 15 ;;;;;;;;1 ; Y":
 CMD2$ = "CHANG CP SUBSCR " + MID$(TDN$, 1, 3) + " " + MID$(TDN$, 4, 3) + " " + MID$
(TDN$, 7, 4) + " ;;;;;;;;;;;;;; " + RMID$ + " ; 1 ; Y": GOTO 3450
3435 IF FI1$ = "ACTSND" THEN 3450:
 CMD1$ = "DELETE CP ROAMER " + MID$(RMID$, 1, 3) + " " + MID$(RMID$, 4, 3) + " " + M
ID$(RMID$, 7, 4) + " Y"
 CMD2$ = "DELETE CP SUBSCR " + MID$(TDN$, 1, 3) + " " + MID$(TDN$, 4, 3) + " " + MID
$(TDN$, 7, 4) + " Y"
3450 ESNOK% = 0: M1$ = ":": PRINT #2, CMD1$: PRINT "Entering Subscriber Update Comma
nds": PRINT CMD1$
3455 CALL GETCHAR
 IF INSTR(A$, "NPA:") THEN 3460
 IF AA$ = nc$ THEN PUTINBUSYFILE: GOTO 3415
 IF (INSTR(A$, "UPDATED") AND ESNOK% <> 5) THEN ESNOK% = 1: GOTO 3455
 IF INSTR(A$, "NOT FOUND") THEN ESNOK% = 2:
 IF INSTR(A$, "NOT ASSIGNED") THEN ESNOK% = 1: GOTO 3455
 IF INSTR(A$, "CANNOT") THEN ESNOK% = 4
GOTO 3455
3460 IF ESNOK% = 1 THEN ESNOK% = 0: GOSUB 6390: CALL DELAY2: PRINT #2, CMD2$: PRINT
CMD2$: GOTO 3461
    IF ESNOK% = 2 THEN CC$ = "ATTEMPTED TO DELETE " + M$ + " AND IT WAS NOT FOUND A
CTIVE IN SWITCH":  ESNOK% = 1: GOTO 3450
    IF ESNOK% = 4 THEN GOSUB 6390: CMD$ = "DELETE CP ROAMER " + MID$(RMID$, 1, 3) +
" " + MID$(RMID$, 4, 3) + " " + MID$(RMID$, 7, 4) + " Y": CALL DELAY2: PRINT #2, CM
D$: ESNOK% = 5: M1$ = ":": GOTO 3455
    IF ESNOK% = 5 THEN GOSUB 6390: CALL DELAY2: ESNOK% = 0: GOTO 3450
GOTO 3455
3461 M1$ = ":": CALL GETCHAR:
IF INSTR(A$, "NPA:") THEN 3462
 IF AA$ = nc$ THEN PUTINBUSYFILE: GOTO 3415:
 IF INSTR(A$, "UPDATED") THEN ESNOK% = 1: GOTO 3461
 IF INSTR(A$, "NOT ASSIGNED") THEN ESNOK% = 2: GOTO 3461
GOTO 3461
3462 IF ESNOK% = 1 THEN ESNOK% = 0: GOTO 3463
    ESNOK% = 2: CC$ = "ATTEMPTED TO DELETE TDN " + t$ + " AND IT WAS NOT FOUND ACTI
VE IN SWITCH":  ESNOK% = 1: GOTO 3462:
3463 PORTFLG = 0: XZ = VAL(RCD$): GET 11, XZ
3464 IF FI1$ = "DEASND" THEN CC$ = DATE$ + " " + TIME$ + CHR$(13) + M$ + " DEACTIVAT
ED FROM TEMPORARY NUMBER " + t$: CALL PRINTTONPAFILE(CC$): LSET M$ = SPACE$(22): TTD
N# = TTDN# - 1: CALL CLEARTNUM: GOTO 3468
    IF FI1$ = "ACTSND" THEN LSET S$ = "Y": LSET T1$ = TIME$: LSET DTS$ = DATE$: IF STAT
E# <> 5 THEN CC$ = TIME$ + " " + M$ + " " + FE$ + " ASSIGNED TEMPORARY NUMBER " + t$
: CALL PRINTTONPAFILE(CC$): TTDN# = TTDN# + 1
PUT 11, XZ
    IF FI1$ = "ACTSND" AND CONF$ = "POS" AND SNAME$ <> "BTFMR" THEN OPEN "TEXT.TXT" FOR
APPEND AS 14: PRINT #14, "?" + MID$(TDN$, 4, 7) + "!" + RMID$ + "10": CLOSE 14: CLL
FLG = 1
    IF FI1$ = "ACTSND" AND CONF$ = "POS" AND SNAME$ = "BTFMR" THEN OPEN "TEXT.TXT" FOR
APPEND AS 14: PRINT #14, "?1713" + MID$(TDN$, 4, 7) + "!" + RIGHT$(RMID$, 6) + "10":
CLOSE 14: CLLFLG = 1
3468 LSET STATE$ = "09": PUT 9, RN: GOTO 3415
3469 IF SKIPFLG = 1 THEN HOME = 0
    IF HOME = 1 THEN GOSUB 6350: HOME = 0
```

```
3470 SKIPFLG = 0: NR = 500: FOR X = 1 TO NR: GET 9, X
IF VAL(STATE$) = 99 THEN X = NR
RN = X: NF = 9: RV$ = SPACE$(2): TS$ = "99": CALL CLEARFILE
NEXT: LOGO = 0: CLOSE 9
3475 CLOSE 4: TNCON# = 0: CLOSE 2: CLOSE 6: CLOSE 11: CLS
3477 IF SNDF# < 0 THEN SNDF# = 0
3478 IF SNDD# < 0 THEN SNDD# = 0
3479 HOME = 0
3485 GOTO HOME2500RET
3550 MO# = FNMO#: DY# = FNDY#: YR# = FNYR#
3551 IF FNDY# > 27 AND FNMO# = 4 THEN MO# = FNMO# + 1: DY# = 1: GOTO 3550
3555 IF FNDY# > 29 THEN MO# = FNMO# + 1: DY# = 1: ELSE DY# = FNDY# + 1: MO# = FNMO#
: YR# = FNYR#
3557 IF MO# = 13 THEN MO# = 1: YR# = FNYR# + 1: GOTO 3560
3560 RETURN
6350 IF INSTR(A$, nc$) THEN RETURN
6351 M$ = ")": BUSYF = 0: GOSUB 6390: IF BUSYF = 1 THEN RETURN
 PRINT #2, "LOGOUT": PRINT "Logging Off System"
6352 CALL GETCHAR: IF INSTR(A$, "..") THEN RETURN
 IF INSTR(A$, ")") THEN 6351
 IF AA$ = nc$ THEN RETURN
6353 GOTO 6352

6390 CALL DELAY2: BUSYF = 0: M1$ = ")": PRINT #2, CHR$(17); : PRINT #2, CHR$(17);
 CALL DELAY2: PRINT #2, CHR$(1)
6391 CALL GETCHAR: IF INSTR(A$, ".") THEN CALL DELAY2: GOTO 6396
 IF INSTR(A$, ")") THEN RETURN
6392 IF AA$ = nc$ OR INSTR(A$, nc$) THEN BUSYF = 1: RETURN
6393 GOTO 6391
6396 PRINT #2, "LOGIN"; CHR$(13); : PRINT "Logging On To System": M1$ = ":": CALL DELAY2
6397 CALL GETCHAR
 IF INSTR(A$, "USERNAME:") THEN CALL DELAY2: PRINT #2, MODE$: GOTO 6398
 IF AA$ = nc$ THEN BSTATE# = 5: GOTO 6392: IF INSTR(A$, "..") THEN 6396
 IF INSTR(A$, "USER NOT") THEN CALL DELAY2: GOTO 6390
 IF INSTR(A$, "QUEUED") THEN BSTATE# = 6: BUSYF = 1: RETURN
 GOTO 6397
6398 CALL GETCHAR:
 IF INSTR(A$, "PASS") THEN CALL DELAY2: M1$ = ")": PRINT #2, PASSWD$; CHR$(13); : GOTO 6399
 IF AA$ = nc$ THEN 6392
 IF INSTR(A$, "FAILURE") THEN 6390 ELSE IF INSTR(A$, "..") THEN 6396
 GOTO 6398
6399 CALL GETCHAR:
 IF INSTR(A$, "FAILURE") THEN BUSYF = 1: RETURN
 IF INSTR(A$, ")") THEN RETURN
 IF AA$ = nc$ THEN 6392
 GOTO 6399

HOME2500RET:
IF FI1$ = "ACTSND" THEN MODAFLG = 0
IF FI1$ = "DEASND" THEN MODDFLG = 0
CALL UPDATERSTAT
END SUB
```

APPENDIX A

FMR.BAS

```
'       $INCLUDE: 'COMMONS.BI'

1       CLEAR , , 2000: VERNUM$ = "4. 13"

4       Z# = 0: PO$ = "+": DEF SEG = Z#: SG# =

((PEEK(&H36) + PEEK(&H37) * 256)): DEF SEG =

SG#: POKE 7, 250: DIM H$(15), OC$(15), O$(20),

Y(30), B(30), HMR(200)

5       MFMRA% = (PEEK(8) + (PEEK(9) * 256)): MFMRC% =

(PEEK(10) + (PEEK(11) * 256)): MTCA% = (PEEK(12)

+ (PEEK(13) * 256)): MTCC% = (PEEK(14) +
```

```
         (PEEK(15) * 256)): MTRCA% = (PEEK(16) +

(PEEK(17) * 256)): MTRCC% = (PEEK(18) +

(PEEK(19) * 256)): MTDDD% = (PEEK(20) +

(PEEK(21) * 256))

6        MOPER% = (PEEK(22) + (PEEK(23) * 256)): TGPI% =

(PEEK(24) + (PEEK(25) * 256)): TGP% = (PEEK(32)

+ (PEEK(33) * 256)): TRK1CT% = (PEEK(40) +

(PEEK(41) * 256)): CB% = (PEEK(48) + (PEEK(49) *

256))

8        DEF FNFMRA# = (PEEK(MFMRA%) + (PEEK(MFMRA% + 1)

* 256)): DEF FNFMRC# = (PEEK(MFMRC%) +

(PEEK(MFMRC% + 1) * 256)): DEF FNTCA# =

(PEEK(MTCA%) + (PEEK(MTCA% + 1) * 256) +

(PEEK(MTCA% + 2) * 16 ^ 4) + (PEEK(MTCA% + 3) *

16 ^ 5))

9        DEF FNTRCA# = (PEEK(MTRCA%) + (PEEK(MTRCA% + 1)

* 256)): DEF FNTRCC# = (PEEK(MTRCC%) +

(PEEK(MTRCC% + 1) * 256)): DEF FNTCC# =

(PEEK(MTCC%) + (PEEK(MTCC% + 1) * 256) +

(PEEK(MTCC% + 2) * 16 ^ 4) + (PEEK(MTCC% + 3) *

16 ^ 5!))

10       DEF FNTDDD# = (PEEK(MTDDD%) + (PEEK(MTDDD% + 1)

* 256)): DEF FNOPER# = (PEEK(MOPER%) +

(PEEK(MOPER% + 1) * 256)): DEF FNTROAM# =

FNTRCA#: DEF FNCALPT# = (PEEK(48) + (PEEK(49) *

256))

11       DEF FNT1 = (PEEK(MTCA%) + (PEEK(MTCA% + 1) * 16

^ 2) + (PEEK(MTCA% + 2) * 16 ^ 4) + (PEEK(MTCA%

+ 3) * 16 ^ 5)): DEF FNT2 = (PEEK(MTCA% + 4) +
```

```
       (PEEK(MTCA% + 5) * 16 ^ 2) + (PEEK(MTCA% + 6) *

16 ^ 4) + (PEEK(MTCA% + 7) * 16 ^ 5))

12     DEF FNTTROAM# = (PEEK(MTRCA%) + (PEEK(MTRCA% +

1) * 256)) + (PEEK(MTRCA% + 2) + (PEEK(MTRCA% +

3) * 256)) + (PEEK(MTRCA% + 4) + (PEEK(MTRCA% +

5) * 256)) + (PEEK(MTRCA% + 6) + (PEEK(MTRCA% +

7) * 256))

13     DEF FNT3 = (PEEK(MTCA% + 8) + (PEEK(MTCA% + 9) *

16 ^ 2) + (PEEK(MTCA% + 10) * 16 ^ 4) +

(PEEK(MTCA% + 11) * 16 ^ 5)): DEF FNT4 =

(PEEK(MTCA% + 12) + (PEEK(MTCA% + 13) * 16 ^ 2)

+ (PEEK(MTCA% + 14) * 16 ^ 4) + (PEEK(MTCA% +

15) * 16 ^ 5)): DEF FNTTCALL# = FNT1 + FNT2 +

FNT3 + FNT4

14     ON ERROR GOTO LOCALHANDLER1: OPEN "home" FOR

APPEND AS 1: CLOSE 1: OPEN "home" FOR INPUT AS 1

15     FOR X = 1 TO 5: LINE INPUT #1, q$: NEXT: INPUT

#1, SNAME$: SNAME$ = UCASE$(SNAME$)

16     INPUT #1, ACT$: INPUT #1, DEA$: INPUT #1,

CLKUP$: INPUT #1, SDAS$: LINE INPUT #1, q$

17     LINE INPUT #1, P1$: LINE INPUT #1, P3$: LINE

INPUT #1, P6$: INPUT #1, P7$: INPUT #1,

LOCALSW$: INPUT #1, CONF$: CONF$ =

UCASE$(CONF$): CLOSE 1

IF P6$ = "AUTOPLEX10" THEN VER$ = VERNUM$ + "
             AUTOPLEX 10"

IF P6$ = "AUTOPLEX100" THEN VER$ = VERNUM$ + "
             AUTOPLEX 100"

IF P6$ = "AUTOPLEX1000" THEN VER$ = VERNUM$ + "
```

AUTOPLEX 1000"

IF P6$ = "EMX100" OR P6$ = "EMX250" OR P6$ = "EMX500" THEN VER$ = VERNUM$ + " EMX 100/250/500"

IF P6$ = "EMX2500" THEN VER$ = VERNUM$ + " EMX 2500"

IF P6$ = "EMX2500" AND SNAME$ = "BTFMR" THEN VER$ = VERNUM$ + " EMX 100/250/500 DMX OFF EMX 2500 "

IF P6$ = "ASTRONET" THEN VER$ = VERNUM$ + " ASTRONET"

18   IF SNAME$ = "" OR CLKUP$ = "" THEN CLOSE : CHAIN "FMRINS"

19   DEF FNBT = INT(BTIME - TIMER): rsval = 5480: rsval$ = "5480"

20   nc$ = "NO CARRIER": DEF FNERMSG$ = MID$(TIME$, 1, 5) + " " + mm$ + " ": DEF FNTMMSG$ = MID$(DATE$, 1, 5) + " " + MID$(TIME$, 1, 5) + " "

21   DEF FNDI1$ = "ATDT" + MID$(PH1$, 2, LEN(PH1$))

31   DEF FNDUM$ = "\\\"

32   SHELL "DEL D:NPA"

34   SHELL "COPY C:\FMR\NXXFILE D:":   SHELL "del c:\temp\npa*.*"

40   O1# = 1: O2# = 2: NTDN$ = "": DAFZ$ = DATE$

41   Z# = 0

45   KEY 7, "RESET": ON KEY(7) GOSUB 10000: KEY(7) ON: TATD = 0

```
50    CLOSE 4: OPEN "RSTAT" FOR INPUT AS 4: INPUT #4,
      THAWFLG: INPUT #4, TACT#: INPUT #4, TDACT#:
      INPUT #4, ACTR#: INPUT #4, DACT#: INPUT #4,
      SNDF#: INPUT #4, SNDD#: INPUT #4, FI$: INPUT #4,
      FI1$: INPUT #4, BUFFLG: INPUT #4, BUSFLG: INPUT
      #4, BTIME: INPUT #4, RSTCTR

51    INPUT #4, SNNM#: INPUT #4, SRDN#: INPUT #4,
      MIDNV#: INPUT #4, BUSCTR: INPUT #4, TTDN#: INPUT
      #4, BLT: INPUT #4, MODE: INPUT #4, CLLFLG: INPUT
      #4, MODAFLG: INPUT #4, MODDFLG: INPUT #4,
      NCLLFLG: CLOSE : CALL GETTNUMI: TTDNA# = RECORD#

55    RSTIMER = TIMER + 60: IF RSTCTR > 2 THEN RSTCTR
      = Z#: CALL RERUN: CHAIN "pokecom"

60    KEY 2, "CLS ": KEY 1, "STUDY": ON KEY(1) GOSUB
      4202: ON KEY(2) GOSUB 125: KEY(2) ON: ON KEY(8)
      GOSUB 20000: KEY(8) ON: KEY 5, "":

70    KEY 4, "TNUM": KEY 7, "RESET": KEY 8, "SEAR":
      KEY 9, "BELL": KEY 10, "":
      IF MODE = 1 THEN KEY 3, "LOCAL": KEY 6, "PRNON":
              POKE 7, 255: PRNFLG = 0: FMRINSFLG =
              1:
      IF MODE = 0 THEN KEY 3, "NORMAL": KEY 6,
              "PRNOFF": PRNFLG = 1:

80    ON KEY(4) GOSUB 1900: KEY(4) ON: KEY(1) ON: ON
      KEY(9) GOSUB 126: KEY(9) ON

81    KEY 15, CHR$(4) + CHR$(31): ON KEY(15) GOSUB
      112: KEY(15) ON

82    'KEY 16, CHR$(4) + CHR$(20): ON KEY(16) GOSUB
      111: KEY(16) ON
```

```
83   KEY 17, CHR$(4) + CHR$(35): ON KEY(17) GOSUB
     20000: KEY(17) ON

84   'KEY 18, CHR$(4) + CHR$(38): ON KEY(18) GOSUB
     165: KEY(18) ON:

85   'KEY 19, CHR$(4) + CHR$(36): ON KEY(19) GOSUB
     115: KEY(19) ON

86   'KEY 20, CHR$(4) + CHR$(30): ON KEY(20) GOSUB
     4200: KEY(20) ON

87   'KEY 21, CHR$(4) + CHR$(32): ON KEY(21) GOSUB
     1900: KEY(21) ON

88   'KEY 22, CHR$(4) + CHR$(18): ON KEY(22) GOSUB
     3800: KEY(22) ON

89   KEY 23, CHR$(4) + CHR$(33): ON KEY(23) GOSUB
     128: KEY(23) ON

90   'KEY 24, CHR$(4) + CHR$(48): ON KEY(24) GOSUB
     127: KEY(24) ON

91   KEY 25, CHR$(4) + CHR$(24): ON KEY(25) GOSUB
     PRFLG: KEY(25) ON

92   CALL tnumstability:

100  K$ = "on"

105  ON TIMER(2) GOSUB 200: CLS : TIMER ON

110  CLS : WH$ = "ACT": GOTO 1410

111  CLS : SHELL "SETCLOCK": CLS : RETURN

112  POKE 7, 255: SYSTEM

115  IF P1$ = "YES" THEN P1$ = "NO":     ELSE P1$ =
     "YES": RETURN

125  CLS : RETURN

126  IF callflg = 2 THEN callflg = 0

127  BELL# = Z#: CLS : RETURN
```

```
128    CHAIN "FMRINS"

129    POKE 7, 255: SYSTEM

130    IF TTDN# < 0 THEN TTDN# = 0

131    CV = CSRLIN: CR = POS(0): COLOR 15, 0, 0: hd$ =
       "COPYRIGHT GTE MOBILNET INC. 1987 - FMR " +
       VER$: LOCATE 1, (40 - (LEN(hd$) / 2)): PRINT
       hd$: COLOR 7, 0, 0: LOCATE 2, 1: PRINT DATE$:
       LOCATE 2, 37: COLOR 15, 0, 0: PRINT "TOTALS":
       COLOR 7, 0, 0: LOCATE 2, 71: PRINT TIME$

132    LOCATE 3, 1: PRINT "CALLS ROAMERS ACT    DE-ACT
       SERIAL #     SERIAL #  MID'S  RETRIES  TDN'S
       TDN'S"

133    PRINT "        DIDN'T MATCH DENIED   NOT VALID
       ACT      LEFT"

134    PRINT "--------------------------------------";

135    IF FNTTROAM# <> TROAM1# THEN callflg# = Z#:
       BELL# = 0

136    LOCATE 6, 1: PRINT USING "#####"; FNTTCALL#:
       LOCATE 6, 9: PRINT USING "####"; FNTTROAM#

140    LOCATE 6, 14: PRINT USING "####"; TACT#; :
       LOCATE 6, 21: PRINT USING "####"; TDACT#; :
       LOCATE 6, 29: PRINT USING "####"; SNNM#; :
       LOCATE 6, 42

142    PRINT USING "####"; SRDN#: LOCATE 6, 52: PRINT
       USING "####"; MIDNV#

144    LOCATE 6, 59: PRINT USING "####"; BUSCTR: LOCATE
       6, 69: PRINT USING "####"; TTDN#: LOCATE 6, 76:
       PRINT USING "####"; (TTDNA# - TTDN#): GOSUB 147:
       RETURN
```

| | |
|---|---|
| 145 | GOSUB 155: H = Z#: N# = FNFMRA#: GOSUB 151: H = 1: N# = FNFMRC#: GOSUB 151: H = 2: N# = FNTCA#: GOSUB 151: H = 3: N# = FNTCC#: GOSUB 151: H = 4: N# = FNTRCA#: GOSUB 151: H = 5: N# = FNTRCC#: GOSUB 151 |
| 146 | H = 6: N# = FNTDDD#: GOSUB 151: H = 7: N# = FNOPER#: GOSUB 151: RETURN |
| 147 | IF P1$ <> "YES" THEN RETURN:      ELSE CFMRA% = MFMRA%: CFMRC% = MFMRC%: CMTCC% = MTCC%: CMTCA% = MTCA%: CTRCA% = MTRCA%: CMTRCC% = MTRCC%: CMTDDD% = MTDDD%: CMOPER% = MOPER%: GOSUB 153 |
| 148 | V = 10: GOSUB 145: FOR SP = 1 TO 3: MTRCA% = MTRCA% + 2: MTRCC% = MTRCC% + 2: MTCA% = MTCA% + 4: MTCC% = MTCC% + 4: MFMRA% = MFMRA% + 2: MFMRC% = MFMRC% + 2: MTDDD% = MTDDD% + 2: MOPER% = MOPER% + 2 |
| 149 | V = 10 + SP: GOSUB 145 |
| 150 | NEXT: MFMRA% = CFMRA%: MFMRC% = CFMRC%: MTCC% = CMTCC%: MTRCA% = CTRCA%: MTCA% = CMTCA%: MTRCC% = CMTRCC%: MTDDD% = CMTDDD%: MOPER% = CMOPER%: RETURN |
| 151 | IF H = 0 THEN H = 1: ELSE H = H * 10 |
| 152 | IF P1PFLG = 1 THEN RETURN: ELSE LOCATE V, H: IF N# < 0 THEN N# = N# + 65534!: PRINT USING "######"; N#: RETURN: ELSE PRINT USING "######"; N#: RETURN |
| 153 | IF P1PFLG = 1 THEN RETURN:      ELSE LOCATE 8, 1: PRINT " ALIAS     ALIAS     CALL      CALL      ROAM      ROAM      DDD       OPER" |

```
154    LOCATE 9, 1: PRINT " ATTEM.     COMP.         ATTEM.
       COMP.      ATTEM.    COMP.     ATTEM.     ATTEM.":
       RETURN

155    IF P1PFLG = 1 THEN CC$ = CHR$(2) + " " +
       STR$(FNFMRA#) + STR$(FNFMRC#) + STR$(FNTCA#) +
       STR$(FNTCC#) + STR$(FNTRCA#) + STR$(FNTRCC#) +
       STR$(FNTDDD#) + STR$(FNOPER#): CALL
       PRINTTONPAFILE(CC$): RETURN:     ELSE RETURN

165    IF MODE = 0 THEN MODE = 1: POKE 7, 255: KEY 3,
       "LOCAL": PRNFLG = 0: KEY 6, "PRNON": CALL
       UPDATERSTAT: RETURN:      ELSE MODE = 0: KEY 6,
       "PRNOFF": PRNFLG = 1: KEY 3, "NORMAL": POKE 7,
       250: CALL UPDATERSTAT: RETURN

200    CALL TIMESUB: RETURN

275    DD# = VAL(OSER$): DDBUL$ = ""

276    DD1# = (DD# = (INT(DD# / 16) * 16)): IF DD1# > 9
       THEN DDBUL$ = CHR$(55 + DD1#) + DDBUL$:     ELSE
       DDBUL$ = CHR$(48 + DD1#) + DDBUL$

277    DD# = INT(DD# / 16): IF DD# < 1 THEN OSER$ =
       DDBUL$: RETURN:    ELSE 276

320    V = FRE(0): C$ = "": FOR X = 1 TO LEN(B$): D$ =
       MID$(B$, X, 1): IF D$ = " " THEN GOTO 330:
       ELSE C$ = C$ + D$

330    NEXT: RETURN

390    IF LEN(H$) < 4 THEN FOR YY = 1 TO (4 - LEN(H$)):
       H$ = "0" + H$: NEXT

400    FOR X = 1 TO 5: H$(X) = MID$(H$, X, 1): GOSUB
       470: NEXT

410    D = VAL(H$(1)) * 16 ^ 4 + VAL(H$(2)) * 16 ^ 3 +
```

```
         VAL(H$(3)) * 16 ^ 2 + VAL(H$(4)) * 16 ^ 1 +

VAL(H$(5))

420      H$ = STR$(D): RETURN

470      REM

471      IF H$(X) = "A" OR H$(X) = "a" THEN H$(X) = "10"

472      IF H$(X) = "B" OR H$(X) = "b" THEN H$(X) = "11"

473      IF H$(X) = "C" OR H$(X) = "c" THEN H$(X) = "12"

474      IF H$(X) = "D" OR H$(X) = "d" THEN H$(X) = "13"

475      IF H$(X) = "E" OR H$(X) = "e" THEN H$(X) = "14"

476      IF H$(X) = "F" OR H$(X) = "f" THEN H$(X) = "15"

480      RETURN

500      IF (TIMER > 0 AND TIMER < 60) THEN OPEN "THRAWY"

FOR APPEND AS 6: CLOSE 6: CC$ = "MIDNIGHT CLEAR

OUT OF THROW AWAY FILE ": CALL

PRINTTONPAFILE(CC$): GOTO 520

CC$ = "Checking Throw Away file 'THRAWY' for work ": CLS : LOCATE 12, 1: PRINT CC$:

IF (THAWFLG = 2 OR THAWFLG = 3) AND BUSFLG = 0

THEN 510

505      IF THAWFLG = 2 AND BUSFLG <> 0 THEN THAWFLG = 3:

UPDATERSTAT

IF THAWFLG = 4 THEN 510

506      CC$ = "": CLS : RETURN

510      PRINTTONPAFILE (CC$)

OPEN "THRAWY" FOR APPEND AS 6: CLOSE 6: OPEN

"THRAWY" FOR INPUT AS 6

511      IF EOF(6) THEN 520 ELSE LINE INPUT #6, q$:

IF q$ = "DEASND" THEN FI$ = "DEACTIVE"

IF q$ = "ACTSND" THEN FI$ = "ACTIVE"
```

```
515   FOR TH = 2 TO 7

IF EOF(6) THEN 520 ELSE LINE INPUT #6, q$(TH)

NEXT

516   OMID$ = q$(3): OSER$ = q$(4): PH1$ = q$(5):

SWNUM$ = q$(7)

IF FI$ = "DEACTIVE" THEN SWNUM$ = "1"

IF SWNUM$ = "" THEN SWNUM$ = "1"

OPEN FI$ FOR APPEND AS 7:

PRINT #7, OMID$, OSER$, PH1$, SWNUM$

IF FI$ = "ACTIVE" THEN ACTR# = ACTR# + 1: CLOSE
      7

IF FI$ = "DEACTIVE" THEN DACT# = DACT# + 1:
      CLOSE 7

OMID$ = "": OSER$ = "": DD$ = "": SWNUM$ = ""

GOTO 511

520   CLOSE 6: CLOSE 7: THAWFLG = Z#: KILL "THRAWY":

UPDATERSTAT: CLS : RETURN

530   FF$ = "": FOR X = 1 TO LEN(F1$): F2$ = MID$(F1$,
      X, 1): IF F2$ = "F" THEN F2$ = ""

540   FF$ = FF$ + F2$: NEXT: RETURN

600   IF FMRINSFLG = 1 OR MODE = 1 THEN FMRINSFLG = 0:

RETURN:

FMRINSFLG = 0

601   TCHGFLG = 1: SANITYTEST = 1: TNCON# = Z#: BUSYF
      = Z#: TIMER OFF:

GOSUB 200: CLS : M2$ = FNDUM$: M3$ = FNDUM$:

BAUD$ = "1200": PH1$ = P3$: PRM$ =

",E,7,1,CD,DS,PE": tnet$ = P7$

CALL DIALCONNECT

605   IF BUSYF = 1 THEN SANITY = SANITY + 1: ELSE
```

```
      SANITY = 0
610   IF SANITY = 0 THEN 615
      IF SANITY < 9 THEN 600
      IF SANITY > 9 THEN SANITY = Z#: GOTO 620
615   CC$ = CC$ + cc1$: CALL DELAY2: CALL DELAY2:
      PRINT #2, CC$: PRINT CC$
620   SANITYTEST = Z#: CC$ = "": cc1$ = "": CLOSE 2:
      TNCON# = Z#: CLS : TIMER ON: RETURN
680   TIMER OFF: TCHGFLG = 1: LOCATE 8, 1: ST# = Z#: V
      = FRE(0): OPEN "D:BUFILE" FOR INPUT AS 13
681   CLS : LOCATE 12, 25: PRINT "Retreiving calls for
      Bufile "
690   IF EOF(13) THEN 1340 ELSE INPUT #13, CD$: CC$ =
      CD$: PRINTTONPAFILE (CC$)
700   OMID$ = MID$(CD$, 1, 10): DD$ = RIGHT$(CD$, 3):
      SWNUM$ = MID$(CD$, 23, 1): IF SWNUM$ = "" THEN
      SWNUM$ = "1"
      IF SNAME$ = "CIFMR" THEN SWNUM$ = "1"
      IF SNAME$ = "SFMR" THEN SWNUM$ = "1"
      IF SNAME$ = "DFMR" THEN SWNUM$ = "1"
      IF INSTR(P6$, "EMX") THEN OSER$ = MID$(CD$, 15,
      8): GOTO 1010
      IF P6$ = "AUTOPLEX100" THEN OSER$ = MID$(CD$,
      12, 11): GOTO 701
      IF INSTR(P6$, "ASTRONET") THEN OSER$ = MID$(CD$,
      13, 10): GOSUB 275: GOTO 1010
      IF P6$ = "AUTOPLEX10" OR P6$ = "AUTOPLEX1000"
      THEN OSER$ = MID$(CD$, 15, 8): GOTO 1010
      CALL RERUN: CHAIN "pokecom"
```

| | |
|---|---|
| 701 | FOR MX = 1 TO LEN(OMID$): IF MID$(OMID$, MX, 1) = "A" THEN MID$(OMID$, MX, 1) = "O": |
| 702 | NEXT: FOR MX = 1 TO LEN(OSER$): IF MID$(OSER$, MX, 1) = "A" THEN MID$(OSER$, MX, 1) = "O" |
| 703 | NEXT: OCSER$ = OSER$: CALL OCTTOHEX: OSER$ = MH$: MH$ = "": OCSER$ = "": GOTO 1010 |
| 711 | CLOSE NF: OPEN "R", NF, NA$, 48 |
| 712 | FIELD NF, 2 AS STATE1$, 10 AS RMID1$, 8 AS RSER1$, 6 AS SITE1$, 10 AS TDN1$, 4 AS RCD1$, 6 AS SPARE1$, 2 AS SWN$: RN = Z#: RETURN |
| 1010 | GOSUB 4005 |
| 1011 | IF SWNUM$ <> "0" OR SWNUM$ <> "" OR SWNUM$ <> "1" THEN 1020 |
| 1012 | IF LOCALSW$ = PH1$ THEN PH1$ = SPACE$(6): GOTO 1035 |
| 1020 | IF (DD$ = "211" OR DD$ = "B18") AND PH1$ <> SPACE$(6) THEN FI$ = "ACTIVE": TACT# = TACT# + 1: GOTO 1300 |
| 1030 | IF (DD$ = "311" OR DD$ = "B19") AND PH1$ <> SPACE$(6) THEN FI$ = "DEACTIVE": TDACT# = TDACT# + 1: GOTO 1300 |
| 1035 | IF (DD$ = "211" OR DD$ = "311" OR DD$ = "B18" OR DD$ = "B19") THEN CC$ = DATE$ + " " + TIME$ + CHR$(13) + "MOBILE " + OMID$ + " ATT. to used FMR - the NPANXX was not valid site = " + SNAME$: CALL PRINTTONPAFILE(CC$): GOSUB 1310: TATD = TATD - 1: GOTO 690 |
| 1045 | CC$ = DATE$ + " " + TIME$ + " BAD RECORD PASSED " + CD$: CALL PRINTTONPAFILE(CC$): TATD = TATD - |

```
     1: GOTO 690

1050 GOSUB 1310: TATD = TATD - 1: GOTO 690

1300 IF FI$ = "ACTIVE" OR FI$ = "DEACTIVE" THEN 1305
     ELSE 1340

1305 OPEN FI$ FOR APPEND AS 7: PRINT #7, OMID$,
     OSER$, PH1$, SWNUM$: IF FI$ = "ACTIVE" THEN
     ACTR# = ACTR# + 1: CLOSE 7: GOTO 690:        ELSE
     IF FI$ = "DEACTIVE" THEN DACT# = DACT# + 1:
     CLOSE 7: GOTO 690:

1310 OMID$ = "": OSER$ = "": DD$ = "": SWNUM$ = ""

1320 RETURN

1340 CLOSE 13: OPEN "D:BUFILE" FOR OUTPUT AS 13:
     CLOSE 13: CLS : BUFFLG = Z#: CALL UPDATERSTAT:
     TIMER ON: RETURN

1410 CALL PEEKCALL

1411 TIMER ON

1430 IF NTDN$ = "" AND (TTDNA# - TTDN#) <= 0 THEN
     BEEP: cc1$ = "ERR " + FNTMMSG$ + ", " + SNAME$ +
     "CHECK TRANS. FILE-ALL TDN'S IN USE": GOSUB 600:
     BELL# = 1

1431 IF (TTDNA# - TTDN# = 0 AND BELL# = 1) THEN BEEP

1432 IF THAWFLG = 1 THEN cc1$ = "ERR " + FNTMMSG$ + "
     " + SNAME$ + " THROWING COMMANDS AWAY": GOSUB
     600: THAWFLG = 2: UPDATERSTAT
     IF THAWFLG = 3 THEN GOSUB 500

1433 IF TCHGFLG <> 0 THEN ON TIMER(2) GOSUB 200:
     TIMER ON: TCHGFLG = 0

1434 IF TATD <> 0 THEN TATD = 0

1435 IF MODAFLG < 0 THEN MODAFLG = 0
```

```
1436  IF MODDFLG < 0 THEN MODDFLG = 0

1437  IF SNDD# < 0 THEN SNDD# = Z#: CALL UPDATERSTAT

1438  LS$ = "": IF BUFFLG = 1 THEN GOSUB 680

1439  IF SNDF# < 0 THEN SNDF# = 0

1440  GOSUB KEYS: IF NOTDNFLG = 1 THEN ccl$ = "ERR " +
      FNTMMSG$ + " " + SNAME$ + " " + "No TDN's
      avaiable ": GOSUB 600: NOTDNFLG = 0

1441  IF callflg# = 1 THEN ccl$ = "ERR " + FNTMMSG$ +
      " " + SNAME$: GOSUB 600: callflg# = 2
      IF callflg# = 2 THEN LOCATE 23, 1: PRINT SDAS$ 1442  IF PORTFLG = 1 THEN ccl$ = "ERR " + FNTMMSG$ +
      " " + SNAME$ + ccl$: GOSUB 600: PORTFLG = 0

1443  IF hstnflg = 1 THEN ccl$ = "ERR " + FNTMMSG$ +
      " " + SNAME$ + " To many operators log into
      houston ": hstnflg = Z#: GOSUB 600

1445  IF TIMER < 26700 OR TIMER > 61200 THEN 1450 ELSE
      IF MID$(TIME$, 4, 2) = "30" AND WH$ = "ACT" THEN
      TESTFLG = 1: WH$ = "DEA": CALL TESTCALL: '
      TEMPORARY TEST FOR MIAMI

1450  BALCT# = Z#: GOSUB KEYS: IF POKFLG = 0 OR POKFLG
      = 3 THEN GOSUB 130:

1451  IF NHR1$ <> LEFT$(TIME$, 2) THEN NHR1$ =
      LEFT$(TIME$, 2): GOSUB 13000: GOSUB 500

1452  FR = FRE(0): FR1 = FRE("")

1453  IF CV > 24 THEN CV = 6: LOCATE CV, CR: ELSE
      LOCATE CV, CR

1465  IF BUFFLG = 1 THEN GOSUB 2005: GOSUB 680

1470  GOSUB KEYS: IF ACTR# <> 0 THEN FI$ = "ACTIVE":
      GOSUB 2005: GOSUB 2900:
```

```
1480    IF DACT# > Z# THEN FI$ = "DEACTIVE": GOSUB 2005:
        GOSUB 2900:

1490    IF SNDF# > Z# THEN FI1$ = "ACTSND": GOSUB 2005:
        SCRNO# = Z#: CALL ROAMERHOME: CALL TIMESUB

1491    IF DACT# = 0 AND SNDD# > Z# THEN FI1$ =
        "DEASND": GOSUB 2005: CALL ROAMERHOME: CALL
        TIMESUB

1492    IF MODAFLG = 0 AND MODDFLG = 0 THEN 1500 ELSE
        GOSUB 2005: SCRNO# = Z#:
        IF MODAFLG > Z# THEN FI1$ = "ACTSND"
        IF MODDFLG > Z# THEN FI1$ = "DEASND"
        GOSUB KEYS
        SNAME$ = UCASE$(SNAME$):
        '   IF INSTR(P6$, "ASTRONET") THEN CALL HOMEASTRO
            IF INSTR(P6$, "AUTOPLEX100") AND NOT
            INSTR(P6$, "AUTOPLEX1000") THEN CALL HOME100
        '   IF SNAME$ = "CIFMR" THEN CALL home1000
        '   IF SNAME$ = "ATFMR" THEN CALL HOMEATLAN
        '   IF SNAME$ = "M1FMR" THEN CALL HOME100
        '   IF SNAME$ = "SFMR" THEN CALL HOME010: REM
            update 6/27/1988
        '   IF (INSTR(P6$, "EMX500") OR INSTR(P6$,
            "EMX250") OR INSTR(P6$, "EMX100")) THEN CALL
            HOME500
        '   IF INSTR(P6$, "EMX2500") THEN CALL HOME2500:
            REM update 6/27/1988
        '   IF SNAME$ = "GRFMR" THEN CALL HOMENOV

1500    IF REPTINFLG = 1 THEN GOSUB 600: REPTINFLG = 0
```

```
1510  V = FRE(0)

1520  IF DATE$ <> DAFZ$ THEN GOSUB 2500: CALL
      UPDATERSTAT: GOSUB 4300

1532  V$ = INKEY$

1535  IF V$ = "" THEN 1536 ELSE IF ASC(V$) = 11 THEN
      GOSUB 2010: KEYTM1 = TIMER + 30: K$ = "on"

1536  IF TIMER > KEYTM1 AND K$ = "on" THEN GOSUB 2005:
      K$ = "off"

1545  IF (BUSFLG = 1 AND TIMER > BTIME) THEN GOSUB
      9000:        ELSE IF (BUSFLG = 1 AND (BTIME -
      TIMER) > 60) THEN GOSUB 9000

1546  IF BUSFLG <> 0 THEN CV = CSRLIN: CR = POS(0):
      LOCATE 2, 56: PRINT "BT = "; FNBT: LOCATE CV, CR

1551  V$ = INKEY$: IF V$ = "" THEN 1552 ELSE 1551

1552  IF (CLLFLG = 1 AND (ACTR# = 0 AND SNDD# = 0 AND
      SNDF# = 0 AND DACT# = 0 AND BUSFLG = 0)) THEN
      CALL WATSONCALL: 'SHELL "WAT"

1553  IF (NCLLFLG = 1 AND (ACTR# = 0 AND SNDD# = 0 AND
      SNDF# = 0 AND DACT# = 0 AND BUSFLG = 0)) THEN
      CALL NEGWATSON: 'shell "nwat"

1555  GOTO 1410

1900  LINCTR = 0: timctr = Z#: CLS : CALL GETTNUMI:
      CLOSE 11: CALL FIELDTNUM: GOSUB 1907: GOTO 1910

1907  PRINT "TNUM    USED ROAMER    ROAMER SENT
      DEACT   TIME   DATE    SITE FEAT."

1909  PRINT "       MID    SER#      ": RETURN: ' cl =
      CSRLIN: cr = POS(0): LOCATE 12, 1: PRINT
      "PREVIOUS CF #   PREFERRED CARRIER": LOCATE cl,
      cr: RETURN
```

```
1910 FOR Z = 1 TO RECORD#: GET 11, Z: IF INSTR(M$,
     RSEARCH$) THEN COLOR 15, 0, 0 ELSE COLOR 7, 0, 0
1915 IF M$ <> SPACE$(22) THEN PRINT t$; " "; u$; "
     "; M$; " "; S$; "  "; DEAT$; "    "; TI$; " ";
     DTA$; " "; PH1$; " "; FE$: LINCTR = LINCTR + 1:
     IF LINCTR > 20 THEN GOSUB 1975: GOSUB 1907:
1920 NEXT: CLOSE 11:
1921 KEY OFF: LOCATE 25, 23: COLOR 15, 0, 0: PRINT
     "LAST USED TDN - RETURN TO CONTINUE"; : INPUT
     q$: COLOR 7, 0, 0: CLS : RETURN
1923 CLS : RETURN
1975 KEY OFF: COLOR 15, 0, 0: LOCATE 25, 33: PRINT
     "RETURN FOR MORE"; : INPUT q$: CLS : LINCTR = 0:
     COLOR 7, 0, 0: CLS : RETURN
2005 BALCT# = 1
2006 KEY(1) OFF: KEY(2) OFF: KEY(3) OFF: KEY(4) OFF:
     KEY(5) OFF: KEY(6) OFF: KEY(8) OFF: KEY(9) OFF:
     KEY(1) OFF: KEY OFF: CLS
2007 RETURN
2010 KEY(1) ON: KEY(2) ON: KEY(4) ON: KEY(7) ON:
     KEY(8) ON: KEY(9) ON: KEY ON: RETURN:
2500 WHICH$ = "": CLS : LOCATE 12, 30: PRINT
     "MIDNIGHT DE-ACTIVATION CHECK "
2501 HMR = Z#: TIMER OFF: TCHGFLG = 1: CALL GETTNUMI:
     CLOSE 11: CALL FIELDTNUM
2502 FOR XZ = 1 TO RECORD#
2503 GET 11, XZ: IF u$ = "Y" THEN HMR = HMR + 1
2504 NEXT: FIRSTFLG = Z#: IF HMR = 0 THEN 2514
2505 R = 1: FOR zx = 1 TO HMR: RN = zx - 1
```

```
2506  RN = RN + 1: GET 11, RN:

2507  IF RN = (RECORD# + 1) THEN 2512

IF INSTR(WHICH$, STR$(RN)) THEN 2506

IF FIRSTFLG = 0 AND PH1$ <> SPACE$(6) THEN

MATCHSITE$ = PH1$: FIRSTFLG = 1: GOTO 2510

IF PH1$ = MATCHSITE$ AND u$ = "Y" THEN 2510

GOTO 2506

2510  WHICH$ = WHICH$ + STR$(RN): GOTO 2506

2512  FIRSTFLG = Z#: NEXT zx:

2513  X = INSTR(WHICH$, " ")

IF X = 0 THEN XZ = VAL(WHICH$): GOSUB 2515: GOTO

2514

WHICH$ = MID$(WHICH$, X + 1, (LEN(WHICH$) - 1))

X = INSTR(WHICH$, " ")

IF X = 0 THEN XZ = VAL(WHICH$): GOSUB 2515: GOTO

2514

XZ = VAL(MID$(WHICH$, 1, (X - 1)))

GOSUB 2515: GOTO 2513

2514  CLOSE 11: CLS

CC$ = DATE$ + " " + TIME$ + " AUTOMATIC

DE-ACTIVATION STARTED"

CALL PRINTTONPAFILE(CC$): RETURN

2515  GET 11, XZ:

2520  R = XZ: PP$ = PH1$: TDACT# = TDACT# + 1: GOSUB

3035: LSET PH1$ = PP$: LSET DEAT$ = "D": PUT 11,

XZ: RETURN

2900  TIMER OFF: TCHGFLG = 1: CALL UPDATERSTAT
2902  LOCATE 12, 25: PRINT " Checking Temporary Number File "
```

```
2905  OPEN FI$ FOR INPUT AS 3: CALL FIELDTNUM

2910  DUP = Z#: IF EOF(3) THEN 3020 ELSE LINE INPUT
      #3, N$: SWNUM$ = RIGHT$(N$, 1)

2911  IF FI$ = "ACTIVE" THEN ACTR# = ACTR# - 1: ELSE
      DACT# = DACT# - 1

2915  CALL GETTNUMI: R = 0

2920  FOR XX = 1 TO RECORD#

2921  IF SWNUM$ = "0" OR SWNUM$ = "1" OR SWNUM$ = ""
      THEN 2925

2922  GET 11, XX
      IF RIGHT$(CXR$, 1) = SWNUM$ THEN 2925
      GOTO 2955

2925  GET 11, XX
      IF u$ = "N" AND R = 0 THEN R = XX:
      IF MID$(M$, 1, 10) <> MID$(N$, 1, 10) THEN 2955
      DUP = 1
      IF (DUP = 1 AND FI$ = "ACTIVE" AND S$ = "Y")
      THEN GOSUB 3070: GOTO 2955: 'CHECK FOR 3 HOUR
      PAST
      IF (DUP = 1 AND FI$ = "ACTIVE" AND S$ = "N")
      THEN R = XX: XX = RECORD# + 5: 'ACT WHILE
      PROCESSING
      IF (DUP = 1 AND FI$ = "DEACTIVE" AND DEAT$ =
      "D") THEN R = XX: XX = RECORD# + 5: 'DE-ACT
      WHILE PROCESSING
      IF (DUP = 1 AND FI$ = "DEACTIVE" AND S$ = "Y")
      THEN R = XX: XX = RECORD#: 'normal de-act

2955  NEXT:
      IF R = 0 THEN CC$ = TIME$ + " MOBILE " + N$ + "
```

TRIED TO ACT.-HOWEVER ALL TDN ALLOCATIONS WERE USED": CALL PRINTTONPAFILE(CC$)

IF R > Z# THEN 2959

2956 CLS : TT = TIMER + 5

2957 IF TIMER < TT THEN LOCATE 12, 1: BEEP: COLOR 15, 0, 0: NTDN$ = "CHECK TRANS. FILE " + "NPA" + MID$(DATE$, 1, 5) + " - A MOBILE TRIED TO ACT. -HOWEVER ALL TDN'S IN USE": PRINT NTDN$: NOTDNFLG = 1: GOTO 2957: ELSE COLOR 7, 0, 0: GOTO 3020

2959 IF DUP = 1 AND XX = RECORD# + 7 THEN 2910

2960 IF DUP = 1 AND XX = RECORD# + 6 THEN 2976

2965 IF (DUP = 1 AND FI$ = "DEACTIVE") THEN GOSUB 3035: GOTO 2910: 'normal de-act

2970 IF DUP = 0 AND FI$ = "DEACTIVE" THEN 2985 ELSE IF DUP = 0 THEN 2990

2975 GOTO 2910

2976 IF MID$(DTA$, 4, 2) = MID$(DATE$, 4, 2) THEN 2977

IF FI$ = "DEACTIVE" THEN GOSUB 3035: GOTO 2910

IF FI$ = "ACTIVE" THEN LSET u$ = "N": GOTO 2995

2977 IF FI$ = "DEACTIVE" THEN CC$ = FNTMMSG$ + "MID " + MID$(N$, 1, 23) + " ATT. TO DE-ACT WHEN 1ST REQUEST NOT COMP. ": CALL PRINTTONPAFILE(CC$): GOTO 2910

2978 IF FI$ = "ACTIVE" THEN CC$ = FNTMMSG$ + "MID " + MID$(N$, 1, 23) + " ATT. TO ACT WHEN 1ST REQUEST NOT COMP.": CALL PRINTTONPAFILE(CC$): GOTO 2910

2985 IF DUP = 0 AND FI$ = "DEACTIVE" THEN CC$ =

```
        FNTMMSG$ + "MID " + MID$(N$, 1, 23) + " ATT.
        DE-ACT W/OUT 1ST BEING ACT. ": CALL
        PRINTTONPAFILE(CC$): GOTO 2910

2990    '

2995    GET 11, R: IF (u$ + "N" AND (S$ = "N" OR S$ = "
        ") OR DDUP = 1) THEN LSET u$ = "Y": LSET M$ =
        N$: LSET DEAT$ = " ": LSET S$ = "N": LSET DTA$ =
        DATE$: LSET PH1$ = MID$(N$, 29, 6): PUT 11, R:
        GOSUB 3045: GOTO 2910

2996    CC$ = "GOTO 2996 TNUM FILE INVALID - RECORD # =
        " + STR$(R): CALL PRINTTONPAFILE(CC$)    LSET u$
        = "N": LSET S$ = " ": CLOSE 3: KILL FI$: CALL
        RERUN: CHAIN "pokecom"

3020    CLOSE 3: CLS : IF FI$ = "ACTIVE" THEN ACTR# =
        Z#: OPEN "ACTIVE" FOR APPEND AS 3: CLOSE 3: KILL
        "ACTIVE": FI$ = "NO FILE"

3025    IF FI$ = "DEACTIVE" THEN DACT# = Z#: OPEN
        "DEACTIVE" FOR APPEND AS 3: CLOSE 3: KILL
        "DEACTIVE": FI$ = "NO FILE"

3030    CLOSE 11: CALL UPDATERSTAT

3031    TIMER ON: RETURN

3035    OPEN "R", 6, "DEASND", 48

3036    FIELD 6, 2 AS STATE$, 10 AS RMID$, 8 AS RSER$, 6
        AS SITE$, 10 AS TDN$, 4 AS RCD$, 6 AS SPARE$, 2
        AS SWN$: RR = Z#: IF INSTR(t$, " ") THEN GOSUB
        3060: CLOSE 6: RETURN

3037    RR = RR + 1: GET 6, RR: IF VAL(STATE$) = 0 THEN
        3038 ELSE 3037

3038    SWNUM$ = "1"
```

```
        LSET TDN$ = t$: LSET STATE$ = "01": LSET RMID$ =
        MID$(M$, 1, 10): LSET RSER$ = MID$(M$, 15, 8):
        LSET SITE$ = PH1$: LSET RCD$ = STR$(R): LSET
        SPARE$ = SPACE$(6): LSET SWN$ = SWNUM$
3039    PUT 6, RR: SNDD# = SNDD# + 1: CC$ = M$ + " " +
        FE$ + " DE-ACTIVATION " + FNTMMSG$: CLOSE 6:
        CALL PRINTTONPAFILE(CC$):
3040    LSET DEAT$ = "D": PUT 11, R: RETURN
3045    OPEN "R", 6, "ACTSND", 48
3046    FIELD 6, 2 AS STATE$, 10 AS RMID$, 8 AS RSER$, 6
        AS SITE$, 10 AS TDN$, 4 AS RCD$, 6 AS SPARE$, 2
        AS SWN$: RR = Z#: IF INSTR(t$, " ") THEN GOSUB
        3060: CLOSE 6: RETURN
3047    RR = RR + 1: GET 6, RR: IF VAL(STATE$) = 0 THEN
        3048 ELSE 3047
3048    LSET STATE$ = "01": LSET RMID$ = MID$(M$, 1,
        10): LSET RSER$ = MID$(M$, 15, 8): LSET SITE$ =
        PH1$: LSET TDN$ = t$: LSET RCD$ = STR$(R): LSET
        SPARE$ = SPACE$(6): LSET SWN$ = SWNUM$: IF DDUP
        = 1 THEN DDUP = Z#: LSET STATE$ = "03"
3052    PUT 6, RR: SNDF# = SNDF# + 1: CC$ = TIME$ + " "
        + M$ + " ACTIVATION": CLOSE 6: CALL
        PRINTTONPAFILE(CC$): RETURN
3060    LSET u$ = "Y": LSET M$ = SPACE$(22): LSET S$ = "
        ": LSET DEAT$ = " ": LSET TI$ = SPACE$(8): LSET
        DTA$ = SPACE$(10): LSET PH1$ = SPACE$(6): LSET
        FE$ = SPACE$(3): PUT 4, R
3061    CC$ = TIME$ + " " + FI$ + " " + TIME$ + " BAD
        TNUM RECORD FOUND IN TNUM FILE RECORD #=" + STR$
```

(R): CALL PRINTTONPAFILE(CC$): RETURN

3070 IF S$ = "N" THEN RETURN:       ELSE TI1$ = "": FOR XI = 1 TO LEN(TI$): IF MID$(TI$, XI, 1) = ":" THEN 3071 ELSE TI1$ = TI1$ + MID$(TI$, XI, 1)

3071 NEXT

3072 TI2$ = "": FOR XI = 1 TO LEN(TIME$): IF MID$(TIME$, XI, 1) = ":" THEN 3073 ELSE TI2$ = TI2$ + MID$(TIME$, XI, 1)

3073 NEXT: TI1 = VAL(TI1$): TI2 = VAL(TI2$): IF TI2 = TI1 < 30000 THEN 3075

3074 CC$ = TIME$ + " " + M$ + " RE-ACT IN LOCAL SWITCH ONLY": CALL PRINTTONPAFILE(CC$): R = XX: DUP = Z#: DDUP = 1: RETURN

3075 CC$ = TIME$ + "*DUP ACT. FOR MID=" + M$ + " ALREADY ASSIGNED " + t$ + " *": CALL PRINTTONPAFILE(CC$): R = XX: XX = RECORD# + 6: RETURN

3300 '

3305 GET 11, XZ: q$ = MID$(fp$, 16, 3): IF VAL(q$) < 0 OR VAL(q$) > 99 THEN BSTATE# = 1: RETURN: ELSE LSET FE$ = q$: q$ = "": fp$ = "": FPTRAP = Z#: PUT 11, XZ

3310 IF MID$(A$, 38, 8) = MID$(M$, 15, 8) THEN CK$ = "OK":     ELSE CK$ = "NO COMPARE": HOSER$ = MID$(A$, 38, 8)

3315 RETURN

3800 QQ$ = "ACTSND": GOSUB 3802: QQ$ = "DEASND": GOSUB 3802: QQ$ = "BUSY": GOSUB 3812: QQ$ =

"D:TEMP": GOSUB 3802: GOTO 3820

3802 ttctr = Z#: CLS : LOCATE 1, 37: PRINT QQ$: NF = 7: NA$ = QQ$: CALL OPENACTSND

3803 GET NF: IF EOF(7) OR NF > RECORD# THEN CLOSE NF: GOTO 3810

3805 IF VAL(STATE$) <> 0 THEN ttctr = ttctr + 5: PRINT STATE$; " "; RMID$; " "; RSER$; " "; SITE$; " "; TDN$; " "; RCD$; " "; SPARE$

3806 GOTO 3803

3810 TT = TIMER + ttctr

3811 IF TIMER > TT THEN CLS : RETURN: ELSE 3811

3812 CLOSE 7: ttctr = Z#: OPEN QQ$ FOR APPEND AS 7: CLOSE 7: LOCATE 1, 37: PRINT QQ$: OPEN QQ$ FOR INPUT AS 7

3813 IF EOF(7) THEN 3815 ELSE INPUT #7, DQ$: ttctr = 4: PRINT DQ$: GOTO 3813

3815 CLOSE 7: GOTO 3810

3820 V$ = INKEY$: IF V$ = "" THEN RETURN: ELSE 3820

3830 CC$ = "goto 3830 and reran": PRINTTONPAFILE (CC$): CALL RERUN: CHAIN "pokecom"

LOCALHANDLER1:

3900 WR = CSRLIN: WC = POS(0)
IF ERR = 57 THEN ER = 57: RESUME NEXT
LOCATE 24, 1
PRINT "Error = "; ERR; " in line number "; ERL
LOCATE WR, WC

3901 IF (ERR = 7 OR ERR = 14) THEN SHELL "BOOT":

```
3902  ER = ERR: EL = ERL: IF ER = 61 THEN SHELL "DEL
      D:NPA": RESUME 3955

3903  CER$ = FNTMMSG$ + "ERROR=" + STR$(ERR) + "
      LINE=" + STR$(ERL): CLOSE 8: OPEN "ERROR" FOR
      APPEND AS 8: PRINT #8, CER$: CER$ = "": CLOSE 8:
      IF ER = 76 OR ER = 75 THEN SHELL "BOOT"

3904  IF ER = 6 THEN RESUME NEXT

3905  IF ER = 62 AND (EL = 15 OR EL = 51) THEN RESUME
      3955

3906  IF ER = 53 AND EL = 1553 THEN CLLFLG = Z#:
      RESUME 1552

3907  IF ER = 53 AND EL = 680 THEN RESUME 1340

3908  IF ER = 53 AND EL = 2905 THEN RESUME 3020

3909  IF ER = 53 AND EL = 9000 THEN RESUME 9051

3010  IF ER = 68 THEN TCHGFLG = 1: TIMER OFF: DEF SEG
      = &H40: POKE 2, &HF8: POKE 3, 2: DEF SEG = SG#:
      TIMER ON: CALL DELAY2: RESUME

3911  V$ = INKEY$: IF V$ = "" THEN 3915 ELSE IF V$ =
      "S" THEN SYSTEM

3915  IF ((ER = 53 OR ER = 52 OR ER = 62) AND EL = 50)
      THEN 3956

3916  IF ER = 53 AND EL = 9000 THEN RESUME 9050

3917  IF ER = 57 THEN RESUME

3918  IF ER = 52 THEN PRINT "fmrbas"

3930  ERC = ERC + 1:

3931  IF ERC > 4 THEN CALL RERUN2: IF RSTCTR = 0 THEN
      RESUME 3950

3933  RESUME

3950  CHAIN "pokecom"
```

```
3955  CHAIN "fmrins"

3956  CALL UPDATERSTAT: RESUME 50

4000  REM *

4001  '

4005  xxr = 1: PH1$ = SPACE$(6): OPEN "R", 12,
      "D:NXXFILE", 58: NPA$ = MID$(OMID$, 1, 6)

4010  FIELD 12, 6 AS NP$, 6 AS SC$, 11 AS MODN$, 10 AS
      PW$, 10 AS MD$, 4 AS BUD$, 11 AS TN$

4015  GET 12, xxr: xxr = xxr + 1

4016  IF xxr = 2 AND VAL(NP$) = 0 THEN CLOSE 12: SHELL
      "del d:npa": SHELL "copy c:\fmr\nxxfile d:":
      GOTO 4005

4020  IF NP$ = SPACE$(6) OR ASC(NP$) = 0 THEN 4035

4025  IF NP$ = NPA$ THEN PH1$ = SC$: GOTO 4035

4030  GOTO 4015

4035  CLOSE 12: RETURN

4200  INPUT "Which "; V$: IF V$ = "e" OR V$ = "E" THEN
      comfil$ = "ERROR": ELSE IF V$ = "x" OR V$ = "X"
      THEN comfil$ = "thrawy": ELSE comfil$ = "NPA" +
      MID$(DATE$, 1, 5)

4201  CLOSE 6: CLS : OPEN comfil$ FOR APPEND AS 6:
      CLOSE 6: CLS : GOTO 4205

4202  comfil$ = "NPA" + MID$(DATE$, 1, 5)

4205  SHELL "BROWSE " + comfil$

4210  V$ = INKEY$: IF V$ = "" THEN RETURN: ELSE 4210

4300  CALL UPDATERSTAT

4301  LOCATE 12, 20: PRINT "CLEARING OUT COUNTERS "

4305  CLLFLG = Z#: SNNM# = Z#: SRDN# = Z#: MIDNV# =
      Z#: BUSCTR = Z#: TROAM# = Z#: TACT# = Z#: TDACT#
```

```
        = Z#: OPEN "text.txt" FOR APPEND AS 15: CLOSE
        15: KILL "text.txt"
 4310   CALL UPDATERSTAT: SHELL "copy d:*.* c:\temp:":
        SHELL "BOOT"
 9000   mm$ = "": OPEN "BUSY" FOR INPUT AS 6: RN = Z#:
        IF SNDD# < 0 THEN SNDD# = 0
 9001   IF SNDF# < 0 THEN SNDF# = 0
 9002   IF MODAFLG < 0 THEN MODAFLG = 0
 9003   IF MODDFLG < 0 THEN MODDFLG = 0
 9007   IF EOF(6) THEN 9050
 9008   INPUT #6, q$: INPUT #6, S1$: INPUT #6, S2$:
        INPUT #6, S3$: INPUT #6, S4$: INPUT #6, S5$:
        INPUT #6, S6$: INPUT #6, S7$: INPUT #6, S8$
 9011   IF INSTR(q$, "ACTSND") AND VAL(S1$) < 4 THEN
        SNDF# = SNDF# + 1: GOTO 9020
 9012   IF INSTR(q$, "ACTSND") AND VAL(S1$) = 4 THEN
        MODAFLG = MODAFLG + 1: GOTO 9020
 9013   IF INSTR(q$, "DEASND") AND VAL(S1$) < 4 THEN
        SNDD# = SNDD# + 1: GOTO 9020
 9014   IF INSTR(q$, "DEASND") AND VAL(S1$) = 4 THEN
        MODDFLG = MODDFLG + 1: GOTO 9020
 9015   GOTO 9007
 9020   CALL UPDATERSTAT: CLOSE 13: OPEN "R", 13, q$, 48
 9021   FIELD 13, 2 AS STATE$, 10 AS RMID$, 8 AS RSER$,
        6 AS SITE$, 10 AS TDN$, 4 AS RCD$, 6 AS SPARE$,
        2 AS SWN$
 9022   RN = RN + 1
 9025   LSET STATE$ = S1$: LSET RMID$ = S2$: LSET RSER$
        = S3$: LSET SITE$ = S4$: LSET TDN$ = S5$: LSET
```

```
        RCD$ = S6$: LSET SPARE$ = SPACE$(4) + MID$(S7$,
        5, 2): LSET SWN$ = S8$: PUT 13, RN
9030    GOSUB 9055: GOTO 9007
9050    CLOSE 6: OPEN "BUSY" FOR APPEND AS 6: CLOSE 6:
        KILL "BUSY"
9051    CLOSE 13: CLOSE 6: BUSFLG = Z#: BTIME = Z#: CALL
        UPDATERSTAT: TIMER ON: RETURN
9055    CLOSE 11: CALL FIELDTNUM
        IF VAL(S6$) = 0 THEN CLOSE 11: RETURN
9060    zx = VAL(S6$): GET 11, zx: LSET M$ = S2$ = "  "
        + S3$: PUT 11, zx: CLOSE 11: RETURN
10000   CLOSE : CLS : BEEP: LOCATE 12, 15: COLOR 15, 0,
        0: CC$ = "@@@@@@@ WARNING --A master reset has
        been invoked by operator --PLEASE WAIT @@@@@@@":
        PRINT CC$: COLOR 7, 0, 0: CC$ = FNTMMSG$ + CC$:
        CALL PRINTTONPAFILE(CC$)
10002   CALL RERUN: CHAIN "pokecom"
13000   FOR t% = 2 TO 7: CC$ = "": FOR zx% = 1 TO 79: X#
        = SCREEN(t%, zx%): CC$ = CC$ + CHR$(X#): NEXT:
        CALL PRINTTONPAFILE(CC$): NEXT: PK$ = P1$: P1$ =
        "YES": P1PFLG = 1: GOSUB 147: P1$ = PK$: P1PFLG
        = Z#: CLS
13001   cc1$ = FNTMMSG$ + " TC=" + STR$(FNTTCALL#) + "
        TA=" + STR$(TACT#) + " TD=" + STR$(TDACT#) +
        "ACT. TDN'S = " + STR$(TTDN#) + " TDN'S LEFT = "
        + STR$(TTDNA# - TTDN#)
        IF (ACTR# <= 0 AND SNDD# <= 0 AND SNDF# <= 0 AND
        DACT# <= 0 AND MODAFLG <= 0 AND MODDFLG <= 0)
        THEN GOSUB 600: ELSE REPTINFLG = 1
```

```
13004 GOSUB 14000: IF P6$ = "AUTOPLEX100" THEN PKLEN =
      11: ELSE PKLEN = 10
      IF TIMER < 28800 OR TIMER > 61200 THEN 13006
      ELSE IF WH$ = "DEA" THEN TESTFLG = 1: WH$ =
      "ACT": CALL TESTCALL

13005 ' IF TIMER > 21600 AND TIMER < 21900 THEN WH$ =
      "": TESTFLG = 1: CALL TESTCALL:     ELSE TESTFLG
      = 0

13006 SANITYTEST = Z#: IF TIMER > 28800 AND TIMER <
      64900! THEN GOSUB 13010: RETURN:     ELSE CLS :
      RETURN

13010 IF INSTR(SDAS$, "N/A") THEN RETURN
      IF TROAM# = 0 THEN TROAM1# = FNTTROAM#: CLS :
      RETURN

13011 IF TROAM1# = FNTROAM# THEN callflg# = 1: BELL# =
      1: CC$ = FNTMMSG$ + SDAS$: CALL
      PRINTTONPAFILE(CC$): RETURN:     ELSE callflg# =
      Z#: RETURN 14000 OPEN "RSTAT" FOR INPUT AS 6: INPUT #6, THAWFLG:
      INPUT #6, TACT#: INPUT #6, TDACT#: INPUT #6,
      ACTR#: INPUT #6, DACT#: INPUT #6, SNDF#: INPUT
      #6, SNDD#: INPUT #6, FI$: INPUT #6, FI1$: INPUT
      #6, BUFFLG: INPUT #6, BUSFLG: INPUT #6, BTIME:
      INPUT #6, RSTCTR 14001 INPUT #6, SNNM#: INPUT #6, SRDN#: INPUT #6,
      MIDNV#: INPUT #6, BUSCTR: INPUT #6, TTDN#: INPUT
      #6, BLT: INPUT #6, MODE: INPUT #6, CLLFLG: INPUT
      #6, MODAFLG: INPUT #6, MODDFLG: INPUT #6,
      NCLLFLG: CLOSE 6
```

```
14002 RETURN

20000 STDN$ = "/////": CLS : LOCATE 12, 27: COLOR 15,
      0, 0: INPUT "Enter Roamer to Search for";
      RSEARCH$
20001 CLS : SFILE$ = "NPA" + LEFT$(DATE$, 5): CLOSE 6:
      OPEN SFILE$ FOR INPUT AS 6:
20002 IF EOF(6) THEN 20050 ELSE LINE INPUT #6, q$:
20003 IF INSTR(q$, RSEARCH$) THEN IF INSTR(q$,
      "ASSIGNED TEMPORARY") THEN PRINT q$: STDN$ =
      RIGHT$(q$, 7): GOTO 20025
20004 IF INSTR(q$, RSEARCH$) THEN IF INSTR(q$, "
      ACTIVATION") THEN PRINT q$: GOTO 20025
20005 IF INSTR(q$, RSEARCH$) THEN IF INSTR(q$,
      "DE-ACTIVATION") THEN PRINT q$: GOTO 20025
20006 IF INSTR(q$, STDN$) THEN IF INSTR(q$, "mobile
      not found") THEN PRINT q$: GOTO 20025
20007 IF INSTR(q$, STDN$) THEN IF INSTR(q$, "mobile
      was busy") THEN PRINT q$: GOTO 20025
20010 IF INSTR(q$, STDN$) THEN IF INSTR(q$,
      "unsuccessfully") THEN PRINT q$: GOTO 20025
20011 IF INSTR(q$, STDN$) THEN IF INSTR(q$, "was
      notified") THEN PRINT q$
20025 GOTO 20002
20050 KEY OFF: LOCATE 25, 33: COLOR 15, 0, 0: PRINT
      "End of Search"; : INPUT q$: COLOR 7, 0, 0: CLS:
      RETURN
```

KEYS:

V$ = INKEY$: IF V$ = "" THEN GOTO KEYEND

IF ASC(V$) = 19 THEN GOSUB 129: GOTO KEYEND

IF ASC(V$) = 16 THEN GOSUB WATCHCALL: GOTO KEYEND

IF ASC(V$) = 20 THEN GOSUB 111: GOTO KEYEND

IF ASC(V$) = 12 THEN GOSUB 165: GOTO KEYEND

IF ASC(V$) = 10 THEN GOSUB 115: GOTO KEYEND

IF ASC(V$) = 6 THEN CHAIN "fmrins"

IF ASC(V$) = 1 THEN GOSUB 4200: GOTO KEYEND

IF ASC(V$) = 4 THEN GOSUB 1900: GOTO KEYEND

IF ASC(V$) = 15 THEN GOSUB PRFLG: GOTO KEYEND

IF ASC(V$) = 5 THEN GOSUB 3800: GOTO KEYEND

IF ASC(V$) = 7 THEN GOSUB 128: GOTO KEYEND

IF ASC(V$) = 24 THEN THAWFLG = 4: GOSUB 500:
              THAWFLG = Z#: GOTO KEYEND

IF ASC(V$) = 2 THEN GOSUB 127: GOTO KEYEND

IF ASC(V$) = 8 THEN GOSUB 20000: GOTO KEYEND

IF ASC(V$) = 25 THEN CALL TESTCALL500

KEYEND:

V$ = ""

IF rsval < 0 THEN rsval$ = "10": rsval = 10: KEY 6, rsval$

RETURN

PRFLG:

IF PRNFLG = 0 THEN PRNFLG = 1: ELSE PRNFLG = 0

IF PRNFLG = 1 THEN KEY 6, "PRNOFF": ELSE KEY 6,

"PRNON"

RETURN

WATCHCALL:

IF MODE = 0 THEN POKFLG = Z#: RETURN

POKFLG = POKFLG + 1: IF POKFLG > 3 THEN POKFLG = Z#:

IF POKFLG = 0 THEN DEF SEG = SG#: POKE 7, 250: KEY 5, "NORMAL"

IF POKFLG = 3 THEN DEF SEG = SG#: POKE 7, 255: KEY 5, "NOBOOT"

IF POKFLG = 2 THEN DEF SEG = SG#: POKE 7, 5: KEY 5, "POKE=5"

IF POKFLG = 1 THEN DEF SEG = SG#: POKE 7, 1: KEY 5, "POKE=1"

RETURN

APPENDIX B

FMR.BAS GLOSSARY

PART A: VARIABLES AND FLAGS

TTDNA#: This variable represents the number of temporary numbers currently in use.

TTDN: This variable represents the total number of temporary numbers allocated to the program.

THAWFLG: When set, this variable indicates that nine consecutive errors have been encountered while trying to either activate or deactivate a roamer. When THAWFLG is set, the appropriate FMR.BAS modules will dial the central monitoring system and inform the system that an activation or deactivation process has failed.

TCHGFLG: When set, TCHGFLG indicates that another module has interrupted the original timer values and that FMR.BAS should reset those values to the original values.

TATD: This variable is set to indicate how many processes (activations or deactivations) are then currently pending.

MODAFLG: MODAFLG is set by ROAMERHOME to indicate that an activation is pending and that all necessary data from the roamer's home switch has been received. When FMR.BAS encounters MODAFLG flag set, it calls the appropriate FMRxxxx module to react to responses received from the roamer's home switch. (FMRxxxx is determined by the type of MTSO switch to which the FMR processor is appended, it being understood that the details of various programming steps in the FMRxxxx subroutines are switch-dependent.)

MODDFLG: MODDFLG is set by ROAMERHOME to indicate that a deactivation request has been received and that all necessary data from the roamer's home switch has been received. When FMR.BAS encounters MODDFLG flag set, it calls the appropriate FMRxxxx module, to react to responses received from the roamer's home switch.

BUFFLG: BUFFLG is set by the subroutine PEEKCALL. PEEKCALL will set BUFFLG if call record data is passed by the background program to a predetermined buffer, i.e., to a block of continuous memory. When BUFFLG is set, the following processing steps take place:

1) A jump is made to a subroutine which collects this data (Step 044).
2) The data is formatted (Step 052).
3) The data is checked for validity (Step 054).
4) The roamer's NPA NXX is verified to exist in NXXFILE. If so, variable SC$ is set to correspond to the roamer's home switch, i.e., AUSTTX, HSTNTX, etc.
5) Data in ACTIVE file or DEACTIVE file is stored.
6) Either ACTR# or DACT# flag is set (Step 0515).

DACT#: This flag, if set, indicates that a deactivation request has been received. At Step 45, a jump is made to a subroutine which:

1) Checks all active temporary numbers for one assigned to the mobile which requested the deactivation.
2) If one is not found, prints a message to the transaction file to indicate a deactivation was requested by a mobile who did not have a temporary number assigned.

3) If a match is found, a check is made to ensure that the requesting subscriber is not the currently undergoing either an activation or a deactivation.

4) When all checks are positive, the roamer's DATA is moved to a file call DEASND (deactivation pending to sent to switches), DACT# is reset, and SNDD# is set.

ACTR#: This flag, if set, indicates that an activation request has been received. A jump is made (Step 045) to a subroutine in which the following processing steps occur:

1) All temporary numbers are checked to insure that a number has not already been assigned to the roamer. If not, the next available temporary number is seized.

2) If all temporary numbers are in use, a warning message is printed to the screen, and an audible tone is sounded to alert the subscriber.

3) If a temporary number is already assigned to the mobile, a determination is made whether three hours have elapsed since a first activation. If so, DDUPFLAG is set. A message is written to transaction file to indicate a reactivation in home switch only. If less than three hours have elapsed, then a message is written to transaction file to indicate duplicate activation.

4) If more than three hours have not elapsed or this is not a valid duplicate activation, the following variables in the respective TNUM file are given the values indicated below.

U$ (used field) = "Y"

M$ (roamer ID field) = Roamer's MID and ESN

DEAT$ (auto deact field) = " "

S$ (commands send field) = "N"

DTA$ (current date) = Date

PH1$ (site code field) = Roamer's home site

SNDF#: This flag, if set, indicates that a request to verify a roamer and call forward him to a temporary number at his home switch has been made. FI1$ will be set to ACTSND, and FMR.BAS will assume processing control.

SNDD: This flag, if set, indicates that a request to cancel call forwarding in roamer's home switch has been made. FI1$ is set to equal DEASND, and FMR.BAS will assume processing control.

CALLFLG#: This flag, if set, indicates that there is a potential problem in extracting call records from a source. A message is printed to the screen to alert the user. The message is also printed to the daily transaction file and sent to a central monitoring center.

PORTFLG: This flag, if set, indicates that trouble has been encountered four consecutive times in trying to establish communication between the FMR processor and a cellular switch. An error message is printed to the transaction file and is sent to a central monitoring center.

HSTNFLG: This flag, if set, indicates that attempts to communicate with an EMX 2500 switch, for example, have failed because too many operators were logged onto the switch. A corresponding message is printed to the transaction file and sent to monitoring center.

NHR1$: This variable is set to equal the current hour. FMR.BAS constantly compares the value of NHR1$ with the current time. When the hour changes, the top eight lines of the screen are printed to the transaction file.

MODAFLG: This flag is set by FMR.BAS after data communication is completed with the roamer's home switch during an activation. Specifically MODAFLG is set when the roamer is validated and the roamer is call forwarded to a temporary number. Module FMR.BAS sets variable FI1$ to equal ACTSND and determines which type of switch the FMR processor is collocated with, then calls the corresponding software module.

MODDFLG: This flag is set by FMR.BAS set after data communication is completed with the roamer's home switch during a deactivation. Specifically MODDFLG is set when call forwarding is cancelled in roamer's home switch. FMR.BAS sets variable FI1$ to equal DEASND and determines which type of switch the FMR processor is collocated with, then calls corresponding software module.

BUSFLG: This flag may be set by FMR.BAS to indicate that a command to a switch was not completed and was put in the BUSYFILE to be tried again later.

BTIME: This is a timer which is set to approximately 15 seconds later than the actual time upon which a command was put in the BUSYFILE. FMR.BAS monitors this timer and, should it expire when BUSFLG is set, then calls a subroutine which pulls the data out of BUSYFILE, determines whether an activation or deactivation was in process, and sets appropriate flags.

AUTFLG: AUTFLG is continually monitored along with the current time. When the time is 23:55:00 and AUTFLG is = 0, a routine to automatically check the temporary number is invoked. This routine will check for active temporary numbers. When one is found, a deactivation order is generated and appropriate deactivation flags are set. After all temporary number are deactivated, AUTFLG is set to 999. FMR.BAS will react to this value by re-booting the computer.

KEYTM1: This variable is set to the present time plus 30 seconds when an operator depress a Cntl'K', allowing access to the HOT KEYs. FMR.BAS monitors this timer value and, when it expires, extinguishes the 25th line and disallows access to the HOT KEYs.

CLLFLG: This variable is set by an FMRxxx module, where xxx may be 500, 010, 1000, 100, or ASTO. After an activation is complete, a check is made of the HOME file to determine whether positive or negative notification is being used. If positive, this variable is set. FMR.BAS monitors CLLFLG, and, if CLLFLG is set and no other work is pending, then a call is made to "WATSON." "WATSON" is the software module that then calls the roamer and informs him that his calls are now being forwarded to him.

NCLLFLG: NCLLFLG is set by an FMRxxx module. If an activation has failed, a check is made of the HOME file to determine whether positive or negative notification is being used. If negative this variable is set. FMR.BAS monitors NCLLFLG, and, if NCLLFLG is set and no other work is pending, a call is made to "WATSON." "WATSON" is a software module that calls the roamer and informs him that his activation has failed and to try again.

SKIP: This flag, when set, indicates that, because of some aberrant circumstance, the processing then in progress is to be diverted from its otherwise normal flow. For example, if FMR.BAS is undergoing a transaction that requires communication to a specific home switch and during DIALCONNECT (see Appendix B, Part B and Appendix C.5) it is determined that a necessary communications port is out of service, then SKIP will be set so as to circumvent subsequent transactions that require that communications port.

HOME: This flag, when set, indicates that FMR.BAS is then operating in a HOME.x subroutine.

DUPFLG: This flag is set when an "invalid" duplicate activation request is detected. As a result, FMR.BAS effectively discards the request.

DDUPFLG: This flag is set when a "valid" duplicate activation request is detected. As a result, the CMR subscriber is subsequently re-activated by FMR.BAS in his home switch.

PART B: SUBROUTINES

CALLSORT: CALLSORT sorts incoming messages from FMR.EXEC into groups having the same home switch.

CLEARFILE: CLEARFILE sets all fields in ACTSND or DEASND file to null values.

CLEARTNUM: CLEARTNUM sets all fields in TNUM file to initial values.

CONVER: CONVER is used only during testing. It converts ASCII keyboard characters into the corresponding hexadecimal value, then packs the converted characters into a buffer to simulate the reception of a call via the AST FOUR PORT CARD.

DIALCONNECT: DIALCONNECT is called when FMR.BAS has decided, in Step 0910, which home switch is to be called. DIALCONNECT enters the NPA NXX file and determines, for example, that the request for FMR service has been made for the benefit of a mobile unit associated with the NPA, 713 882, that is, Houston, Texas. The subroutine then determines the manner in which a communications link is to be established with the corresponding Houston switch. For example, is the switch coupled to a dedicated network, e.g. Telenet, to which the FMR processor can simply attach? Alternatively, must communications be established in a dial-up mode?

DELAY2: DELAY2 is used to delay program execution for 2 seconds.

DOUBLEDABBLE: DOUBLEDABBLE converts a decimal serial number, as displayed in an ASTRONET switch customer overlay data base, into its hexadecimal equivalent.

FIELDTNUM: FIELDTNUM opens the TNUM file as a random file and accordingly formats TNUM into twelve fields.

GETCHAR: GETCHAR is used when data must be retrieved from a switch via communication port #2. GETCHAR will retrieve data, one character at a time, and build a string from that data.

GETTNUMI: GETTNUMI determines the total number of temporary numbers which the program has available to work with. This value will vary from machine to machine.

MANUFTOHEX: MANUFTOHEX converts a manufacturer's serial number, as displayed in the AUTOPLEX 10 subscriber data base, into its hexadecimal equivalent.

OCTTOHEX: OCTTOHEX converts an octal serial number, as displayed in the AUTOPLEX 100 subscriber data base, into its hexadecimal equivalent.

PEEKCALL: PEEKCALL is used to retrieve calls from the background program, store them in BUFILE file, and then set BUFFLG.

REMOVESPACES: REMOVESPACES is used to remove spaces from a string.

RERUN: RERUN is used at any time by any module that determines that the program is functioning improperly. RERUN routine is called to reset all flags, clear all files, and rerun the program.

RERUN2: RERUN2 is called when a program error is encountered. RERUN2 keeps track of the number of times and time intervals between program errors. If five consecutive errors are encountered, the system is re-booted.

SND1OPENFIELD: SND1OPENFIELD is used to open and field ACTSND and DEASND files.

TESTCALL: TESTCALL is used only during testing. TESTCALL will simulate fifty simultaneous activation and fifty deactivation attempts.

TIMESUB: TIMESUB is called by Advanced Basic's "ON TIMER" function. TIMESUB is arranged to be called every two seconds. However, various modules and/or subroutines will change this value. When TIMESUB is called, checks are done to ensure that the background program is running and, if so, the "heartbeat," i.e., '+/-', is displayed in the upper left-hand corner of the screen.

TNUMSTABILITY: TNUMSTABILITY is called each time the program is rerun. TNUMSTABILITY checks the validity of the data in TNUM file. If invalid data is encountered, the TNUM record is cleared, and a message is printed to the transaction file to indicate which temporary number has been fixed.

UPDATERSTAT: UPDATERSTAT is called by various modules whenever data which is stored in file RSTAT changes value. UPDATERSTAT does the updates to RSTAT file.

VALIDATENPA: VALIDATENPA searches the NPA files for a match with the roamer NPA NXX. If a match is found, the following variables are passed back to the calling module:
PASSWD$ = Password of roamer's home switch

| | |
|---|---|
| | MODE$ = Username/Mode, which allows access to subscriber data base |
| | BUD$ = Baud rate of modem connected to recent change port. |
| DATECHECK: | DATECHECK determines whether the current real actual has passed 12:00 PM (midnight). Is so, the FMR system initiates an automatic deactivation of all currently activated roaming subscribers. |
| DELAY5: | DELAY5 simply inserts, at the implicated point in the processing sequence, a 5-second delay. |
| DENYHANDLER: | DENYHANDLER is called upon when a request for FMR service is received from a subscriber who must be denied service. DENYHANDLER logs an appropriate message to a chronological file and denies the subscriber FMR service. |
| NEGWATSON: | NEGWATSON is called in circumstances when no call-back is provided to an activated subscriber upon activation. |
| OPENACSND: | OPENACSND simply opens the ACSND files. |
| PUTINBUSYFILE: | PUTINBUSYFILE seizes an incompleted transaction, stores the transaction in a file, and recalls the transaction 15 seconds later. |

| | |
|---|---|
| SAVENPAFILE: | SAVENPAFILE writes the chronological sequence of events that occur during the course of a transaction. These events can then be recalled and examined at a subsequent time. |
| STATUS: | STATUS checks the Comm Port to determine whether it is active. |
| WATSONCALL: | WATSONCALL calls the voice card in the FMR processor to transmit a call-back to the subscriber upon activation. |

APPENDIX C

C.1
CALLSORT

```
SUB CALLSORT
ON ERROR GOTO LOCALHANDLER1
'
END SUB
```

C.2
CLEARFILE

```
SUB CLEARFILE
SHARED TS$, RMID$, RSER$, SITE$, TDN$, RCD$, RV$, NF, RN
ON ERROR GOTO LOCALHANDLER1:
LSET STATE$ = TS$: LSET RMID$ = SPACE$(10): LSET RSER$ = SPACE$(8): LSET SITE$ = SPACE$(6): LSET TDN$ = SPACE$(10): LSET RCD$ = RV$: PU
T NF, RN
TCHGFLG = 1
END SUB
```

C.3
CLEARTNUM

```
SUB CLEARTNUM
ON ERROR GOTO LOCALHANDLER1:
RCD# = VAL(RCD$)
LSET O$ = "N": LSET M$ = SPACE$(22): LSET S$ = " ": LSET DEAT$ = " ":
LSET TI$ = SPACE$(8): LSET DTA$ = SPACE$(10): LSET PHI$ = SPACE$(6):
LSET FE$ = SPACE$(3): PUT 11, RCD#
TCHGFLG = 1
END SUB
```

C.4
CONVER (QQ$)

```
SUB CONVER (QQ$)
ON ERROR GOTO LOCALHANDLER1:
P1% = PEEK(4) + (PEEK(5) * 256)
```

```
X% = 0: ptr% = CB% + P1%
FOR X = 1 TO LEN(CO$) STEP 2
    X$ = MID$(CO$, X, 2)
    IF ASC(LEFT$(X$, 1)) ) 57 THEN A1% = ASC(LEFT$(X$, 1)) - 55:    ELSE A1% = ASC(LEFT$(X$, 1)) - 48
    IF ASC(RIGHT$(X$, 1)) ) 57 THEN A2% = ASC(RIGHT$(X$, 1)) - 55:   ELSE A2% = ASC(RIGHT$(X$, 1)) - 48
    A3% = (A1% * 16) + A2%
    POKE (ptr% + X%), A3%: X% = X% + 1
NEXT
p% = PEEK(3): p% = p% + 1: P1% = P1% + 13:
POKE 4, INT(P1% MOD 256): POKE 5, INT(P1% / 256): POKE 3, p%

TCHSFLG = 1
END SUB
```

C.5

DIALCONNECT

```
SUB DIALCONNECT
ON ERROR GOTO LOCALHANDLER1:
busyctr = 0: CTOUT = 0
IF PH1$ = "" THEN GOTO CALLSTATE3:    ELSE IF MID$(PH1$, 1, 1) = "T" OR MID$(PH1$, 1, 1) = "t" THEN TMFLG = 1: GOSUB tnet: GOTO CA
LLSTATE10
TNCOM = 0: EIT0 = 0: TOUT0 = 5000: GOSUB DIAL
ALL = LOC(2): IF ALL ) 0 THEN BA$ = INPUT$(ALL, 2)
GOSUB MODEMINIT: CTOUT = 30
PRINT #2, "ATDT" + PH1$
CALLSTATE1:
CALL GETCHAR: IF INSTR(A$, "ATDT") THEN GOTO CALLSTATE2:    ELSE IF AA$ = nc$ THEN BUSYF = 1: PUTINBUSYFILE: GOTO CA
LLSTATE10: ELSE GOTO CALLSTATE1
CALLSTATE2:
CALL GETCHAR: IF INSTR(A$, "CONNECT") THEN GOTO CALLSTATE10:   ELSE IF (AA$ = nc$ OR INSTR(A$, "BUSY")) THEN BUSYF = 1:
BSTATE$ = 3: PUTINBUSYFILE: GOTO CALLSTATE10:  ELSE GOTO CALLSTATE2
GOTO CALLSTATE10
CALLSTATE3:
PRINT "Not a valid phone number - files"! FIIS! * - DATA="! T1$: CALL RERUN: CHAIN "pokecom"
DIAL:
    DEF SEG = &H40: POKE 2, &HF0: POKE 3, 2:
    DEF SEG = 0: SG0 = ((PEEK(&H36) + PEEK(&H37) * 256)): DEF SEG = SG0:
    CLOSE 2: LOCATE 24, 30: PRINT BAUD$: PAH$: CALL DELAY2: CALL DELAY2: OPEN "COM2:" + BAUD$ + PAH$ FOR RANDOM AS 2:
    RETURN MODEMINIT:
    CTOUT = 0
    PRINT #2, "+++ATZ": M1$ = "OK": R2$ = FNDUM$: R3$ = FNDUM$
MODEMINIT1:
    CALL GETCHAR: IF INSTR(A$, M1$) THEN GOTO MODEMINITRETURN:    ELSE IF AA$ = nc$ THEN GOTO NOMODEMRESP: ELSE GOTO MODEMIN
IT1
    PRINT #2, "ATH": M1$ = "OK"
MODEMINIT2:
    CALL GETCHAR: IF INSTR(A$, M1$) THEN GOTO MODEMINITRETURN:    ELSE IF AA$ = nc$ THEN GOTO NOMODEMRESP: ELSE GOTO MODEMIN
IT2
MODEMINITRETURN:
    CALL DELAY2: RETURN
NOMODEMRESP:
    CLOSE 2: CS = CSRLIN: cr = POS(0): LOCATE 24, 10: BEEP: PRINT "NO MODEM RESPONSE":
    LOCATE CS, cr:
    MODRETRY = MODRETRY + 1: IF MODRETRY ) 5 THEN CHAIN "pokecom"
    CALL DELAY2: CALL DELAY2: GOSUB DIAL: GOTO MODEMINIT
tnet:
    DIALFLG = 0
    tt1$ = LEFT$(PH1$, 2): tt1$ = UCASE$(tt1$): IF tt1$ = "TO" THEN DIALFLG = 1: PH1$ = MID$(PH1$, 2, LEN(PH1$) - 1)
    IF TNCOM = 1 THEN GOSUB TNETDISCON:    ELSE IF TNCOM = 0 THEN GOTO TNET1
    IF TNCOM = 0 THEN GOTO tnet:           ELSE A$ = "?": GOTO addrconnect2
TNET1:
    IF LEN(BAUD$) ( 6 THEN PAH$ = ",E,7,1,CD,DS,FE"
    TNCOM = 0: x0 = 0: t0 = 0: 2: GOSUB DIAL: CALL DELAY2
TNET2:
    IF LOC(2) () 0 THEN BA$ = INPUT$(LOC(2), 2): GOTO TNET2
    IF MODE = 0 THEN GOSUB MODEMINIT: CTOUT = 30: D1$ = FNDU1$: PRINT #2, D1$: M1$ = "ATDT"
    IF MODE = 1 THEN GOSUB MODEMINIT: CTOUT = 30: D1$ = "ATDT==TJPJ2": PRINT #2, D1$: M1$ = "ATDT"
TNET3:
    CALL GETCHAR: IF INSTR(A$, M1$) THEN GOTO TNET4:           ELSE IF AA$ = nc$ THEN BUSYF = 1: PUTINBUSYFILE: GOTO TNETRET: ELSE
GOTO TNET3
TNET4:
    M1$ = FNDUM$: R2$ = FNDUM$: R3$ = FNDUM$: CALL GETCHAR
    IF INSTR(A$, "CONNECT") THEN: GOTO ADDRCONNECT
    IF AA$ = nc$ THEN BUSYF = 1: BSTATE$ = 11: PUTINBUSYFILE: GOTO TNETRET
    IF INSTR(A$, "BUSY") THEN BUSYF = 1: BSTATE$ = 11: PUTINBUSYFILE: GOTO CLOSEF
    GOTO TNET4
```

```
THETRET:
 RETURN

ADDRCONNECT:
 INSDF = 0:
 CALL DELAY2: PRINT #2, CHR$(13):
 PRINT #2, CHR$(13):
 PRINT #2, CHR$(13):
addrconnect2:
 AI$ = "P": RC$ = "=": CALL GETCHAR: IF INSTR(A$, "UUUUUU") THEN BUSYF = 1: PUTINBUSYFILE: GOTO THETRET
ADDRCONNECT3:
 IF INSTR(A$, "P") AND INSDF = 0 THEN PRINT #2, twt$: INSDF = 1: GOTO addrconnect2
 IF INSTR(A$, "?") OR INSDF = 1 THEN PRINT #2, twt$: INSDF = 2: GOTO addrconnect2
 IF INSTR(A$, "ILLEGAL") OR INSDF = 1 THEN PRINT #2, twt$: GOTO addrconnect2
 IF INSTR(A$, "CONNECT") AND DIALFLG = 1 THEN GOTO DIALDS
 IF INSTR(A$, "CONNECT") AND DIALFLG = 0 THEN TNCON = 1: GOTO CLRBUF
 IF INSTR(A$, "REJECTING") THEN TNCON = 0: BUSYF = 1: PUTINBUSYFILE: GOTO THETRET
 IF INSTR(A$, "OPERATING") THEN BUSYF = 1: BSTATE# = 7: SKIPFLG = 1: PUTINBUSYFILE: GOTO THETRET
 IF INSTR(A$, "BUSY") THEN TNCON = 0: BUSYF = 1: PUTINBUSYFILE: GOTO THETRET
 IF AA$ = nc$ THEN BUSYF = 1: PUTINBUSYFILE: GOTO THETRET
 IF INSTR(A$, "=") THEN PRINT #2, CHR$(13): CALL DELAY2
 GOTO addrconnect2
ADDRCONRET:
 RETURN CLRBUF:
 R$
 ALL$ = LOC(2): DP$ = INPUT$(ALL$, 2): DP$ = ""
 LOOP WHILE ALL$ <> 0
 GOTO THETRET THETDISCON:
 PRINT #2, "P"
THETGETCHAR:
 CALL GETCHAR
 IF INSTR(A$, "P") THEN GOTO DISCONNECT1:      ELSE IF INSTR(A$, "?") THEN GOTO THETDISCON: ELSE IF AA$ = nc$ THEN TNCON = 0: GOTO THETRET: ELSE GOTO THETGETCHAR
DISCONNECT1:
 PRINT #2, "D"
THETGETCHAR1:
 CALL GETCHAR: IF INSTR(A$, "NOT CONNECTED") OR INSTR(A$, "DISCONNECTED") THEN GOTO NCONNECTION ELSE IF AA$ = nc$ THEN TNCON = 0: GOTO THETDISCONRETURN
 IF INSTR(A$, "?") THEN GOTO DISCONNECT1:      ELSE GOTO THETGETCHAR1
NCONNECTION:
 TNCON = 1:
THETDISCONRETURN:
 RETURN DIALDS: CTOUT = 0
 CALL DELAY2: PRINT #2, "DS"
DIALDS1:
 CALL GETCHAR: IF INSTR(A$, "CONNECT") THEN GOTO DIALDSRET
               IF INSTR(A$, "NOT OPERATING") THEN BUSYF = 1: BSTATE# = 7: SKIPFLG = 1: PUTINBUSYFILE: GOTO DIALDSRET
               IF INSTR(A$, nc$) OR AA$ = nc$ THEN BUSYF = 1: BSTATE# = 11: PUTINBUSYFILE: GOTO DIALDSRET
               GOTO DIALDS1
DIALDSRET:
 IF BUSYF = 0 THEN TNCON = 1:   ELSE TNCON = 0
 GOTO CLRBUF
CALLSTATE10:
 TEMFLG = 1: CTOUT = 0
END SUB
```

C.6

DELAY 2

```
SUB DELAY2
 ON ERROR GOTO LOCALHANDLER1:
 STARTDELAY:
 PP = TIMER + 2
 DO
 IF PP > (TIMER + 4) THEN GOTO STARTDELAY
 LOOP WHILE PP > TIMER
END SUB
```

C.7

DOUBLE DABBLE

```
SUB DOUBLEDABBLE
ON ERROR GOTO LOCALHANDLER1:
258 H$ = RSER$: IF LEN(H$) <> 8 THEN CC$ = "INVALID SER NUMBER FOR ROAMER " + RMID$ + " " + RSER$: CALL PRINTTONPAFILE(CC$): GOTO DOUBLERET
254 FOR X = 1 TO 8: H$(X) = MID$(H$, X, 1): GOSUB HEXTODEC: NEXT: GOSUB DOUBLE1: RSER1$ = SERCMP$: GOTO DOUBLERET:
HEXTODEC:
```

```
IF H$(X) = "A" OR H$(X) = "a" THEN H$(X) = "10"
IF H$(X) = "B" OR H$(X) = "b" THEN H$(X) = "11"
IF H$(X) = "C" OR H$(X) = "c" THEN H$(X) = "12"
IF H$(X) = "D" OR H$(X) = "d" THEN H$(X) = "13"
IF H$(X) = "E" OR H$(X) = "e" THEN H$(X) = "14"
IF H$(X) = "F" OR H$(X) = "f" THEN H$(X) = "15"
RETURN
DOUBLE1:
SERCMP$ = RIGHT$(STR$(VAL(H$(1)) * 16 ^ 7 + VAL(H$(2)) * 16 ^ 6 + VAL(H$(3)) * 16 ^ 5 + VAL(H$(4)) * 16 ^ 4 + VAL(H$(5)) * 16 ^ 3 + VAL
(H$(6)) * 16 ^ 2 + VAL(H$(7)) * 16 ^ 1 + VAL(H$(8))), 10)
RETURN

DOUBLERET:
END SUB
```

C.8

FIELDTNUM

```
SUB FIELDTNUM
ON ERROR GOTO LOCALHANDLER1:
CLOSE 11: OPEN "R", 11, "TNUM", 92
FIELD 11, 10 AS t$, 1 AS u$, 22 AS M$, 1 AS S$, 1 AS DEAT$, 8 AS TI$, 10 AS DTA$, 6 AS PHI$, 3 AS FE$, 10 AS PLENUM$, 15 AS CALFWD$, 5
AS CXR$
END SUB
```

C.9

GETCHAR

```
SUB GETCHAR
ON ERROR GOTO LOCALHANDLER1:
COM(2) OFF: IF CTOUT = 0 THEN TOUT = TIMER + 45:     ELSE TOUT = TIMER + CTOUT
IF TIMF = 0 THEN IF (CLKUP$ = SITE$) OR (CLKUP$ = "HOME" AND HOME = 1) THEN TIMF = 0:          ELSE TIMF = 1
BB$ = "": AA$ = "": A$ = "": EIT# = 0
WAITFORCHAR:
 IF LOC(2) ) 0 THEN GOTO GOTCHAR
  IF TIMER ) TOUT THEN EIT# = 2: b$ = CHR$(2): GOTO TIMEOUT:          ELSE IF (TOUT - TIMER) ) 45 THEN TOUT = TIMER + 30
 CS = CSRLIN: cr = POS(0): LOCATE 1, 60: PRINT TATD: LOCATE 1, 70: PRINT (TOUT - TIMER): LOCATE CS, cr: GOTO WAITFORCHAR
GOTCHAR:
 b$ = INPUT$(1, 2): TOUT = TOUT + .02
  IF (ASC(b$) = 10 OR ASC(b$) = 0 OR ASC(b$) ) 122 OR ASC(b$) = 17 OR ASC(b$) = 19 OR ASC(b$) = 16) THEN GOTO WAITFORCHAR:
    ELSE IF PRNFLG = 0 THEN PRINT b$;
TIMEOUT:
 IF (EIT# ) 1 AND LEN(A$) ( 5) THEN AA$ = nc$: BSTATER = 4: PRINT AA$: GOTO GETCHARET:         ELSE IF EIT# ) 0 THEN GOTO GETL
RET: ELSE IF ASC(b$) = 13 THEN GOTO LINETERMINATE: ELSE IF ASC(b$) = 3 THEN A$ = A$ + "("
 A$ = A$ + b$: IF INSTR(A$, nc$) THEN AA$ = nc$: GOTO GETCHARET:           ELSE IF LEN(A$) ) 125 THEN AA$ = nc$: GOTO GETCHARET:
ELSE IF INSTR(A$, M1$) THEN GOTO PRNTANDRET
 IF INSTR(A$, M2$) OR INSTR(A$, M3$) THEN GOTO PRNTANDRET:
GOTO WAITFORCHAR
LINETERMINATE:
 IF LEN(A$) = 0 THEN GOTO WAITFORCHAR
  IF (TIMF = 0 AND INSTR(A$, "TIME")) THEN X4# = INSTR(A$, ":"): Y4# = INSTR(A$, "/"): IF (X4# () 0 AND Y4# () 0) THEN DATE$ = MID$(A$
(Y4# - 2), 8): TIME$ = MID$(A$, (X4# - 2), 8): TIMF = 1: PRINT "Time updated"
PRNTANDRET:
 IF PRNFLG = 1 THEN PRINT ""
GETCHARET:
TCHGFLG = 1
END SUB
```

C.10

GETTNUMI

```
SUB GETTNUMI
 ON ERROR GOTO LOCALHANDLER1:
 CLOSE 6: OPEN "TNUMI" FOR INPUT AS 6
 INPUT #6, X$: RECORD# = VAL(X$): X$ = ""
 CLOSE 6:
 END SUB
```

C.11

MANUFTOHEX

```
SUB MANUFTOHEX
 ON ERROR GOTO LOCALHANDLER1:
 FOR YY = 1 TO 2: H$(YY) = MID$(RSER$, YY, 1): GOSUB MANU1: NEXT: D1$ = H$(1) + H$(2)
 D = (VAL(H$(1)) * 16 + VAL(H$(2)))
 D1$ = MID$(RSER$, 4, 5)
 IF LEN(D1$) < 5 THEN FOR YY = 1 TO (5 - LEN(D1$)): D1$ = "0" + D1$: NEXT
 FOR YY = 1 TO 5: H$(YY) = MID$(D1$, YY, 1): GOSUB MANU1: NEXT
 DD = VAL(H$(1)) * 16 ^ 4 + VAL(H$(2)) * 16 ^ 3 + VAL(H$(3)) * 16 ^ 2 + VAL(H$(4)) * 16 ^ 1 + VAL(H$(5)): SIMCMD$ = MID$(STR$(D), 2) +
"00" + MID$(STR$(DD), 2): IF LEN(SIMCMD$) = 11 THEN GOTO MANURET
 IF LEN(SIMCMD$) <> 11 THEN FOR M1 = 1 TO (11 - LEN(SIMCMD$)): SIMCMD$ = MID$(SIMCMD$, 1, 3) + "0" + RIGHT$(SIMCMD$, (11 - (11 - LEN(SI
MCMD$) + 3))): NEXT: GOTO MANURET
MANU1:
 IF ASC(H$(YY)) > 57 THEN D1 = ASC(H$(YY)) - 55: H$(YY) = STR$(D1)
RETURN

MANURET:
END SUB
```

C.12

OCTTOHEX

```
SUB OCTTOHEX
 ON ERROR GOTO LOCALHANDLER1:
 OC$ = LEFT$(OCSER$, 3): GOSUB OCT1: MH$ = HEX$(D) + "0": OC$ = RIGHT$(OCSER$, 7): GOSUB OCT1: GOSUB OCT2: MH$ = MH$ + H$
 IF LEN(MH$) <> 8 THEN FOR M1 = 1 TO (8 - LEN(MH$)): MH$ = MID$(MH$, 1, 3) + "0" + RIGHT$(MH$, (8 - (8 - LEN(MH$) + 3))): NEXT
 GOTO OCTRET
OCT1:
 FOR X = 1 TO LEN(OC$): OC$(X) = MID$(OC$, X, 1): NEXT: RP = LEN(OC$)
 D = 0: FOR X = 1 TO LEN(OC$): RP = RP - 1: D = D + VAL(OC$(X)) * 8 ^ (RP): NEXT
RETURN
OCT2:
 H$ = ""
 H$ = RIGHT$(STR$(INT(D / 65536!)), 1): IF VAL(H$) <> 0 THEN D = D - (65536! * VAL(H$))
 H$ = H$ + HEX$(D):
RETURN
OCTRET:
END SUB
```

C.13

PEEKCALL

```
SUB PEEKCALL
 ON ERROR GOTO LOCALHANDLER1:
 IF PEEK(3) = 0 THEN GOTO peekend
 cll$ = "": S = PEEK(3)
 FOR t = 0 TO (S - 1):
    FOR T1 = 0 TO 12:
       TY$ = HEX$(PEEK(CBX + (t * 13) + T1)))
       IF LEN(TY$) <> 2 THEN TY$ = "0" + TY$
       cll$ = cll$ + TY$
    NEXT
    TATD = TATD + 1: OPEN "D:BUFILE" FOR APPEND AS 16: PRINT #16, cll$: CLOSE 16: BUFFLG = 1
    cll$ = ""
    IF t = S THEN IF PEEK(3) <> S THEN S = PEEK(3) - 1
 NEXT: POKE 4, 0: POKE 5, 0: POKE 3, 0:
peekend:
END SUB
```

C.14

REMOVESPACE

```
SUB REMOVESPACE
ON ERROR GOTO LOCALHANDLER1:
 XS$ = ""
 FOR XS = 1 TO LEN(SA$)
  IF MID$(SA$, XS, 1) () " " THEN XS$ = XS$ + MID$(SA$, XS, 1)
 NEXT: SA$ = XS$
END SUB
```

C.15

RERUN

```
SUB RERUN
 CLOSE : OPEN "R", 1, "ACTSND", 46: CLOSE 2: OPEN "R", 2, "DEASND", 46
 FIELD 1, 2 AS STATE1$, 10 AS RMID1$, 8 AS RSER1$, 6 AS SITE1$, 10 AS TDN1$, 4 AS RCD1$, 6 AS SPARE1$: FIELD 2, 2 AS STATE$, 10 AS RMID
$, 8 AS RSER$, 6 AS SITE$, 10 AS TDN$, 4 AS RCD$, 6 AS SPARE$
 CALL GETTNUM1: FOR X = 1 TO RECORD#
 GET 1, X: IF VAL(STATE1$) () 0 AND VAL(RCD1$) () 0 THEN RN = VAL(RCD1$): GOSUB CLEARTNUM
 GET 2, X: IF VAL(STATE$) () 0 AND VAL(RCD$) () 0 THEN RN = VAL(RCD$): GOSUB CLEARTNUM
 GOSUB CLEARACTSND: PUT 1, X: GOSUB CLEARDEASND: PUT 2, X: NEXT: CLOSE 1: CLOSE 2: GOTO RERUN1
CLEARACTSND:
 LSET STATE1$ = SPACE$(2): LSET RMID1$ = SPACE$(10): LSET RSER1$ = SPACE$(8): LSET SITE1$ = SPACE$(6): LSET TDN1$ = SPACE$(10): LSET SP
ARE1$ = SPACE$(10)
 RETURN
CLEARDEASND:
 LSET STATE$ = SPACE$(2): LSET RMID$ = SPACE$(10): LSET RSER$ = SPACE$(8): LSET SITE$ = SPACE$(6): LSET TDN$ = SPACE$(10): LSET SPARE$
= SPACE$(10)
 RETURN
RERUN1:
 CLLFLG = 0: SNDD# = 0: SNDF# = 0: ACTR# = 0: DACT# = 0: BUFFLG = 0: BUSFLG = 0: BTIME = 0: RSTCTR = 0: CALL UPDATERSTAT: CLOSE : CALL
UPDATERSTAT

OPEN "D:BUSY" FOR APPEND AS 1: CLOSE 1: KILL "D:BUSY"
 SHELL "copy d:*.* c:\temp:":
 GOTO RERUNEND
CLEARTNUM:
 CALL FIELDTNUM: GET 11, RN
 LSET U$ = "N": LSET M$ = SPACE$(22): LSET S$ = " ": LSET DEAT$ = " ": LSET TI$ = SPACE$(8): LSET DTA$ = SPACE$(10): LSET PH1$ = SPACE$
(6): LSET FE$ = SPACE$(3): PUT 11, RN:
 RETURN

RERUNEND:
END SUB
```

C.16

RERUN2

```
SUB RERUN2
 IF TIMER ( RSTIMER THEN
  RSTCTR = RSTCTR + 1: CALL UPDATERSTAT
 ELSE RSTCTR = 0: CALL UPDATERSTAT: SHELL "COPY D:*.* C:\TEMP":
 END IF
END SUB

SUB SND1OPENFIELD
ON ERROR GOTO LOCALHANDLER1:
 CLOSE NF: OPEN "R", NF, NA$, 46
 FIELD NF, 2 AS STATE1$, 10 AS RMID1$, 8 AS RSER1$, 6 AS SITE1$, 10 AS TDN1$, 4 AS RCD1$, 6 AS SPARE1$: RN = 0:
END SUB
```

C.17

TESTCALL

```
    ERROR GOTO LOCALHANDLER1:
20100 IF INHEREFLG = 1 THEN GOTO testend:    ELSE TCHGFLG = 1: TIMER OFF
20101 IF MODE = 0 THEN 20160
20111 FOR ccv% = 1 TO 50:
20105 CLS : LOCATE 9, 1: IF WH$ = "" OR WH$ = "DEA" THEN WH$ = "ACT":    ELSE IF WH$ = "ACT" THEN WH$ = "DEA"
20110 CLOSE 13: KEY 8, WH$: OPEN "home" FOR INPUT AS 13: FOR X = 1 TO 11: LINE INPUT #13, q$: NEXT: CLOSE 13
20115 q$ = LEFT$(q$, LEN(q$) - 1): GOSUB 20127: NEXT ccv%: INHEREFLG = 0: GOTO testend
20127 IF RIGHT$(q$, 3) = "211" AND WH$ = "DEA" THEN q$ = LEFT$(q$, (LEN(q$) - 3)) + "311"
20128 IF RIGHT$(q$, 3) = "D18" AND WH$ = "DEA" THEN q$ = LEFT$(q$, (LEN(q$) - 3)) + "D19"
20129 IF RIGHT$(q$, 4) = "A18C" AND WH$ = "DEA" THEN q$ = LEFT$(q$, (LEN(q$) - 4)) + "A19C"
20155 PRINT q$
    Q$ = q$: CALL CONVER(QQ$): RETURN 20160 CLS : WH$ = "ACT":
20161 CLOSE 13: OPEN "home" FOR INPUT AS 13: FOR X = 1 TO 11: LINE INPUT #13, q$: NEXT: CLOSE 13
20165 q$ = LEFT$(q$, LEN(q$) - 1): GOSUB 20127: INHEREFLG = 0:

testend:
TIMER ON: TCHGFLG = 1:
END SUB
```

C.18

TIMESUB

```
SUB TIMESUB
ON ERROR GOTO LOCALHANDLER1:
161 IF MODE () 0 THEN RSCTR = RSCTR + 1:
191 GOSUB HEARTBEAT
193 IF PEEK(6) = 1 THEN BLT = BLT + 1:  IF BLT ) 50 THEN CC$ = DATE$ + " " + TIME$ + " " + "BASE LINE TIME OUT": CALL PRINTTONPAFILE(CC
$): SHELL "BOOT"
194 IF PEEK(6) () 1 THEN BLT = 0: POKE 6, 1
195 GOTO TIMERET
HEARTBEAT:
    CRSL = CSRLIN: CRO = POS(0)
    IF PO$ = "+" THEN PO$ = "-":        ELSE PO$ = "+"
    IF CRSL = 0 OR CRO = 0 THEN CRO = 1: CRSL = 1
    LOCATE 1, 1: PRINT PO$: LOCATE CRSL, CRO
RETURN

TIMERET:
TCHGFLG = 1
END SUB
```

C.19

TNUMSTABILITY

```
SUB tnumstability
ON ERROR GOTO LOCALHANDLER1:
IF SNDD$ () 0 OR SNDF$ () 0 OR MODAFLG () 0 OR MODDFLG () 0 OR BUSFLG () 0 THEN GOTO TNUMEND
TTDN# = 0: CLS : LOCATE 12, 35: PRINT "TDN CHECK"
CALL FIELDTNUM
FOR X = 1 TO RECORD#
GET 11, X: IF u$ = "Y" AND S$ = "N" THEN RCD$ = STR$(X): CC$ = "Roamer " + M$ + " record was clear out in TNUM file ": CALL PRINTTONPAF
ILE(CC$): CALL CLEARTNUM
IF u$ = "Y" AND S$ = "Y" THEN TTDN# = TTDN# + 1
NEXT
TNUMEND:
CALL UPDATERSTAT
END SUB
```

C.20

UPDATERSTAT

```
SUB UPDATERSTAT
SHARED TROAM#, TACT#, TDACT#, ACTR#, DACT#, SNDF#, SNDD#, FI$, FII$, BUFFLG, BUSFLG, BTIME, RSTCTR, SNMM#, SRDN#, MIDNV#, BUSCTR, TTD#
, BLT, MODE, CLLFLG
ON ERROR GOTO LOCALHANDLER1:
CLOSE 10: OPEN "RSTAT" FOR OUTPUT AS 10:
PRINT #10, TROAM#: PRINT #10, TACT#: PRINT #10, TDACT#: PRINT #10, ACTR#
PRINT #10, DACT#: PRINT #10, SNDF#: PRINT #10, SNDD#: PRINT #10, FI$: PRINT #10, FII$: PRINT #10, BUFFLG: PRINT #10, BUSFLG: PRINT #10
   BTIME
PRINT #10, RSTCTR: PRINT #10, SNMM#: PRINT #10, SRDN#: PRINT #10, MIDNV#: PRINT #10, BUSCTR: PRINT #10, TTDN#: PRINT #10, BLT: PRINT =
0, MODE: PRINT #10, CLLFLG:
PRINT #10, MODAFLG: PRINT #10, MODDFLG: PRINT #10, NCLLFLG: CLOSE 10:
TCHGFLG = 1
END SUB
```

C.21

VALIDATENAP

```
SUB VALIDATENPA
ON ERROR GOTO LOCALHANDLER1:
OPEN "R", 8, "D:NIFFILE", 58
 FIELD 8, 6 AS NP$, 6 AS SC$, 11 AS RODM$, 10 AS PM$, 10 AS MD$, 4 AS BUD$, 11 AS TM$
VALIDSTATE1:
 GET 8
 IF LEFT$(PHID$, 6) = NP$ THEN FHI$ = RODM$:            ELSE IF NP$ = SPACE$(6) OR VAL(NP$) = 0 THEN GOTO VALIDSTATE5: ELSE
 GOTO VALIDSTATE1
 I = INSTR(1, PM$, " "): PRES$ = MID$(PM$, 1, (I - 1))
 I = INSTR(1, MD$, " "): IF I > 0 THEN MODE$ = MID$(MD$, 1, (I - 1)):          ELSE MODE$ = MD$
 I = INSTR(1, BUD$, " "): IF I = 0 THEN I = LEN(BUD$) + 1: BAUD$ = MID$(BUD$, 1, (I - 1)): GOTO VALIDSTATE4
BAUD$ = MID$(BUD$, 1, (I - 1))
VALIDSTATE4:
IF TM$ = SPACE$(11) THEN tmet$ = "":           ELSE I = INSTR(1, TM$, " "): tmet$ = "C " + MID$(TM$, 1, (I - 1))
 GOTO VALIDSTATE6:
VALIDSTATE5:
PHI$ = "": CALL RERUN: CHAIN "POKECOM"
VALIDSTATE6:
 CLOSE 8:
TCHGFLG = 1
END SUB
```

C.22

DATECHECK

```
SUB datecheck
ON ERROR GOTO FM1HANDLER
MO# = VAL(LEFT$(DATE$, 2)):
DY# = VAL(MID$(DATE$, 4, 2)):
YR# = VAL(MID$(DATE$, 7, 4)):
MO$ = STR$(MO#):
DY$ = STR$(DY#):
YR$ = STR$(YR#)
END SUB
```

C.23

DELAY5

```
SUB DELAY5
ON ERROR GOTO FM1HANDLER
STARTDELAY:
PP = TIMER + 5
  DO
   IF PP > (TIMER + 10) THEN GOTO STARTDELAY
  LOOP WHILE PP > TIMER
END SUB
```

C.24

DENYHANDLER

```
SUB DENYHANDLER
ON ERROR GOTO FM1HANDLER
6500 IF VAL(MID$(SPARE$, 5, 2)) < 2 THEN BSTATE# = 10: SEROK = 0: FPTRAP = 0: PUTINBUSYFILE: GOTO DENYRET
6501 IF DSC# = 0 THEN CALL RERUN: CHAIN "pokecom"
6505 IF BSTATE# = 12 THEN 6518
6510 GET 11, DSC#: mm$ = M$: LSET M$ = SPACE$(22): LSET S$ = " ": LSET DEAT$ = SPACE$(1): LSET TI$ = SPACE$(8): LSET PHI$ = SPACE$(6):
  LSET FE$ = SPACE$(3): LSET DTA$ = SPACE$(10): LSET u$ = "N": PUT 11, DSC#
6513 IF SEROK = 5 THEN CC$ = FNERMSG$ + "ATT. TO ACT HIS FP DIDN'T ALLOW FMR ACTIVATION ": CALL PRINTTONPAFILE(CC$): X$ = "": GOTO 6518
6514 IF SEROK = 4 THEN CC$ = FNERMSG$ + "ATT. TO ACT. HIS ESN DID NOT MATCH MID " + HOSER$: CALL PRINTTONPAFILE(CC$): HOSER$ = "": SNNM
# = SNNM# + 1: GOTO 6518
6515 IF (SEROK = 3 AND FPTRAP () 2) OR (BSER# () 0) THEN CC$ = FNERMSG$ + "ATT. TO ACT. HIS ESN WAS MARKED DENIED SERVICE ": CALL PRIN
TTONPAFILE(CC$): SRDN# = SRDN# + 1: GOTO 6518
6516 IF FPTRAP = 2 AND (SEROK = 3 OR SEROK = 2) THEN CC$ = FNERMSG$ + "ATT. TO ACT. - HIS MID WAS NOT VALIDATED ": CALL PRINTTONPAFILE(
CC$): MIDNV# = MIDNV# + 1: GOTO 6518
6517 CC$ = FNTMMSG$ + "GOT TO 6500 CODE REASON UNKNOWN WORKING WITH MID=" + mm$: CALL PRINTTONPAFILE(CC$)
6518 LSET STATE$ = "07": PUT 4, RN: IF FI1$ = "ACTSND" THEN SNDF# = SNDF# - 1:   ELSE SNDD# = SNDD# - 1: TATD = TATD - 1
6519 MODAFLG = MODAFLG + 1
6520 CC$ = "": SEROK = 0: FPTRAP = 0: DSC# = 0:
DENYRET:
TCHGFLG = 1
END SUB
```

C.25

NEGWATSON

```
SUB NEGWATSON
ON ERROR GOTO FM1HANDLER
  DEF SEG = SG#: POKE 7, 255: SHELL "NWAT": DEF SEG = SG#: POKE 7, 250:
9553 TMPNFLG = 0: OPEN "NTEMP.TXT" FOR OUTPUT AS 15: OPEN "NTEXT.TXT" FOR INPUT AS 14
9554 IF EOF(14) THEN 9570 ELSE LINE INPUT #14, NCCL$: PRINT NCCL$
9555 IF INSTR(NCCL$, "C") THEN CC$ = FNTMMSG$ + "Mobile " + MID$(NCCL$, 10, 10) + " was notified": CALL PRINTTONPAFILE(CC$): GOTO 9554
9556 IF INSTR(NCCL$, "N") THEN NTMPFLG = 1: CC$ = FNTMMSG$ + "Att. notification to " + MID$(NCCL$, 10, 10) + " - mobile did not answer"
: CALL PRINTTONPAFILE(CC$): GOTO 9559
9557 IF INSTR(NCCL$, "B") THEN NTMPFLG = 1: CC$ = FNTMMSG$ + "Att. notification to " + MID$(NCCL$, 10, 10) + " - mobile was busy": CALL
  PRINTTONPAFILE(CC$): GOTO 9559
9558 IF INSTR(NCCL$, "H") THEN NTMPFLG = 1: CC$ = FNTMMSG$ + "Att. notification to " + MID$(NCCL$, 10, 10) + " mobile not found": CALL
PRINTTONPAFILE(CC$): CC$ = ""
9559 CALX = VAL(MID$(NCCL$, 20)) - 1: IF CALX = 0 THEN NTMPFLG = 0: CC$ = FNTMMSG$ + "Att. to notify " + RMID$ + " ten times unsuccessf
ully": CALL PRINTTONPAFILE(CC$): GOTO 9554:   ELSE NCCL$ = MID$(NCCL$, 1, 19) + RIGHT$(STR$(CALX), LEN(STR$(CALX)) - 1): PRINT #15, NCC
L$
9560 GOTO 9554
9570 CLOSE 14: CLOSE 15: IF NTMPFLG = 0 THEN KILL "NTEXT.TXT": NCLLFLG = 0: CALL UPDATERSTAT: CLS : GOTO NWATSONEND
9572 KILL "NTEXT.TXT": SHELL "RENAME NTEMP.TXT NTEXT.TXT": NCLLFLG = 1: CALL UPDATERSTAT: CLS :
NWATSONEND:
TCHGFLG = 1
END SUB
```

C.26

OPENACTSND

```
SUB OPENACTSND
ON ERROR GOTO FM1HANDLER
CLOSE NF: OPEN "R", NF, NA$, 46
FIELD NF, 2 AS STATE$, 10 AS RMID$, 8 AS RSER$, 6 AS SITE$, 10 AS TDN$, 4 AS RCD$, 6 AS SPARE$: RN = 0
TCHGFLG = 1
END SUB
```

C.27

PRINTTONPAFILE

```
SUB PRINTTONPAFILE (CC$) STATIC
ON ERROR GOTO FN1HANDLER
        'Input data CC$ = message to be printed
        'file #6 is opened as D:NPAmm-dd then close
        COMFILE$ = "NPA" + MID$(DATE$, 1, 5): CLOSE 6: OPEN COMFILE$ FOR APPEND AS 6: PRINT #6, CC$: CLOSE 6:
        CC$ = ""
TCHGFLG = 1
END SUB
```

C.28

PUTINBUSYFILE

```
SUB PUTINBUSYFILE
ON ERROR GOTO FN1HANDLER:
BUSYSTATE1:
    IF SANITYTEST = 1 THEN CC$ = "": GOTO BUSYRET:
    IF BSTATE# = 8 THEN CC$ = FNERMSG$ + "ATTEMPTED ACT/DE-ACT SYS-TAPE NOT ON LINE AT SITE " + SITE2$: GOTO BUSYSTATE2
    IF HOME = 1 THEN SITE2$ = "LOCAL":     ELSE SITE2$ = SITE$:
    IF MID$(SPARE$, 5, 2) = " " THEN buctr = 0:            ELSE buctr = VAL(MID$(SPARE$, 5, 2))
    IF (SITE2$ = "LOCAL" OR (TIMER ) 0 AND TIMER ( 216000)) THEN NPRMFLG = NPRMFLG + 1:  ELSE NPRMFLG = 0
    buctr = buctr + 1: IF (buctr ) 0 AND F11$ = "ACTSND" AND STATE$ = "04") THEN STA$ = "02": chgflg = 1: buctr = 1: F11$ = "DEASND": GO
TO BUSYSTATE2:     ELSE STA$ = STATE$: chgflg = 0
BUSYSTATE2:
    IF buctr ) 0 AND NPRMFLG = 0 THEN GOTO BUSYSTATE5:              ELSE IF BSTATE# = 10 THEN BUSCTR = BUSCTR - 1
    IF SITE$ = "HSTNTX" THEN PRINT #2, CHR$(17)!: PRINT #2, CHR$(17)!
    BUSCTR = BUSCTR + 1: OPEN "D:BUSY" FOR APPEND AS 6: PRINT #6, F11$: PRINT #6, STA$:PRINT #6, MID$: PRINT #6, RSER$: PRINT #6, SITE
$: PRINT #6, TDM$: PRINT #6, RCD$
BUSYSTATE3:
    IF F11$ = "ACTSND" AND VAL(STA$) ( 4 THEN SNDF# = SNDF# - 1
    IF F11$ = "ACTSND" AND VAL(STA$) = 4 THEN MODMFLG = MODMFLG - 1
    IF F11$ = "DEASND" AND VAL(STA$) ( 4 THEN SNDD# = SNDD# - 1
    IF F11$ = "DEASND" AND VAL(SA1$) = 4 THEN MODDFLG = MODDFLG - 1
    IF STA$ = "02" AND chgflg = 1 THEN F11$ = "ACTSND": BSTATE# = 13: STA$ = "04": GOTO BUSYSTATE3
    IF SNDF# ( 0 THEN SNDF# = 0:
    IF SNDD# ( 0 THEN SNDD# = 0
    ZN = VAL(RCD$): GET 11, ZN: PUT 11, ZN: LSET SPARE$ = "BUSY" + STR$(buctr): PRINT #6, SPARE$
    CLOSE 6: TS$ = "06": RV$ = RCD$: mm$ = MID$: CALL CLEARFILE: BTIME = TIMER + 15: GOSUB BUSYMSG: GOTO BUSYRET
BUSYSTATE5:
    ZN = VAL(RCD$): GET 11, ZN: IF F11$ = "ACTSND" THEN CALL CLEARTNUM: TTDN# = TTDN# - 1:           ELSE IF F11$ =
"DEASND" AND STATE$ = "04" THEN CALL CLEARTNUM: ELSE IF F11$ = "DEASND" AND STATE$ = "01" THEN GOSUB REACTTNUM
    IF F11$ = "ACTSND" AND VAL(STA$) ( 4 THEN SNDF# = SNDF# - 1
    IF F11$ = "ACTSND" AND VAL(STA$) = 4 THEN MODMFLG = MODMFLG - 1
    IF F11$ = "DEASND" AND VAL(STA$) ( 4 THEN SNDD# = SNDD# - 1: IF VAL(STA$) = 2 THEN CALL CLEARTNUM: GOTO busystate6:   ELSE GOTO busys
tate6
    IF F11$ = "DEASND" AND VAL(SAT$) = 4 THEN MODDFLG = MODDFLG - 1
    IF STA$ = "02" THEN F11$ = "ACTSND": STA$ = "04": BSTATE# = 13: GOTO BUSYSTATE3
busystate6:
    GOSUB NEGMAT
    IF F11$ = "ACTSND" THEN F13$ = "ACTIVATION":     ELSE F13$ = "DE-ACTIVATION"
    CC$ = FNTMMSG$ + F13$ + " of " + MID$ + " was thrown away": CALL PRINTTONPAFILE(CC$): THRMFLG = THRMFLG + 1
    TS$ = " ": RV$ = "  ": CALL CLEARFILE: GOTO BUSYRET REACTTNUM:
    ZN = VAL(RCD$): GET 11, ZN: LSET DEAT$ = " ": LSET S$ = "Y": LSET TI$ = TIME$: LSET DTA$ = DATE$: PUT 11, ZN: RETURN
BUSYMSG:
    IF BSTATE# = 0 THEN GOTO BUSYSTATE10
    IF (NPRMFLG )= 2 AND buctr = 2: BUSFLG = 1: CALL UPDATERSTAT:    ELSE IF BSTATE# = 1 THEN CC$ = FNERMSG$ + "ATT. ACT
. - FEAT. PKG WAS INCORRECT " + q$ + "-SITE =" + SITE2$: GOTO BUSYSTATE10
    IF BSTATE# = 2 THEN CC$ = FNERMSG$ + "ATT. TO CANCEL CALL FWD RESPONSE ERROR RCD-SITE =" + SITE2$: GOTO BUSYSTATE10
    IF BSTATE# = 4 THEN CC$ = FNERMSG$ + "ACT. ACT/DE-ACT " + "TIME OUT RESPONSE ON A CMD.-SITE=" + SITE2$: GOTO BUSYSTATE10
    IF BSTATE# = 5 THEN CC$ = FNERMSG$ + "ACT. ACT/DE-ACT " + "I/O PORT WAS OUT OF SERVICE AT " + SITE2$: GOTO BUSYSTATE10
    IF BSTATE# = 6 THEN CC$ = FNERMSG$ + "ACT. ACT/DE-ACT " + "TO MANY OPERATOR'S LOG ON AT " + SITE2$: hstnflg = 1: GOTO BUSYSTATE10
    IF BSTATE# = 7 THEN CC$ = FNERMSG$ + "ATTEMPTED ACT/DE-ACT - TRL. LOGGING INTO " + SITE2$: HOME = 0: GOTO BUSYSTATE10
    IF BSTATE# = 3 THEN CC$ = FNTMMSG$ + mm$ + " " + "ACT. ACT/DE-ACT " + "- MODEM DIDN'T CONNECT AT SITE " + SITE2$: GOTO BUSYSTATE10
    IF BSTATE# = 10 THEN BUSFLG = 1: CALL UPDATERSTAT: BSTATE# = 0: GOTO BUSYSTATE11
    IF BSTATE# = 9 THEN CC$ = FNERMSG$ + "ACT. ACT/DE-ACT " + "TRL. DIALING SITE " + SITE2$: GOTO BUSYSTATE10
    IF BSTATE# = 11 THEN CC$ = FNTMMSG$ + mm$ + " TRL. CALLING LOCAL TELENET ": GOTO BUSYSTATE10
    IF BSTATE# = 12 THEN CC$ = FNERMSG$ + " BAD FORMAT FOR COMMAND =" + SIMCMD$ + DASCMD$: GOTO BUSYSTATE10
    IF BSTATE# = 13 THEN CC$ = FNTMMSG$ + mm$ + "ACTIVATION CANCELLED GOING BACK TO CANCEL CALL FWD IN ROAMER HOME SWITCH": GOTO BUSYST
ATE10
    IF BSTATE# = 14 THEN CC$ = FNTMMSG$ + mm$ + "SIMS FILE IN USED - SITE =" + SITE2$: GOTO BUSYSTATE10
BUSYSTATE9:
    CC$ = FNERMSG$ + "ACT. ACT/DE-ACT " + "- UNEXP. ERROR FROM - SITE =" + SITE2$
BUSYSTATE10:
    IF buctr = 4 THEN cc1$ = CC$: PORTFLG = 1: ELSE PORTFLG = 0: cc1$ = ""
    CALL PRINTTONPAFILE(CC$): BUSFLG = 1: CALL UPDATERSTAT: BSTATE# = 0:
BUSYSTATE11:
    RETURN NEGMAT:
    IF CONF$ = "-EG" THEN OPEN "NIEXT.TXT" FOR APPEND AS 14: PRINT #14, "?" + MID$(TDM$, 4, 7) + "-" + MID$ + "10": CLOSE 14: NCLLFLG = 1
: UPDATERSTAT
    RETURN
BUSYRET:
    TCHGFLG = 1
END SUB
```

C.29

SAVENPAFILE

```
SUB SAVENPAFILE
4250 ON ERROR GOTO FM1HANDLER
4251 ferflg = 0: TCHGFLG = 1: TIMER OFF: CLOSE 12: CLOSE 15:
4253 OPEN ccmfil$ FOR INPUT AS 12: OPEN "D:NPA" FOR OUTPUT AS 15
4255 IF EOF(12) THEN GOTO 4257
4256 INPUT #12, A$: PRINT #15, A$: IF ER () 61 THEN 4255
  CLS : LOCATE 12, 12: PRINT "NPA FILE TO LARGE TO VIEW USE FMRINS PROGRAM"
  LOCATE 13, 12: INPUT "Enter return continue"; q$: ferflg = 1:
4257 CLOSE 12: CLOSE 15: TIMER ON:
4265 '
END SUB
```

C.30

STATUS

```
SUB STATUS
ON ERROR GOTO FM1HANDLER
STAT1$ = "State=" + STR$(STATE%) + " Working on " + FI1$ + " file for roamer " + RMID$ + " busy retries=" + MID$(SPARE$, 5, 2)
END SUB
```

C.31

TESTCALL500

```
SUB TESTCALL500
ON ERROR GOTO FM1HANDLER:
CLS : LOCATE 12, 1: PRINT " Enter your password now ";
    pass$ = INPUT$(5): pass$ = UCASE$(pass$)
    IF pass$ () "ELMER" THEN GOTO ENDTEST1

CLS : LOCATE 12, 12: INPUT "Enter Roamer's Mid (i.e.7138820821) "; q$
    LOCATE 13, 12: INPUT "Enter Roamer's Esn (as depicted in call records) "; Q1$
    LOCATE 14, 12: INPUT "Enter Act or De-Act code (i.e, 211/311 or B18/B19) "; q2$
    IF P6$ = "AUTOPLEX100" THEN q3$ = q$ + "0" + Q1$ + "0" + q2$: q3$ = UCASE$(q3$)
    IF INSTR(P6$, "EMX") OR P6$ = "AUTOPLEX10" THEN q3$ = q$ + "0002" + Q1$ + "0" + q2$: q3$ = UCASE$(q3$)
    OPEN "D:BUFILE" FOR APPEND AS 13: BUFFLG = 1
    PRINT #13, q3$: CLOSE 13:
ENDTEST1:
CLS : TCHGFLG = 1
END SUB
```

C.32

WATSONCALL

```
SUB WATSONCALL
ON ERROR GOTO FM1HANDLER
IF TESTFLG = 1 THEN TMPFLG = 0: TESTFLG = 0: GOTO 1570
  DEF SEG = SG%: POKE 7, 255: SHELL "WAT": DEF SEG = SG%: POKE 7, 250:
1553 TMPFLG = 0: OPEN "TEMP.TXT" FOR OUTPUT AS 15: OPEN "TEXT.TXT" FOR INPUT AS 14
1554 IF EOF(14) THEN 1570 ELSE LINE INPUT #14, CCL$: PRINT CCL$
1555 IF INSTR(CCL$, "C") THEN CC$ = FNTMMSG$ + "Mobile " + MID$(CCL$, 10, 10) + " was notified": CALL PRINTTONPAFILE(CC$): GOTO 1554
1556 IF INSTR(CCL$, "N") THEN TMPFLG = 1: CC$ = FNTMMSG$ + "Att. notification to " + MID$(CCL$, 10, 10) + " - mobile did not answer": CALL PRINTTONPAFILE(CC$): GOTO 1559
1557 IF INSTR(CCL$, "B") THEN TMPFLG = 1: CC$ = FNTMMSG$ + "Att. notification to " + MID$(CCL$, 10, 10) + " - mobile was busy": CALL PRINTTONPAFILE(CC$): GOTO 1559
```

1558 IF INSTR(CCL$, "H") THEN TMPFLG = 1: CC$ = FNTMMSG$ + "Att. notification to " + MID$(CCL$, 10, 10) + " mobile not found": CALL PRINTTONPAFILE(CC$): CC$ = ""
1559 CALX = VAL(MID$(CCL$, 20)) - 1: IF CALX = 0 THEN TMPFLG = 0: CC$ = FNTMMSG$ + "Att. to notify " + RMID$ + " ten times unsuccessfully": CALL PRINTTONPAFILE(CC$): GOTO 1554:        ELSE CCL$ = MID$(CCL$, 1, 19) + RIGHT$(STR$(CALX), LEN(STR$(CALX)) - 1): PRINT #15, CCL$
1560 CALL TIMESUB: GOTO 1554
1570 CLOSE 14: CLOSE 15: IF TMPFLG = 0 THEN KILL "TEXT.TXT": CLLFLG = 0: CALL UPDATERSTAT: CLS : GOTO WATSONEND
1572 KILL "TEXT.TXT": SHELL "RENAME TEMP.TXT TEXT.TXT": CLLFLG = 1: CALL UPDATERSTAT: CLS :
WATSONEND:
TCHGFLG = 1
END SUB

COPYRIGHT INFORMATION

ALL ~~THE~~ SOFTWARE PROGRAMMING DISCLOSED IN THIS PATENT DOCUMENT IS COPYRIGHTED TO GTE MOBILNET INCORPORATED ("GTEM"). GTEM HEREBY CONSENTS TO THE REPRODUCTION OF THE COPYRIGHTED SOFTWARE DISCLOSED IN THIS PATENT DOCUMENT, BUT ONLY SO FAR AS SUCH REPRODUCTION IS UNDERTAKEN SOLELY AS NECESSARY IN CONJUNCTION WITH THE REPRODUCTION OF AN ISSUED PATENT IN WHICH THE COPYRIGHTED SOFTWARE APPEARS.  GTEM RESERVES UNTO ITSELF THE RIGHT TO USE THE COPYRIGHTED SOFTWARE FOR ALL OTHER PURPOSES, INCLUDING, BUT NOT LIMITED TO, THE PURPOSES DISCLOSED OR SUGGESTED BY THIS PATENT DOCUMENT AND INCLUDING THE CREATION OF DERIVATIVE WORKS.

COPYRIGHT
GTE Mobilnet Incorporated

Appendix D
FMR.EXEC

```
1: #LIST           EQU   1
2: SYSTEM10        EQU   1
3: SYSTEM100      EQU   0
4: SYSTEM500      EQU   0
5: SYSTEM1000     EQU   0
6: SYSTEM2500     EQU   0
7: SYSTEMASTRO    EQU   0
8: SYSTEMASTRO1   EQU   0
9: SYSTEMNOVA     EQU   0
10: SYSTEMEXRD    EQU   0
11: SYSTEMFMR     EQU   0
12: AUSTIN              EQU   0
13: HOUSTON       EQU   0
14: CINN          EQU   0
15: ATLANTA       EQU   0
16: DALLAS              EQU   0
17: MIAMI               EQU   0
18: SAN ANTONIO  EQU   1
19: JACKSONVILLE EQU   0
20: CLEVELAND    EQU   0
21: AKRON              EQU   0
22: YOUNGSTOWN   EQU   0
23: ORLANDO      EQU   0
24: TAMPA              EQU   0
25: FT MYERS     EQU   0
26: CORPUS             EQU   0
27:              IF1
28:              %OUT   ASSEMBLER PASS # 1
```

```
29:             ENDIF
30:             IF2
31:             %OUT    ASSEMBLER PASS # 2
32:             ENDIF
33:             %OUT    E.L.Didion & E.Lyle FMR Application 1
34:             .286C
35:             .ALPHA
36:             PAGE    66,132
37:             DOSSEG
38:             IF      LIST
39:             .LIST
40:             ENDIF
41:             IF      SYSTEM500
42:             TITLE   MOTOROLA EMX 500/25/100 ASSEMBLY
43:             ENDIF
44:             IF      SYSTEM2500
45:             TITLE   MOTOROLA/DIGITAL SWITCH CO. EMX 2500 ASSEMBLY
46:             ENDIF
47:             IF      SYSTEM10
48:             TITLE   AT&T AUTOPLEX 10 ASSEMBLY
49:             ENDIF
50:             IF      SYSTEM100
51:             TITLE   AT&T AUTOPLEX 100 ASSEMBLY
52:             ENDIF
53:             IF      SYSTEM1000
54:             TITLE   AT&T AUTOPLEX 1000 ASSEMBLY
55:             ENDIF
56:             IF      SYSTEMASTRO
57:             TITLE   ASTRONET ASSEMBLY
58:             ENDIF
59:             IF      SYSTEMASTRO1
60:             TITLE   ASTRONET ASSEMBLY
61:             ENDIF
62: WP          EQU     WORD PTR
63: BYP         EQU     BYTE PTR
64: FS1B        EQU     4
65: STACKSIZE   EQU     400
66: ZSEG        SEGMENT PARA    PUBLIC
67: ZSEG        ENDS
68: SGROUP              SEGMENT PARA STACK     'STACK'
69:             DB      STACKSIZE DUP(0)
70: SGROUP              ENDS
71: CGROUP              SEGMENT PARA PUBLIC    'CODE'
72: ASSUME      CS:CGROUP,DS:CGROUP,ES:CGROUP,SS:SGROUP
73: START       PROC    FAR
74:             JMP     BEGIN
75: BUFFLAG1    DB      0
76: CALLBUFP    DW      0
77: FLAG        DB      0
78: PORT_ACTIVE DB      255             ;USED TO TELL IF WE SHOULD PRINT CHAR
79:             DW      PORT1FMRA       ;COMPLETED 2/10/88
80:             DW      PORT1FMRC       ;COMPLETED 2/10/88
81:             DW      PORT1TCA        ;COMPLETED 2/1/88
82:             DW      PORT1TCC        ;COMPLETED 2/1/88
83:             DW      PORT1TRCA       ;COMPLETED 2/5/88
84:             DW      PORT1TRCC       ;COMPLETED 2/5/88
85:             DW      PORT1TDDD       ;COMPLETED 2/20/88
86:             DW      PORT1OPER       ;COMPLETED 2/20/88
87: SGRPI               DW      T1GRPI  ;COMPLETED 2/16/88
88:             DW      PORT2G          ;COMPLETED 2/17/88
89:             DW      PORT3G          ;COMPLETED 2/17/88
90:             DW      PORT4GRPI       ;COMPLETED 2/17/88
91: SGRP        DW      PORT1TGRP1      ;COMPLETED 2/17/88
92:             DW      PORT2TGRP1      ;COMPLETED 2/17/88
93:             DW      PORT3TGRP1      ;COMPLETED 2/17/88
94:             DW      PORT4TGRP1      ;COMPLETED 2/17/88
95: STRK        DW      PORT1TRK1       ;COMPLETED 2/17/88
96:             DW      PORT2TRK1       ;COMPLETED 2/17/88
97:             DW      PORT3TRK1       ;COMPLETED 2/17/88
98:             DW      PORT4TRK1       ;COMPLETED 2/17/88
99:             DW      CALLBUF
100:            IF      SYSTEM500
101:            DW      CELL_1
102:            ENDIF
103: PORT1FMRA  DW      0       ;TOTAL FMR CALL ATTEMPTS (ALIAS BIT)
104: PORT2FMRA  DW      0       ;TOTAL FMR CALL ATTEMPTS (ALIAS BIT)
105: PORT3FMRA  DW      0       ;TOTAL FMR CALL ATTEMPTS (ALIAS BIT)
106: PORT4FMRA  DW      0       ;TOTAL FMR CALL ATTEMPTS (ALIAS BIT)
107: PORT1FMRC  DW      0       ;TOTAL FMR CALL COMPLETED (ALIAS BIT)
108: PORT2FMRC  DW      0       ;TOTAL FMR CALL COMPLETED (ALIAS BIT)
```

```
109: PORT3FMRC    DW    0    ;TOTAL FMR CALL COMPLETED (ALIAS BIT)
110: PORT4FMRC    DW    0    ;TOTAL FMR CALL COMPLETED (ALIAS BIT)
111: PORT1TCA     DD    0    ;PORT 1 TOTAL ATTEMPTED CALLS
112: PORT2TCA     DD    0    ;PORT 2 TOTAL ATTEMPTED CALLS
113: PORT3TCA     DD    0    ;PORT 3 TOTAL ATTEMPTED CALLS
114: PORT4TCA     DD    0    ;PORT 4 TOTAL ATTEMPTED CALLS
115: PORT1TCC     DD    0    ;PORT 1 TOTAL COMPLETED CALLS
116: PORT2TCC     DD    0    ;PORT 2 TOTAL COMPLETED CALLS
117: PORT3TCC     DD    0    ;PORT 3 TOTAL COMPLETED CALLS
118: PORT4TCC     DD    0    ;PORT 4 TOTAL COMPLETED CALLS
119: PORT1TRCA    DW    0    ;PORT 1 TOTAL ROAMER ATTEMPTED CALLS
120: PORT2TRCA    DW    0    ;PORT 2 TOTAL ROAMER ATTEMPTED CALLS
121: PORT3TRCA    DW    0    ;PORT 3 TOTAL ROAMER ATTEMPTED CALLS
122: PORT4TRCA    DW    0    ;PORT 4 TOTAL ROAMER ATTEMPTED CALLS
123: PORT1TRCC    DW    0    ;PORT 1 TOTAL ROAMER COMPLETED CALLS
124: PORT2TRCC    DW    0    ;PORT 2 TOTAL ROAMER COMPLETED CALLS
125: PORT3TRCC    DW    0    ;PORT 3 TOTAL ROAMER COMPLETED CALLS
126: PORT4TRCC    DW    0    ;PORT 4 TOTAL ROAMER COMPLETED CALLS
127: PORT1TDDD    DW    0    ;PORT 1 TOTAL 1+ (DDD) CALLS
128: PORT2TDDD    DW    0    ;PORT 2 TOTAL 1+ (DDD) CALLS
129: PORT3TDDD    DW    0    ;PORT 3 TOTAL 1+ (DDD) CALLS
130: PORT4TDDD    DW    0    ;PORT 4 TOTAL 1+ (DDD) CALLS
131: PORT1OPER    DW    0    ;TOTAL PORT 1 0+ (OPR) CALLS
132: PORT2OPER    DW    0    ;TOTAL PORT 2 0+ (OPR) CALLS
133: PORT3OPER    DW    0    ;TOTAL PORT 3 0+ (OPR) CALLS
134: PORT4OPER    DW    0    ;TOTAL PORT 4 0+ (OPR) CALLS
135: PORT1GRPI    DB    0    ;NUMBER OF ACTIVE GROUPS TO STUDY
136: PORT1TGRP1   DW    0    ;TRUNK GROUP NUMBER TO STUDY #1
137: PORT1TGRP2   DW    0    ;TRUNK GROUP NUMBER TO STUDY #2
138: PORT1TGRP3   DW    0    ;TRUNK GROUP NUMBER TO STUDY #3
139: PORT1TGRP4   DW    0    ;TRUNK GROUP NUMBER TO STUDY #4
140: PORT1TGRP5   DW    0    ;TRUNK GROUP NUMBER TO STUDY #5
141: PORT2GRPI    DB    0    ;NUMBER OF ACTIVE GROUPS TO STUDY
142: PORT2TGRP1   DW    0    ;TRUNK GROUP NUMBER TO STUDY #1
143: PORT2TGRP2   DW    0    ;TRUNK GROUP NUMBER TO STUDY #2
144: PORT2TGRP3   DW    0    ;TRUNK GROUP NUMBER TO STUDY #3
145: PORT2TGRP4   DW    0    ;TRUNK GROUP NUMBER TO STUDY #4
146: PORT2TGRP5   DW    0    ;TRUNK GROUP NUMBER TO STUDY #5
147: PORT3GRPI    DB    0    ;NUMBER OF ACTIVE GROUPS TO STUDY
148: PORT3TGRP1   DW    0    ;TRUNK GROUP NUMBER TO STUDY #1
149: PORT3TGRP2   DW    0    ;TRUNK GROUP NUMBER TO STUDY #2
150: PORT3TGRP3   DW    0    ;TRUNK GROUP NUMBER TO STUDY #3
151: PORT3TGRP4   DW    0    ;TRUNK GROUP NUMBER TO STUDY #4
152: PORT3TGRP5   DW    0    ;TRUNK GROUP NUMBER TO STUDY #5
153: PORT4GRPI    DB    0    ;NUMBER OF ACTIVE GROUPS TO STUDY
154: PORT4TGRP1   DW    0    ;TRUNK GROUP NUMBER TO STUDY #1
155: PORT4TGRP2   DW    0    ;TRUNK GROUP NUMBER TO STUDY #2
156: PORT4TGRP3   DW    0    ;TRUNK GROUP NUMBER TO STUDY #3
157: PORT4TGRP4   DW    0    ;TRUNK GROUP NUMBER TO STUDY #4
158: PORT4TGRP5   DW    0    ;TRUNK GROUP NUMBER TO STUDY #5
159: PORT1TRK1    DW    0    ;PORT 1 TRUNK GRP 1 (TRK GRP STUDY)
160: PORT1TRK2    DW    0    ;PORT 1 TRUNK GRP 2 (TRK GRP STUDY)
161: PORT1TRK3    DW    0    ;PORT 1 TRUNK GRP 3 (TRK GRP STUDY)
162: PORT1TRK4    DW    0    ;PORT 1 TRUNK GRP 4 (TRK GRP STUDY)
163: PORT1TRK5    DW    0    ;PORT 1 TRUNK GRP 5 (TRK GRP STUDY)
164: PORT2TRK1    DW    0    ;PORT 2 TRUNK GRP 1 (TRK GRP STUDY)
165: PORT2TRK2    DW    0    ;PORT 2 TRUNK GRP 2 (TRK GRP STUDY)
166: PORT2TRK3    DW    0    ;PORT 2 TRUNK GRP 3 (TRK GRP STUDY)
167: PORT2TRK4    DW    0    ;PORT 2 TRUNK GRP 4 (TRK GRP STUDY)
168: PORT2TRK5    DW    0    ;PORT 2 TRUNK GRP 5 (TRK GRP STUDY)
169: PORT3TRK1    DW    0    ;PORT 3 TRUNK GRP 1 (TRK GRP STUDY)
170: PORT3TRK2    DW    0    ;PORT 3 TRUNK GRP 2 (TRK GRP STUDY)
171: PORT3TRK3    DW    0    ;PORT 3 TRUNK GRP 3 (TRK GRP STUDY)
172: PORT3TRK4    DW    0    ;PORT 3 TRUNK GRP 4 (TRK GRP STUDY)
173: PORT3TRK5    DW    0    ;PORT 3 TRUNK GRP 5 (TRK GRP STUDY)
174: PORT4TRK1    DW    0    ;PORT 4 TRUNK GRP 1 (TRK GRP STUDY)
175: PORT4TRK2    DW    0    ;PORT 4 TRUNK GRP 2 (TRK GRP STUDY)
176: PORT4TRK3    DW    0    ;PORT 4 TRUNK GRP 3 (TRK GRP STUDY)
177: PORT4TRK4    DW    0    ;PORT 4 TRUNK GRP 4 (TRK GRP STUDY)
178: PORT4TRK5    DW    0    ;PORT 4 TRUNK GRP 5 (TRK GRP STUDY)
179: PORT1_STATE  DW    0
180: PORT2_STATE  DW    0
181: PORT3_STATE  DW    0
182: PORT4_STATE  DW    0
183: PORT1_WA     DW    0
184: PORT2_WA     DW    0
185: PORT3_WA     DW    0
186: PORT4_WA     DW    0
187: PORT1_CCT    DW    0
188: PORT2_CCT    DW    0
```

```
189: PORT3_CCT      DW      0
190: PORT4_CCT      DW      0
191: PORT1_UART     DW      1A0H
192: PORT2_UART     DW      1A8H
193: PORT3_UART     DW      1B0H
194: PORT4_UART     DW      1B8H
195: CALLBUF   DW   2000 DUP(0)
196: TEMPBUF        DW      150 DUP(0)
197: ATTB          DB      15
198: WHEN          EQU     35540
199: TRACE         DW      0
200: INT_ACT       DB      0
201: PORT_BUSY     DB      0
202: FNAME         DB      'C:\OS1\DAST.TXT',0
203: HANDLE        DW      0
204: ;
205: COMMENT !
206: BAUD RATE'S ARE AS FOLLOWS:
207: 110 BAUD=1740H
208: 300 BAUD=8001H
209: 600 BAUD=C000H
210: 1200 BAUD=6000H
211: 1800 BAUD=4000H
212: 2400 BAUD=3000H
213: 3600 BAUD=2000H
214: 4800 BAUD=1800H
215: 9600 BAUD=0C00H
216:
217: PARITY EQUAL AS FOLLOWS:
218: BITS 1-0=CHARACTER LENGTH( 00=5 BITS 01=6 BITS 10=7 BITS  11=8 BITS)
219:
220: BIT    2=NUMBER OF STOP BITS (0-1 1=1.5 IF CHAR LENGTH=5 ELSE 1=2)
221:
222: BIT    3=PARITY (1=ENABLE PARITY 0=DON'T GENERATE PARITY)
223:
224: BIT    4=PARITY TYPE (0=ODD 1=EVEN)
225:
226: BIT    5=STICK PARITY (CAUSES PARITY TO ALWAYS BE 1 OR 0)
227:        THIS IS MARK OR SPACE PARITY
228:        0=DISABLE STICK PARITY
229:        1=MARK IF BIT 3=1 AND BIT 4=0
230:        1=SPACE IF BIT 3=1 AND BIT 4=1
231:        1=NO PARITY IF BIT 3=0
232:
233: BIT    6=SET BREAK (CAUSES OUTPUT OF STRING OF 0'S TO REMOTE
234:             THIS IS NEVER USED IN FMR
235:
236: BIT    7=TOGGLES PORT ADDRESS OF OTHER REGISTERS ON CHIP
237:
238: NORMALY BIT'S 5-7 ARE SET TO ZERO (0)
239:
240: !
241:             IF      SYSTEM500
242: PORT1_BAUD   DW      6000H   ;9600 BAUD
243: PORT2_BAUD   DW      6000H   ;9600 BAUD
244: PORT3_BAUD   DW      6000H   ;9600 BAUD
245: PORT4_BAUD   DW      6000H   ;9600 BAUD
246: PORT1_PAR    DW      1BH     ;8 N 1
247: PORT2_PAR    DW      1BH     ;8 N 1
248: PORT3_PAR    DW      1BH     ;8 N 1
249: PORT4_PAR    DW      1BH     ;8 N 1
250: PORT1_IMASK  DW      1       ;REC INTERRUPT ONLY
251: PORT2_IMASK  DW      1       ;REC INTERRUPT ONLY
252: PORT3_IMASK  DW      1       ;REC INTERRUPT ONLY
253: PORT4_IMASK  DW      1       ;REC INTERRUPT ONLY
254: SYSTEMNAME   DB      6,1,26,'Motorola  E.M.X. 500/250/100'
255:              DB      6,2,9,'FMR System Rev 4.08 June 18,1988 Written by E.L.Didion & E.Lyle'
256:              IF      AUSTIN
257:              DB      6,3,26,'AUSTIN (RSA-Victoria) System'
258:              ENDIF
259:              IF      CLEVELAND
260:              DB      6,3,32,'CLEVELAND System'
261:              ENDIF
262:              IF      AKRON
263:              DB      6,     'AKRON System'
264:              ENDIF
265:              IF      FT
266:              DB      6,3,31,'FORT MYERS System'
267:              ENDIF
268:              IF      JACKSONVILLE
269:              DB      6,3,30,'JACKSONVILLE System'
```

```
270:            ENDIF
271:            IF      TAMPA
272:            DB      6,3,34,'TAMPA System'
273:            ENDIF
274:            IF      YOUNGSTOWN
275:            DB      6,3,28,'YOUNGSTOWN OHIO System'
276:            ENDIF
277:            DB      0
278: NO_CELLS   EQU     50
279: NO_CHANS   EQU     100
280: CELL_1     DW      (NO_CELLS*NO_CHANS) DUP(0)
281:            ENDIF
282:            IF      SYSTEM2500
283: COM1UART   EQU     1A8H
284: COM1STATE  DB      253
285: TEMPBUFF   DB      200     DUP(0)
286: COM1BUFP   DW      0
287: MASK1      DB      ' '
288: TMOUT_VAL  DB      0
289: TMOUT_VAL1 DB      0
290: PORT1_BAUD DW      0C00H   ;9600 BAUD
291: PORT2_BAUD DW      0C00H   ;9600 BAUD
292: PORT3_BAUD DW      0C00H   ;9600 BAUD
293: PORT4_BAUD DW      0C00H   ;9600 BAUD
294: PORT1_PAR  DW      3       ;8 N 1
295: PORT2_PAR  DW      3       ;8 N 1
296: PORT3_PAR  DW      3       ;8 N 1
297: PORT4_PAR  DW      3       ;8 N 1
298: PORT1_IMASK DW     9       ;REC & MODEM INTERRUPT
299: PORT2_IMASK DW     9       ;NO INTERRUPT'S ALLOWED
300: PORT3_IMASK DW     9       ;NO INTERRUPT'S ALLOWED
301: PORT4_IMASK DW     9       ;NO INTERRUPT'S ALLOWED
302: SYSTEMNAME DB      6,1,26,'Motorola/D.S.C.   E.M.X. 2500'
303:            DB      6,2,9,'FMR System Rev 4.08 June 18,1988 Written by E.L.Didion & E.Lyle'
304:            IF      HOUSTON
305:            DB      6,3,33,'HOUSTON System'
306:            ENDIF
307:            DB      0
308: UART1      EQU     1A8H
309:            ENDIF
310:            IF      SYSTEM100
311: PORT1_BAUD DW      6000H   ;1200 BAUD
312: PORT2_BAUD DW      6000H   ;1200 BAUD
313: PORT3_BAUD DW      6000H   ;1200 BAUD
314: PORT4_BAUD DW      6000H   ;1200 BAUD
315: PORT1_PAR  DW      3       ;8 N 1
316: PORT2_PAR  DW      3       ;8 N 1
317: PORT3_PAR  DW      3       ;8 N 1
318: PORT4_PAR  DW      3       ;8 N 1
319: PORT1_IMASK DW     1       ;REC INTERRUPT ONLY
320: PORT2_IMASK DW     1       ;REC INTERRUPT ONLY
321: PORT3_IMASK DW     1       ;REC INTERRUPT ONLY
322: PORT4_IMASK DW     1       ;REC INTERRUPT ONLY
323: GRPP       DB      0
324: GRPN       DB      0
325: GRPQ       DB      0
326: GRPR       DB      0
327: GRPS       DB      0
328: GRPT       DB      0
329: NOTNORMALU DB      'NOT A NORMAL 01 U TYPE',0
330: SYSTEMNAME DB      6,1,31,'AT&T Autoplex 100'
331:            DB      6,2,15,'FMR System Rev 4.08 Written by E.L.Didion & E.Lyle'
332:            IF      DALLAS
333:            DB      6,3,30,'DALLAS TEXAS System'
334:            ENDIF
335:            IF      MIAMI
336:            DB      6,3,31,'MIAMI FLA. System'
337:            ENDIF
338:            ENDIF
339:            IF      SYSTEM1000
340: PORT1_BAUD DW      6000H   ;1200 BAUD
341: PORT2_BAUD DW      6000H   ;1200 BAUD
342: PORT3_BAUD DW      6000H   ;1200 BAUD
343: PORT4_BAUD DW      6000H   ;1200 BAUD
344: PORT1_PAR  DW      1AH     ;7 E 1
345: PORT2_PAR  DW      1AH     ;7 E 1
346: PORT3_PAR  DW      1AH     ;7 E 1
347: PORT4_PAR  DW      1AH     ;7 E 1
348: PORT1_IMASK DW     1       ;REC INTERRUPT ONLY
349: PORT2_IMASK DW     1       ;REC INTERRUPT ONLY
350: PORT3_IMASK DW     1       ;REC INTERRUPT ONLY
351: PORT4_IMASK DW     1       ;REC INTERRUPT ONLY
```

```
352: MAXCHAR     EQU    250
353: FIR_CALL    DB     0
354:             IF     CINN
355:             %OUT   CINCINNATI (RSA-COLUMBUS-DAYTON) System
356: PORT1_ACT   DB     '5137394868'    ;THIS IS A SITE DEPENDENT NUMBER
357: PORT1_DACT  DB     '5137394869'    ;THIS IS A SITE DEPENDENT NUMBER
358: PORT2_ACT   DB     '51323976A5'    ;THIS IS A SITE DEPENDENT NUMBER
359: PORT2_DACT  DB     '51323976A6'    ;THIS IS A SITE DEPENDENT NUMBER
360: PORT3_ACT   DB     '6142716487'    ;THIS IS A SITE DEPENDENT NUMBER
361: PORT3_DACT  DB     '6142716488'    ;THIS IS A SITE DEPENDENT NUMBER
362:             ENDIF
363:             IF     ATLANTA
364:             %OUT   ATLANTA RSA System
365: PORT1_ACT   DB     '4046979998'    ;THIS IS A SITE DEPENDENT NUMBER
366: PORT1_DACT  DB     '4046979999'    ;THIS IS A SITE DEPENDENT NUMBER
367: PORT2_ACT   DB     '4046979998'    ;THIS IS A SITE DEPENDENT NUMBER
368: PORT2_DACT  DB     '4046979999'    ;THIS IS A SITE DEPENDENT NUMBER
369: PORT3_ACT   DB     '4046979998'    ;THIS IS A SITE DEPENDENT NUMBER
370: PORT3_DACT  DB     '4046979999'    ;THIS IS A SITE DEPENDENT NUMBER
371:             ENDIF
372: SYSTEMNAME  DB     6,1,31,'AT&T Autoplex 1000'
373:             DB     6,2,15,'FMR System Rev 4.08 Written by E.L.Didion & E.Lyle'
374:             IF     CINN
375:             DB     6,3,20,'CINCINNATI (RSA-COLUMBUS-DAYTON) System'
376:             ENDIF
377:             IF     ATLANTA
378:             DB     6,3,14,'ATLANTA (RSA-MACON) System'
379:             ENDIF
380:             DB     0
381:             ENDIF
382:             IF     SYSTEM10
383: PORT1_BAUD  DW     6000H    ;1200 BAUD
384: PORT2_BAUD  DW     6000H    ;1200 BAUD
385: PORT3_BAUD  DW     6000H    ;1200 BAUD
386: PORT4_BAUD  DW     6000H    ;1200 BAUD
387: PORT1_PAR   DW     1BH      ;8 N 1
388: PORT2_PAR   DW     3        ;8 N 1
389: PORT3_PAR   DW     3        ;8 N 1
390: PORT4_PAR   DW     3        ;8 N 1
391: PORT1_IMASK DW     1        ;REC INTERRUPT ONLY
392: PORT2_IMASK DW     1        ;REC INTERRUPT ONLY
393: PORT3_IMASK DW     1        ;REC INTERRUPT ONLY
394: PORT4_IMASK DW     1        ;REC INTERRUPT ONLY
395: MAXCHAR     EQU    250
396: SYSTEMNAME  DB     6,1,32,'AT&T Autoplex 10'
397:             DB     6,2,15,'FMR System Rev 4.08 Written by E.L.Didion & E.Lyle'
398:             IF     SAN_ANTONIO
399:             DB     6,3,28,'SAN ANTONIO TEXAS System'
400:             ENDIF
401:             DB     0
402:             ENDIF
403:             IF     SYSTEMASTRO
404: PORT1_BAUD  DW     6000H    ;1200 BAUD
405: PORT2_BAUD  DW     6000H    ;1200 BAUD
406: PORT3_BAUD  DW     6000H    ;1200 BAUD
407: PORT4_BAUD  DW     6000H    ;1200 BAUD
408: PORT1_PAR   DW     3        ;8 N 1
409: PORT2_PAR   DW     3        ;8 N 1
410: PORT3_PAR   DW     3        ;8 N 1
411: PORT4_PAR   DW     3        ;8 N 1
412: PORT1_IMASK DW     1        ;REC INTERRUPT ONLY
413: PORT2_IMASK DW     1        ;REC INTERRUPT ONLY
414: PORT3_IMASK DW     1        ;REC INTERRUPT ONLY
415: PORT4_IMASK DW     1        ;REC INTERRUPT ONLY
416: MAXCHAR     EQU    250
417: SYSTEMNAME  DB     6,1,32,'Astronet System'
418:             DB     6,2,15,'FMR System Rev 4.08 Written by E.L.Didion & E.Lyle'
419:             IF     ORLANDO
420:             DB     6,3,28,'ORLANDO FLORIDA System'
421:             ENDIF
422:             DB     0
423:             IF     CORPUS
424:             DB     6,3,30,'CORPUS TEXAS System'
425:             ENDIF
426:             DB     0
427:             ENDIF
428:             IF     SYSTEMASTRO1
429: PORT1_BAUD  DW     6000H    ;1200 BAUD
430: PORT2_BAUD  DW     6000H    ;1200 BAUD
431: PORT3_BAUD  DW     6000H    ;1200 BAUD
432: PORT4_BAUD  DW     6000H    ;1200 BAUD
```

```
433: PORT1_PAR      DW    3          ;8 N 1
434: PORT2_PAR      DW    3          ;8 N 1
435: PORT3_PAR      DW    3          ;8 N 1
436: PORT4_PAR      DW    3          ;8 N 1
437: PORT1_IMASK    DW    1          ;REC INTERRUPT ONLY
438: PORT2_IMASK    DW    1          ;REC INTERRUPT ONLY
439: PORT3_IMASK    DW    1          ;REC INTERRUPT ONLY
440: PORT4_IMASK    DW    1          ;REC INTERRUPT ONLY
441: MAXCHAR        EQU   250
442: SYSTEMNAME     DB    6,1,33,'Astronet1 System '
443:                DB    6,2,15,'FMR System Rev 4.03 Written by E.L.Didion & E.Lyle',0
444:                ENDIF
445:                IF    SYSTEMNOVA
446: PORT1_BAUD     DW    6000H      ;1200 BAUD
447: PORT2_BAUD     DW    6000H      ;1200 BAUD
448: PORT3_BAUD     DW    6000H      ;1200 BAUD
449: PORT4_BAUD     DW    6000H      ;1200 BAUD
450: PORT1_PAR      DW    3          ;8 N 1
451: PORT2_PAR      DW    3          ;8 N 1
452: PORT3_PAR      DW    3          ;8 N 1
453: PORT4_PAR      DW    3          ;8 N 1
454: PORT1_IMASK    DW    1          ;REC INTERRUPT ONLY
455: PORT2_IMASK    DW    1          ;REC INTERRUPT ONLY
456: PORT3_IMASK    DW    1          ;REC INTERRUPT ONLY
457: PORT4_IMASK    DW    1          ;REC INTERRUPT ONLY
458: MAXCHAR        EQU   250
459: SYSTEMNAME     DB    6,1,33,'Novatel System'
460:                DB    6,2,15,'FMR System Rev 4.08 Written by E.L.Didion & E.Lyle',0
461:                ENDIF
462:                IF    SYSTEMEXRO
463: PORT1_BAUD     DW    6000H      ;1200 BAUD
464: PORT2_BAUD     DW    6000H      ;1200 BAUD
465: PORT3_BAUD     DW    6000H      ;1200 BAUD
466: PORT4_BAUD     DW    6000H      ;1200 BAUD
467: PORT1_PAR      DW    3          ;8 N 1
468: PORT2_PAR      DW    3          ;8 N 1
469: PORT3_PAR      DW    3          ;8 N 1
470: PORT4_PAR      DW    3          ;8 N 1
471: PORT1_IMASK    DW    1          ;REC INTERRUPT ONLY
472: PORT2_IMASK    DW    1          ;REC INTERRUPT ONLY
473: PORT3_IMASK    DW    1          ;REC INTERRUPT ONLY
474: PORT4_IMASK    DW    1          ;REC INTERRUPT ONLY
475: MAXCHAR        EQU   250
476: SYSTEMNAME     DB    6,1,30,'L. M. Ericson System'
477:                DB    6,2,15,'FMR System Rev 4.08 Written by E.L.Didion & E.Lyle',0
478:                ENDIF
479: TOUT_VALUE     EQU   8000       ;TIME OUT VALUE WHEN BASICA NOT RUNNING
480: WORK_PORT      DW    0
481: WORK_PORTS     DW    0
482: TEMP_PORT      DW    0
483: TEMP_PORT2     DW    0
484: WORKING_WA     DW    0
485: WORK_TRK       DW    0
486: WORK_GRPI      DB    0
487: CALL_PORT      DW    0
488: FMR_CALL_PORT  DB    10H
489: CALLCOMP       DB    0
490: ROAMCOMP       DB    0
491: CALLSTATE0     DB    30
492: CALLSTATE1     DB    18
493: CALLSTATE2     DB    18
494: CALLSTATE3     DB    8
495: CALLSTATE4     DB    18
496: CALLSTATE5     DB    9
497: CALLSTATE6     DB    17
498: CALLSTATE7     DB    17
499: CALLSTATE8     DB    11
500: CALLSTATE9     DB    15
501: CALLSTATE10    DB    5
502: CALLSTATE11    DB    4
503: KEEP           DW    0
504: GONE           EQU   1310
505: WR16           DW    0
506: MES1           DB    'SYSTEM IS RUNING OK ',0
507: MESWA          DB    'NO WORK AREAS ARE AVAILIABLE',0
508: MES2           DB    'SYSTEM RUNING OK ',0
509: MES3           DB    'WORK AREA FOUND LINKED WORK AREA ADDRESS = ',0
510: MES4           DB    'GOT BAD CALL RECORD TYPE=^B'
511: MES4A          DB    0,13,0
512: MES5           DB    'GOT CALL RECORD OF THE TYPE=^B'
513: MES5A          DB    0,' PORT # ^B'
```

```
514: MES5B         DB        0,13,0
515: MES6          DB        'System Written by E.L.Didion & E.Lyle REV 4.08 June 18,1988',0
516: PORT_ADDR     DB        0F8H,03,0F8H,02
517: OK_THIS_PORT  DB        0
518: BHANDLE       DW        0
519: BASEMESS      DB        'C:TOUT.TXT',0
520: DUMPMES       DB        'THIS IS A WA HEX DUMP',13,10,0
521: COPYRIGHT     DB        6,4,21,'Copyright G.T.E. Mobilnet May 23,1987',0
522: REQCT         DB        0
523: AXREG         DW        0
524: BXREG         DW        0
525: CXREG         DW        0
526: DXREG         DW        0
527: SIREG         DW        0
528: DIREG         DW        0
529: BPREG         DW        0
530: DSREG         DW        0
531: ESREG         DW        0
532: SSREG         DW        0
533: SPREG         DW        0
534: BASELINE      DW        0
535: HEARTBEAT     DB        0
536: AST4_BUSY     DB        0
537: SYSREQSEG     DW        0F800H
538: SYSREQOFF     DW        0F859H
539: VECTORSSEG    DW        0
540: VECTORSOFF    DW        0
541: STARTES       DW        0
542: BYEBYE                  EQU     (WHEN+GONE)
543: COMMENT |
544: ************************************
545: * DOS BASE PAGE LOCATIONS          *
546: ************************************
547: |
548: DOS_SEG       EQU       40H
549: DOSACTPAGE    EQU       62H
550: DOSCMODE      EQU       60H
551: LASTCOL       DB        79
552: LASTROW       DB        23
553: DOSCURSOR     EQU       50
554: COMMENT |
555: *************************************************************
556: * THIS ROUTINE IS USED TO SET UP THE BACK GROUND PORTION    *
557: * OF THE FOLLOW ME ROAMING PROGRAM. THIS IS DONE BY SETTING *
558: * UP THE INTERRUPT VECTOR'S OF THE 18.2 SEC. TIMER INTERRUPT*
559: * AND THE AST4 PORT INTERRUPT,USING INTERRUPT #5.           *
560: *************************************************************
561: |
562: BEGIN:        PUSH      DS
563:              MOV       CS:STARTES,ES
564:              XOR       AX,AX
565:              PUSH      AX
566:              MOV       AX,CGROUP
567:              MOV       DS,AX
568:              MOV       ES,AX
569:              CALL      CLEARVAR
570:              LEA       DX,AST4_INRP
571:              MOV       AX,250DH          ;GET VALUE FOR VECTOR INRP 2
572:              INT       21H               ;GO TELL DOS TO CHANGE IT
573:              MOV       DX,1BFH
574:              MOV       AL,08FH
575:              OUT       DX,AL
576:              LEA       DX,INRPC
577:              MOV       AX,251CH
578:              INT       21H
579:              PUSH      CS
580:              POP       DS
581:              MOV       AX,SYSREQSEG
582:              MOV       DX,SYSREQOFF
583:              MOV       DS,AX
584:              MOV       AX,2560H
585:              INT       21H
586:              PUSH      CS
587:              POP       DS
588:              PUSH      CS
589:              POP       ES
590:              LEA       DX,SYSREQ
591:              MOV       AX,2515H
592:              INT       21H
593:              PUSH      CS
594:              POP       DS
```

```
595:                 MOV     CX,3
596: COMINITLP:      MOV     BX,CX
597:                 PUSH    CX
598:                 CALL    STDCOMINIT
599:                 POP     CX
600:                 LOOP    COMINITLP
601:                 MOV     BX,CX
602:                 CALL    STDCOMINIT
603:                 CALL    CLEARVAR
604:                 CALL    CLEAR
605:                 MOV     DX,0101H
606:                 CALL    LOCATE
607:                 LEA     SI,SYSTEMNAME
608:                 CALL    STDMESOUT
609:                 LEA     SI,COPYRIGHT
610:                 CALL    STDMESOUT
611:                 INT     0DH
612:                 IF      SYSTEM2500
613:                 MOV     CS:PORT_ACTIVE,250
614:                 CALL    LOGON
615:                 MOV     CS:PO     .IVE,250
616:                 CALL    ALLO
617:                 LEA     SI,PO       ATE
618:                 MOV     WP[SI],253
619:                 ENDIF
620:                 IN      AL,21H
621:                 AND     AL,0DFH
622:                 OUT     21H,AL
623:                 MOV     AH,2AH
624:                 INT     21H
625:                 MOV     CS:KEEP,CX
626: GO_BACK:        MOV     BX,ZSEG
627:                 MOV     AX,CGROUP
628:                 SUB     BX,AX
629:                 MOV     DX,BX
630:                 MOV     AX,3100H
631:                 INT     21H
632: INRPC:          MOV     DX,CS:KEEP
633:                 CMP     DX,BYEBYE
634:                 JGE     GO_BACK
635: GOODINP:        INC     CS:HEARTBEAT
636:                 CMP     CS:INT_ACT,0
637:                 JE      OKTOHANDLE
638: GETOUT:         JMP     CKINRP
639: OKTOHANDLE:     CMP     CS:FLAG,0
640:                 JNE     OKFLAG
641:                 CMP     BYP CS:PORT_ACTIVE,250
642:                 JNE     OKFLAG
643:                 INC     CS:WP BASELINE
644:                 CMP     CS:BASELINE,TOUT_VALUE
645:                 JNE     BADFLAG
646: GOTOBOOT:       JMP     BOOT
647: OKFLAG:         MOV     CS:FLAG,0       ;RESET FMR'S FLAG (I'M RUNNING)
648:                 MOV     WP CS:BASELINE,0
649: BADFLAG:        CMP     CS:WP FOAD+4,0  ;ARE THERE ANY WA'S QUEUED ?
650:                 JE      GETOUT
651:                 MOV     CS:INT_ACT,1    ;MARK THAT WE'RE IN HERE
652:                 PUSH    DS
653:                 PUSH    ES
654:                 PUSH    BP
655:                 PUSHA
656:                 MOV     AX,CGROUP
657:                 MOV     DS,AX
658:                 MOV     ES,AX
659:                 CLI
660:                 MOV     AL,20H
661:                 OUT     20H,AL
662: TEST1:          MOV     AX,FS1B
663:                 CALL    UNLINK
664:                 CMP     DX,0            ;DOUBLE CHECK TO MAKE SURE
665:                 JNE     CKFCB1
666:                 STI
667:                 JMP     NEXTM
668: CKFCB1:         MOV     CALLCOMP,0
669:                 MOV     CS:WORKING_WA,DX
670:                 MOV     SI,DX
671:                 STI
672:                 XOR     AX,AX
673:                 MOV     AL,[SI+9]
674:                 MOV     CALL_PORT,AX
675:                 CMP     CS:CALLBUFP,2087
```

```
676:              JL        OKCALLBUF
677:              JMP       DUMPIT
678: OKCALLBUF:   JMP       CKFCB
679: DUMPIT:      XOR       DX,DX
680:              MOV       SI,CS:WORKING_WA
681: NOKEY:       MOV       BX,CALL_PORT    ;GET PORT NUMBER
682:              MOV       CX,BX            ;BX=INDEXED PORT # (SHL 1)
683:              SHR       CX,1             ;GET PORT # BACK
684:              ADD       CX,5
685:              MOV       TEMP_PORT,CX
686:              MOV       CL,PORT_ACTIVE
687:              CMP       CX,TEMP_PORT
688:              JNE       DUMPIT1
689:              CALL      STDOUTCRLF
690:              XOR       CX,CX
691:              MOV       CX,245
692:              MOV       BX,9
693: SHOWCALLLP:  MOV       DL,[SI+BX]
694:              INC       BX
695:              PUSH      BX
696:              PUSH      CX
697:              IF        SYSTEM1000
698:              MOV       AL,DL
699:              CALL      STDOUTTTY
700:              ENDIF
701:              IF        SYSTEM10
702:              MOV       AL,DL
703:              CALL      STDOUTTTY
704:              ENDIF
705:              IF        S    00
706:              CALL      ST      OUT
707:              ENDIF
708:              IF        SYSTEM100
709:              CALL      STDHEX8OUT
710:              ENDIF
711:              IF        SYSTEMASTRO
712:              MOV       AL,DL
713:              CALL      STDOUTTTY
714:              ENDIF
715:              IF        SYSTEM2500
716:              MOV       AL,DL
717:              CALL      STDOUTTTY
718:              ENDIF
719: DUMPITZ:     POP       CX
720:              POP       BX
721:              LOOP      SHOWCALLLP
722: DUMPIT1:     MOV       DX,CS:WORKING_WA
723: COMMENT |
724:              LEA       SI,FQAD
725:              CMP       WP[SI+4],0       ;ANY MORE WORK LINKED ?
726:              JNE       MOREWORK
727: |
728:              CALL      WADROP
729:              JMP       NEXTM
730: MOREWORK:    JMP       TEST1
731: BUMPTRCA     PROC      NEAR
732:              PUSH      SI
733:              PUSH      BX
734:              LEA       SI,PORT1TRCA
735:              MOV       BX,CALL_PORT
736:              INC       WP[SI+BX]
737:              POP       BX
738:              POP       SI
739:              RET
740: BUMPTRCA     ENDP
741: BUMPTRCC     PROC      NEAR
742:              PUSH      SI
743:              PUSH      BX
744:              LEA       SI,PORT1TRCC
745:              MOV       BX,CALL_PORT
746:              INC       WP[SI+BX]
747:              POP       BX
748:              POP       SI
749:              RET
750: BUMPTRCC     ENDP
751: BUMPTCA      PROC      NEAR
752:              PUSH      SI
753:              PUSH      BX
754:              LEA       SI,PORT1TCA
755:              MOV       BX,CALL_PORT
756:              SHL       BX,1             ;SHIFT FOR TWO WORD ENTRY
757:              INC       WP[SI+BX]
```

```
758:                    CMP     WP[SI+BX],0
759:                    JNE     BUMPTCAOK
760:                    INC     WP[SI+BX+2]
761: BUMPTCAOK:         POP     BX
762:                    POP     SI
763:                    RET
764: BUMPTCA            ENDP
765: BUMPTCC            PROC    NEAR
766:                    PUSH    SI
767:                    PUSH    BX
768:                    LEA     SI,PORT1TCC
769:                    MOV     BX,CALL_PORT
770:                    SHL     BX,1        ;SHIFT FOR TWO WORD ENTRY
771:                    INC     WP[SI+BX]
772:                    CMP     WP[SI+BX],0
773:                    JNE     BUMPTCCOK
774:                    INC     WP[SI+BX+2]
775: BUMPTCCOK:         POP     BX
776:                    POP     SI
777:                    RET
778: BUMPTCC            ENDP
779: BUMPOPER           PROC    NEAR
780:                    PUSH    SI
781:                    PUSH    BX
782:                    LEA     SI,PORT1OPER
783:                    MOV     BX,CALL_PORT
784:                    INC     WP[SI+BX]
785:                    POP     BX
786:                    POP     SI
787:                    RET
788: BUMPOPER           ENDP
789: BUMPDDD            PROC    NEAR
790:                    PUSH    SI
791:                    PUSH    BX
792:                    LEA     SI,PORT1DDD
793:                    MOV     BX,CALL_PORT
794:                    INC     WP[SI]
795:                    POP     BX
796:                    POP     SI
797:                    RET
798: BUMPDDD            ENDP
799: ;
800:            IF      SYSTEM10
801:    %OUT    E.L.Didion & E.Lyle FMR Application   AT&T AUTOPLEX 10
802: CKFCB:             MOV     SI,WORKING_WA
803:                    MOV     CS:BYP_FMR_CALL_PORT,10H
804:                    CMP     BYP[SI+75],10  ;IS IT A LINE FEED ?
805:                    JE      CKFSP2
806:                    JMP     DUMPIT
807: CKFSP2:            CMP     BYP[SI+140],10 ;IS IT A LINE FEED ?
808:                    JE      CKFSP3
809:                    JMP     DUMPIT
810: CKFSP3:            CMP     BYP[SI+205],10 ;IS IT A LINE FEED ?
811:                    JE      OKCALLRCD
812:                    JMP     DUMPIT
813: OKCALLRCD:         CMP     BYP[SI+165],30H
814:                    JE      OKCT1          ;CALL TYPE LESS THAN 10 HEX ?
815:                    JMP     DUMPIT
816: OKCT1:             CMP     BYP[SI+166],44H ;IS THIS A SECURITY ENTRY ?
817:                    JNE     OKCALL_TYPE
818:                    JMP     DUMPIT         ;IF SO DROP THE CALL
819: OKCALL_TYPE:   CALL BUMPTCA
820:                    CMP     BYP[SI+166],32H ;IS IT OPER ASSISTIED (LOCAL)
821:                    JNE     CKFOPERA
822:                    CALL    BUMPOPER
823:                    JMP     SHORT CKNEXT
824: CKFOPERA:          CMP     BYP[SI+166],45H ;IS IT OPER ASSISTED (TOLL)
825:                    JNE     CKFDDD
826:                    CALL    BUMPOPER
827:                    JMP     SHORT CKNEXT
828: CKFDDD:            CMP     BYP[SI+166],34H ;IS DDD ?
829:                    JNE     CKF800
830:                    CALL    BUMPDDD
831:                    JMP     SHORT CKNEXT
832: CKF800:            CMP     BYP[SI+166],31H
833:                    JNE     CKNEXT
834:                    CALL    BUMPDDD
835: CKNEXT:            MOV     AL,[SI+167]
836:                    CMP     AL,58
837:                    JL      OKTOMASK
838:                    SUB     AL,55
```

```
839: OKTOMASK:    AND     AL,15
840:             TEST    AL,8
841:             JZ      APLEXNOANS
842:             MOV     CALLCOMP,1
843:             CALL    BUMPTCC
844:             CALL    BUMPTRCC
845: APLEXNOANS: CALL    BUMPTRCA
846:             CMP     WP[SI+53],3132H ;IS IT 21 OF (21)1211
847:             JNE     CKFMR311
848:             CMP     WP[SI+55],3231H ;IS IT 12 OF 21(12)11
849:             JE      CKFMR11
850: CKFMR311:   CMP     WP[SI+53],3133H ;IS IT 31 OF (31)1311
851:             JNE     CKFMR_1
852:             CMP     WP[SI+55],3331H ;IS IT 13 OF 31(13)11
853:             JE      CKFMR11
854: CKFMR_1:    CMP     WP[SI+53],3142H ;IS IT *1 OF *18/*19 ?
855:             JNE     APLEXDONE
856: CKFMR11:    CMP     WP[SI+57],3131H ;IS IT 11 OF 2112(11)/3113(11)
857:             JE      GOTFMRCALL
858:             CMP     WP[SI+57],3831H ;IS IT 18 OF *18 ?
859:             JE      GOTFMRCALL
860:             CMP     WP[SI+57],3931H ;IS IT 19 OF *19 ?
861:             JE      GOTFMRCALL
862: APLEXDONE:  JMP     DUMPIT
863: GOTFMRCALL: MOV     BX,43
864:             LEA     DI,CALLBUF
865:             PUSH    BP
866:             MOV     BP,CALLBUFP
867:             MOV     CX,4
868: MIDLOOP:    MOV     AL,[SI+BX]
869:             SUB     AL,48
870:             CMP     AL,10
871:             JL      OKMIDL
872:             MOV     AL,0
873: OKMIDL:     SHL     AL,CL
874:             MOV     AH,AL
875:             INC     BX
876:             MOV     AL,[SI+BX]
877:             SUB     AL,48
878:             CMP     AL,10
879:             JL      OKMIDR
880:             MOV     AL,0
881: OKMIDR:     OR      AL,AH
882:             MOV     DS:[DI+1
883:             INC     BP
884:             INC     BX
885:             CMP     BX,53
886:             JL      MIDLOOP
887:             XOR     AX,AX
888:             MOV     CS:WP[DI+BP],AX
889:             ADD     BP,2
890:             MOV     BX,35
891: PUTSER:     MOV     AL,CS:[SI+BX]
892:             SUB     AL,48
893:             CMP     AL,10
894:             JL      OK1STD
895:             SUB     AL,7
896: OK1STD:     SHL     AL,CL
897:             MOV     AH,AL
898:             INC     BX
899:             MOV     AL,[SI+BX]
900:             SUB     AL,48
901:             CMP     AL,10
902:             JL      OK2NDD
903:             SUB     AL,7
904: OK2NDD:     OR      AL,AH
905:             MOV     CS:[DI+BP],AL
906:             INC     BP
907:             INC     BX
908:             CMP     BX,43
909:             JL      PUTSER
910:             MOV     BX,52
911: DIAL_DIGIT: MOV     AL,[SI+BX]
912:             SUB     AL,48
913:             SHL     AL,CL
914:             MOV     AH,AL
915:             INC     BX
916:             MOV     AL,[SI+BX]
917:             SUB     AL,48
918:             OR      AL,AH
919:             CMP     BX,53
```

```
920:            JNE     OKTOSTUFDD
921:            AND     AL,15               ;WIPE OUT UPPER HALF
922:            OR      AL,CS:FMR_CALL_PORT
923: OKTOSTUFDD: MOV    DS:[DI+BP],AL
924:            INC     BP
925:            INC     BX
926:            CMP     BX,56
927:            JL      DIAL_DIGIT
928:            INC     BUFFLAG1
929:            MOV     CALLBUFP,BP
930:            POP     BP
931:            JMP     DUMPIT
932:            ENDIF
933: ;
934:            IF      SYSTEM100
935:    %OUT    E.L.Didion & E.Lyle FMR Application   AT&T AUTOPLEX 100
936:            IF      DALLAS
937:    %OUT    DALLAS TEXAS System
938:            ENDIF
939:            IF      MIAMI
940:    %OUT    MIAMI FLORIDA System
941:            ENDIF
942: CKFCB:             MOV     SI,DX
943:            MOV     AL,[SI+11]          ;CK FOR CX OR XC
944:            AND     AL,0F0H
945:            CMP     AL,0C0H             ;IS IT AND EVEN CHAR COUNT ?
946:            JNE     FIXCBREC
947:            JMP     OKCBREC
948: FIXCBREC:  XOR     CX,CX
949:            MOV     CL,[SI+10]
950:            MOV     BX,11
951: GETCBLP:   MOV     AL,[SI+BX]
952:            AND     AL,15
953:            SHL     AL,1
954:            SHL     AL,1
955:            SHL     AL,1
956:            SHL     AL,1
957:            MOV     AH,AL
958:            MOV     AL,[SI+BX+1]
959:            AND     AL,0F0H
960:            SHR     AL,1
961:            SHR     AL,1
962:            SHR     AL,1
963:            SHR     AL,1
964:            OR      AL,AH
965:            MOV     [SI+BX],AL
966:            INC     BX
967:            LOOP    GETCBLP
968: OKCBREC:   MOV     DL,[SI+11]
969:            MOV     CS:B'    'R_CALL_PORT,10H
970:            MOV     GRPN,
971:            MOV     GRPP,
972:            MOV     GRPQ,0
973:            MOV     GRPR,0
974:            MOV     GRPS,0
975:            MOV     GRPT,0
976:            MOV     CALLCOMP,0
977:            MOV     ROAMCOMP,0
978:            CMP     DL,0CAH
979:            JE      GOTGRP1
980:            JMP     CKFC1
981: COMMENT !
982: ****************************************************
983: *THIS IS THE TOLL WIRELINE CALL TYPE  (CALL TYPE CA1)*
984: ****************************************************
985: !
986: GOTGRP1:   LEA     DI,PORT1TDDD
987:            MOV     BX,CALL_PORT
988:            INC     WP[DI+BX]           ;BUMP DDD ATTEMPTED CNT.
989:            MOV     DL,[SI+31]
990:            MOV     DH,DL               ;SAVE THE BYTE FOR A MINUTE
991:            AND     DL,0F0H             ;KEEP UPPER BYTE
992:            CMP     DL,0F0H
993:            JE      GOTWD31
994:            JMP     CKWD33
995: GOTWD31:   MOV     DL,DH
996:            CMP     DL,0FAH
997:            JNE     CKGRP3              ;GRP 3 IS THE MOST COMMON
998:            JMP     LASTGRPCK
999: CKGRP3:    CMP     DL,0F3H
1000:           JNE     CKGRP1
```

```
1001:                 MOV     GRPP,255
1002:                 MOV     GRPQ,255
1003:                 CMP     BYP[SI+15],0BBH  ;CHECK FOR NO ANSWER
1004:                 JE      SGRP3NANS
1005:                 MOV     ROAMCOMP,1
1006:                 MOV     CALLCOMP,1
1007: SGRP3NANS:      JMP     SET_NORMAL_U
1008: CKGRP1:         CMP     DL,0F1H          ;IS DATA GROUP Q INCLUDED
1009:                 JNE     CKGRP2
1010:                 MOV     GRPQ,255
1011:                 JMP     LASTGRPCK
1012: CKGRP2:         CMP     DL,0F2H
1013:                 JNE     CKGRP4
1014:                 MOV     GRPP,255
1015:                 JMP     LASTGRPCK
1016: CKGRP4:         JMP     LASTGRPCK
1017: CKWD33:         MOV     DL,[SI+32]
1018:                 AND     DL,15
1019:                 CMP     DL,15
1020:                 JE      OKWD33
1021:                 JMP     DUMPIT
1022: OKWD33:         MOV     DL,[SI+33]
1023:                 MOV     DH,DL
1024:                 AND     DL,240           ;GET THE UPPER CHAR
1025:                 CMP     DL,0A0H          ;ANY GRPS INCLUDED ?
1026:                 JNE     CKLGRP3
1027:                 JMP     DUMPIT
1028: CKLGRP3:        MOV     DL,DH
1029:                 CMP     DL,3AH           ;CHECK FOR GRP 3 ONLY,MOST CM
1030:                 JNE     CKLGRP1
1031:                 MOV     GRPP,255
1032:                 MOV     GRPQ,255
1033:                 CMP     BYP[SI+15],0BBH
1034:                 JE      SET_NORMAL_U
1035:                 MOV     ROAMCOMP,1
1036:                 MOV     CALLCOMP,1
1037: SET_NORMAL_U:   CALL    BUMPTRCA
1038:                 JMP     LASTGRPCK
1039: CKLGRP1:
1040: LASTGRPCK:      JMP     SHOWCALL
1041: CKFC1:          CMP     DL,0C1H
1042:                 JNE     CKFC3
1043:                 MOV     DL,15H
1044:                 JMP     SHOWCALL
1045: CKFC3:          CMP     DL,0C3H
1046:                 JNE     GOCKFC6
1047:                 CMP     BYP[SI+12],3AH   ;IS IT C33 GRP ?
1048:                 JE      GOT_GRP33
1049:                 CMP     BYP[SI+12],4AH   ;IS IT C34 GRP
1050:                 JE      GOT_GRP34
1051:                 JMP     OPERC
1052: GOT_GRP34:      JMP     DUMPIT
1053:                 CALL    BUMPTRCA
1054:                 MOV     ROAMCOMP,1
1055:                 JMP     SHOWCALL
1056: GOCKFC6:        JMP     CKFC6
1057: GOT_GRP33:      MOV     BX,2
1058:                 CMP     BYP[SI+?],0AAH
1059:                 JE      GOT_G???
1060:                 CMP     BYP[SI+24],1AH
1061:                 JE      GOTGRP33NA
1062:                 JMP     SHOWCALL
1063: GOTGRP33NA:     INC     BX
1064: GOT_GRP33A:     CMP     BX,26
1065:                 JE      GOTALIAS
1066:                 JMP     SHOWCALL
1067: GOTALIAS:       LEA     DI,PORT1FMRA
1068:                 MOV     AX,BX
1069:                 MOV     BX,CALL_PORT
1070:                 INC     WP[DI+BX]
1071:                 CALL    BUMPTRCA
1072:                 CMP     AX,26
1073:                 JE      ALIASANS
1074:                 JMP     SHOWCALL
1075: ALIASANS:       LEA     DI,PORT1FMRC
1076:                 INC     WP[DI+BX]
1077:                 MOV     CALLCOMP,1
1078:                 MOV     ROAMCOMP,1
1079:                 JMP     SHOWCALL
1080: OPERC:          CMP     BYP[SI+12],6AH   ;IS IT OPER. ASSISTED ?
1081:                 JNE     CKFC32
```

```
1082:             LEA     DI,PORT1OPER
1083:             MOV     BX,CALL_PORT
1084:             INC     WP[DI+BX]
1085:             CALL    BUMPTRCA
1086:             CMP     BYP[SI+27],4AH
1087:             JNE     NOPERANS
1088:             MOV     CALLCOMP,1
1089:             MOV     ROAMCOMP,1
1090: NOPERANS:   JMP     SHOWCALL
1091: CKFC32:     CMP     BYP[SI+12],2AH    ;IS IT MOBILE TO MOBILE CALL ?
1092:             JE      MOBILEC
1093:             JMP     CKFC6
1094: MOBILEC:    CALL    BUMPTRCA
1095:             CMP     BYP[SI+27],4AH
1096:             JNE     GOODC32
1097:             MOV     ROAMCOMP,1
1098:             MOV     CALLCOMP,1
1099: GOODC32:    CMP     BYP[SI+18],0BBH
1100:             JNE     GOODCKF6
1101:             CMP     BYP[SI+20],11H
1102:             JNE     GOODCKF6
1103:             CMP     WP[SI+21],0AAAAH
1104:             JNE     GOODCKF6
1105:             CMP     BYP[SI+19],0B2H
1106:             JE      FNDFMR
1107:             CMP     BYP[SI+19],0B3H
1108:             JE      FNDFMR
1109: GOODCKF6:   JMP     SHOWCALL
1110: FNDFMR:     CMP     BYP[SI+23],11H
1111:             JNE     FNDFMR1
1112:             JMP     SHOWCALL
1113: FNDFMR1:    MOV     ROAMCOMP,1
1114:             MOV     CALLCOMP,1
1115:             LEA     DI,PORT1TCC
1116:             MOV     BX,CALL_PORT
1117:             SHL     BX,1
1118:             INC     WP[DI+BX]
1119:             CMP     WP[DI+BX],0
1120:             JNE     FNDFMR2
1121:             INC     WP[DI+BX+2]
1122: FNDFMR2:    INC     BUFFLAG1
1123:             LEA     DI,CALLBUF
1124:             ADD     DI,CALLBUFP
1125:             MOV     BX,23
1126:             MOV     AL,[SI+BX]
1127:             CALL    WIPE_A
1128:             MOV     BYP[DI],AL
1129:             INC     DI
1130:             INC     BX
1131:             MOV     AL,BYP[SI+BX]
1132:             AND     AL,0F0H
1133:             MOV     AH,AL
1134:             MOV     AL,BYP[SI+14]
1135:             AND     AL,15
1136:             OR      AL,AH
1137:             CALL    WIPE_A
1138:             MOV     BYP[DI],AL
1139:             INC     DI
1140:             MOV     BX,15
1141:             MOV     CX,3
1142: MIDLOOP:    MOV     AL,[SI+BX]
1143:             CALL    WIPE_A
1144:             MOV     BYP[DI],AL
1145:             INC     BX
1146:             INC     DI
1147:             LOOP    MIDLOOP
1148:             MOV     CX,4
1149:             MOV     BX,51
1150:             MOV     AL,[SI+BX]
1151:             AND     AL,15
1152:             CALL    WIPE_A
1153:             MOV     [DI],AL
1154:             INC     BX
1155:             INC     DI
1156: PUTSER:     MOV     AL,[SI+BX]
1157:             CALL    WIPE_A
1158:             MOV     [DI],AL
1159:             INC     BX
1160:             INC     DI
1161:             CMP     BX,57
1162:             JNE     PUTSER
```

```
1163: DIAL_DIGITS:  MOV     AL,[SI+BX]
1164:               AND     AL,15
1165:               SHL     AL,CL
1166:               MOV     AL,CS:FMR_CALL_PORT
1167:               MOV     AH,AL
1168:               MOV     AL,[SI+19]
1169:               AND     AL,15
1170:               OR      AL,AH
1171:               MOV     BYP[DI],AL
1172:               INC     DI
1173:               MOV     AL,[SI+20]
1174:               MOV     BYP[DI],AL
1175:               MOV     AX,CALLBUFP
1176:               ADD     AX,13
1177:               MOV     CALLBUFP,AX
1178:               JMP     SHOWCALL
1179: CKFC6:        CMP     DL,0C6H
1180:               JNE     BADCALL
1181:               MOV     DL,6FH
1182:               JMP     SHOWCALL
1183: WIPE_A        PROC    NEAR
1184:               MOV     AH,AL
1185:               AND     AH,0F0H
1186:               CMP     AH,0A0H
1187:               JNE     OKUPPER
1188:               AND     AL,15
1189: OKUPPER:      MOV     AH,AL
1190:               AND     AH,15
1191:               CMP     AH,0AH
1192:               JNE     OKCHAR
1193:               AND     AL,0F0H
1194: OKCHAR:       RET
1195: WIPE_A        ENDP
1196: SHOWCALL:     MOV     BX,CALL_PORT
1197:               LEA     DI,PORT1TCA     ;GET TOTAL CALL ATTEMPTS CNT.
1198:               SHL     BX,1
1199:               INC     WP[DI+BX]
1200:               CMP     WP[DI+BX],0
1201:               JNE     CKCOMP
1202:               INC     WP[DI+BX+2]
1203: CKCOMP:       CMP     CALLCOMP,0
1204:               JE      GOGOODCB
1205:               LEA     DI,PORT1TCC
1206:               MOV     BX,CALL_PORT
1207:               SHL     BX,1            ;SHIFT FOR DOUBLE WORD
1208:               INC     WP[DI+BX]
1209:               CMP     WP[DI+BX],0
1210:               JNE     GOGOODCB
1211:               INC     WP[DI+BX+2]
1212: GOGOODCB:     CMP     ROAMCOMP,0
1213:               JE      GOODCBF
1214:               LEA     DI,PORT1TRCC
1215:               MOV     BX,CALL_PORT
1216:               INC     WP[DI+BX]
1217: GOODCBF:      JMP     GOODCB
1218: BADCALL:      JMP     DUMPIT
1219: GOODCB:       CMP     BYP[SI+16],0B2H
1220:               JE      CK11P
1221:               CMP     BYP[SI+16],0B3H
1222:               JE      CK11P
1223:               CMP     BYP[SI+16],0BBH
1224:               JE      CK11P
1225: GTDUMPIT:     JMP     DUMPIT
1226: CK11P:        CMP     BYP[SI+17],11H
1227:               JNE     GTDUMPIT
1228:               LEA     DI,CALLBUF
1229:               MOV     BX,CALLBUFP
1230:               MOV     AL,BYP[SI+20]
1231:               MOV     BYP[DI+BX],AL
1232:               INC     BX
1233:               MOV     AL,BYP[SI+21]
1234:               AND     AL,0F
1235:               MOV     AH,AL
1236:               MOV     AL,BYP[SI+11]
1237:               AND     AL,0FH
1238:               OR      AL,AH
1239:               MOV     BYP[DI+BX],AL
1240:               INC     BX
1241:               MOV     AL,BYP[SI+12]
1242:               MOV     BYP[DI+BX],AL
1243:               INC     BX
```

```
1244:            MOV      AL,BYP[SI+13]
1245:            MOV      BYP[DI+BX],AL
1246:            INC      BX
1247:            MOV      AL,BYP[SI+14]
1248:            MOV      BYP[DI+BX],AL
1249:            INC      BX
1250:            MOV      CX,6
1251:            PUSH     SI
1252:            PUSH     DI
1253:            ADD      SI,48
1254: PUTSERLP:  MOV      AL,BYP[SI]
1255:            MOV      BYP[DI+BX],AL
1256:            INC      SI
1257:            INC      DI
1258:            LOOP     PUTSERLP
1259:            POP      DI
1260:            POP      SI
1261:            ADD      BX,6
1262:            MOV      AL,BYP[SI+16]
1263:            MOV      BYP[DI+BX],AL
1264:            INC      BX
1265:            MOV      AL,BYP[SI+17]
1266:            MOV      BYP[DI+BX],AL
1267:            INC      BX
1268:            MOV      CALLBUFP,BX
1269:            INC      BUFFLAG1
1270:            JMP      DUMPIT
1271:            ENDIF
1272:            IF       SYSTEM500
1273:            %OUT     E.L.Didion & E.Lyle FMR Application   MOTOROLA EMX 500/250/100
1274: CKFCB:     MOV      SI,DX            ;GET WA ADDRESS IN SI
1275:            MOV      CS:WORKING_WA,DX
1276:            CMP      BYP[SI+13],0CBH ;IS IT A CALL RECORD ?
1277:            JE       CKFFIXED
1278:            JMP      DUMPIT
1279: CKFFIXED:  CMP      BYP[SI+14],0    ;IS IT A FIXED PART ?
1280:            JE       CK_FOR_VIC
1281:            JMP      DUMPIT
1282: CK_FOR_VIC: MOV     CS:FMR_CALL_PORT,10H
1283:            IF       AUSTIN
1284:            %OUT     AUSTIN Victoria RSA System
1285:            ENDIF
1286:            IF       CLEVELAND
1287:            %OUT     CLEVELAND OHIO System
1288:            ENDIF
1289:            IF       AKRON
1290:            %OUT     AKRON OHIO System
1291:            ENDIF
1292:            IF       YOUNGSTOWN
1293:            %OUT     YOUNGSTOWN OHIO System
1294:            ENDIF
1295:            IF       JACKSONVILLE
1296:            %OUT     JACKSONVILLE FL. System
1297:            ENDIF
1298:            IF       TAMPA
1299:            %OUT     TAMPA   FL. System
1300:            ENDIF
1301:            IF       FT MYERS
1302:            %OUT     FORT MYERS System
1303:            ENDIF
1304:            IF       AUSTIN
1305:            CMP      CS:BYP[SI+32],30
1306:            JNE      CK_VIC_1
1307:            MOV      CS:FMR_CALL_PORT,20H
1308:            MOV      CS:WP_CALL_PORT,2
1309:            JMP      SHORT CKFALIAS
1310: CK_VIC_1:  CMP      CS:BYP[SI+32],31
1311:            JNE      CKFALIAS
1312:            MOV      CS:FMR_CALL_PORT,20H
1313:            MOV      CS:WP_CALL_PORT,2
1314:            ENDIF
1315: CKFALIAS:  MOV      BX,CALL_PORT    ;GET PORT ID (SHL BY 1)
1316:            TEST     BYP[SI+38],80H  ;IS THIS AND ALIAS CALL ?
1317:            JZ       CKFPRNT
1318:            LEA      DI,PORT1FMRA    ;YES THEN BUMP THE ALIAS CNT.
1319:            INC      WP[DI+BX]
1320: CKALIASC:  CMP      BYP[SI+35],15   ;IS IT A COMPLETED CALL ?
1321:            JS       CKFPRNT
1322:            LEA      DI,P        C   ;BUMP ALIAS COMPLETED CNT.
1323:            INC      WP[D)
1324: CKFPRNT:   MOV      SI,CS:       NG WA
```

```
1325:               ADD     SI,10
1326: CKRM:                 LEA     DI,PORT1TCA     ;GET CALL ATTEMPTS COUNTER
1327:               SHL     BX,1                    ;GET INDEX FOR DOUBLE WORD
1328:               INC     WP[DI+BX]
1329:               CMP     WP[DI+BX],0
1330:               JNE     CKCOMP
1331:               INC     WP[DI+BX+2]
1332: CKCOMP:       CMP     BYP[SI+25],15
1333:               JB      BMPTCC
1334:               CMP     BYP[SI+25],68H
1335:               JE      BMPTCC
1336:               CMP     BYP[SI+25],67H
1337:               JE      BMPTCC
1338:               CMP     BYP[SI+25],70H          ;IS IT ORGIN. LOSS OF CARRIER?
1339:               JE      BUMP_LOSS
1340:               CMP     BYP[SI+25],71H          ;IS IT TERM. LOSS OF CARRIER
1341: BUMP_LOSS:    MOV     AX,[SI+21]              ;GET CELL# OF THIS CALL
1342:               XCHG    AL,AH                   ;GET TENS THEN UNITS
1343:               MOV     AH,0
1344:               DEC     AL                      ;START WITH CELL 0
1345:               CMP     AX,NO_CELLS             ;CHECK MAX ALLOWABLE CELLS
1346:               JB      OK_CELL_NO
1347:               JMP     SHORT CKROAM
1348: OK_CELL_NO:   MOV     BX,NO_CHANS             ;AX=(CELL#-1)*(CHANNELS PER CELL)
1349:               MUL     BX
1350:               LEA     DI,CELL_1               ;GET START OF CELL 1,CHANNEL 1
1351:               MOV     BX,[SI+23]              ;GET CHANNEL OF THIS CALL
1352:               XCHG    BL,BH                   ;GET TENS THEN UNITS
1353:               MOV     BH,0
1354:               DEC     BL                      ;START WITH CHANNEL 0
1355:               CMP     BX,NO_CHANS             ;CHECK MAX ALLOWABLE CHANNELS
1356:               JB      OK_CHAN_NO
1357:               JMP     SHORT CKROAM
1358: OK_CHAN_NO:   ADD     AX,BX                   ;CELL+CHANNEL=CHANNEL INDEX
1359:               ADD     DI,AX                   ;ADD THIS TO START OF CHANNELS
1360:               MOV     DX,AX
1361:               INC     WP[DI]
1362:               JMP     SHORT CKROAM
1363: BMPTCC:       LEA     DI,PORT1TCC
1364:               MOV     BX,CS:CALL_PORT
1365:               SHL     BX,1                    ;SET DOUBLE WORD
1366:               MOV     CALLCOMP,1
1367:               INC     WP[DI+BX]
1368:               CMP     WP[DI+BX],0
1369:               JNE     CKROAM
1370:               INC     WP[DI+BX+2]
1371: CKROAM:       MOV     BX,CALL_PORT            ;GET PORT VALUE BACK
1372:               CMP     BYP[SI+44],1            ;IS THIS A ROAMER CALL ?
1373:               JE      BUMPRMCT
1374:               JMP     CKFLANDC
1375: BUMPRMCT:     LEA     DI,PORT1TRCA            ;GET ROAM CALL COUNTER
1376:               INC     WP[DI+BX]               ;BUMP TOTAL ROAM CALL COUNTER
1377:               CMP     BYP[SI+25],15
1378:               JG      CKST
1379: BRMCC:        LEA     DI,PORT1TRCC            ;DX MUST HAVE THE WA ADDRESS
1380:               INC     WP[DI+BX]
1381:               MOV     DX,WORKING_WA
1382:               JMP     CKFLANDC
1383: CKST:         CMP     BYP[SI+25],68H          ;WAS CCI = 68 = FMR ?
1384:               JE      CKDD
1385:               CMP     BYP[SI+25],67H          ;WAS CCI = 67 = FMR ?
1386:               JE      CKDD
1387:               CMP     BYP[SI+25],70H          ;WAS CCI = 70 = FMR ?
1388:               JE      CKDD
1389:               JMP     CKFLANDC
1390: CKDD:         CMP     BYP[SI+75],0F2H         ;DIAL 211/311 ?
1391:               JE      CKDD1
1392:               CMP     BYP[SI+75],0F3H
1393:               JE      CKDD1
1394:               CMP     BYP[SI+75],0FBH
1395:               JE      CKDD1
1396:               JMP     BRMCC
1397: CKDD1:        CMP     BYP[SI+76],11H
1398:               JE      MOVECALL
1399:               CMP     BYP[SI+76],18H
1400:               JE      MOVECALL
1401:               CMP     BYP[SI+76],19H
1402:               JE      MOVECALL
1403:               JMP     BRMCC
1404: MOVECALL:     PUSH    BX
1405:               PUSH    CS
```

```
1406:           POP     DS
1407:           PUSH    CS
1408:           POP     ES
1409:           LEA     DI,CALLBUF
1410:           ADD     DI,CAL...
1411:           MOV     BX,34
1412: MIDLOOP:  MOV     AL,[SI+BX]      ;PUT THE MID INTO THE CALL BUFF
1413:           AND     AL,0FH
1414:           MOV     CX,4
1415:           SHL     AL,CL
1416:           INC     BX
1417:           MOV     AH,[SI+BX]
1418:           AND     AH,0F0H
1419:           SHR     AH,CL
1420:           OR      AL,AH
1421:           MOV     BYP[DI],AL
1422:           INC     DI
1423:           CMP     BX,39
1424:           JL      MIDLOOP
1425:           XOR     AX,AX
1426:           MOV     WP[DI],AX
1427:           ADD     DI,2
1428:           MOV     BX,40
1429: SERLP:    MOV     AL,[SI+BX]
1430:           MOV     [DI],AL
1431:           INC     DI
1432:           INC     BX
1433:           CMP     BX,44
1434:           JNE     SERLP
1435: DIAL_DIGITS: MOV  AL,BYP[SI+75]   ;PUT DIAL DIGITS IN CALL BUFF
1436:           AND     AL,15
1437:           OR      AL,CS:FMR_CALL_PORT
1438:           MOV     BYP[DI],AL
1439:           MOV     AL,BYP[SI+76]
1440:           MOV     BYP[DI+1],AL
1441:           MOV     AX,CALLBUFP
1442:           ADD     AX,13
1443:           MOV     CALLBUFP,AX     ;SET CALL BUFF POINTER FOR NEXT
1444:           POP     BX
1445:           INC     BUFFLAG1
1446:           JMP     BRNCC
1447: CKFLANDC: CMP     BYP[SI+29],0    ;IS THIS LAND TO MOBILE CALL ?
1448:           JNE     CKFTRK
1449:           JMP     NOSTUDY
1450: COMMENT |
1451: ************************************************************
1452: * HERE WE MUST CHECK THE CALL'S FOR DDD OR OPER OR TRUNK GRP *
1453: * IF TRUNK GROUP STUDIES HAVE BEEN REQUESTED,THE CALL RECORD *
1454: * IS CHECKED FOR A CALL ATTEMPTED ON ONE OF THE SELECTED    *
1455: * TRUNK GROUPS.                                              *
1456: ************************************************************
1457: |
1458: CKFTRK:   LEA     DI,SGRPI
1459:           MOV     SI,WORKING_WA
1460:           MOV     BX,CALL_PORT
1461:           MOV     DI,WP[DI+BX]
1462:           MOV     AL,BYP[DI]      ;NEED TO STUDY ANY TRUNK GRP'S?
1463:           CMP     AL,0
1464:           JNE     DOSTUDY
1465: NOSTUDY:  CALL    GETTRK
1466:           JMP     DUMPIT
1467: DOSTUDY:  MOV     WORK_GRPI,AL    ;SAVE # OF GRP'S TO STUDY
1468:           CALL    GETTRK
1469:           CMP     WORK_TRK,0      ;ANY OUT GOING TRK USED ?
1470:           JE      DONESTUDY
1471:           XOR     CX,CX
1472:           MOV     CL,WORK_GRPI    ;GET # OF GRP'S TO STUDY
1473:           LEA     DI,SGRP
1474:           MOV     DI,[DI+BX]      ;GET START ADRESS OF TRK CNT
1475:           LEA     SI,STRK
1476:           MOV     SI,[SI+BX]
1477: COMMENT |
1478: ************************************************************
1479: * AT THIS PORINT                                            *
1480: *    CX=NUMBER OF GROUP'S TO STUDY                          *
1481: *    DI=START ADDRESS OF THE TRUNK GROUP NUMBER'S TO STUDY  *
1482: *    SI=START ADDRESS OF THE COUNTERS FOR THE TRK GROUPS    *
1483: ************************************************************
1484: |
1485: TRKCKLP:  MOV     BX,CX
1486:           DEC     BX
```

```
1487:                SHL     BX,1                ;MUL BY TWO FOR WORD OFFSET
1488:                MOV     DX,[DI+BX]
1489:                CMP     DX,WORK_TRK
1490:                JE      DONETRKCK
1491:                LOOP    TRKCKLP
1492:                JMP     SHORT DONESTUDY
1493: DONETRKCK:     INC     WP[SI+BX]           ;BUMP TRK GRP COUNTER
1494: DONESTUDY:     JMP     DUMPIT
1495: GETTRK         PROC    NEAR
1496:                MOV     CS:AXREG,AX
1497:                MOV     CS:BXREG,BX
1498:                MOV     CS:CX    CX
1499:                MOV     CS:DX
1500:                MOV     CS:DI
1501:                MOV     CS:SIREG,SI
1502:                MOV     CS:BPREG,BP
1503:                MOV     WORK_TRK,0          ;CLEAR TRK VALUE
1504:                MOV     SI,WORKING_WA
1505:                ADD     SI,10
1506:                XOR     BX,BX
1507:                MOV     AX,BX
1508:                MOV     BL,CALLSTATE0
1509:                LEA     DI,CALLSTATE0
1510:                ADD     BX,2                ;GET WORD COUNT OFFSET
1511:                XOR     CX,CX               ;CLEAR CX
1512:                MOV     CL,BYP[SI+BX]       ;GET # OF SUB TYPE'S
1513:                DEC     CX
1514:                CMP     CX,1                ;DO SAFETY CHECK ON LOOP CNT
1515:                JL      GETTRKC1
1516:                CMP     CX,6
1517:                JG      GETTRKC1
1518:                INC     BX
1519: STATECKLP:     MOV     AL,BYP[SI+BX]
1520:                PUSH    CX
1521:                PUSH    BX
1522:                PUSH    AX
1523:                CMP     AL,4                ;SUB TYPE 4 ?
1524:                JE      GETTRKC
1525:                CMP     AL,6                ;SUB TYPE 6 (DIALED DIGITS) ?
1526:                JE      CKFDDDOPER
1527: STATECKLP1:    POP     AX
1528:                POP     BX
1529:                MOV     CX,BX
1530:                MOV     BX,AX
1531:                MOV     BL,BYP[DI+BX]
1532:                ADD     BX,CX
1533:                POP     CX
1534:                LOOP    STATECKLP
1535: GETTRKC1:      MOV     AX,CS:AXREG
1536:                MOV     BX,CS:BXREG
1537:                MOV     CX,CS:CXREG
1538:                MOV     DX,CS:DXREG
1539:                MOV     DI,CS:DIREG
1540:                MOV     SI,CS:SIREG
1541:                MOV     BP,CS:BPREG
1542:                RET
1543: GETTRKC:       MOV     DX,[SI+BX+14]
1544:                XCHG    DH,DL
1545:                MOV     CS:WORK_TRK,DX
1546:                JMP     STATECKLP1
1547: CKFDDDOPER:    MOV     CX,BX
1548:                PUSH    DI
1549:                CMP     BYP[SI+BX+12],0FFH  ;IS LONG HAUL ?
1550:                JNE     LONGHAUL
1551:                MOV     AL,BYP[SI+BX+13]
1552:                AND     AL,0F0H
1553:                CMP     AL,0                ;IS IT OPER CALL ?
1554:                JE      BOPER
1555:                CMP     AL,10H              ;IS IT SHORT HAUL DDD CALL ?
1556:                JE      BDDD
1557:                JMP     SHORT BACKDDDCK
1558: LONGHAUL:      CMP     BYP[SI+BX+11],0F1H  ;DDD ?
1559:                JE      BDDD
1560:                CMP     BYP[SI+BX+11],0F0H  ;OPER CALL ?
1561:                JE      BOPER
1562:                JMP     SHORT BACKDDDCK
1563: BOPER:         LEA     DI,PORT1OPER
1564: BDDDOPER:      MOV     BX,CALL_PORT
1565:                INC     WP[DI+BX]           ;BUMP THE COUNTER FOR PORT
1566:                JMP     SHORT BACKDDDCK
1567: BDDD:          LEA     DI,PORT1TDDD
```

```
1568:              JMP      SHORT BODDOPER
1569: BACKDDDCK:   MOV      BX,CX
1570:              POP      DI
1571:              MOV      AX,6            ;PUT STATE 6 BACK IN AX
1572:              JMP      STATECKLP1
1573: GETTRK       ENDP
1574: SHOWREG      PROC     NEAR
1575:              PUSH     DX
1576:              CALL     LOCATE
1577:              MOV      DX,AX
1578:              CALL     STDHEX16OUT
1579:              POP      DX
1580:              RET
1581: SHOWREG      ENDP
1582:              ENDIF
1583:              IF       SYSTEM1000
1584:     XOUT     E.L.Didion & E.Lyle FMR Application   AT&T AUTOPLEX 1000
1585: CKFCB:       MOV      SI,CS:WORKING_WA
1586:              MOV      CS:FMR_CALL_PORT,10H
1587:              MOV      CS:WP_CALL_PORT,0
1588:              CMP      CS:BYP[SI+55],'2'
1589:              JNE      CKPORT3
1590:              MOV      CS:FMR_CALL_PORT,20H
1591:              MOV      CS:WP_CALL_PORT,2
1592:              JMP      SHORT CKFCBS
1593: CKPORT3:     CMP      CS:BYP[SI+65],'3'
1594:              JNE      CKFCBS
1595:              MOV      CS:FMR_CALL_PORT,30H
1596:              MOV      CS:WP_CALL_PORT,4
1597: CKFCBS:      CMP      BYP[SI+75],10    ;IS IT A LINE FEED ?
1598:              JE       CKFSP2
1599:              JMP      DUMPIT
1600: CKFSP2:      CMP      BYP[SI+140],10   ;IS IT A LINE FEED ?
1601:              JE       CKFSP3
1602:              JMP      DUMPIT
1603: CKFSP3:      CMP      BYP[SI+205],10   ;IS IT A LINE FEED ?
1604:              JE       OKCALLRCD
1605:              JMP      DUMPIT
1606: OKCALLRCD:   CMP      BYP[SI+165],30H
1607:              JE       OKCT1            ;CALL TYPE LESS THAN 10 HEX ?
1608:              JMP      DUMPIT
1609: OKCT1:       CMP      BYP[SI+166],44H  ;IS THIS A SECURITY ENTRY ?
1610:              JNE      OKCALL_TYPE
1611:              JMP      DUMPIT           ;IF SO DROP THE CALL
1612: OKCALL_TYPE: CALL     BUMPTCA
1613:              CMP      BYP[SI+166],32H  ;IS IT OPER ASSISTIED (LOCAL)
1614:              JNE      CKFOPERA
1615:              CALL     BUMPOPER
1616:              JMP      SHORT CKNEXT
1617: CKFOPERA:    CMP      BYP[SI+166],45H  ;IS IT OPER ASSISTED (TOLL)
1618:              JNE      CKFDDD
1619:              CALL     BUMPOPER
1620:              JMP      SHORT CKNEXT
1621: CKFDDD:      CMP      BYP[SI+166],34H  ;IS DDD ?
1622:              JNE      CKF800
1623:              CALL     BUMPDDD
1624:              JMP      SHORT CKNEXT
1625: CKF800:      CMP      BYP[SI+166],31H
1626:              JNE      CKNEXT
1627:              CALL     BUMPDDD
1628: CKNEXT:      MOV      AL,[SI+167]
1629:              CMP      AL,58
1630:              JL       OKTOMASK
1631:              SUB      AL,55
1632: OKTOMASK:    AND      AL,15
1633:              TEST     AL,8
1634:              JZ       APLEXNOANS
1635:              MOV      CALLCOMP,1
1636:              CALL     BUMPTCC
1637:              CALL     BUMPTRCC
1638: APLEXNOANS:  CALL     BUMPTRCA
1639:              MOV      CS:FMR_CALL,0
1640: CK_FMR_ACT:  MOV      CX,6
1641:              CMP      CS:FMR_CALL_PORT,10H  ;IS IT PORT1?
1642:              JNE      LOOK_FOR_PORT2
1643:              LEA      DI,PORT1_ACT
1644:              JMP      SHORT CK_FMR_ACT1
1645: LOOK_FOR_PORT2: CMP   CS:FMR_CALL_PORT,20H  ;IS IT PORT2?
1646:              JNE      LOOK_FOR_PORT3
1647:              LEA      DI,PORT2_ACT
1648:              JMP      SHORT CK_FMR_ACT1
```

```
1649: LOOK_FOR_PORT3: CMP    CS:FMR_CALL_PORT,30H    ;IS IT PORT3?
1650:                 JNE    BAD_CALL_PORT
1651:                 LEA    DI,PORT3_ACT
1652:                 JMP    SHORT  CK_FMR_ACT1
1653: BAD_CALL_PORT:  JMP    DUMPIT
1654: CK_FMR_ACT1:    MOV    SI,CS:WORKING_WA
1655:                 ADD    SI,53
1656:                 REPE   CMPSW
1657:                 CMP    CX,0
1658:                 JE     FND_FMR_ACT
1659: CK_FMR_DE_ACT:  MOV    CX,6
1660:                 CMP    CS:FMR_CALL_PORT,10H    ;IS IT PORT1?
1661:                 JNE    LOOK_FOR_DPORT2
1662:                 LEA    DI,PORT1_DACT
1663:                 JMP    SHORT  CK_FMR_DACT1
1664: LOOK_FOR_DPORT2:CMP    CS:FMR_CALL_PORT,20H    ;IS IT PORT2?
1665:                 JNE    LOOK_FOR_DPORT3
1666:                 LEA    DI,PORT2_DACT
1667:                 JMP    SHORT  CK_FMR_DACT1
1668: LOOK_FOR_DPORT3:CMP    CS:FMR_CALL_PORT,30H    ;IS IT PORT3?
1669:                 JNE    BAD_CALL_PORT
1670:                 LEA    DI,PORT3_DACT
1671:                 JMP    SHORT  CK_FMR_DACT1
1672: CK_FMR_DACT1:   MOV    SI,CS:WORKING_WA
1673:                 ADD    SI,53
1674:                 REPE   CMPSW
1675:                 CMP    CX,0
1676:                 JE     FND_FMR
1677:                 JMP    APLEXDONE
1678: FND_FMR_ACT:    MOV    SI,CS:WORKING_WA
1679:                 MOV    CS:FMR_CALL,1
1680:                 JMP    SHORT  GOTFMRCALL
1681: FND_FMR_DACT:   MOV    SI,CS:WORKING_WA
1682:                 MOV    CS:FMR_CALL,2
1683:                 JMP    SHORT  GOTFMRCALL
1684: APLEXDONE:      JMP    DUMPIT
1685: GOTFMRCALL:     MOV    BX,43
1686:                 LEA    DI,CALLBUF
1687:                 MOV    SI,WORKING_WA
1688:                 PUSH   BP
1689:                 MOV    BP,CALLBUFP
1690:                 MOV    CX,4
1691: MIDLOOP:        MOV    AL,[SI+BX]
1692:                 SUB    AL,48
1693:                 CMP    AL,10
1694:                 JL     OKMIDL
1695:                 MOV    AL,0
1696: OKMIDL:         SHL    AL,CL
1697:                 MOV    AH,AL
1698:                 INC    BX
1699:                 MOV    AL,[SI+BX]
1700:                 SUB    AL,48
1701:                 CMP    AL,10
1702:                 JL     OKMIDR
1703:                 MOV    AL,0
1704: OKMIDR:         OR     AL,AH
1705:                 MOV    DS:[DI+BP],AL
1706:                 INC    BP
1707:                 INC    BX
1708:                 CMP    BX,53
1709:                 JL     MIDLOOP
1710:                 XOR    AX,AX
1711:                 MOV    CS:WP[DI+BP],AX
1712:                 ADD    BP,2
1713:                 MOV    BX,35
1714: PUTSER:         MOV    AL,[SI+BX]
1715:                 SUB    AL,48
1716:                 CMP    AL,10
1717:                 JL     OK1STD
1718:                 SUB    AL,7
1719: OK1STD:         SHL    AL,CL
1720:                 MOV    AH,AL
1721:                 INC    BX
1722:                 MOV    AL,[SI+BX]
1723:                 SUB    AL,48
1724:                 CMP    AL,10
1725:                 JL     OK2NDD
1726:                 SUB    AL,7
1727: OK2NDD:         OR     AL,AH
1728:                 MOV    DS:[DI+BP],AL
1729:                 INC    BP
```

```
1730:                   INC     BX
1731:                   CMP     BX,43
1732:                   JL      PUTSER
1733: DIAL_DIGIT:       CMP     CS:FMR_CALL,1
1734:                   JNE     CKFD_19
1735:                   MOV     AL,08H
1736:                   OR      AL,FMR_CALL_PORT
1737:                   MOV     DS:[DI+BP],AL
1738:                   INC     BP
1739:                   MOV     DS:BYP[DI+BP],18H
1740:                   INC     BP
1741:                   JMP     SHORT   LAST1000
1742: CKFD_19:          CMP     CS:FMR_CALL,2
1743:                   JE      OK_19
1744:                   JMP     DUMPIT
1745: OK_19:            MOV     AL,08H
1746:                   OR      AL,FMR_CALL_PORT
1747:                   MOV     DS:BYP[DI+BP],AL
1748:                   INC     BP
1749:                   MOV     DS:BYP[DI+BP],19H
1750:                   INC     BP
1751: LAST1000:         INC     BUFFLAG1
1752:                   MOV     CALLBUFP,BP
1753:                   POP     BP
1754:                   JMP     DUMPIT
1755:                   ENDIF
1756:                   IF      SYSTEM2500
1757:         %OUT      E.L.Didion & E.Lyle FMR Application   Motorola/DSC E.M.X. 2500
1758:                   IF      HOUSTON
1759:         %OUT      HOUSTON FMR SYSTEM
1760:                   ENDIF
1761: CKFCB:            MOV     SI,WORKING_WA
1762:                   MOV     CS:FMR_CALL_PORT,18H
1763:                   MOV     DX,[SI]
1764:                   CMP     WP[SI],3132H
1765:                   JE      OKDD2
1766:                   CMP     WP[SI+100],3133H
1767:                   JE      OKDD21_31
1768:                   CMP     WP[SI+100],3120H
1769:                   JNE     BADCALL1
1770:                   CMP     BYP[SI+102],38H
1771:                   JE      OKFMRCALL
1772:                   CMP     BYP[SI+102],39H
1773:                   JE      OKFMRCALL
1774: BADCALL1:         JMP     BADCALL
1775: OKDD21_31:        CMP     BYP[SI+102],31H
1776:                   JNE     BADCALL1
1777: OKFMRCALL:        LEA     DI,CALLBUF
1778:                   ADD     DI,CALLBUFP
1779:                   MOV     CX,5
1780:                   MOV     BX,40
1781: PUTMIDLP:         MOV     AX,[SI+BX]
1782:                   AND     AX,0F0FH
1783:                   ADD     BX,2
1784:                   PUSH    CX
1785:                   MOV     CX,4
1786:                   SHL     AL,CL
1787:                   OR      AL,AH
1788:                   MOV     [DI],AL
1789:                   INC     DI
1790:                   POP     CX
1791:                   LOOP    PUTMIDLP
1792:                   XOR     AX,AX
1793:                   MOV     CS:WP[DI],AX
1794:                   ADD     DI,2
1795:                   MOV     CX,4
1796:                   MOV     BX,63
1797: PUTSERLP:         MOV     AX,[SI+BX]
1798:                   ADD     BX,2
1799:                   AND     AX,4F4FH
1800:                   CMP     AH,10
1801:                   JL      OKUPPER
1802:                   SUB     AH,55
1803: OKUPPER:          CMP     AL,10
1804:                   JL      OKLOWER
1805:                   SUB     AL,55
1806: OKLOWER:          CALL    SHIFT4
1807:                   OR      AL,AH
1808:                   MOV     [DI],AL
1809:                   INC     DI
1810:                   LOOP    PUTSERLP
```

```
1811:            MOV     BX,100
1812:            MOV     CX,4
1813:            MOV     AH,CS:FMR_CALL_PORT
1814: PUTDDLP:   MOV     AL,[SI+BX]
1815:            AND     AL,15
1816:            OR      AL,AH
1817:            CMP     AL,10
1818:            JNE     OKDD1
1819:            INC     AL
1820: OKDD1:     MOV     [DI],AL
1821:            INC     DI
1822:            INC     BX
1823:            MOV     AX,[SI+BX]
1824:            AND     AX,0F0FH
1825:            AND     AL,15
1826:            SHL     AL,CL
1827:            OR      AL,AH
1828:            MOV     [DI],AL
1829:            MOV     AX,CALLBUFP
1830:            ADD     AX,13
1831:            MOV     CALLBUFP,AX
1832:            INC     BUFFLAG1
1833:            CALL    BUMPTCA
1834:            CALL    BUMPTCC
1835: BADCALL:   JMP     DUMPIT
1836:            ENDIF
1837:            IF      SYSTEMASTRO
1838:    %OUT    E.L.Didion & E.Lyle FMR Application  Astronet System
1839:            IF      ORLANDO
1840:    %OUT    ORLANDO FLA. System
1841:            ENDIF
1842: CKFCB:     MOV     SI,WORKING_WA
1843:            CMP     BYP[SI+13],':'
1844:            JNE     BADLINK
1845:            CMP     BYP[SI+16],':'
1846:            JE      OKTOPUT
1847: BADLINK:   JMP     DUMPIT
1848: OKTOPUT:   LEA     DI,CALLBUF
1849:            ADD     DI,CALLBUFP
1850:            MOV     CX,5
1851:            MOV     BX,19
1852: PUTMID:    XOR     AX,AX
1853:            MOV     AL,[SI]
1854:            AND     AL,15
1855:            CALL    SHIFT4
1856:            XCHG    AH,AL
1857:            INC     BX
1858:            MOV     AL,[SI+BX]
1859:            AND     AL,15
1860:            OR      AL,AH
1861:            MOV     [DI],AL
1862:            INC     DI
1863:            INC     BX
1864:            LOOP    PUTMID
1865:            MOV     CX,5
1866:            MOV     BYP[DI],0
1867:            INC     DI
1868:            MOV     BX,30
1869: PUTSER:    XOR     AX,AX
1870:            MOV     AL,[SI+BX]
1871:            CMP     AL,41H
1872:            JL      OKHEX1
1873:            SUB     AL,55
1874: OKHEX1:    AND     AL,15
1875:            CALL    SHIFT4
1876:            INC     BX
1877:            XCHG    AH,AL
1878:            MOV     AL,[SI+BX]
1879:            CMP     AL,41H
1880:            JL      OKHEX2
1881:            SUB     AL,55
1882: OKHEX2:    AND     AL,15
1883:            OR      AL,AH
1884:            MOV     [DI],AL
1885:            INC     DI
1886:            INC     BX
1887:            LOOP    PUTSER
1888:            MOV     BX,42
1889: PUTNUM:    MOV     AL,1BH
1890:            MOV     [DI],AL
1891:            INC     DI
```

```
1892:              XOR      AX,AX
1893: OKNUM:       MOV      AL,[SI+BX]
1894:              INC      BX
1895:              AND      AL,15
1896:              CALL     SHIFT4
1897:              XCHG     AH,AL
1898:              MOV      AL,[SI+BX]
1899:              AND      AL,15
1900:              OR       AL,AH
1901:              MOV      [DI],AL
1902:              INC      BUFFLAG1
1903:              MOV      AX,CALLBUFP
1904:              ADD      AX,13
1905:              MOV      CALLBUFP,AX
1906:              CALL     BUMPTCA
1907:              CALL     BUMPTCC
1908:              CALL     BUMPTRCA
1909:              CALL     BUMPTRCC
1910:              JMP      DUMPIT
1911:              ENDIF
1912:              IF       SYSTEMASTRO1
1913:       %OUT   E.L.Didion & E.Lyle FMR Application  Astronet1 System
1914: CKFCB:       MOV      SI,WORKING_WA
1915:              JMP      DUMPIT
1916:              ENDIF
1917:              IF       SYSTEMEXRO
1918:       %OUT   E.L.Didion & E.Lyle FMR Application  L. M. Ericson System
1919: CKFCB:       JMP      DUMPIT
1920:              ENDIF
1921:              IF       SYSTEMNOVA
1922:       %OUT   E.L.Didion & E.Lyle FMR Application  Novatel System
1923: CKFCB:       JMP      DUMPIT
1924:              ENDIF
1925: CKINRP:      IRET
1926:              PUSH     DS
1927:              PUSH     ES
1928:              PUSHA
1929:              MOV      AX,40H
1930:              MOV      DS,AX
1931:              PUSH     CS
1932:              POP      ES
1933: TELL_PORT:   ;MOV     CS:WP OK_THIS_PORT,1
1934:              ;PUSH    CS
1935:              ;POP     DS
1936:              ;PUSH    CS
1937:              ;POP     ES
1938:              ;CALL    STONESOUT
1939:              JMP      SHORT OK_PORTS_RET
1940: OK_PORTS_1:  CMP      CS:WP OK_THIS_PORT,0
1941:              JE       OK_PORTS
1942:              MOV      CS:WP OK_THIS_PORT,0
1943: OK_PORTS_RET: POPA
1944:              POP      ES
1945:              POP      DS
1946: GO_BACK_NOW: IRET
1947: NEXTM:
1948: NEXTM1:
1949: DONEINRP:    MOV      CS:INT_ACT,0
1950:              POPA
1951:              POP      BP
1952:              POP      ES
1953:              POP      DS
1954:              IRET
1955: ;INDATA ;BX CONTAINS THE UNIT NUMBER (BX=0=PORT1 BX=1=PORT2 ECT.)
1956: STDCOMINIT   PROC     NEAR
1957:              CLI
1958:              PUSH     DS
1959:              LEA      SI,PORT1_UART
1960:              SHL      BX,1              ;SELECT TWO WORD OFFSET
1961: DO_COM:      MOV      DX,[SI+BX]        ;GET I/O ADDRESS IN DX
1962:              ADD      DX,3              ;GET LINE CONTROL REG ADDRESS
1963:              MOV      AL,80H            ;GET BIT 7 ON
1964:              OUT      DX,AL
1965:              DEC      DX
1966:              DEC      DX                ;GET MSB FOR BAUD RATE GEN
1967:              LEA      SI,PORT1_BAUD     ;GET BAUD RATE WORD
1968:              MOV      AX,[SI+BX]        ;GET BAUD RATE
1969:              OUT      DX,AL
1970:              DEC      DX                ;GET LSB FOR BAUD RATE GEN
1971:              XCHG     AH,AL
1972:              OUT      DX,AL
```

```
1973:                  ADD     DX,3             ;GET LINE CONTROL REG ADD BACK
1974:                  LEA     SI,PORT1_PAR
1975:                  MOV     AX,[SI+BX]       ;GET PARITY WORD
1976:                  OUT     DX,AL
1977: GETLCR:          MOV     CX,40H           ;GET I/O DATA SEGMENT VALUE
1978:                  MOV     DS,CX            ;SET I/O DATA SEGMENT IN DS
1979:                  AND     DX,1F8H
1980:                  ADD     DX,3             ;GET LCR REG ADDRESS
1981:                  IN      AL,DX
1982:                  AND     AL,7FH           ;RESET DLAB
1983:                  OUT     DX,AL
1984:                  MOV     AL,3
1985:                  INC     DX               ;GET MCR REG ADDRESS
1986:                  OUT     DX,AL            ;SET DTR & RTS & OUT2
1987:                  PUSH    DX
1988:                  SUB     DX,4
1989:                  IN      AL,DX
1990:                  POP     DX
1991:                  SUB     DX,3             ;GET IER REG ADDRESS
1992:                  LEA     SI,PORT1_IMASK   ;GET PORT1 INTERRUPT MASK
1993:                  MOV     AL,CS:[SI+BX]    ;GET THIS PORT'S MASK
1994:                  OUT     DX,AL
1995:                  JMP     $+2              ;DELAY FOR HARDWARE
1996:                  AND     DX,1F8H
1997: CLEARPORT:       IN      AL,DX
1998:                  INC     DX
1999:                  MOV     CX,DX
2000:                  AND     CX,7
2001:                  CMP     CX,7
2002:                  JNE     CLEARPORT
2003:                  MOV     AL,20H
2004:                  OUT     20H,AL
2005:                  IN      AL,21H
2006:                  AND     AL,0DFH
2007:                  OUT     21H,AL
2008: DO_BACK:         POP     DS
2009:                  STI
2010:                  RET                      ;RETURN TO CALLER
2011: STDCOMINIT       ENDP
2012: STDOUTBELL       PROC    NEAR
2013:                  PUSH    AX
2014:                  PUSH    CX
2015:                  PUSH    DX
2016:                  MOV     DX,61H
2017:                  IN      AL,61
2018:                  PUSH    AX
2019:                  OR      AL,3
2020:                  XOR     CX,CX
2021:                  OUT     DX,AL
2022: BELL1:           LOOP    BELL1
2023:                  POP     AX
2024:                  OUT     DX,AL
2025:                  POP     DX
2026:                  POP     CX
2027:                  POP     AX
2028:                  RET
2029: STDOUTBELL       ENDP
2030: SYSREQ:          PUSHA
2031:                  PUSH    DS
2032:                  PUSH    ES
2033:                  PUSH    BP
2034:                  STI
2035:                  CMP     AX,8500H
2036:                  JE      OKSYSREQ
2037:                  INT     68H
2038:                  JMP     SYSREQBACK
2039: OKSYSREQ:        PUSH    CS
2040:                  POP     DS
2041:                  PUSH    CS
2042:                  POP     ES
2043:                  MOV     DX,1601H
2044:                  CALL    LOCATE
2045:                  LEA     SI,MES6
2046:                  CALL    STDMESOUT
2047:                  MOV     DX,1701H
2048:                  CALL    LOCATE
2049:                  CMP     REQCT,0
2050:                  JNE     SHOWREQ
2051:                  MOV     AL,255
2052:                  MOV     REQCT,AL
2053:                  LEA     SI,MES2
```

```
2054:            CALL    STDMESOUT
2055:            JMP     SYSREQBACK
2056: SHOWREG:   MOV     REQCT,0
2057:            LEA     SI,MES1
2058:            CALL    STDMESOUT
2059:            MOV     DX,CS
2060:            CALL    STDHEX16OUT
2061:            CALL    STDOUTSP
2062:            LEA     SI,FQAD
2063:            MOV     DX,WP[SI]
2064:            CALL    STDHEX16OUT
2065:            CALL    STDOUTSP
2066:            MOV     DX,WP[SI+2]
2067:            CALL    STDHEX16OUT
2068:            CALL    STDOUTSP
2069:            MOV     DX,WP[SI+4]
2070:            CALL    STDHEX16OUT
2071:            CALL    STDOUTSP
2072:            MOV     DX,WP[SI+6]
2073:            CALL    STDHEX16OUT
2074:            CALL    STDOUTSP
2075:            LEA     SI,PORT1_WA
2076:            MOV     DX,[SI]
2077:            CALL    STDHEX16OUT
2078:            CALL    STDOUTSP
2079:            MOV     DX,CALLBUFP
2080:            CALL    STDHEX16OUT
2081:            CALL    STDOUTSP
2082:            MOV     DL,BUFFLAG1
2083:            XOR     DH,DH
2084:            CALL    STDHEX16OUT
2085:            CALL    STDOUTSP
2086:            MOV     DX,BASELINE
2087:            CALL    STDDEC16OUT
2088:            CALL    STDOUTSP
2089:            XOR     DX,DX
2090:            MOV     DL,HEARTBEAT
2091:            CALL    STDHEX8OUT
2092:            CALL    STDOUTSP
2093:            MOV     DX,1BFH
2094:            IN      AL,DX
2095:            MOV     DL,AL
2096:            CALL    STDHEX8OUT
2097:            CALL    STDOUTSP
2098:            MOV     DX,CS:PORT1_STATE
2099:            CALL    STDDEC16OUT
2100:            CALL    STDOUTSP
2101:            PUSH    DS
2102:            MOV     AX,40H
2103:            MOV     DS,AX
2104:            MOV     SI,110H
2105:            MOV     AX,DS:[SI]
2106:            MOV     DS,AX
2107:            MOV     SI,2EH
2108:            MOV     DX,DS:[SI]
2109:            POP     DS
2110:            CALL    STDDEC16OUT
2111:            IF      SYSTEM2500
2112:            CALL    STDOUTSP
2113:            MOV     DL,CS:LOGSTATE
2114:            CALL    STDHEX8OUT
2115:            ENDIF
2116:            MOV     AL,2
2117:            OUT     20H,AL
2118:            MOV     AX,40H
2119:            MOV     DS,AX
2120:            MOV     SI,17H
2121:            MOV     AL,BYP[SI]
2122:            PUSH    CS
2123:            POP     DS
2124:            AND     AL,3
2125:            CMP     AL,3
2126:            JNE     SYSREQBACK
2127:            JMP     BOOT
2128: SYSREQBACK: POP    BP
2129:            POP     ES
2130:            POP     DS
2131:            POPA
2132:            INT     60H
2133:            IRET
2134: KEYBOARD   EQU     17H
```

```
2135: LINE            EQU     2EH
2136: BASICASEG       EQU     510H
2137: SHIFT4                  PROC    NEAR
2138:                 PUSH    CX
2139:                 MOV     CX,4
2140:                 SHL     AL,CL
2141:                 POP     CX
2142:                 RET
2143: SHIFT4          ENDP
2144: BOOT:           MOV     AX,0F000H
2145:                 MOV     DS,AX
2146:                 MOV     DX,0E05BH
2147:                 MOV     AX,2554H
2148:                 INT     21H
2149:                 INT     54H
2150: START           ENDP
2151:                 INCLUDE NEW2.ASM
2152:                 INCLUDE NEW3.ASM
2153:                 INCLUDE NEW4.ASM
2154:                 INCLUDE NEW5.ASM
2155:                 INCLUDE NEW6.ASM
2156: CGROUP          ENDS
2157:                 END

1: *              %OUT     E.L.Didion & E.Lyle FMR Application 2
  2: AST4_INRP:      PUSH     DS
  3:                 PUSH     ES
  4:                 PUSHA
  5:                 IN       AL,21H
  6:                 OR       AL,20H
  7:                 JMP      $+2
  8:                 JMP      $+2
  9:                 OUT      21H,AL
 10:                 MOV      AL,20H
 11:                 JMP      $+2
 12:                 JMP      $+2
 13:                 OUT      20H,AL
 14:                 MOV      AX,CGROUP       ;GET DATA SEG
 15:                 MOV      DS,AX
 16:                 MOV      ES,AX
 17:                 JMP      $+2
 18:                 JMP      $+2
 19: CHECK_AST:      MOV      DX,1BFH         ;GET AST MAIN INRP REGISTER
 20:                 IN       AL,DX           ;READ AST INTERRUPT CONTROL REG
 21:                 AND      AL,0FH          ;MASK THE SHIT WE DON'T NEED!
 22:                 CMP      AL,0FH          ;ANY INTERRUPT'S PENDING ?
 23:                 JE       AST_DONE        ;IF NOT GET OUT OF HERE
 24: AST1:           TEST     AL,1            ;IS I( PORT 1
 25:                 JNZ      AST2
 26:                 MOV      BX,0
 27:                 JMP      PORT_INRP_1
 28: AST2:           TEST     AL,2
 29:                 JNZ      AST3
 30:                 MOV      BX,1
 31:                 JMP      PORT_INRP_1
 32: AST3:           TEST     AL,4
 33:                 JNZ      AST4
 34:                 MOV      BX,2
 35:                 JMP      PORT_INRP_1
 36: AST4:           TEST     AL,8
 37:                 JNZ      AST_DONE
 38:                 MOV      BX,3
 39:                 JMP      PORT_INRP_1
 40: AST_DONE:       JMP      COM_PORT_RET
 41: COMMENT !
 42: ************************************************************
 43: * THE INTERRUPT ID REGISTER HAS 4 VALUES- THEY ARE AS FOLLOWS: *
 44: *  6 = HIGHEST PRIORTY = OVERRUN OR PARITY OR FRAMING OR BREAK *
 45: *  4 = SECOND  PRIORTY = RECEIVER DATA READY                   *
 46: *  2 = THIRD   PRIORTY = TRANSMITTER HOLDING REGISTER EMPTY    *
 47: *  0 = FOURTH  PRIORTY = MODEM/RS-232 LEAD STATUS CHANGE       *
 48: ************************************************************
 49: !
 50: PORT_INRP_1: MOV   CS:WORK_PORT,BX
 51: START_UART:  MOV   BX,CS:WORK_PORT
 52: START_UART1: SHL   BX,1                   ;MULTIPLY BY 2 FOR TABLE OFFSET
 53:              MOV   CS:WORK_PORTS,BX
 54:              LEA   SI,PORT1_UART
```

```
55:             MOV     DX,CS:WP[SI+BX] ;GET PORT UART START ADD
56:             MOV     CS:TEMP_PORT2,DX
57:             STI
58:             IF      SYSTEM500
59:             INCLUDE 500SYS.ASM
60:             ENDIF
61:             IF      SYSTEM2500
62:             INCLUDE 2500SYS.ASM
63:             ENDIF
64:             IF      SYSTEM10
65:             INCLUDE 10SYS.ASM
66:             ENDIF
67:             IF      SYSTEM100
68:             INCLUDE 100SYS.ASM
69:             ENDIF
70:             IF      SYSTEM1000
71:             INCLUDE 1000SYS.ASM
72:             ENDIF
73:             IF      SYSTEMASTRO
74:             INCLUDE ASTROSYS.ASM
75:             ENDIF
76:             IF      SYSTEMASTRO1
77:             INCLUDE ASTR1SYS.ASM
78:             ENDIF
79:             IF      SYSTEMNOVA
80:             INCLUDE NOVASYS.ASM
81:             ENDIF
82:             IF      SYSTEMEXRO
83:             INCLUDE EXROSYS.ASM
84:             ENDIF
85:             JMP     CHECK_AST
86:             IF      SYSTEMFMR
87: RDA2FD:     PUSH    DX
88:             PUSH    BX
89:             LEA     DI,PORT1_UART
90:             MOV     DX,[DI+BX]
91:             IN      AL,DX           ;READ THE CHAR
92:             ADD     DX,5
93:             PUSH    AX
94:             IN      AL,DX           ;CLEAR ANY ERRORS
95:             POP     AX
96:             LEA     DI,PORT1_STATE
97:             ADD     DI,BX
98:             CMP     WP[DI],1        ;ARE WE RECIEVING AN INPUT
99:             JNE     DONE_IN
100: GOOD_INPUT: CMP    AL,10           ;IS IT LINE FEED ?
101:            JE      DONE_IN
102:            CMP     AL,0            ;IS A NULL CHAR ?
103:            JE      DONE_IN
104:            CMP     AL,13           ;IS IT A CARRIAGE RETURN ?
105:            JNE     GET_LINE1
106:            MOV     AL,0
107: GET_LINE1: LEA     DI,PORT1_WA
108:            ADD     DI,BX
109:            MOV     DX,BX
110:            XOR     BX,BX
111:            MOV     SI,WP[DI]       ;GET THE WORK AREA ADDESSS
112:            MOV     BL,BYP[SI+10]   ;GET CHAR COUNT
113:            ADD     BX,17
114:            INC     BYP[SI+10]
115:            MOV     BYP[SI+BX],AL
116:            CMP     AL,0
117:            JNE     DONE_IN
118: DONE_LINE: LEA     DI,PORT1_STATE
119:            ADD     DI,DX
120:            MOV     WP[DI],3        ;SET PORT STATE = LINE DONE
121:            LEA     DI,PORT1_WA
122:            ADD     DI,DX
123:            MOV     DX,WP[DI]
124:            MOV     AX,TRACE
125:            PUSH    AX
126:            MOV     TRACE,0
127:            MOV     AX,FSIB
128:            CALL    LINKEND
129:            POP     AX
130:            MOV     TRACE,AX
131: DONE_IN:   POP     BX
132:            POP     DX
133:            JMP     START_UART
134: CK2THRE:   CMP     AL,2            ;IS IT TRANSMITTER HOLD EMPTY ?
135:            JNE     CKMODEM         ;NO, THEN CHECK LINE STATUS
```

```
136:              LEA     DI,PORT1_STATE
137:              ADD     DI,BX
138:              CMP     WP[DI],2        ;ARE WE SENDING A MESSAGE
139:              JE      PORT_MES_F
140:              JMP     START_UART
141: PORT_MES_F:  LEA     SI,PORT1_WA
142:              MOV     DI,WP[SI+BX]
143:              MOV     AX,[DI+12]      ;GET MESSAGE SEGMENT
144:              PUSH    ES
145:              MOV     ES,AX
146:              MOV     AX,[DI+14]      ;GET MESSAGE OFFSET
147:              INC     WP[DI+14]
148:              XOR     DX,DX
149:              MOV     DL,BYP[DI+16]
150:              MOV     SI,AX
151:              MOV     AL,ES:BYP[SI]
152:              POP     ES
153:              CMP     AL,0            ;IS IT THE END OF MESSAGE ?
154:              JE      DROP_CHAR1
155:              CALL    STD_OUTP
156:              JMP     START_UART
157: DROP_CHAR1:  LEA     DI,PORT1_STATE
158:              MOV     WP[DI+BX],4
159: DROP_CHAR:   LEA     SI,PORT1_WA
160:              MOV     DI,WP[SI+BX]
161:              LEA     AX,COM_DISPATCH
162:              MOV     WP[DI+4],AX
163:              MOV     DX,DI
164:              MOV     AX,TRACE
165:              PUSH    AX
166:              MOV     AX,FS1B
167:              CALL    LINKEND
168:              POP     AX
169:              MOV     TRACE,AX
170:              JMP     START_UART
171: CKMODEM:     PUSH    DX
172:              MOV     DX,WP[SI+BX]    ;GET UART START ADDRESS
173:              ADD     DX,4            ;GET MODEM STATUS REG ADDRESS
174:              IN      AL,DX
175:              POP     DX
176:              JMP     START_UART
177:              ENDIF
178: COM_PORT_RET: IN     AL,21H
179:              AND     AL,0f
180:              JMP     $+2
181:              OUT     21H,A
182:              MOV     BYP CS:PORT_BUSY,0
183: COMMENT |
184:              JMP     $+2
185:              MOV     AL,20H
186:              OUT     20H,AL
187: |
188:              POPA
189:              POP     ES              ;GET REGISTER'S BACK
190:              POP     DS
191:              IRET

1:*           %OUT    E.L.Didion & E.Lyle FMR Application 3
2: COMMENT |
3: *******************************   ******
4: * ROUTINE FOR STANDARD MESSAGE OUT *
5: *******************************   ******
6: |
7: STDMESIN     PROC    NEAR
8:              MOV     AH,10
9:              MOV     DX,OFFSET TEMPBUF
10:             INT     21H
11:             RET
12: STDMESIN    ENDP
13: COMMENT |
14: ******************************************
15: * ROUTINE FOR STANDARD INPUT WITH ECHO    *
16: ******************************************
17: |
18: STDIN          PROC    NEAR
19:             MOV     AH,1            ;SET UP FOR BIOS INPUT
20:             INT     21H             ;GOTO DOS FOR SERVICE
21:             RET                     ;RETURN TO CALLER
```

```
22: STDIN           ENDP
23: COMMENT !
24: ************************************************
25: * ROUTINE FOR STANDARD INPUT WITHOUT ECHO (PASSWORDS ECT.) *
26: ************************************************
27: !
28: STDINNE         PROC    NEAR
29:                 MOV     AH,8            ;SET UP FOR DOS SERVICE
30:                 INT     21H             ;GOTO DOS FOR SERVICE
31:                 RET                     ;RETURN TO CALLER
32: STDINNE         ENDP
33: COMMENT !
34: ************************************************
35: * ROUTINE TO CHECK IF A KEY HAS BEEN PRESSED *
36: ************************************************
37: !
38: STDINCK         PROC    NEAR
39:                 PUSH    DX              ;SAVE DX
40:                 PUSH    CX
41:                 MOV     DL,0FFH         ;SET UP FOR CONSOLE INPUT
42:                 MOV     AH,06H          ;CHECK KEY BOARD INPUT
43:                 INT     21H             ;GOTO DOS SERVICE ROUTINE
44:                 POP     CX
45:                 POP     DX              ;RESTORE DX
46:                 RET                     ;RETURN TO CALLER
47: STDINCK         ENDP
48: COMMENT !
49: ************************************************
50: * ROUTINE TO SEND CARRIAGE RETURN AND LINE FEED TO STANDARD OUTPUT *
51: ************************************************
52: !
53: STDOUTCRLF      PROC    NEAR
54:                 PUSH    DX              ;SAVE DX
55:                 MOV     DL,13           ;PUT ASCII FOR CR IN DL
56:                 CALL    STDOUTTTY
57:                 MOV     DL,10           ;PUT ASCII FOR LF IN DL
58:                 CALL    STDOUTTTY
59:                 POP     DX              ;RESTORE DX
60:                 RET
61: STDOUTCRLF      ENDP
62: COMMENT !
63: ************************************************
64: * ROUTINE TO OUTPUT A SPACE TO THE SCREEN *
65: ************************************************
66: !
67: STDOUTSP        PROC    NEAR
68:                 PUSH    DX
69:                 PUSH    AX
70:                 PUSH    CX
71:                 MOV     AL,' '
72:                 CALL    STDOUT
73:                 POP     CX
74:                 POP     AX
75:                 POP     DX
76:                 RET
77: STDOUTSP        ENDP
78: COMMENT !
79: ************************************************
80: * ROUTINE TO SEND A COMPLETE MESSAGE TO STANDARD OUTPUT DEVICE *
81: * INDATA :DS+SI POINT TO MESSAGE ADDRESS *
82: ************************************************
83: !
84: STDMESOUT       PROC    NEAR
85:                 PUSHF
86:                 PUSH    SI              ;SAVE REGISTERS
87:                 PUSH    AX
88: STDMESOUT1:     MOV     AL,[SI]         ;GET A CHAR. FROM THE MESSAGE
89:                 INC     SI              ;POINT TO NEXT CHAR.
90:                 CMP     AL,0            ;MESSAGE COMPLETE?
91:                 JE      STDMESOUT       ;IF SO THEN EXIT
92:                 CMP     AL,1            ;CONTROL A ?
93:                 JNE     MESOUT1
94:                 MOV     DX,[SI]         ;YES THEN NEXT 2 BYTE OUTPUT
95:                 CALL    STDHEX16OUT
96:                 INC     SI
97:                 INC     SI
98:                 JMP     STDMESOUT1
99: MESOUT1:        CMP     AL,2            ;CONTROL B ?
100:                JNE     MESOUT2         ;NO,CHECK FOR CONTROL C
101:                MOV     DL,[SI]         ;YES,THEN NEXT BYTE OUTPUT
102:                CALL    STDHEX8OUT
```

```
103:              INC      SI
104:              JMP      STDMESOUT1
105: MESOUT2:     CMP      AL,3             ;CONTROL C ?
106:              JNE      MESOUT3          ;NO,CHECK FOR CONTROL D
107:              CALL     PDATE            ;YES,THEN OUTPUT DATE&TIME
108:              CALL     PTIME
109:              JMP      STDMESOUT1
110: MESOUT3:     CMP      AL,4             ;CONTROL D ?
111:              JNE      MESOUT4
112:              CALL     CLEAR            ;YES,THEN CLEAR SCREEN
113:              JMP      STDMESOUT1
114: MESOUT4:     CMP      AL,5             ;CONTROL E ?
115:              JNE      MESOUT5
116:              CALL     STDOUTCRLF       ;YES,THEN OUTPUT CR&LF
117:              JMP      STDMESOUT1
118: MESOUT5:     CMP      AL,6             ;CONTROL F ?
119:              JNE      MESOUT6
120:              MOV      DH,[SI]          ;YES,THEN LOCATE NEXT 2 BYTES
121:              INC      SI
122:              MOV      DL,[SI]
123:              INC      SI
124:              CALL     LOCATE
125:              JMP      STDMESOUT1
126: MESOUT6:     CMP      AL,7             ;CONTROL G ?
127:              JNE      MESOUT7
128:              MOV      AL,[SI]          ;CHANGE ATTRIBUTE
129:              MOV      ATTB,AL
130:              INC      SI
131:              JMP      STDMESOUT1
132: MESOUT7:     CALL     STDOUTTTY
133:              JMP      STDMESOUT1       ;GO GET NEXT CHAR.
134: STDMESEXIT:  POP      AX               ;GET AX BACK
135:              POP      SI               ;GET SI BACK
136:              POPF
137:              RET                       ;RETURN TO CALLER
138: STDMESOUT    ENDP
139: COMMENT !
140: ############################################################
141: # ROUTINE TO CHECK THE COMM LINE FOR INPUT                  #
142: # INDATA :DX CONTAINS THE UNIT NUMBER (DX=0=COM1: AND DX=1=COM2:) #
143: # OUTDATA:IF CHAR READY THEN FLAG NZ AND BYTE IN AL ELSE FLAG Z  #
144: ############################################################
145: !
146: STDCOMINCK   PROC     NEAR
147:              PUSH     DS               ;SAVE REGISTERS
148:              PUSH     DX
149:              PUSH     SI
150:              MOV      SI,DX            ;DX=0=COM1: DX=1=COM2:
151:              ADD      SI,SI            ;DOUBLE INDEX INTO TABLE
152:              MOV      DX,40H           ;SET SEGMENT TABLE ADDRESS
153:              MOV      DS,DX            ;PUT IN SEGMENT REG.
154:              MOV      DX,[SI]          ;GET IT
155:              ADD      DX,5             ;ADD LINE STATUS
156:              IN       AL,DX            ;READ DEVICE STATUS
157:              TEST     AL,1             ;TEST RECV REGISTER FULL BIT
158:              JZ       STDCOMINCKE      ;IF NOT THEN RETURN TO CALLER
159:              MOV      DX,[SI]
160:              IN       AL,DX            ;GET THE CHAR
161: STDCOMINCKE: POP      SI               ;RESTORE REGISTERS
162:              POP      DX
163:              POP      DS
164:              RET
165: STDCOMINCK   ENDP
166: COMMENT !
167: ########################################
168: # ROUTINE TO SEND A CHAR TO THE COMM PORT #
169: # INDATA: AL=ASCII CHAR                  #
170: #         DX=COM PORT=0=COM1 1=COM2      #
171: ########################################
172: !
173: STDCOMOUT    PROC     NEAR
174:              MOV      AH,1             ;SEND IT OUT
175:              INT      14H              ;REQUEST DOS SERVICE
176:              RET
177: STDCOMOUT    ENDP
178: COMMENT !
179: ############################################################
180: # ROUTINE TO TURN SIGNAL LINE DTR AND RTS ON                #
181: # INDATA :DX CONTAINS THE UNIT NUMBER (DX=0=COM1: AND DX=1=COM2:) #
182: # OUTDATA:COM PORT TURNED ON                                #
183: ############################################################
```

```
184:  |
185:  STDCOMON    PROC    NEAR
186:              PUSH    DS              ;SAVE DATA STORE POINTER
187:              PUSH    DX              ;SAVE DATA AREA INDEX REG.
188:              PUSH    SI              ;SAVE INDEX REG.
189:              MOV     SI,DX           ;PUT DX IN INDEX SI
190:              ADD     SI,SI           ;DOUBLE THE COM INDEX
191:              MOV     DX,40H          ;GET SYSTEM I/O TABLE SEG
192:              MOV     DS,DX           ;PUT I/O SEG IN DATA STORE REG.
193:              MOV     DX,[SI]         ;GET INDEX FOR COM-X
194:              ADD     DX,4            ;GET MODEM CONTROL REG ADDRESS
195:              MOV     AL,0BH          ;GET  DTR AND RTS AND OUT2
196:              OUT     DX,AL           ;SET THE MODEM CARD REG.
197:              POP     SI              ;GET REGISTER'S BACK
198:              POP     DX
199:              POP     DS
200:              RET                     ;RETURN TO THE CALLER
201:  STDCOMON    ENDP
202:  COMMENT |
203:  **************************************************
204:  * ROUTINE TO TURN OFF DTR ON THE SPECIFIED COM PORT      *
205:  * INDATA :DX CONTAINS THE UNIT NUMBER (DX=0=COM1: AND DX=1=COM2:)  *
206:  * OUTDATA:DTR LINE RESET ON THE SPECIFIED COM PORT       *
207:  **************************************************
208:  |
209:  STDCOMOFF   PROC    NEAR
210:              PUSH    DS              ;SAVE NEEDED REGISTERS
211:              PUSH    DX
212:              PUSH    SI
213:              MOV     SI,DX
214:              ADD     SI,SI
215:              MOV     DX,40H
216:              MOV     DS,DX
217:              MOV     DX,[SI]
218:              ADD     DX,4
219:              MOV     AL,0
220:              OUT     DX,AL
221:              POP     SI
222:              POP     DX
223:              POP     DS
224:              RET                     ;RETURN TO CALLER
225:  STDCOMOFF   ENDP
226:  COMMENT |
227:  **************************************************
228:  * ROUTINE TO SEND A MESSAGE TO THE COMM PORT'S   *
229:  * INDATA :SI=MESSAGE ADDRESS                     *
230:  *        :DX=0=COM1 DX=1=COM2                    *
231:  **************************************************
232:  |
233:  STDCOMMES   PROC    NEAR
234:              PUSH    SI
235:              PUSH    DX
236:  MESLOOP:    MOV     AL,[SI]
237:              INC     SI
238:              CMP     AL,0            ;END OF MESSAGE?
239:              JNE     MESLOP1
240:              POP     DX
241:              POP     SI
242:              RET
243:  MESLOP1:    CALL    STDCOMOUT
244:              JMP     MESLOOP
245:  STDCOMMES   ENDP
246:  COMMENT |
247:  **************************************************
248:  * ROUTINE TO SEND HEX OUT TO THE STANDARD OUTPUT DEVICE   *
249:  * INDATA:DL=WORD(BINARY)                                  *
250:  **************************************************
251:  |
252:  STDHEX8OUT  PROC    NEAR
253:              PUSH    CX
254:              PUSH    AX
255:              PUSH    DS
256:              PUSH    ES
257:              MOV     CX,2            ;GET LOOP COUNT OF 2(2*4)=8
258:  HEXOUT1:    PUSH    CX              ;SAVE LOOP COUNT
259:              MOV     CL,4
260:              ROL     DL,CL           ;ROTATE DL LEFT
261:              MOV     AL,DL           ;MOV IT TO AL
262:              AND     AL,00FH         ;GET JUST THIS DIGIT
263:              DAA                     ;ADD 6 IF A-F
264:              ADD     AL,0F0H         ;ADD ONE IF CARRY SET
```

```
265:                ADC     AL,040H         ;MAKE ASCII
266:                CALL    STDOUTTTY       ;GO OUTPUT THE CHAR
267:                POP     CX              ;GET CX BACK
268:                LOOP    HEXOUT1
269:                POP     ES
270:                POP     DS
271:                POP     AX
272:                POP     CX
273:                RET
274: STDHEX8OUT     ENDP
275: COMMENT !
276: **********************************************
277: * ROUTINE TO SEND HEX OUT TO A DISK HANDLE   *
278: * INDATA:DL=WORD(BINARY)                     *
279: *        BX=HANDLE                           *
280: **********************************************
281: !
282: STDHEX8WRT     PROC    NEAR
283:                PUSH    CX
284:                PUSH    AX
285:                PUSH    DX
286:                XOR     AX,AX
287:                MOV     CS:WR01,BX      ;SAVE THE HANDLE
288:                MOV     CX,2            ;GET LOOP COUNT OF 2(2*4)=8
289: HEXWRT1:       MOV     CS:CXREG,CX     ;SAVE LOOP COUNT
290:                MOV     CL,4
291:                ROL     DL,CL           ;ROTATE DL LEFT
292:                MOV     AL,DL           ;MOV IT TO AL
293:                AND     AL,00FH         ;GET JUST THIS DIGIT
294:                DAA                     ;ADD 6 IF A-F
295:                ADD     AL,0F0H         ;ADD ONE IF CARRY SET
296:                ADC     AL,040H         ;MAKE ASCII
297:                MOV     CS:DXREG,DX
298:                LEA     DX,WR02
299:                MOV     WR02,AX
300:                MOV     CX,1            ;WRITE 1 WORD (TWO ASCII CHAR)
301:                MOV     BX,CS:WR01      ;GET THE FILE HANDLE BACK
302:                CALL    WRITEFILE       ;GO WRITE CHAR TO THE FILE
303:                MOV     DX,CS:DXREG
304:                MOV     CX,CS:CXREG
305:                LOOP    HEXWRT1
306:                POP     DX
307:                POP     AX
308:                POP     CX
309:                RET
310: STDHEX8WRT     ENDP
311: STDHEX16OUT    PROC    NEAR
312:                PUSH    CX
313:                PUSH    AX
314:                PUSH    DS
315:                PUSH    ES
316:                MOV     CX,4
317: HEX16OUT1:     PUSH    CX
318:                MOV     CL,4
319:                ROL     DX,CL
320:                MOV     AL,DL
321:                AND     AL,00FH
322:                DAA
323:                ADD     AL,0F0H
324:                ADC     AL,040H
325:                CALL    STDOUT
326:                POP     CX
327:                LOOP    HEX16OUT1
328:                POP     ES
329:                POP     DS
330:                POP     AX
331:                POP     CX
332:                RET
333: STDHEX16OUT    ENDP
334: STDDEC8OUT     PROC    NEAR
335:                PUSH    DS
336:                PUSH    DI
337:                PUSH    DX
338:                PUSH    CX
339:                PUSH    AX
340:                XOR     CX,CX
341:                MOV     DI,OFFSET TEMPBUF
342: DEC8OUT1:      PUSH    CX
343:                MOV     AL,DL
344:                XOR     AH,AH
```

```
345:            MOV     CL,10
346:            DIV     CL
347:            MOV     DL,AL
348:            MOV     AL,AH
349:            ADD     AL,30H
350:            MOV     [DI],AL
351:            INC     DI
352:            POP     CX
353:            INC     CX
354:            CMP     DL,0
355:            JNZ     DEC8r
356:            CMP     CX,2
357:            JL      DEC8O...
358: DEC8OUT2:  DEC     DI
359:            MOV     AL,[DI]
360:            CALL    STDOUT
361:            LOOP    DEC8OUT2
362:            POP     AX
363:            POP     CX
364:            POP     DX
365:            POP     DI
366:            POP     DS
367:            RET
368: STDDEC8OUT ENDP
369: STDDEC16OUT PROC   NEAR
370:            PUSH    DS
371:            PUSH    DI
372:            PUSH    DX
373:            PUSH    CX
374:            PUSH    AX
375:            XOR     CX,CX
376:            LEA     DI,TEMPBUF
377: DEC16OUT1: PUSH    CX
378:            MOV     AX,DX
379:            XOR     DX,DX
380:            MOV     CX,10
381:            DIV     CX
382:            XCHG    AX,DX
383:            ADD     AL,30H
384:            MOV     [DI],AL
385:            INC     DI
386:            POP     CX
387:            INC     CX
388:            CMP     DX,0
389:            JNZ     DEC16OUT1
390: DEC16OUT2: DEC     DI
391:            MOV     AL,[DI]
392:            CALL    STDOUT
393:            LOOP    DEC16OUT2
394:            POP     AX
395:            POP     CX
396:            POP     DX
397:            POP     DI
398:            POP     DS
399:            RET
400: STDDEC16OUT ENDP
401: SCROLL             PROC    NEAR
402:            MOV     CX,0
403:            MOV     DH,24
404:            MOV     DL,79
405:            MOV     BH,7
406:            MOV     AX,0601H    ;AH=6 REQUEST SCROLL AL
407:            INT     10H         ;CALL BIOS
408:            RET
409: SCROLL     ENDP
410: COMMENT !
411: **************************************************
412: * ROUTINE TO CONVERT FORM ASCII DECIMAL TO INTERNAL BCD  *
413: * INDATA :AH=TEN'S CHAR  AL=ONE'S CHAR                   *
414: *        :DS=DGROUP OFFSET WITHIN SEGMENT                *
415: * OUTDATA:AL=DECIMAL EQUILAVENT                          *
416: **************************************************
417: !
418: STDASCDEC  PROC    NEAR
419:            PUSH    BX          ;SAVE REG BX FOR CALLER
420:            PUSH    CX          ;SAVE REG CX FOR CALLER
421:            PUSH    DX          ;SAVE REG DX FOR CALLER
422:            SUB     AH,30H      ;CHECK FOR DIGIT
423:            JL      BADASC
424:            SUB     AL,30H      ;CHECK FOR DIGIT
```

```
425:            JL      BADASC
426:            CMP     AH,9            ;CHECK TO BIG
427:            JG      BADASC
428:            CMP     AL,9            ;CHECK TO BIG
429:            JG      BADASC
430:            MOV     CL,AL
431:            AND     AX,0FF00H
432:            XCHG    AL,AH
433:            MOV     BX,10
434:            MUL     BX
435:            XCHG    AL,AH
436:            MOV     AL,CL
437:            ADD     AL,AH
438:            CLC                     ;TELL CALLER ALL OK
439: STDASCDECR: POP    DX              ;GET REG DX BACK FOR CALLER
440:            POP     CX              ;GET REG CX BACK FOR CALLER
441:            POP     BX              ;GET REG BX BACK FOR CALLER
442:            RET
443: BADASC:    STC                     ;TELL CALLER BAD CHAR NOT(0-9)
444:            JC      STDA:
445: STDASCDEC  ENDP
446: COMMENT !
447: ***********************************************************
448: * MODULE SETCOLOR IS USED TO CHANGE THE COLOR ATTRIBUTE   *
449: * INDATA :BX=COLOR                                        *
450: * OUTDATA:COLOR SET TO DX                                 *
451: ***********************************************************
452: !
453: SETCOLOR   PROC    NEAR
454:            MOV     AH,0BH
455:            INT     16
456:            RET
457: SETCOLOR   ENDP
458: PDATE              PROC    NEAR
459:            MOV     AH,2AH
460:            INT     21H
461:            MOV     BX,DX
462:            MOV     DL,BH
463:            CALL    STDDEC8OUT
464:            MOV     AL,'/'
465:            CALL    STDOUT
466:            MOV     DL,BL
467:            CALL    STDDEC8OUT
468:            MOV     AL,'/'
469:            CALL    STDOUT
470:            MOV     DX,CX
471:            CALL    STDDEC16OUT
472:            CALL    STDOUTSP
473:            RET
474: PDATE              ENDP
475: PTIME              PROC    NEAR
476:            MOV     AH,2CH
477:            INT     21H
478:            MOV     BX,DX
479:            MOV     DL,CH
480:            CALL    STDDEC8OUT
481:            MOV     AL,':'
482:            CALL    STDOUT
483:            MOV     DL,CL
484:            CALL    STDDEC8OUT
485:            MOV     AL,':'
486:            CALL    STDOUT
487:            MOV     DL,BH
488:            CALL    STDDEC8OUT
489:            MOV     AL,' '
490:            CALL    STDOUT
491:            RET
492: PTIME              ENDP

1:*         %OUT    E.L.Didion & E.Lyle FMR Application 4
2: COMMENT !
3: ***********************************************************
4: * CREATEFILE SUBROUTINE                                   *
5: * INDATA :DS:DX=POINTER TO F.  NE  (DRIVE,PATH,FILENAME)  *
6: * OUTDATA:CARRY CLEAR IF OK, AX=HANDLE                    *
7: *        :CARRY SET THERE WAS AN ERROR AND AX=ERROR CODE  *
8: ***********************************************************
```

```
 9: |
10: CREATEFILE   PROC     NEAR
11:              PUSH     CX
12:              MOV      CX,32           ;SET FILE ATTRIBUTE
13:              MOV      AH,3CH          ;SET UP CALL FOR DOS
14:              INT      21H             ;CALL DOS TO WRITE TO FILE
15:              POP      CX              ;GET CX BACK
16:              RET                      ;RETURN TO CALLER
17: CREATEFILE   ENDP
18: ;
19: COMMENT |
20: ***********************************************************
21: * OPENFILE ROUTINE                                         *
22: * INDATA :DS:DX=POINTER TO FILE NAME (DRIVE,PATH,FILENAME) *
23: * OUTDATA:IF NO ERROR AX=FILE HANDLE                       *
24: *        :IF ERROR AX=ERROR CODE                           *
25: ***********************************************************
26: |
27: OPENFILE     PROC     NEAR
28:              MOV      AX,3D02H
29:              INT      21H
30:              JNC      OPENFILE1
31:              CALL     ERRORRET
32:              STC
33: OPENFILE1:   RET
34: OPENFILE     ENDP
35: ;
36: COMMENT |
37: ***********************************************************
38: * ROUTINE TO OPEN A FILE FOR APPEND                        *
39: * INDATA :DS:DX=ADDRESS TO ASCII FOR THE FILE NAME STRING  *
40: * OUTDATA:AX=FILE HANDLE                                   *
41: ***********************************************************
42: |
43: OPENAPPEND   PROC     NEAR
44:              PUSH     DX
45:              CALL     OPENFILE
46:              POP      DX
47:              JNC      APPENDOK
48:              CALL     CREATEFILE
49: APPENDOK:    PUSH     AX
50:              MOV      BX,AX
51:              MOV      AX,4202H
52:              MOV      CX,0
53:              MOV      DX,0
54:              INT      21H
55:              POP      AX
56: APPEND_END:  RET
57: OPENAPPEND   ENDP
58: ;
59: COMMENT |
60: ***********************************************************
61: * CLOSEFILE ROUTINE                                        *
62: * INDATA :BX=HANDLE                                        *
63: ***********************************************************
64: |
65: CLOSEFILE    PROC     NEAR
66:              MOV      AH,3EH          ;SET FOR DOS CALL
67:              INT      21H             ;CALL DOS TO CLOSE THE FILE
68:              RET                      ;RETURN TO CALLER
69: CLOSEFILE    ENDP
70: ;
71: COMMENT |
72: ***********************************************************
73: * WRITEFILE ROUTINE                                        *
74: * INDATA :DX=MESSAGE ADDRESS                               *
75: *        :BX=HANDLE                                        *
76: *        :CX=WORDCOUNT                                     *
77: * OUTDATA:CARRY SET IF AN ERROR WAS DETECTED               *
78: *        :IF CARRY SET AX=ERROR CODE                       *
79: *        :IF CARRY NOT SET AX=#OF WORDS WRITTEN            *
80: ***********************************************************
81: |
82: WRITEFILE    PROC     NEAR
83:              PUSH     SI
84:              MOV      AH,40H          ;SET UP FOR DOS CALL FOR WRITE
85:              INT      21H             ;GO TO DOS FOR WRITE FUNCTION
86:              JNC      WRITEFILE1
87:              CALL     ERRORRET        ;GO GET THE ERROR CODE *
88:              CMP      AX,0            ;ANY ERROR'S DURING WRITE ?
89:              CLC                      ;SET NO ERROR'S
90:              JE       WRITEFILE1      ;RETURN IF ALL OK
```

```
 91:               STC                          ;SET CARRY IF NOT ALL WRITTEN!
 92: WRITEFILE1:   POP      SI
 93:               RET
 94: WRITEFILE     ENDP
 95: ;
 96: COMMENT !
 97: ****************************************************
 98: * READFILE ROUTINE                                  *
 99: * INDATA :BX=FILE HANDLE                            *
100: *        :CX=NUMBER OF WORDS TO READ                *
101: *        :DX=READ BUFFER ADDRESS                    *
102: * OUTDATA:CARRY SET IF ERROR IS DECTECTED           *
103: *        :IF CARRY SET AX=ERROR CODE *              *
104: *        :IF CARRY NOT SET THEN AX=# OF WORDS READ  *
105: ****************************************************
106: !
107: READFILE      PROC     NEAR
108:               MOV      AH,3FH              ;SET UP FOR DOS CALL TO READ FI
109:               INT      21H                 ;CALL DOS TO READ FILE
110:               CALL     ERRORRET
111:               CMP      AX,0                ;ANY ERRORS DURING READ ?
112:               CLC                          ;SET NO ERROR'S
113:               JE       READFILE1
114:               STC                          ;MARK ERROR FOUND FOR CALLER
115: READFILE1:    RET                          ;RETURN TO CALLER
116: READFILE      ENDP
117: ERRORRET      PROC     NEAR
118:               MOV      AH,59H
119:               MOV      BX,0
120:               INT      21H
121:               RET
122: ERRORRET      ENDP

1: *             %OUT     E.L.Didion & E.Lyle FMR Application 5
  2: COMMENT !
  3: ****************************************************
  4: * ROUTINE TO SEND ONE CHAR    HE STANDARD OUTPUT DEVICE *
  5: * INDATA :CHAR TO BE OUTPUT     AL                 *
  6: ****************************************************
  7: !
  8: STDOUT                 PROC     NEAR
  9:               PUSH     DS
 10:               PUSH     ES
 11:               PUSHA
 12:               CMP      AL,7                ;IS IT A BELL CHAR ?
 13:               JE       STD00X
 14:               CALL     STDOUTTTY
 15:               JMP      STD3
 16: STD00:        CMP      ATTB,0
 17:               JNE      STD4
 18: STD00X:       MOV      DL,AL
 19:               MOV      AH,2
 20:               PUSH     DS
 21:               INT      21H
 22:               POP      DS
 23:               JMP      STD3
 24: STD4:         CMP      AL,10               ;IF LINE FEED THROW IT AWAY
 25:               JE       STD3
 26:               CMP      AL,13               ;IF CR,THEN OUTPUT CR&LF
 27:               JNE      STD0
 28:               CALL     STDOUTCRLF
 29:               JMP      STD3
 30: STD0:         MOV      DL,AL
 31:               MOV      BH,0
 32:               MOV      BL,ATTB
 33:               MOV      CX,1
 34:               CALL     STDOUTTTY
 35: STD3:         POPA
 36:               POP      ES
 37:               POP      DS
 38:               RET                          ;RETURN TO CALLER
 39: STDOUT        ENDP
 40: COMMENT !
 41: ****************************************************
 42: * ROUTINE TO SEND A CHAR TO THE SCREEN AS IF IT WERE A TTY *
 43: * INDATA    :AL=CHAR TO DISPLAY                    *
 44: * OUTDATA   :CHAR DISPLAYED ON SCREEN              *
 45: ****************************************************
```

```
46: |
47: STDOUTTTY   PROC    NEAR
48:             CMP     AL,10           ;IS IT LINE FEED CHAR ?
49:             JNE     TTYOUT7         ;IF SO, DUMP IT
50:             RET
51: TTYOUT7:    PUSHA                   ;SAVE ALL CALLER'S REGISTERS
52:             PUSH    DS              ;SAVE   CALLER'S DS REG.
53:             PUSH    ES              ;SAVE CALLER'S EXTRA SEGMENT
54:             MOV     CX,DOS_SEG      ;GET DOS SEGMENT (NORMAL=40H)
55:             MOV     DS,CX           ;SET DOS SEGMENT ACTIVE
56:             MOV     CX,0B800H       ;GET PAGE ONE VALUE
57:             MOV     ES,CX           ;SET PAGE 1 VIDEO ADDRESS IN ES
58:             CMP     AL,13           ;IS IT CARRIAGE RETURN CHAR ?
59:             JE      TTYOUT4         ;IF SO, GO DO SCROLL ONE LINE
60:             CMP     AL,8            ;IS IT BACK ARROW CHAR ?
61:             JNE     TTYOUT5Z
62:             JMP     TTYOUT5
63: TTYOUT5Z:   PUSH    AX              ;SAVE THE CHARACTER
64:             CALL    FIND_POS        ;CHECK WHERE WE ARE NOW
65:             MOV     DI,ADDR_6845    ;GET INDIRECT POINTER FOR 6845
66:             MOV     DX,[DI]         ;GET I/O ADD FOR 6845 CONT.
67:             ADD     DX,6            ;GET STATUS REGISTER ADDRESS
68:             MOV     DI,BX           ;PUT STORE ADDRESS IN DI
69: STDOUTTTY1: IN      AL,DX           ;READ THE CONTROLER STATUS
70:             TEST    AL,1            ;IS IT LOW
71:             JNZ     STDOUTTTY1      ;NO, GO CHECK AGAIN
72:             CLI                     ;TURN OFF THE INTERRUPTS
73: STDOUTTTY2: IN      AL,DX           ;READ THE CONTROLER STATUS
74:             TEST    AL,1            ;IS IT HIGH
75:             JZ      STDOUTTTY2      ;NO, GO CHECK AGAIN
76:             POP     AX              ;GET THE CHAR BACK
77: TTYOUT:     STOSB                   ;DISPLAY THE CHAR
78:             MOV     BX,DS           ;SAVE DOS SEGMENT IN BX
79:             MOV     AX,CGROUP       ;GET OUR DATA SEGMENT ADDRESS
80:             MOV     DS,AX
81:             MOV     AL,ATTB         ;GET ATTRIBUTE
82:             MOV     CX,DS           ;SAVE OUR DATA SEGMENT
83:             MOV     DS,BX           ;GET DOS DATA SEGMENT BACK
84:             STOSB                   ;STORE THE ATTRIBUTE BYTE
85:             MOV     DS,CX           ;GET OUR DATA SEGMENT BACK
86:             MOV     DI,DOSCURSOR    ;GET ADDRESS TO DOS CURSOR POS.
87:             MOV     DS,BX           ;GET DOS DATA SEG BACK
88:             MOV     DX,[DI]         ;GET WHERE WE ARE NOW
89:             INC     DL              ;MOV CURSOR RIGHT BY ONE
90:             MOV     DS,CX           ;GET OUR DATA SEG BACK
91:             POP     DX
92:             PUSH    DX
93:             MOV     AX,DX
94:             MOV     DX,1503H
95:             CALL    SHOWREG
96:             POP     DX
97:             POP     AX
98:             POP     SI
99: |
100:            CMP     BYP[SI],0
101:            JE      A050
102:            CLC
103: LENO:      ADD     SI,2
104:            MOV     AX,[SI]
105:            MOV     DI,AX
106:            MOV     [DI],DX
107:            MOV     [SI],DX
108: A045:      XOR     AX,AX
109:            MOV     SI,DX
110:            MOV     [SI],AX
111: A145:      POP     SI
112:            POP     DX
113:            POP     AX
114: COMMENT |
115: THIS CODE LEFT FOR TESTING WHEN NESSESSARY
116:            PUSH    SI
117:            PUSH    DX
118:            PUSH    AX
119:            LEA     SI,FOAD
120:            ADD     SI,AX
121:            MOV     AX,WP[SI]
122:            MOV     DX,1601H
123:            CALL    SHOWREG
124:            MOV     DX,1606H
125:            MOV     AX,WP[SI+2]
126:            CALL    SHOWREG
```

```
127:            POP     AX
128:            POP     DX
129:            POP     SI
130: |
131:            RET
132: A050:              MOV     [SI],DX
133:            ADD     SI,2
134:            MOV     [SI],DX
135:            JMP     A045
136: LINKEND    ENDP
137: COMMENT |
138: ++++++++++++++++++++++++++++++++++++++++++++++++++++++
139: F05 ENTRY POINT FOR MODULE F05 UNLINK
140: INDATA :AX=BIAS OF QUEUE ROOT
141: OUTDATA:DX=ADDRESS OF WORK AREA IF FOUND,DX=0 IF NOT FOUND
142: ++++++++++++++++++++++++++++++++++++++++++++++++++++++
143: |
144: UNLINK             PROC    NEAR
145:            PUSH    CS
146:            POP     DS
147: COMMENT |
148: THIS IS LEFT FOR TESTING WHEN NESSESSARY
149:            PUSH    AX
150:            MOV     DX,130EH
151:            CALL    LOCATE
152:            POP     AX
153:            PUSH    AX
154:            MOV     DX,AX
155:            CALL    STDHEX16OUT
156:            POP     AX
157: |
158:            LEA     SI,FQAD
159:            ADD     SI,AX
160: COMMENT |
161: THIS CODE IS LEFT FOR TESTING WHEN NESSESSARY
162:            PUSH    SI
163:            PUSH    AX
164:            PUSH    DX
165:            MOV     AX,WP[SI]
166:            MOV     DX,140CH
167:            CALL    SHOWREG
168:            MOV     AX,WP[SI+2]
169:            MOV     DX,1412H
170:            CALL    SHOWREG
171:            POP     DX
172:            POP     AX
173:            POP     SI
174: |
175:            MOV     DX,[SI]
176:            CMP     DX,0
177:            JE      UNLINK3
178:            MOV     DI,DX
179:            MOV     AX,[D
180:            MOV     [SI],
181:            CMP     AX,0
182:            JNE     UNLINK3A
183:            MOV     [SI+2],AX       ;CLEAR LAST ALSO
184: UNLINK3A:  MOV     AX,0
185:            MOV     WP[DI],AX
186: UNLINK3:   NOP
187: COMMENT |
188: THIS CODE IS LEFT FOR TESTING WHEN NESSESSARY
189:            PUSH    SI
190:            PUSH    AX
191:            PUSH    DX
192:            MOV     AX,DX
193:            MOV     DX,150FH
194:            CALL    SHOWREG
195:            MOV     AX,WP[SI]
196:            MOV     DX,160CH
197:            CALL    SHOWREG
198:            MOV     AX,WP[SI+2]
199:            MOV     DX,1612H
200:            CALL    SHOWREG
201:            POP     DX
202:            POP     AX
203:            POP     SI
204: |
205:            RET
206: UNLINK     ENDP
```

```
207: COMMENT |
208: ***********************************
209: F06 ENTRY POINT FOR MODULE F06 WADROP
210: INDATA :DX=WORK ADDRESS
211: ***********************************
212: |
213: WADROP          PROC    NEAR
214:         XOR     BX,BX
215:         MOV     CX,8
216:         MOV     SI,DX           ;DX=WORK AREA ADDRESS
217: WALOOP: ADD     BX,2
218:         MOV     WP[SI+BX],0
219:         LOOP    WALOOP
220:         MOV     AX,WA1B
221:         CALL    LINKEND
222:         RET
223: WADROP          ENDP
224: COMMENT |
225: ****************************************************
226: F07 ENTRY POINT FOR MODULE F07 WAGET
227: INDATA :AX=BIAS OF QUEUE ROOT OF SMALLEST ACCEPTABLE SIZE WORK AREA
228: OUTDATA:DX=0=NO ACCEPTABLE SIZE WAS AVAILABLE,IF FOUND DX=WA ADDRESS
229: ****************************************************
230: |
231: WAGET           PROC    NEAR
232:         PUSH    SI
233:         XOR     AX,AX
234:         CALL    UNLINK
235: WAGET3: POP     SI
236:         RET
237: WAGET           ENDP
238: ;
239: WORKADD    DW   0
240: WR00       DW   0
241: WR01       DW   0
242: WR02       DW   0
243: WR03       DW   0
244: WR04       DW   0
245: WR05       DW   0
246: BIAS       DW   0
247: WRCOM1          DW   0
248: WRCOM2          DW   0
249: WA1B       EQU  0
250:    ; WORK AREA ALLOCATIONS
251:            IF   SYSTEM100
252: AD1WS           EQU     300
253: AD1WN           EQU     50
254:            ENDIF
255:            IF   SYSTEM500
256: AD1WS           EQU     300
257: AD1WN           EQU     50
258:            ENDIF
259:            IF   SYSTEM1000
260: AD1WS           EQU     300
261: AD1WN           EQU     50
262:            ENDIF
263:            IF   SYSTEM2500
264: AD1WS           EQU     300
265: AD1WN           EQU     50
266:            ENDIF
267:            IF   SYSTEM1'
268: AD1WS           EQU
269: AD1WN           EQU
270:            ENDIF
271:            IF   SYSTEMASTRO
272: AD1WS           EQU     300
273: AD1WN           EQU     50
274:            ENDIF
275:            IF   SYSTEMASTRO1
276: AD1WS           EQU     300
277: AD1WN           EQU     50
278:            ENDIF
279:            IF   SYSTEMNOVA
280: AD1WS           EQU     300
281: AD1WN           EQU     50
282:            ENDIF
283:            IF   SYSTEMEXRO
284: AD1WS           EQU     300
285: AD1WN           EQU     50
```

```
286:        ENDIF
287: AD1W   DB      (AD1WN+AD1WS) DUP(0)
288: FOAD   DB      25 DUP(0)
```

*Copyright*
*GTE Mobilnet Incorporated*
*All Rights Reserved*

We claim:

1. A method for enabling a roaming CMR subscriber to automatically receive, in a foreign service area, calls placed to his home service area, the method comprising the steps:
   (a) receiving at a foreign service area MTSO request information indicating that the roaming CMR subscriber desires to receive, in the foreign service area, calls placed to his home service area;
   (b) validating the roaming subscriber;
   (c) upon validation of the roaming subscriber, assigning the roaming subscriber a temporary directory number (TDN) for use in the foreign service area; and
   (d) providing command information to the roaming CMR subscriber's home service area MTSO so as to enable the roaming CMR subscriber's home service area MTSO to call forward, to the TDN, calls placed to the roaming CMR subscriber's MID in his home service area.

2. A method for enabling a roaming CMR subscriber to automatically receive, in a foreign service area, calls placed to his home service area as defined in claim 1 wherein, according to Step (a), the foreign service area MTSO receives a predetermined code initiated by the roaming CMR subscriber.

3. A method for enabling a roaming CMR subscriber to automatically receive, in a foreign service area, calls placed to his home service area as defined in claim 2 wherein the predetermined code comprises information entered by the roaming CMR subscriber at a control unit included in a mobile unit.

4. A method for enabling a roaming CMR subscriber to automatically receive, in a foreign service area, calls placed to his home service area as defined in claim 1 wherein, according to Step (d), the command information is provided to the roaming CMR subscriber's home service area MTSO via a communications link between the home service area MTSO and the foreign service area MTSO.

5. A method for enabling a roaming CMR subscriber to automatically receive, in a foreign service area, calls placed to his home service area as defined in claim 4 wherein the command information constitutes a command to the roaming CMR subscriber's home service area MTSO to call forward, to the TDN, calls placed to the roaming CMR subscriber's MID in his home service.

6. A method for activating a procedure that enables calls placed to a CMR subscriber's MID to be automatically forwarded to a service area outside the CMR subscriber's home service area, the method comprising the steps:
   (a) accepting a predetermined code initiated by the subscriber, which code indicates that calls received in the subscriber's home area to his MID are to be forwarded outside his home service area;
   (b) assigning the roaming subscriber a temporary directory number (TDN), to which TDN calls placed to the subscriber's MID in his home service area are to be forwarded; and
   (c) commanding an MTSO in the subscriber's home service area to forward, to the TDN, calls placed to the subscriber's MID in his home service area.

7. A method for activating a procedure that enables calls placed to a CMR subscriber's MID to be automatically forwarded to a service area outside the CMR subscriber's home service area as defined in claim 6 wherein, prior to either Step (b) or Step (c), a step is performed whereby the subscriber is validated.

8. A method for activating a procedure that enables calls placed to a CMR subscriber's MID to be automatically forwarded to a service area outside the CMR subscriber's home service area as defined in claim 7 wherein the subscriber is validated by affirmatively determining, according to predetermined criteria, that the subscriber's home service area is a service area from which calls may be forwarded to a service area in which the subscriber is roaming.

9. A method for activating a procedure that enables calls placed to a CMR subscriber's MID to be automatically forwarded to a service area outside the CMR subscriber's home service area as defined in claim 7 wherein the subscriber is validated by affirmatively determining that the subscriber is authorized to receive calls in his home service area.

10. A method for activating a procedure that enables calls placed to a CMR subscriber's MID to be automatically forwarded to a service area outside the CMR subscriber's home service area as defined in claim 9 wherein the subscriber is validated by additionally affirmatively determining, according to predetermined criteria, that the subscriber's home service area is a service area from which calls may be forwarded to a service area in which the subscriber is roaming.

11. A method for activating a procedure that enables calls placed to a CMR subscriber's MID to be automatically forwarded to a service area outside the CMR subscriber's home service area as defined in claim 7 wherein the subscriber is validated by affirmatively determining that the ESN associated with the mobile unit used by the subscriber is an ESN that has not been denied service and by affirmatively determining that the subscriber is authorized to receive calls in his home service area.

12. A method for activating a procedure that enables calls placed to a CMR subscriber's MID to be automatically forwarded to a service area outside the CMR subscriber's home service area as defined in claim 11 wherein the subscriber is validated by additionally affirmatively determining, according to predetermined criteria, that the subscriber's home service area is a service area from which calls may be forwarded to a service area in which the subscriber is roaming.

13. A method for activating a procedure that enables calls placed to a CMR subscriber's MID to be automatically forwarded to a service area outside the CMR subscriber's home service area as defined in claim 7 wherein the subscriber is validated by affirmatively determining that the ESN associated with the mobile unit used by the subscriber correlates positively with the MID associated with the mobile unit the subscriber is using, by affirmatively determining that the ESN associated with the mobile unit used by the subscriber has not been denied service, and by affirmatively determining that the subscriber is authorized to receive calls in his home service area.

14. A method for activating a procedure that enables calls placed to a CMR subscriber's MID to be automatically forwarded to a service area outside the CMR subscriber's home service area as defined in claim 13 wherein the subscriber is validated by additionally affirmatively determining, according to predetermined criteria, that the subscriber's home service area is a service area from which calls may be forwarded to a service area in which the subscriber is roaming.

15. An apparatus for enabling a roaming CMR subscriber to automatically receive, in a foreign service area, calls placed to his home service area, the apparatus comprising a computer for coupling both to a switch associated in the home service area and to a switch associated with the roaming service area and programmed to:
   (1) receive information indicating that calls placed to the home service area are to be forwarded to the foreign service area;
   (2) assign the subscriber a temporary directory number (TDN) in the foreign switch; and
   (3) command the home switch to forward, to the TDN, calls placed to the home service area.

16. An apparatus as defined in claim 15 wherein the computer is programmed to validate the subscriber as a prerequisite to either Step (1) or Step (2).

17. An apparatus as defined in claim 15 wherein the computer is programmed to validate the subscriber as a prerequisite to both Step (1) and Step (2).

18. A CMR system that automatically forwards, to a foreign service area outside a CMR subscriber's home service area, calls placed to the subscriber's home service area, the system comprising:
   home MTSO means associated with the home service area and including a home switch for receiving calls placed to the subscriber's MID;
   foreign MTSO means associated with a foreign service area and including a foreign switch;
   control computer means coupled to the home switch and to the foreign switch for (1) receiving information indicating that calls placed to the CMR subscriber's home MTSO are to be forwarded to the foreign MTSO; (2) assigning the CMR subscriber a temporary directory number (TDN) in conjunction with the foreign switch for use in the foreign service area; and (3) providing information to the home switch that enables the home switch to forward, to the TDN at the foreign switch, calls placed to the CMR subscriber's MID in the home service area.

19. A CMR system as defined in claim 18 wherein control computer means is operable for validating the CMR subscriber before assigning the TDN and before providing information to the home switch that enables the home switch to forward calls to the TDN.

20. A CMR system as defined in claim 18 wherein the information received by the control computer means indicating that calls placed to the CMR subscriber's home MTSO are to be forwarded to the foreign MTSO is information derived from a predetermined code initiated by the CMR subscriber and transmitted through a control head associated with a mobile unit.

21. A CMR system as defined in claim 20 wherein the control computer means is operable for validating the CMR subscriber before assigning the TDN and before providing information to the home switch that enables the home switch to forward calls to the TDN.

22. A CMR system as defined in claim 21 wherein validating by the control computer means includes affirmatively determining, according to predetermined criteria, that the subscriber's home service area is a service area from which calls may be forwarded to the foreign service area.

23. A CMR system as defined in claim 22 wherein validating by the computer means includes affirmatively determining that the subscriber is authorized to receive calls in his home service area.

24. A CMR system as defined in claim 23 wherein validating by the computer means includes determining in the affirmative that the ESN associated with the mobile unit is an ESN that has not been denied service.

25. A CMR processing system for automatically enabling predetermined calls placed to a home CMR service area to be forwarded to a foreign service area, the system comprising:
   (i) means associated with the foreign service area for receiving information that predetermined calls placed to the home service area are to be directed to the foreign service area;
   (ii) means associated with the foreign service area for assigning a temporary directory number (TDN) to which the calls are to be directed; and
   (iii) means associated with the foreign service area for providing information to the home service area so as to enable the home service area to direct the calls to the TDN.

26. A CMR processing system as defined in claim 25 wherein the means recited in claim 25, clause (i) includes program instructions that respond to the reception at the foreign service area of a code initiated by or on behalf of a roaming CMR subscriber.

27. A CMR processing system as defined in claim 26 wherein the program instructions respond to a code entered at a CMR mobile unit.

28. A CMR processing system as defined in claim 25 further comprising:
   (iv) means for determining whether the predetermined calls are entitled to be forwarded from the home service area to the foreign service area.

29. A CMR processing system as defined in claim 28 wherein the means recited in claim 28, Clause (iv) includes a first set of program instructions for affirmatively determining, according to predetermined criteria, that the home service area is a service area from which calls may be forwarded to the foreign service area.

30. A CMR processing system as defined in claim 29 wherein the predetermined calls are intended to be received at a mobile unit that has been assigned a particular MID and a particular ESN and wherein the first set of program instructions affirmatively determines that the ESN has not been denied service in the home service area and that the home service area will accept and place calls to the MID.

31. A CMR processing system as defined in claim 30 wherein the means recited in claim 25, Clause (i) includes program instructions that respond to the reception at the foreign service area of a code initiated by or on behalf of a roaming CMR subscriber.

32. A CMR processing system as defined in claim 31 wherein the program instructions respond to a code entered at a CMR mobile unit.

33. A method for enabling a CMR subscriber to automatically receive, in a foreign service area, calls placed to his home service area, the method comprising the steps:
   (a) receiving at a foreign service area MTSO a request indicating that the CMR subscriber desires to receive, in the foreign service area, calls placed to his home service area;
   (b) validating the roaming subscriber;
   (c) upon validation of the roaming subscriber, assigning the roaming subscriber a temporary directory number (TDN) for use in the foreign service area;
   (d) accessing the subscriber's feature package in his home service area and ensuring that the feature package includes Call Forwarding for the purpose of enabling the subscriber to receive calls in the foreign service area; and
   (e) providing information to the CMR subscriber's home service area MTSO so as to enable the CMR subscriber's home service area MTSO to call forward, to the TDN, calls placed to the CMR subscriber's MID in his home service area.

34. A method for enabling a CMR subscriber to automatically receive, in a foreign service area, calls placed to his home service area as defined in claim 33 wherein, according to Step (a), the foreign service area MTSO receives a predetermined code initiated by the CMR subscriber.

35. A method for enabling a CMR subscriber to automatically receive, in a foreign service area, calls placed to his home service area as defined in claim 34 wherein the predetermined code comprises information entered by the CMR subscriber at a control head included in a mobile unit.

36. A method for enabling a CMR subscriber to automatically receive, in a foreign service area, calls placed to his home service area as defined in claim 33 wherein, according to Step (e), the information is provided to the CMR subscriber's home service area MTSO via a communications link between the home service area MTSO and the foreign service area MTSO.

37. A method for enabling a CMR subscriber to automatically receive, in a foreign service area, calls placed to his home service area as defined in claim 36 wherein, according to Step (e), the information constitutes a command to the roaming CMR subscriber's home service area MTSO to call forward, to the TDN, calls placed to the CMR subscriber's MID in his home service area.

38. A method for enabling a CMR subscriber to automatically receive, in a foreign service area, calls placed to his home service area as defined in claim 37 wherein, according to Step (a), the foreign service area MTSO receives a predetermined code initiated by the CMR subscriber.

39. A method for enabling a CMR subscriber to automatically receive, in a foreign service area, calls placed to his home service area as defined in claim 38 wherein the predetermined code comprises information entered by the CMR subscriber at a control head included in a mobile unit.

40. A method for enabling a CMR subscriber to automatically receive, in a foreign service area, calls placed to his home service area as defined in claim 33 wherein, upon the receipt of a request according to Step (a), a determination is made whether the request is a duplicate request.

41. A method for enabling a CMR subscriber to automatically receive, in a foreign service area, calls placed to his home service area as defined in claim 40 wherein, according to Step (a), the foreign service area MTSO receives a predetermined code initiated by the CMR subscriber.

42. A method for enabling a CMR subscriber to automatically receive, in a foreign service area, calls placed to his home service area as defined in claim 41 wherein the predetermined code comprises information entered by the CMR subscriber at a control head included in a mobile unit.

43. A method for enabling a CMR subscriber to automatically receive, in a foreign service area, calls placed to his home service area as defined in claim 40 wherein, according to Step (e), the information is provided to the CMR subscriber's home service area MTSO via a communications link between the home service area MTSO and the foreign service area MTSO.

44. A method for enabling a CMR subscriber to automatically receive, in a foreign service area, calls placed to his home service area as defined in claim 43 wherein, according to Step (e), the information constitutes a command to the roaming CMR subscriber's home service area MTSO to call forward, to the TDN, calls placed to the CMR subscriber's MID in his home service area.

45. A method for enabling a CMR subscriber to automatically receive, in a foreign service area, calls placed to his home service area as defined in claim 44 wherein, according to Step (a), the foreign service area MTSO receives a predetermined code initiated by the CMR subscriber.

46. A method for enabling a CMR subscriber to automatically receive, in a foreign service area, calls placed to his home service area as defined in claim 45 wherein the predetermined code comprises information entered by the CMR subscriber at a control head included in a mobile unit.

47. A method for activating a procedure that enables calls placed to a CMR subscriber's home service area to be automatically forwarded to a foreign service area outside the CMR subscriber's home service area, the method comprising the steps:
   (a) receiving a request indicating that calls received in the subscriber's home service area to his MID are to be forwarded to the foreign service area;
   (b) determining whether the request is a duplicate request;
   (c) validating the subscriber, that is, verifying that calls placed to the subscriber's home service area to his MID are entitled to be transferred to the foreign service area;
   (d) upon validation of the subscriber, assigning the subscriber a temporary directory number, TDN, to which TDN calls placed to the subscriber's MID in his home service area are to be forwarded;
   (e) accessing the subscriber's feature package in his home service area and ensuring that the feature package includes Call Forwarding for the purpose of enabling the subscriber to receive calls in the foreign service area; and
(f) commanding an MTSO in the subscriber's home service area to forward, to the TDN, calls placed to the subscriber's MID in his home service area.

48. A method for activating a procedure that enables calls placed to a CMR subscriber's home service area to be automatically forwarded to a foreign service area outside the CMR subscriber's home service area as defined in claim 47 wherein the request comprises a predetermined code initiated by the subscriber and received by an MTSO in the foreign service area.

49. A method for activating a procedure that enables calls placed to a CMR subscriber's home service area to be automatically forwarded to a foreign service area outside the CMR subscriber's home service area as defined in claim 48 wherein the predetermined code comprises information entered by the subscriber at a control head included in a mobile unit.

50. A method for activating a procedure that enables calls placed to a CMR subscriber's home service area to be automatically forwarded to a foreign service area outside the CMR subscriber's home service area as defined in claim 47 wherein, according to Step (f), commanding is effected via a communications link between the home service area and the foreign service area MTSO.

51. A method for activating a procedure that enables calls placed to a CMR subscriber's home service area to be automatically forwarded to a foreign service area outside the CMR subscriber's home service area, as defined in claim 50 wherein the request comprises a predetermined code initiated by the subscriber and received by an MTSO in the foreign service area.

52. A method for activating a procedure that enables calls placed to a CMR subscriber's home service area to be automatically forwarded to a foreign service area outside the CMR subscriber's home service area, as defined in claim 51 wherein the predetermined code comprises information entered by the subscriber at a control head included in a mobile unit.

53. A method for activating a process that enables calls placed to a CMR subscriber's home service area to be automatically forwarded to a foreign service area outside the CMR subscriber's home service area, the method comprising the steps:
(a) receiving an activation request indicating that calls received in the subscriber's home service area to his MID are to be forwarded to the foreign service area;
(b) determining whether the activation request is a duplicate request;
(c) assigning the subscriber a temporary directory number (TDN), to which TDN calls placed to the subscriber's MID in his home service area are to be forwarded; and
(d) commanding an MTSO in the subscriber's home service area to forward, to the TDN, calls placed to the subscriber's MID in his home service area.

54. A method for activating a process that enables calls placed to a CMR subscriber's home service area to be automatically forwarded to a foreign service area outside the CMR subscriber's home service area as defined in claim 53 wherein, in accordance with Step (b), a determination is made whether the duplicate request is a valid duplicate request or an invalid duplicate request.

55. A method for activating a process that enables calls placed to a CMR subscriber's home service area to be automatically forwarded to a foreign service area outside the CMR subscriber's home service area as defined in claim 54 wherein:
(i) if the duplicate request is determined to be a valid duplicate request, the subscriber is re-activated, and
(ii) if the duplicate request is determined to be an invalid duplicate request, the duplicate request is substantially discarded.

56. A method for activating a process that enables calls placed to a CMR subscriber's home service area to be automatically forwarded to a foreign service area outside the CMR subscriber's home service area as defined in claim 55 wherein, as a prerequisite to Step (c), the subscriber is validated, that is, it is verified that calls placed to the subscriber's home service area are entitled to be transferred to the foreign service area.

57. A method for activating a process that enables calls placed to a CMR subscriber's home service area to be automatically forwarded to a foreign service area outside the CMR subscriber's home service area as defined in claim 56, wherein the method comprises the additional step:
(e) accessing the subscriber's feature package in his home service area and ensuring that the feature package includes Call Forwarding for the purpose of enabling the subscriber to receive calls in the foreign service area.

58. A method for activating a process that enables calls placed to a CMR subscriber's home service area to be automatically forwarded to a foreign service area outside the CMR subscriber's home service area as defined in claim 53 wherein, in response to an activation request, a data record is created, which data record contains the subscriber's MID and a TDN.

59. A method for activating a process that enables calls placed to a CMR subscriber's home service area to be automatically forwarded to a foreign service area outside the CMR subscriber's home service as defined in claim 58 wherein:
a plurality of data records is established, said data records each containing an MID; and
in response to said activation request, a search is made of the then-existing data records to identify a match, if any, between the subscriber's MID and the MID in each of the respective, then-existing data records.

60. A method for activating a process that enables calls placed to a CMR subscriber's home service area to be automatically forwarded to a foreign service area outside the CMR subscriber's home service area as defined in claim 59 wherein, if a match is identified, a determination is made that the activation request is a duplicate request.

61. A method for activating a process that enables calls placed to a CMR subscriber's home service area to be automatically forwarded to a foreign service area outside the CMR subscriber's home service area as defined in claim 60 wherein, in accordance with Step (b) a determination is made whether the duplicate request is a valid duplicate request or an invalid duplicate request.

62. A method for activating a process that enables calls placed to a CMR subscriber's home service area to be automatically forwarded to a foreign service area outside the CMR subscriber's home service area as defined in claim 61 wherein:
  (i) if the duplicate request is determined to be a valid duplicate request, the subscriber is re-activated, and
  (ii) if the duplicate request is determined to be an invalid duplicate request, the duplicate request is substantially discarded.

63. A method for activating a process that enables calls placed to a CMR subscriber's home service area to be automatically forwarded to a foreign service area outside the CMR subscriber's home service area as defined in claim 62 wherein, as a prerequisite to Step (c), the subscriber is validated, that is, it is verified that calls placed to the subscriber's home service area are entitled to be transferred to the foreign service area.

64. A method for activating a process that enables calls placed to a CMR subscriber's home service area to be automatically forwarded to a foreign service area outside the CMR subscriber's home service area as defined in claim 63, wherein the method comprises the additional step:
  (e) examining the subscriber's feature package in his home service area and, if a determination is made that the subscriber does not have Call Forwarding in that feature package, adding Call Forwarding to that feature package for the purpose of enabling the subscriber to receive calls in the foreign service area.

65. A method for activating a process that enables calls placed to a CMR subscriber's home service area to be automatically forwarded to a foreign service area outside the CMR subscriber's home service area as defined in claim 58 wherein the data record contains the time of activation, if there has in fact been an activation, corresponding to the activation request.

66. A method for activating a process that enables calls placed to a CMR subscriber's home service area to be automatically forwarded to a foreign service area outside the CMR subscriber's home service area as defined in claim 65 wherein:
  a plurality of data records is established, said data records each containing an MID; and
  in response to said activation request, a search is made of the then-existing data records to identify a match, if any, between the subscriber's MID and the MID in each of the respective, then-existing data records.

67. A method for activating a process that enables calls placed to a CMR subscriber's home service area to be automatically forwarded to a foreign service area outside the CMR subscriber's home service area as defined in claim 66 wherein, if a match is identified, a determination is made that the activation request is a duplicate request.

68. A method for activating a process that enables calls placed to a CMR subscriber's home service area to be automatically forwarded to a foreign service area outside the CMR subscriber's home service area as defined in claim 67 wherein, in accordance with Step (b) a determination is made whether the duplicate request is a valid duplicate request or an invalid duplicate request.

69. A method for activating a process that enables calls placed to a CMR subscriber's home service area to be automatically forwarded to a foreign service area outside the CMR subscriber's home service area as defined in claim 68 wherein the duplicate request is determined to be a valid duplicate request if the time of activation contained in the data record that resulted in the identification of a match is at least a predetermined length of time earlier than the time of the then-pending activation request.

70. A method for activating a process that enables calls placed to a CMR subscriber's home service area to be automatically forwarded to a foreign service area outside the CMR subscriber's home service area as defined in claim 69 wherein:
  (i) if the duplicate request is determined to be a valid duplicate request, the subscriber is re-activated, and
  (ii) if the duplicate request is determined to be an invalid duplicate request, the duplicate request is substantially discarded.

71. A method for activating a process that enables calls placed to a CMR subscriber's home service area to be automatically forwarded to a foreign service area outside the CMR subscriber's home service area as defined in claim 70 wherein, as a prerequisite to Step (c), the subscriber is validated, that is, it is verified that calls placed to the subscriber's home service area are entitled to be transferred to the foreign service area.

72. A method for activating a process that enables calls placed to a CMR subscriber's home service area to be automatically forwarded to a foreign service area outside the CMR subscriber's home service area as defined in claim 71, wherein the method comprises the additional step:
  (e) accessing the subscriber's feature package in his home service area and ensuring that the feature package includes Call Forwarding for the purpose of enabling the subscriber to receive calls in the foreign service area.

73. In a method for enabling a roaming CMR subscriber to automatically receive, in a foreign service area, calls placed to his home service area, which method comprises the steps:
  (a) receiving at a foreign service area MTSO an activation request indicating that the roaming CMR subscriber desires to receive, in the foreign service, calls placed to his home service area;
  (b) validating the roaming subscriber;
  (c) upon validation of the roaming subscriber, assigning the roaming subscriber a temporary directory number (TDN) for use in the foreign service area; and
  (d) providing command information to the roaming CMR subscriber's home service area MTSO so as to enable the roaming CMR subscriber's home service area MTSO to call forward, to the TDN, calls placed to the roaming CMR subscriber's MID in his home service area, THE IMPROVEMENT COMPRISING:
  (e) determining whether the activation request is a duplicate application request.

74. As improvement as defined in claim 73 wherein Step (e) is performed by searching then-existing data records to identify a match, if any, between the CMR subscriber's MID and the MID in each of the respective then-existing data records and, if a match is identified, determining that the activation request is a duplicate activation request.

75. An improvement as defined in claim 74 wherein, when a duplicate activation request is detected, a determination is made whether the duplicate activation request is a valid duplicate activation request or an invalid duplicate activation request.

76. An improvement as defined in claim 75 wherein:

(i) if the duplicate request is determined to be a valid duplicate request, the subscriber is re-activated, and (ii) if the duplicate request is determined to be an invalid duplicate request, the duplicate request is substantially discarded.

77. An improvement as defined in claim 76 wherein, if a time of activation contained in the data record that resulted in the identification of a match is at least a predetermined length of time earlier than the time of the then-pending duplicate activation request, the then-pending duplicate activation request is determined to be a valid duplicate activation request.

78. In a CMR system that includes a home MTSO associated with a home service area of a CMR subscriber, said home service area for receiving calls placed to the subscriber's MID, and that includes a foreign MTSO associated with a foreign service area, an apparatus for causing calls placed to the subscriber's home service area to be automatically call forwarded to the foreign service area when the subscriber is present in the foreign service area, the apparatus comprising a processor for coupling, via a communications link, to the home MTSO, said processor comprising:

(i) means for receiving information indicating that the CMR subscriber is present in the foreign service area, (ii) means for assigning the CMR subscriber a temporary directory number (TDN) in conjunction with the foreign MTSO for use in the foreign service area, and (iii) means for providing information to the home MTSO that enables the home MTSO to automatically call forward, to the TDN, calls placed to the CMR subscriber's MID in the home service area.

* * * * *